United States Patent
Ikeda et al.

(10) Patent No.: US 11,168,914 B2
(45) Date of Patent: Nov. 9, 2021

(54) OPERATING SYSTEM, INFORMATION PROCESSING DEVICE, CONTROL SYSTEM, AND INFRARED OUTPUT DEVICE

(71) Applicant: Daikin Industries, LTD., Osaka (JP)

(72) Inventors: Makoto Ikeda, Osaka (JP); Kousuke Tsuboi, Osaka (JP); Takao Sonoda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/618,821

(22) PCT Filed: Jul. 12, 2018

(86) PCT No.: PCT/JP2018/026410
§ 371 (c)(1),
(2) Date: Dec. 3, 2019

(87) PCT Pub. No.: WO2019/013309
PCT Pub. Date: Jan. 17, 2019

(65) Prior Publication Data
US 2020/0141607 A1 May 7, 2020

(30) Foreign Application Priority Data
Jul. 14, 2017 (JP) .............................. JP2017-138610
Jul. 14, 2017 (JP) .............................. JP2017-138614
(Continued)

(51) Int. Cl.
*H04B 10/00* (2013.01)
*F24F 11/56* (2018.01)
*G08C 17/00* (2006.01)

(52) U.S. Cl.
CPC .............. *F24F 11/56* (2018.01); *G08C 17/00* (2013.01); *G08C 2201/31* (2013.01)

(58) Field of Classification Search
CPC .... G08C 23/04; G08C 2201/93; G08C 17/00; G08C 2201/31; G08C 2201/41;
(Continued)

(56) References Cited

U.S. PATENT DOCUMENTS

2002/0111135 A1 8/2002 White et al.
2005/0216738 A1 9/2005 Kita et al.
(Continued)

FOREIGN PATENT DOCUMENTS

JP 6-113365 A 4/1994
JP 2006-203831 A 8/2006
(Continued)

OTHER PUBLICATIONS

International Preliminary Report of corresponding PCT Application No. PCT/JP2018/026410 dated Jan. 23, 2020.
(Continued)

*Primary Examiner* — Hibret A Woldekidan
(74) *Attorney, Agent, or Firm* — Global IP Counselors, LLP

(57) ABSTRACT

An operating system that can control any apparatus is provided. The operating system (1001) includes an input receiving device (1060), a first information processing device (1100), a second information processing device (1200), and an infrared output device (1070). The operating system (1001) operates a first-type apparatus (1010) operable by communication of an infrared pattern and a second-type apparatus (1020) operable via a network. The first information processing device (1100) is connected to the input receiving device (1060) and configured to analyze operation information corresponding to an input operation. The second information processing device (1200) is configured to control the second-type apparatus (1020) (controlled apparatus (B)) via the network based on a control instruc-
(Continued)

tion. The infrared output device (1070) is configured to output an infrared pattern corresponding to a control instruction to the first-type apparatus (1010) (controlled apparatus (A)).

4 Claims, 68 Drawing Sheets

(30) Foreign Application Priority Data

| | | | |
|---|---|---|---|
| Jul. 14, 2017 | (JP) | ............................. | JP2017-138615 |
| Jul. 14, 2017 | (JP) | ............................. | JP2017-138620 |

(58) Field of Classification Search
CPC ............ G08C 2201/42; G08C 2201/40; G08C 2201/92; G08C 2201/21; F24F 11/56; G06F 13/00; G10L 15/00; H04M 11/00; H04Q 9/00; H04B 10/1141; H04B 10/114; H04B 5/0062; H04B 10/00; H04B 10/11
USPC .......................... 398/106, 107, 108, 112, 109
See application file for complete search history.

(56) References Cited

U.S. PATENT DOCUMENTS

| | | | | |
|---|---|---|---|---|
| 2006/0064700 | A1* | 3/2006 | Ludvig | .............. H04N 21/4312 719/318 |
| 2007/0290876 | A1 | 12/2007 | Sato et al. | |
| 2009/0189032 | A1* | 7/2009 | Su | ......................... F16M 11/08 248/179.1 |
| 2014/0226077 | A1 | 8/2014 | Sato et al. | |
| 2015/0112667 | A1 | 4/2015 | Kozuka et al. | |
| 2015/0121425 | A1 | 4/2015 | Sato et al. | |
| 2018/0091846 | A1 | 3/2018 | Sato et al. | |

FOREIGN PATENT DOCUMENTS

| | | | | |
|---|---|---|---|---|
| JP | 3130081 | U | 2/2007 | |
| JP | 2011-250027 | A | 12/2011 | |
| JP | 2011250027 | A * | 12/2011 | ............. G08C 17/00 |
| JP | 2015-80195 | A | 4/2015 | |
| JP | 2017-46295 | A | 3/2017 | |

OTHER PUBLICATIONS

International Search Report of corresponding PCT Application No. PCT/JP2018/026410 dated Oct. 2, 2018.

European Search Report of corresponding EP Application No. 18 831 294.6 dated Jan. 29, 2021.

* cited by examiner

| ENVIRONMENTAL INFORMATION | CONTROLLED APPARATUS A (FIRST TYPE) | CONTROLLED APPARATUS B (SECOND TYPE) | ASSOCIATED APPARATUS D (FIRST TYPE) | ASSOCIATED APPARATUS E (SECOND TYPE) |
|---|---|---|---|---|
| ILLUMINANCE INFORMATION | S-MODEL TELEVISION | ... | S-MODEL LUMINAIRE | ... |
| ILLUMINANCE INFORMATION | ... | ... | ... | ... |
| TEMPERATURE INFORMATION | H-MODEL AIR CONDITIONER | ... | D-MODEL ELECTRIC FAN | ... |
| TEMPERATURE INFORMATION | ... | D-MODEL AIR CONDITIONER | C-MODEL FAR INFRARED HEATER | D-MODEL FAR INFRARED HEATER |
| TEMPERATURE INFORMATION | ... | ... | ... | ... |

| ENVIRONMENTAL INFORMATION | CONTROLLED APPARATUS A (FIRST TYPE) | CONTROLLED APPARATUS B (SECOND TYPE) | CONTROLLED APPARATUS C (THIRD TYPE) | ASSOCIATED APPARATUS D (FIRST TYPE) | ASSOCIATED APPARATUS E (SECOND TYPE) | ASSOCIATED APPARATUS F (THIRD TYPE) |
|---|---|---|---|---|---|---|
| ILLUMINANCE INFORMATION | S-MODEL TELEVISION | --- | --- | S-MODEL LUMINAIRE | --- | T-MODEL LUMINAIRE |
| ILLUMINANCE INFORMATION | --- | --- | T-MODEL TELEVISION | T-MODEL LUMINAIRE | --- | --- |
| TEMPERATURE INFORMATION | H-MODEL AIR CONDITIONER | --- | --- | D-MODEL ELECTRIC FAN | --- | --- |
| TEMPERATURE INFORMATION | --- | D-MODEL AIR CONDITIONER | --- | C-MODEL FAR INFRARED HEATER | D-MODEL FAR INFRARED HEATER | --- |
| TEMPERATURE INFORMATION | --- | --- | M-MODEL AIR CONDITIONER | D-MODEL ELECTRIC FAN | --- | M-MODEL ELECTRIC FAN |

1240S

OPERATING SYSTEM, INFORMATION PROCESSING DEVICE, CONTROL SYSTEM, AND INFRARED OUTPUT DEVICE

TECHNICAL FIELD

The present invention relates to an operating system, an information processing device, a control system, and an infrared output device.

BACKGROUND ART

Hitherto, development of an operating device that centralizes the operations of a plurality of apparatuses has been considered (see, for example, Patent Literature 1 (Japanese Registered Utility Model No. 3130081)).

In addition, for example, Patent Literature 2 (Japanese Laid-open Patent Publication No. H6-113365) describes a single infrared remote controller with which a plurality of apparatuses is operable.

SUMMARY OF THE INVENTION

Technical Problem

In recent years, operation input methods and apparatus management methods have been increasing in variety. For this reason, operations for individual apparatuses that users have can be complicated. With the increase in variety, there are increasing needs for control systems that can normally control apparatuses.

When an apparatus is operated with an infrared remote controller, a state where a behavior differs from the operation made with the infrared remote controller (here, such a state is referred to as operation failed state) can not be recognized, and the apparatus can be left in a state not desired by a user.

In such a situation, there are at least following tasks.

The first task is to provide an operating system and information processing device that can control any apparatus.

The second task is to provide a control system and infrared output device that can easily control any apparatus.

The third task is to provide a highly reliable control system.

The fourth task is to provide an operating system with which the state where a behavior of an intended apparatus operable with an infrared signal is inconsistent with an operation for the intended apparatus is less likely to be caused.

Solution to Problem

[First Invention]

A first invention for solving the first task is as follows.

An operating system according to a first aspect of the first invention includes an input receiving device, a first information processing device, a control instruction determination unit, a second information processing device, and an infrared output device. The operating system operates a first-type apparatus at least operable by communication of an infrared pattern and a second-type apparatus at least operable via a network. The input receiving device receives an input operation. The first information processing device is connected to the input receiving device, and includes an operation information analyzing unit that analyzes operation information corresponding to the input operation. The control instruction determination unit determines whether a result analyzed by the operation information analyzing unit includes a control instruction to the first-type apparatus or a control instruction to the second-type apparatus. The second information processing device is connected to the first information processing device and, when the control instruction determination unit determines that the control instruction to the second-type apparatus is included, controls the second-type apparatus via the network based on the control instruction. The infrared output device is connected to the first information processing device and/or the second information processing device and, when the control instruction determination unit determines that the control instruction to the first-type apparatus is included, outputs the infrared pattern corresponding to the control instruction to the first-type apparatus. The first information processing device or the second information processing device includes the control instruction determination unit.

With the operating system according to the first aspect of the first invention, when it is determined that the operation information includes the control instruction to the first-type apparatus as a result of analysis of the operation information, the first-type apparatus is controlled by transmitting the infrared pattern to the first-type apparatus. On the other hand, with the operating system, when it is determined that the operation information includes the control instruction to the second-type apparatus as a result of analysis of the operation information, the second-type apparatus is controlled via the network. Therefore, the apparatus not operable via the network (the first-type apparatus) is operated by the infrared output device, and the apparatus operable via the network (the second-type apparatus) is operated by the second information processing device, so any apparatus can be controlled.

An operating system according to a second aspect of the first invention is the operating system according to the first aspect of the first invention, wherein the operating system includes an operating device that accommodates the input receiving device and the infrared output device in one and the same casing. Since the input receiving device and the infrared output device are accommodated in the same casing as the operating device, any apparatus around the operating device can be controlled regardless of whether the apparatus is an apparatus operable via the network (second-type apparatus) or not.

An operating system according to a third aspect of the first invention is the operating system according to the first aspect or second aspect of the first invention, wherein the input receiving device determines whether the second-type apparatus has been controlled by the second information processing device and transmits a determined result to the first information processing device.

With the operating system according to the third aspect of the first invention, the input receiving device (the operating device) determines whether the second-type apparatus has been controlled by the second information processing device and transmits the determined result to the first information processing device. Therefore, for example, even when an administrator of the first information processing device is different from an administrator of the second information processing device, the administrator of the first information processing device is able to judge whether the second-type apparatus has been controlled by the second information processing device. Thus, the operating system can be appropriately managed.

An operating system according to a fourth aspect of the first invention is the operating system of any one of the first to third aspects of the first invention, wherein the input receiving device determines whether the first-type apparatus has been controlled by transmission of the infrared pattern and transmits a determined result to the first information processing device and/or the second information processing device.

With the operating system according to the fourth aspect of the first invention, the input receiving device (the operating device) determines whether the first-type apparatus has been controlled by transmission of the infrared pattern and transmits the determined result to the first information processing device and/or the second information processing device. Therefore, the administrator of the first information processing device and/or the administrator of the second information processing device is able to judge whether the first-type apparatus has been controlled. For example, when the administrator of the first information processing device and/or the administrator of the second information processing device has received the determined result that the first-type apparatus has not been controlled, a transmission instruction for transmit of the infrared pattern can be provided to the infrared output device again. Thus, the reliability of the operating system is improved.

An operating system according to a fifth aspect of the first invention is the operating systems according to the first to fourth aspects of the first invention, wherein the second information processing device, when the result determined by the control instruction determination unit includes the control instruction to the first-type apparatus, transmits, to the infrared output device, an output instruction to output the infrared pattern corresponding to the control instruction.

With the operating system according to the fifth aspect of the first invention, the second information processing device transmits the output instruction to the infrared output device. Therefore, in the second information processing device, it can be judged whether the first-type apparatus has been controlled. As a result, the reliability of the operating system is improved.

An operating system according to a sixth aspect of the first invention is the operating systems according to the first to fifth aspects of the first invention, wherein the second information processing device or the infrared output device further includes an infrared pattern generating unit to generate the infrared pattern corresponding to a control content over the first-type apparatus.

The operating system according to the sixth aspect of the first invention includes the infrared pattern generating unit to generate the infrared pattern corresponding to the control content over the first-type apparatus. Therefore, a desired first-type apparatus can be controlled. As a result, extensibility to the first-type apparatus is improved.

An operating system according to a seventh aspect of the first invention is the operating systems according to the first to sixth aspects of the first invention, wherein the first-type apparatus includes multiple models, and the infrared pattern corresponding to the control instruction varies among the models. With this configuration, multiple-model first-type apparatuses can be controlled by using infrared patterns (exclusive commands) that vary among the models.

An operating system according to an eighth aspect of the first invention is the operating systems according to the first to seventh aspects of the first invention, wherein the second-type apparatus includes the input receiving device and/or the infrared output device.

With the operating system according to the eighth aspect of the first invention, the operating device is accommodated in the second-type apparatus. Therefore, a system configuration is simplified.

An operating system according to a ninth aspect of the first invention is the operating systems according to the first to eighth aspects of the first invention, wherein the input operation is voice input through voice.

With the operating system according to the ninth aspect of the first invention, the first-type apparatus and the second-type apparatus can be controlled by voice input.

An operating system according to a tenth aspect of the first invention is the operating systems according to the first to ninth aspects of the first invention, wherein the input receiving device includes a specific operation information identifying unit, a specific operation storage unit, and a specific operation execution unit. The specific operation information identifying unit identifies specific operation information to the second-type apparatus in the operation information corresponding to the input operation. The specific operation storage unit stores the specific operation information in association with a specific operation. When the specific operation information has been identified by the specific operation information identifying unit, the specific operation execution unit executes the specific operation to the second-type apparatus.

With the operating system according to the tenth aspect of the first invention, the input receiving device executes the specific operation to the second-type apparatus when the specific operation information to the second-type apparatus has been identified. Therefore, the second-type apparatus can be controlled without access to the first information processing device or the second information processing device on the network.

An operating system according to an eleventh aspect of the first invention is the operating systems according to the first to tenth aspects of the first invention, wherein the second information processing device further includes an environmental information acquiring unit. The environmental information acquiring unit is configured to acquire environmental information at predetermined timing from an environmental information detecting apparatus that detects the environmental information that indicates a status of a surrounding environment. When the result determined by the control instruction determination unit includes the control instruction to the first-type apparatus, the second information processing device transmits, to the infrared output device, an output instruction to output the infrared pattern based on the control instruction and the environmental information to the first-type apparatus. When it is determined that the determined result includes the control instruction to the second-type apparatus, the second information processing device controls the second-type apparatus via the network based on the control instruction and the environmental information.

With the operating system according to the eleventh aspect of the first invention, when the determined result includes the control instruction to the first-type apparatus, the second information processing device transmits, to the infrared output device, the output instruction to output the infrared pattern based on the control instruction and the environmental information. Therefore, the apparatus can be appropriately controlled according to the environment of the user. When it is determined that the determined result includes the control instruction to the second-type apparatus, the second-type apparatus is controlled via the network based on the control instruction and the environmental information. Therefore, the apparatus can be appropriately controlled according to the environment of the user.

An operating system according to a twelfth aspect of the first invention is the operating systems according to the first to eleventh aspects of the first invention, wherein the second information processing device further includes an environmental information acquiring unit, an associated apparatus storage unit, an associated apparatus extracting unit, and an associated apparatus control unit. The environmental information acquiring unit acquires environmental information at predetermined timing from an environmental information detecting apparatus that detects the environmental information that indicates a status of a surrounding environment. The associated apparatus storage unit stores, in association with any one of the first-type apparatus and the second-type apparatus and the environmental information, any one or any combination of another first-type apparatus or another second-type apparatus as an associated apparatus(es). When the control instruction determination unit determines that the control instruction to the first-type apparatus or the control instruction to the second-type apparatus is included, the associated apparatus extracting unit extracts the associated apparatus(es) from the associated apparatus storage unit. The associated apparatus control unit, when another first-type apparatus is extracted by the associated apparatus extracting unit as the associated apparatus, transmits, to the infrared output device, the output instruction of the infrared pattern corresponding to a control content over the extracted associated apparatus, and/or, when another second-type apparatus is extracted by the associated apparatus extracting unit as the associated apparatus, controls the extracted associated apparatus via the network.

With the operating system according to the twelfth aspect of the first invention, the second information processing device stores another apparatus in association with the first-type apparatus, the second-type apparatus, and the environmental information as the associated apparatus(es), and controls not only the first apparatus or the second apparatus but also the associated apparatus(es) according to the environment of the user. Therefore, user's comfort is improved.

The term "another apparatus" in the present invention means an apparatus different from the apparatus that is the control object.

An operating system according to a thirteenth aspect of the first invention is the operating systems according to the first to twelfth aspects of the first invention, wherein the second information processing device further includes a specific situation detecting unit, a specific situation storage unit, and a specific situation control unit. The specific situation detecting unit detects a specific situation. The specific situation storage unit stores the specific situation in association with a predetermined first-type apparatus and a control content over the first-type apparatus. The specific situation storage unit also stores the specific situation in association with a predetermined second-type apparatus and a control content over the second-type apparatus. When a specific situation has been detected, the specific situation control unit transmits, to the infrared output device, an output instruction to output the infrared pattern corresponding to the control content associated with the specific situation regardless of the operation information. Further, the specific situation control unit controls the second-type apparatus with the control content associated with the specific situation.

With the operating system according to the thirteenth aspect of the first invention, when the specific situation has been detected, the control content over the first-type apparatus, associated with the specific situation, is transmitted to the operating device. This configuration allows the user to recognize the specific situation. In addition, when the specific situation has been detected, the second-type apparatus is controlled with the control content associated with the specific situation. This configuration allows the user to recognize the specific situation.

An operating system according to a fourteenth aspect of the first invention is the operating systems according to the first to thirteenth aspects of the first invention, wherein the first information processing device is communicable with a third information processing device that is able to operate, via the network, a third-type apparatus different from the second-type apparatus.

Further, the control instruction determination unit further determines whether the result analyzed by the operation information analyzing unit includes a control instruction to a control instruction to the third-type apparatus. When the control instruction determination unit determines that the control instruction to the third-type apparatus is included, the first information processing device transmits an operation command corresponding to the control instruction to the third information processing device.

With the operating system according to the fourteenth aspect of the first invention, when it is determined that the operation information includes the control instruction to the first-type apparatus as a result of the analysis of the operation information, the first-type apparatus is controlled by transmission of the infrared pattern to the first-type apparatus. With the operating system, when it is determined that the operation information includes the control instruction to the second-type apparatus as a result of the analysis of the operation information, the second-type apparatus is controlled via the network. With the operating system, when it is determined that the operation information includes the control instruction to the third-type apparatus as a result of the analysis of the operation information, the operation command to the third-type apparatus is transmitted via the network to the third information processing device that is able to operate the third-type apparatus.

Therefore, the operating system that is able to not only operate the first-type apparatus and the second-type apparatus but also transmit an operation command to the third-type apparatus not operable by the second information processing device can be provided. As a result, an operating system with further high extensibility can be provided.

An operating system according to a fifteenth aspect of the present invention is the operating system according to the fourteenth aspect, wherein the second information processing device and the second-type apparatus are connected via a first communication adaptor that communicates by using a first communication protocol. The third information processing device and the third-type apparatus are connected via a second communication adaptor that communicates by using a second communication protocol different from the first communication protocol.

With the operating system according to the fifteenth aspect of the first invention, the operating system that is also able to transmit an operation command to the third-type apparatus that communicates by using a communication protocol different from that of the second-type apparatus can be provided.

An operating system according to a sixteenth aspect of the first invention is operating system according to the fourteenth or fifteenth aspect of the first invention, wherein the input receiving device determines whether the third-type apparatus has been controlled by the third information processing device and transmit a determined result to the first information processing device and/or the second information processing device.

With the operating system according to the sixteenth aspect of the first invention, the input receiving device (operating device) determines whether the third-type apparatus has been controlled and transmits a determined result to the first information processing device and/or the second information processing device. Therefore, for example, even when an administrator of the first information processing device and/or an administrator of the second information processing device is different from an administrator of the third information processing device, the administrator of the first information processing device and/or the administrator of the second information processing device is able to judge whether the third-type apparatus has been controlled by the third information processing device. Thus, the operating system can be further appropriately managed.

An operating system according to a seventeenth aspect of the first invention is the operating systems according to the fourteenth to sixteenth aspects of the first invention, wherein the second information processing device further includes an environmental information acquiring unit, an associated apparatus storage unit, an associated apparatus extracting unit, and an associated apparatus control unit. The environmental information acquiring unit acquires environmental information at predetermined timing from an environmental information detecting apparatus configured to detect the environmental information that indicates a status of a surrounding environment. The associated apparatus storage unit stores, in association with any one of the first-type apparatus, the second-type apparatus, and the third-type apparatus and the environmental information, any one or any combination of another first-type apparatus, another second-type apparatus, or another third-type apparatus as an associated apparatus(es). When the control instruction determination unit determines that the control instruction to any one of the first-type apparatus, the second-type apparatus, and the third-type apparatus is included, the associated apparatus extracting unit extracts the associated apparatus (es) from the associated apparatus storage unit. When another first-type apparatus is extracted by the associated apparatus extracting unit as the associated apparatus, the associated apparatus control unit transmits, to the infrared output device, an output instruction to output the infrared pattern corresponding to a control content over the extracted associated apparatus. Further, when another second-type apparatus is extracted by the associated apparatus extracting unit as the associated apparatus, the associated apparatus control unit controls the extracted associated apparatus via the network. Further, when another third-type apparatus is extracted by the associated apparatus extracting unit as the associated apparatus, the associated apparatus control unit transmits an operation command corresponding to the control instruction to the associated apparatus to the third information processing device.

With the operating system according to the seventeenth aspect of the first invention, when the third-type apparatus is extracted as the associated apparatus, the second information processing device transmits an operation command to the associated apparatus that is the third-type apparatus via the network based on the control instruction and the environmental information. Therefore, the apparatus can be appropriately controlled according to the environment of the user.

A second information processing device according to an eighteenth aspect of the first invention is connected to a first information processing device and an infrared output device via a network. The first information processing device includes an operation information analyzing unit that analyzes operation information corresponding to an input operation, and a control instruction determination unit that determines whether a result analyzed by the operation information analyzing unit includes a control instruction to a first-type apparatus at least operable by communication of an infrared pattern or a control instruction to a second-type apparatus at least operable via the network. When the control instruction determination unit determines that the control instruction to the first-type apparatus is included, the infrared output device outputs the infrared pattern corresponding to the control instruction to the first-type apparatus. When the control instruction determination unit determines that the control instruction to the second-type apparatus is included, the second information processing device controls the second-type apparatus via the network based on the control instruction.

The second information processing device according to the eighteenth aspect of the first invention is connected to the first information processing device and the infrared output device and, when it is determined that the operation information includes the control instruction to the second-type apparatus as a result of analysis of the operation information, controls the second-type apparatus via the network. Therefore, the apparatus not operable via the network is operated by the infrared output device, and the apparatus operable via the network is operated by the second information processing device. Thus, an operating system that can control any apparatus can be constructed.

A second information processing device according to a nineteenth aspect of the first invention is the second information processing device according to the eighteenth aspect of the first invention, receives a result determined by the control instruction determination unit from the first information processing device and, when the determined result includes the control instruction to the first-type apparatus, transmits, to the infrared output device, an output instruction to output the infrared pattern corresponding to the control instruction. With such a configuration, the second information processing device transmits an output instruction to the infrared output device. Therefore, in the second information processing device, it can be judged whether the first-type apparatus has been controlled.

A second information processing device according to a twentieth aspect of the first invention is the second information processing device according to the eighteenth or nineteenth aspect of the first invention, and further includes an infrared pattern generating unit configured to generate the infrared pattern corresponding to a control content over the first-type apparatus.

With the second information processing device according to the twentieth aspect of the first invention, the second information processing device includes the infrared pattern generating unit that generates the infrared pattern corresponding to the control content over the first-type apparatus. Therefore, the second information processing device is able to control the first-type apparatus by transmission of the infrared pattern corresponding to the control content to the first-type apparatus.

A second information processing device according to a twenty-first aspect of the first invention is the second information processing device according to any one of the eighteenth to twentieth aspects of the first invention, wherein the first-type apparatus includes multiple models, and the infrared pattern corresponding to the control instruction varies among the models. With this configuration, multiple-model first-type apparatuses can be controlled by using infrared patterns (exclusive commands) that vary among the models.

A second information processing device according to a twenty-second aspect of the first invention is the second information processing device according to any one of the eighteenth to twenty-first aspects of the first invention, wherein the input operation is voice input through voice.

With the second information processing device according to the twenty-second aspect of the first invention, the first-type apparatus and the second-type apparatus can be controlled by voice input.

A second information processing device according to a twenty-third aspect of the first invention is the second information processing device according to any one of the eighteenth to twenty-second aspects of the first invention, and further includes an environmental information acquiring unit that acquires environmental information at predetermined timing from an environmental information detecting apparatus to detect the environmental information that indicates a status of a surrounding environment. The second information processing device receives a result determined by the control instruction determination unit from the first information processing device and, when the determined result includes the control instruction to the first-type apparatus, transmits, to the infrared output device, the output instruction to output an infrared pattern based on the control instruction and the environmental information. When it is determined that the determined result includes the control instruction to the second-type apparatus, the second information processing device controls the second-type apparatus based on the control instruction and the environmental information via the network.

With the second information processing device according to the twenty-third aspect of the first invention, the second information processing device receives the determined result from the first information processing device and, when the determined result includes the control instruction to the first-type apparatus, transmits, to the infrared output device, an output instruction to output the infrared pattern to the first-type apparatus based on the control instruction and the environmental information. Therefore, the apparatus can be appropriately controlled according to the environment of the user. Further, when it is determined that the determined result includes the control instruction to the second-type apparatus, the second-type apparatus is controlled based on the control instruction and the environmental information via the network. Therefore, the apparatus can be appropriately controlled according to the environment of the user.

A second information processing device according to a twenty-fourth aspect of the first invention is the second information processing device according to any one of the eighteenth to twenty-third aspects of the first invention, includes an environmental information acquiring unit, an associated apparatus storage unit, an associated apparatus extracting unit, and an associated apparatus control unit. The environmental information acquiring unit acquires environmental information at predetermined timing from an environmental information detecting apparatus that detects the environmental information that indicates a status of a surrounding environment. The associated apparatus storage unit stores, in association with any one of the first-type apparatus and the second-type apparatus and the environmental information, any one or any combination of another first-type apparatus or another second-type apparatus as an associated apparatus(es). When the control instruction determination unit determines that the control instruction to the first-type apparatus or the control instruction to the second-type apparatus is included, the associated apparatus extracting unit extracts the associated apparatus(es) from the associated apparatus storage unit. When another first-type apparatus is extracted by the associated apparatus extracting unit as the associated apparatus, the associated apparatus control unit transmits, to the infrared output device, an output instruction to output the infrared pattern corresponding to a control content over the extracted associated apparatus. When another second-type apparatus is extracted by the associated apparatus extracting unit as the associated apparatus, the associated apparatus control unit controls the extracted associated apparatus via the network.

With the second information processing device according to the twenty-fourth aspect of the first invention, the control device stores a predetermined apparatus and another apparatus in association with the environmental information as an associated apparatus, and controls not only the first apparatus or the second apparatus but also the associated apparatus according to the environment of the user. Therefore, comfort of the user is improved.

A second information processing device according to a twenty-fifth aspect of the first invention is the second information processing device according to any one of the eighteenth to twenty-fourth aspects of the first invention, includes a specific situation detecting unit, a specific situation storage unit, and a specific situation control unit. The specific situation detecting unit detects a specific situation. The specific situation storage unit stores the specific situation in association with a predetermined first-type apparatus and the control content over the first-type apparatus. Further, the specific situation storage unit stores the specific situation in association with a predetermined second-type apparatus and a control content over the second-type apparatus. When the specific situation has been detected, the specific situation control unit transmits, to the infrared output device, an output instruction to output the infrared pattern corresponding to the control content associated with the specific situation regardless of the operation information. Also, the specific situation control unit controls the second-type apparatus with the control content associated with the specific situation.

With the second information processing device according to the twenty-fifth aspect of the first invention, when the specific situation has been detected, the control content over the first-type apparatus, associated with the specific situation, is transmitted to the operating device. This configuration allows the user to recognize the specific situation. In addition, when a specific situation has been detected, the second-type apparatus is controlled with the control content associated with the specific situation. This configuration allows the user to recognize the specific situation.

A second information processing device according to a twenty-sixth aspect of the first invention is the second information processing device according to any one of the eighteenth to twenty-fifth aspects of the first invention, and further includes an environmental information acquiring unit, an associated apparatus storage unit, an associated apparatus extracting unit, and an associated apparatus control unit. Here, the first information processing device is communicable with a third information processing device that is able to operate a third-type apparatus different from the second-type apparatus via the network, the control instruction determination unit further determines whether the result analyzed by the operation information analyzing unit includes a control instruction to the third-type apparatus and, when the control instruction determination unit determines that the control instruction to the third-type apparatus is included, transmits an operation command corresponding to the control instruction to the third information processing device. The environmental information acquiring unit acquires environmental information at predetermined timing from an environmental information detecting apparatus configured to detect the environmental information that indicates a status of a surrounding environment. The associated apparatus storage unit stores, in association with any one of the first-type apparatus, the second-type apparatus, and the third-type apparatus and the environmental information, any one or any combination of another first-type apparatus, another second-type apparatus, or another third-type apparatus as an associated apparatus(es). When the control instruction determination unit determines that the control instruction to any one of the first-type apparatus, the second-type apparatus, and the third-type apparatus is included, the associated apparatus extracting unit extracts the associated apparatus(es) from the associated apparatus storage unit. When another first-type apparatus is extracted by the associated apparatus extracting unit as the associated apparatus, the associated apparatus control unit transmits, to the infrared output device, an output instruction to output the infrared pattern corresponding to a control content over the extracted associated apparatus. When another second-type apparatus is extracted by the associated apparatus extracting unit as the associated apparatus, the associated apparatus control unit controls the extracted associated apparatus via the network. When another third-type apparatus is extracted by the associated apparatus extracting unit as the associated apparatus, the associated apparatus control unit transmits, to the third information processing device, an operation command corresponding to the control instruction to the associated apparatus.

With the second information processing device according to the twenty-sixth aspect of the first invention, when the third-type apparatus is extracted as the associated apparatus, the second information processing device transmits the operation command to the associated apparatus that is the third-type apparatus based on the control instruction and the environmental information via the network. Therefore, the apparatus can be appropriately controlled according to the environment of the user.

A second information processing device according to a twenty-seventh aspect of the first invention is connected to a first information processing device and an infrared output device via a network. The first information processing device includes an operation information analyzing unit that analyze operation information corresponding to an input operation. When a result analyzed by the operation information analyzing unit includes a control instruction to a first-type apparatus at least operable by communication of an infrared pattern, the infrared output device outputs the infrared pattern corresponding to the control instruction to the first-type apparatus. The second information processing device includes a control instruction determination unit and a second control unit. The control instruction determination unit determines whether the result analyzed by the operation information analyzing unit includes the control instruction to the first-type apparatus at least operable by communication of the infrared pattern or the control instruction to a second-type apparatus at least operable via a network. When the control instruction determination unit determines that the control instruction to the second-type apparatus is included, the second control unit controls the second-type apparatus via the network based on the control instruction.

The second information processing device according to the twenty-seventh aspect of the first invention is connected to the first information processing device and the infrared output device, when it is determined that the operation information includes the control instruction to the second-type apparatus as a result of analysis of the operation information, controls the second-type apparatus via the network. Therefore, the apparatus not operable via the network is operated by the infrared output device, and the apparatus operable via the network is operated by the second information processing device. Therefore, an operating system that can control any apparatus can be constructed.

[Second Invention]

A second invention for solving the second task is as follows.

A control system according to a first aspect of the second invention includes an input receiving device and an infrared output device. The input receiving device receives a control command to a controlled apparatus controllable by infrared ray through voice input. The infrared output device is installed in a fixed apparatus whose position is fixed in a predetermined space. When the input receiving device has received the control command, the infrared output device outputs infrared ray to the controlled apparatus.

With the control system according to the first aspect of the second invention, the control system includes the above-described components. Therefore, the controlled apparatus can be controlled by voice input through infrared ray. Further, since the position of the fixed apparatus is fixed in a predetermined space, the range of infrared ray that is output by the infrared output device installed in the fixed apparatus can be estimated in advance. Therefore, as long as apparatuses present in the range are controllable by the infrared ray, the infrared output device is able to easily control any controlled apparatus. Further, the infrared output device is installed in the fixed apparatus, so no installation space for the infrared output device is required.

A control system according to a second aspect of the second invention is the control system according to the first aspect of the second invention, wherein the fixed apparatus is fixedly mounted on a ceiling or wall of a room. Alternatively, the control system according to the second aspect of the second invention is fixedly embedded in a ceiling or wall of a room.

With the control system according to the second aspect of the second invention, the fixed apparatus is fixedly mounted on a ceiling or wall of a room. For example, a luminaire, an air-conditioning device, or the like, may be used as the fixed apparatus. Alternatively, the fixed apparatus is fixedly embedded in the ceiling or wall of the room. For example, a luminaire, an air-conditioning device, a wall-hanging television, or the like, may be used as the fixed apparatus. By using such a fixed apparatus, the probability of avoiding a shield placed in a transmission path of infrared ray in a predetermined space can be increased. In other words, the probability that infrared ray reaches a controlled apparatus can be increased. As a result, the reliability of the control system is improved. Arrangement of the fixed apparatus is generally considered in space design. With the control system according to the second aspect, the controlled apparatus can be appropriately controlled in a space designed in consideration of arrangement of the fixed apparatus.

A control system according to a third aspect of the second invention is the control system according to the first or second aspect of the second invention, wherein the fixed apparatus is an air-conditioning device. Generally, the air-conditioning device is installed at a higher position (near the ceiling of the room, or the like). Therefore, with the control system according to the third aspect, a controlled apparatus present at a location lower in position than a location where the air-conditioning device is installed can be easily controlled.

A control system according to a fourth aspect of the second invention is the control system of any one of the first to third aspects of the second invention, wherein the infrared output device is mounted on an upper-half region of a body of the fixed apparatus. Therefore, with the control system according to the fourth aspect, infrared ray can be output from a higher position. Thus, the probability of avoiding a shield placed in a transmission path of infrared ray in a predetermined space can be increased. For example, the infrared output device is mounted at an upper part of a floor-standing air-conditioning device.

A control system according to a fifth aspect of the second invention is the control system according to any one of the first to fourth aspects of the second invention, the input receiving device is disposed inside the fixed apparatus.

With the control system according to the fifth aspect of the second invention, the input receiving device is disposed inside the fixed apparatus. Therefore, a system configuration is simplified. In addition, no installation space for the input receiving device is required.

A control system according to a sixth aspect of the second invention is the control system according to any one of the first to fifth aspects of the second invention, wherein an attitude control device to control an attitude of the infrared output device is installed in the infrared output device.

With the control system according to the sixth aspect of the second invention, the output direction of infrared ray can be changed to a desired direction. Therefore, the probability that infrared ray reaches the controlled apparatus can be increased. As a result, the reliability of the control system is improved.

A control system according to a seventh aspect of the second invention is the control system according to any one of the first to sixth aspects of the second invention, and further includes an information processing device that is able to communicate with the input receiving device and the infrared output device via the network. The information processing device includes a voice analyzing unit, a control identifying unit, and an output instruction transmission unit. The voice analyzing unit analyzes voice input. The control identifying unit identifies a control content that indicates a controlled apparatus and a control command to the controlled apparatus from a result analyzed by the voice analyzing unit. The output instruction transmission unit transmits, to the infrared output device, an output instruction to output infrared ray based on the control content identified by the control identifying unit.

With the control system according to the seventh aspect of the second invention, the information processing device on the network transmits, to the infrared output device, an output instruction to output infrared ray based on the analyzed result of analysis of the voice input. When the apparatus is intended to be controlled by the voice input, the amount of information processing can be enormous. In such a case as well, with the control system according to the seventh aspect, the voice analysis is executed with high accuracy by using the information processing device on the network. Therefore, the controlled apparatus and the control command can be minutely identified. As a result, the control system that can easily control any apparatus can be provided.

An infrared output device according to an eighth aspect of the second invention is installed in a fixed apparatus whose position is fixed in a predetermined space. When an input receiving device, which receives, through voice input, a control command to a controlled apparatus that is controllable by infrared ray, has received the control command, the infrared output device outputs infrared ray to the controlled apparatus.

With the infrared output device according to the eighth aspect of the second invention, the position of the fixed apparatus is fixed. Therefore, the range of infrared output can be estimated in advance. In addition, the infrared output device outputs, to a controlled apparatus, infrared ray based on voice input via a voice receiving device. Therefore, as long as apparatuses present in the range are controllable by infrared ray, the infrared output device is able to easily control any controlled apparatus. In addition, the infrared output device is installed in the fixed apparatus. Therefore, no installation space for the infrared output device is required.

[Third Invention]

A third invention for solving the third task is as follows.

A control system according to a first aspect of the third invention includes an input receiving device, an infrared output device, an environmental information detecting device, and an information processing device. The input receiving device receives a control command to a controlled apparatus controllable by infrared ray. The infrared output device is configured to output infrared ray to the controlled apparatus. The environmental information detecting device is configured to detect environmental information around the controlled apparatus. The information processing device receives a control command from the input receiving device and transmits, to the infrared output device, an output instruction to output infrared ray based on the control command. Here, the information processing device receives the environmental information from the environmental information detecting device and determines that the controlled apparatus has been controlled based on the output instruction and the environmental information.

With the control system according to the first aspect of the third invention, the information processing device receives the environmental information from the environmental information detecting device and determines whether the controlled apparatus has been controlled based on the output instruction and the environmental information. Therefore, when the controlled apparatus has not been controlled, a process in which the controlled apparatus is controlled can be executed. For example, the output instruction is resent or transmission of the output instruction is prompted by informing an administrator of the controlled apparatus that the controlled apparatus has not been controlled. As a result, the control system with high reliability can be provided.

A control system according to a second aspect of the third invention is the control system according to the first aspect of the third invention, wherein the information processing device, when the information processing device determines that the controlled apparatus has not been controlled, retransmits the output instruction to the infrared output device. Thus, the controlled apparatus is reliably controlled, so the control system with high reliability can be provided.

A third aspect of the third invention is the control process according to the first or second aspect of the third invention, wherein the information processing device, when the information processing device determines that the controlled apparatus has not been controlled, transmits, to the input receiving device, notification that the controlled apparatus has not been controlled. Thus, a user of the input receiving device is prompted to input the control command again, so the controlled apparatus is reliably controlled. As a result, the control system with high reliability can be provided.

A control system according to a fourth aspect of the third invention is the control system according to any one of the first to third aspects of the third invention, wherein an attitude control device to control an attitude of the infrared output device is installed in the infrared output device.

With the control system according to the fourth aspect of the third invention, the output direction of infrared ray can be changed to a desired direction. Therefore, the probability that infrared ray reaches a controlled apparatus can be increased. As a result, the reliability of the control system is improved.

An information processing device according to a fifth aspect of the third invention is connected to an input receiving device, an infrared output device, and an environmental information detecting device. The input receiving device receives a control command to a controlled apparatus controllable by infrared ray. The infrared output device outputs infrared ray to the controlled apparatus. The environmental information detecting device detects environmental information around the controlled apparatus. The information processing device according to the fifth aspect includes an output instruction transmission unit and a control determination unit. The output instruction transmission unit receives a control command from the input receiving device and transmit, to the infrared output device, an output instruction to output infrared ray based on the control command. The control determination unit receives the environmental information from the environmental information detecting device and determines that the controlled apparatus has been controlled based on the output instruction to output infrared ray and the environmental information.

With the information processing device according to the fifth aspect of the third invention, the information processing device receives the environmental information from the environmental information detecting device and determines whether the controlled apparatus has been controlled based on the output instruction and the environmental information. Therefore, when the controlled apparatus has not been controlled, a process in which the controlled apparatus is controlled can be executed. For example, an output instruction is resent or an administrator of a controlled apparatus is prompted to transmit an output instruction by informing that the controlled apparatus has not been controlled. As a result, the control system with high reliability can be provided.

[Fourth Invention]

A fourth invention for solving the fourth task is as follows.

An operating system according to a first aspect of the fourth invention includes an air conditioner and an infrared output device. The air conditioner includes an indoor unit. The infrared output device is installed in the indoor unit or mounted on a wall surface or ceiling surface near the indoor unit. The infrared output device receives first information on an instruction to an apparatus to be operated and transmits an infrared signal corresponding to the first information to the apparatus to be operated. The apparatus to be operated is an apparatus other than the air conditioner and is operable by an infrared signal. The air conditioner includes an apparatus management device configured to manage the apparatus to be operated. The apparatus management device includes a command information receiving unit and a determination unit. The command information receiving unit receives second information on a command content. The determination unit determines whether there is a deviation between a behavior of the apparatus to be operated and the command content based on the behavior of the apparatus to be operated and the second information.

Here, the apparatus management device of the air conditioner determines whether an actual behavior of the apparatus to be operated is inconsistent with the command content to the apparatus to be operated. Therefore, the state where the actual behavior is inconsistent with the command content (operation failed state) is hardly left as it is.

The behavior whose inconsistency is determined desirably includes at least a start or stop of the apparatus to be operated. In other words, the determination unit desirably determine at least whether the apparatus to be operated has started or stopped as operated when the apparatus to be operated is operated to start or stop with the infrared output device.

When the air conditioner includes the apparatus management device, the following advantages are obtained.

Houses, offices, and the like, are often air-conditioned by air conditioners. For this reason, when the air conditioner includes the apparatus management device, the apparatus to be operated can be managed without additionally providing a device exclusively managing the apparatus. Therefore, equipment cost tends to be reduced.

In addition, when the infrared output device is disposed in the indoor unit of the air conditioner or on a wall surface or ceiling surface near the indoor unit, the following advantages are obtained.

Furniture, and the like, is placed in a house, an office, or the like. Furniture, and the like, can be obstacles depending on the installation position of the infrared output device. As a result, an infrared signal may not reach an infrared photoreceiving portion of the apparatus to be operated.

The indoor unit is often provided on a ceiling or near a ceiling from which a space can be looked over from its original functional viewpoint. Moreover, to achieve the purpose of air-conditioning, there is a low possibility that furniture, such as a shelf, is disposed near the indoor unit so as to interfere with sending of air. In other words, there is a relatively low possibility that an obstacle that interferes with transmission of an infrared signal is installed near the indoor unit.

For this reason, with the operating system in which the infrared output device is installed in the indoor unit of the air conditioner or on a wall surface or ceiling surface near the indoor unit, the state where an operation content in a command from the infrared output device is inconsistent with an actual behavior of an apparatus hardly occurs in the first place.

An operating system according to a second aspect of the fourth invention is the operating system according to the first aspect of the fourth invention, wherein the apparatus management device further includes a first information transmission unit. The first information transmission unit transmits the first information to the infrared output device.

With the operating system, when the first information is transmitted from the apparatus management device to the infrared output device, an infrared signal corresponding to the first information is transmitted to the apparatus to be operated. In other words, the operation of the infrared output device to transmit a signal is controlled by the apparatus management device of the air conditioner. Since the infrared output device is installed in the indoor unit or near the indoor unit, the operating system can be implemented almost without wiring work for installing the infrared output device.

An operating system according to a third aspect of the fourth invention is the operating system according to the second aspect of the fourth invention, wherein the first information transmission unit, when the determination unit determines that there is the inconsistency, retransmits the first information to the infrared output device.

With the operating system, when the actual behavior of the apparatus to be operated is inconsistent with the operation content in the command, the first information is resent, and, as a result, the infrared signal corresponding to the first information is resent from the infrared output device to the apparatus to be operated. Therefore, the operation failed state is hardly left as it is.

An operating system according to a fourth aspect of the fourth invention is the operating system of any one of the first to third aspects of the fourth invention, wherein the infrared output device is mounted in the indoor unit.

Here, the infrared output device is mounted in the indoor unit. Therefore, work for connecting the infrared output device and the indoor unit on site is not required.

An operating system according to a fifth aspect of the fourth invention is the operating system according to any one of the first to fourth aspects of the fourth invention, and further includes an operational status detecting unit. The operational status detecting unit detects an operational status of the apparatus to be operated. The apparatus management device further includes a judging unit. The judging unit judges a behavior of the apparatus to be operated based on the operational status that is detected by the operational status detecting unit. An apparatus to be operated with infrared ray mostly has no output unit that outputs a behavior to the outside. However, the operating system includes the operational status detecting unit to detect the operational status of the apparatus to be operated, and the behavior of the apparatus to be operated is judged based on the detected operational status. Therefore, even an apparatus to be operated does not have an output unit, or the like, that outputs a behavior can be managed by the apparatus management device.

An operating system according to a sixth aspect of the fourth invention is the operating system according to the fifth aspect of the fourth invention, wherein the operational status detecting unit includes at least one of a microphone, a camera, a sensor configured to measure a current or electric power, an illuminance sensor, a temperature sensor, and a barometric sensor.

Here, the operational status detecting unit acquires an operating sound of the apparatus to be operated or a notification sound at the time of receiving an infrared signal with the microphone, detects the behavior of the apparatus to be operated with the camera, or measures various state quantities with various sensors. Thus, the operational status of the apparatus to be operated can be accurately acquired.

An operating system according to a seventh aspect of the fourth invention is the operating system according to any one of the first to sixth aspects of the fourth invention, wherein the apparatus management device further includes an output unit. The output unit outputs information about a result determined by the determination unit.

With the operating system, information about the result determined by the determination unit is output. Therefore, the state (operation failed state) of the apparatus to be operated, where the operation content in the command is inconsistent with an actual behavior, is hardly left as it is.

An operating system according to an eighth aspect of the fourth invention is the operating system according to any one of the first to seventh aspects of the fourth invention, and further includes a command receiver. The command receiver receives a command to the apparatus to be operated as a voice command and transmits a signal on the voice command to an analyzing device that analyzes the signal via a network. The first information is information based on an analyzed result of the signal by the analyzing device.

The apparatus to be operated can be operated by voice, so convenience is high.

Advantageous Effects of Invention

[First Invention]

With the operating system according to the first aspect of the first invention, a any apparatus can be controlled.

With the operating system according to the second aspect of the first invention, a any apparatus around the operating device can be controlled.

With the operating system according to the third aspect of the first invention, the system can be appropriately managed.

With the operating system according to the fourth aspect of the first invention, the reliability of the system is improved.

With the operating system according to the fifth aspect of the first invention, the reliability of the system is improved.

With the operating system according to the sixth aspect of the first invention, extensibility to the first-type apparatus is improved.

With the operating system according to the seventh aspect of the first invention, multiple-model first-type apparatuses can be controlled.

With the operating system according to the eighth aspect of the first invention, the system configuration is simplified.

With the operating system according to the ninth aspect of the first invention, the first-type apparatus and the second-type apparatus can be controlled by voice input.

With the operating system according to the tenth aspect of the first invention, the apparatus can be controlled without access to the information processing device on the network.

With the operating system according to the eleventh aspect of the first invention, the apparatus can be appropriately controlled according to an environment of a user.

With the operating system according to the twelfth aspect of the first invention, comfort of a user is improved.

With the operating system according to the thirteenth aspect of the first invention, a user is caused to recognize a specific situation.

With the operating system according to the fourteenth aspect of the first invention, the operating system with high extensibility can be provided.

With the operating system according to the fifteenth aspect of the first invention, the operating system with high extensibility can be provided.

With the operating system according to the sixteenth aspect of the first invention, the operating system can be further appropriately managed.

With the operating system according to the seventeenth aspect of the first invention, the apparatus can be appropriately controlled according to an environment of a user.

With the second information processing device according to the eighteenth aspect of the first invention, an operating system that can control any apparatus can be constructed.

With the second information processing device according to the nineteenth aspect of the first invention, the reliability of the system is improved.

With the second information processing device according to the twentieth aspect of the first invention, extensibility to the first-type apparatus is improved.

With the second information processing device according to the twenty-first aspect of the first invention, multiple-model first-type apparatuses can be controlled.

With the second information processing device according to the twenty-second aspect of the first invention, the first-type apparatus and the second-type apparatus can be controlled by voice input.

With the second information processing device according to the twenty-third aspect of the first invention, the apparatus can be appropriately controlled according to an environment of a user.

With the second information processing device according to the twenty-fourth aspect of the first invention, comfort of a user is improved.

With the second information processing device according to the twenty-fifth aspect of the first invention, a user is caused to recognize a specific situation.

With the second information processing device according to the twenty-sixth aspect of the first invention, the apparatus can be appropriately controlled according to an environment of a user.

With the second information processing device according to the twenty-seventh aspect of the first invention, an operating system that can control any apparatus can be constructed.

[Second Invention]

With the control system according to the first aspect of the second invention, any controlled apparatus can be easily controlled by voice input.

With the control system according to the second aspect of the second invention, the probability that infrared ray reaches a controlled apparatus can be increased.

With the control system according to the third aspect of the second invention, a controlled apparatus present at a location lower than a location where an air-conditioning device is installed can be easily controlled.

With the control system according to the fourth aspect of the second invention, infrared ray can be output from a higher position.

With the control system according to the fifth aspect of the second invention, the system configuration is simplified.

With the control system according to the sixth aspect of the second invention, the probability that infrared ray reaches a controlled apparatus can be increased.

With the control system according to the seventh aspect of the second invention, any apparatus can be easily controlled by voice input.

With the infrared output device according to the eighth aspect of the second invention, a controlled apparatus can be easily controlled by voice input.

[Third Invention]

With the control system according to the first aspect of the third invention, the control system with high reliability can be provided.

With the control system according to the second aspect of the third invention, reliability is further improved.

With the control system according to the third aspect of the third invention, reliability is further improved.

With the control system according to the fourth aspect, the probability that infrared ray reaches a controlled apparatus can be increased.

With the information processing device according to the fifth aspect of the third invention, a control system with high reliability can be constructed.

[Fourth Invention]

With the operating system according to the first aspect of the fourth invention, the apparatus management device of the air conditioner determines whether an actual behavior of the apparatus to be operated is inconsistent with a command content to the apparatus to be operated. Therefore, the state where the actual behavior is inconsistent with the command content (operation failed state) is hardly left as it is.

With the operating system according to the second and fourth aspects of the fourth invention, wiring work during installation is reduced.

With the operating system according to the third and seventh aspects of the fourth invention, the state where an actual behavior of the apparatus to be operated is inconsistent with an operation content in the command is hardly left as it is.

With the operating system according to the fifth aspect of the fourth invention, even an apparatus to be operated without an output unit, or the like, configured to output a behavior can be managed by the apparatus management device.

With the operating system according to the sixth aspect of the fourth invention, the operational status of the apparatus to be operated can be accurately acquired.

With the operating system according to the seventh aspect of the fourth invention, the air conditioner can be operated by voice even when the air conditioner is caused to perform a relatively complicated operation.

With the operating system according to the eighth aspect of the fourth invention, the apparatus to be operated can be operated by voice, so convenience is high.

BRIEF DESCRIPTION OF THE DRAWINGS

FIG. 17 is a schematic diagram that shows the configuration of an associated apparatus storage unit 1240 according to the modification 1H.

FIG. 29 is a schematic diagram that shows the configuration of an associated apparatus storage unit 1240S according to the modification 2B.

DESCRIPTION OF EMBODIMENTS

[First Invention]

First Embodiment (1-1-1) Configuration of Operating System 1001

Figure 1:
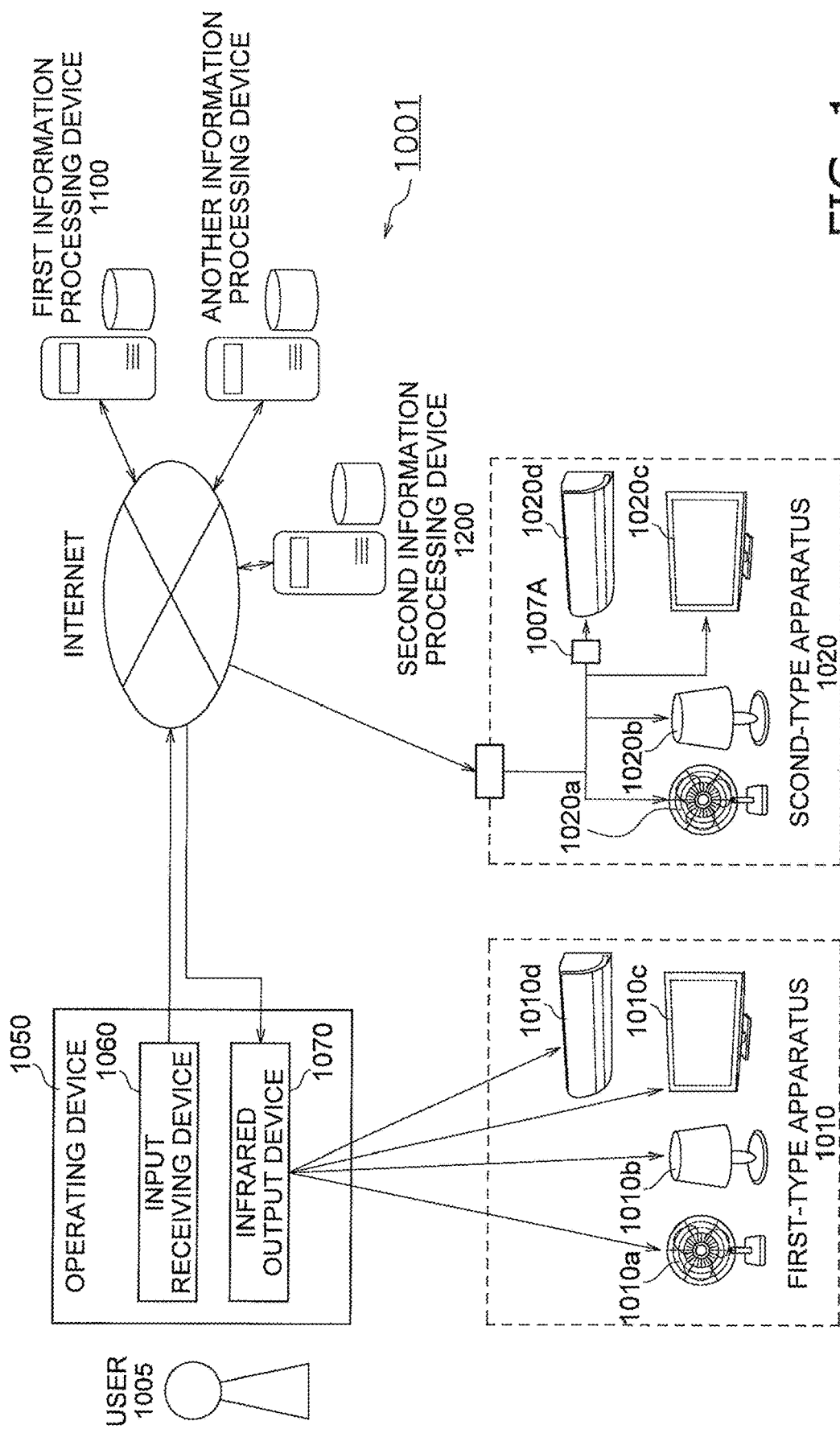
FIG. 1 is a schematic diagram that shows the concept of an operating system 1001 according to a first embodiment of the first invention.
Figure 2:
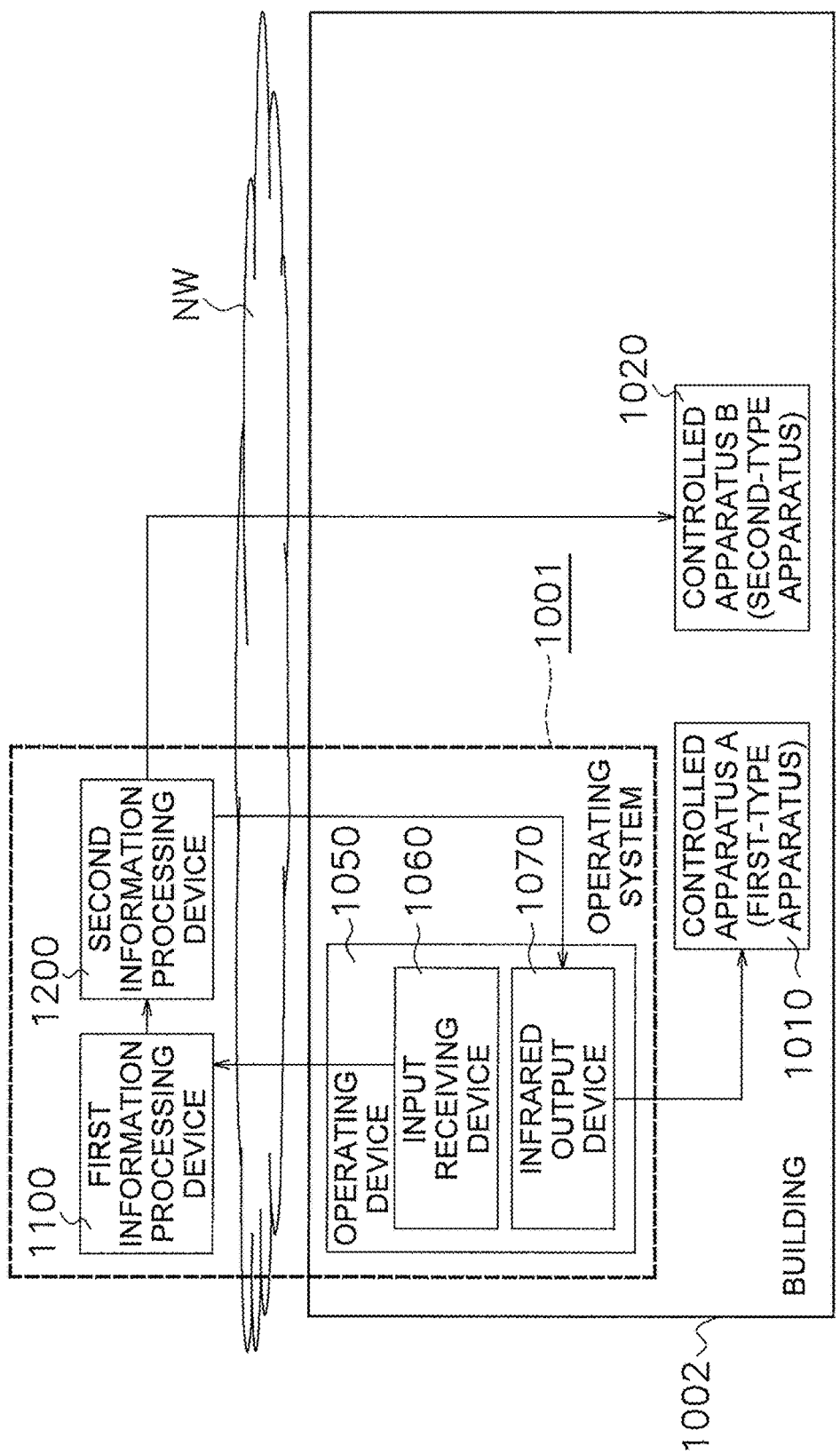
FIG. 2 is a schematic diagram that shows the configuration of the operating system 1001 according to the embodiment.

FIG. 1 is a schematic diagram that shows the concept of an operating system 1001 according to a first embodiment of the first invention. FIG. 2 is a schematic diagram that shows the configuration of the operating system 1001 according to the embodiment.

The operating system 1001 includes an operating device 1050, a first information processing device 1100, and a second information processing device 1200. The operating device 1050 includes an input receiving device 1060 and an infrared output device 1070. In the operating system 1001, when a user 1005 performs an input operation on the operating device 1050, an apparatus present around the operating device 1050 can be operated. Here, "first-type apparatuses 1010" and "second-type apparatuses 1020" are present as types of apparatuses. These apparatuses are placed in a building 1002.

In FIG. 1, one of each of the operating device 1050, the first information processing device 1100, and the second information processing device 1200 is shown; however, the number of each device is not limited thereto. The first information processing device 1100 and the second information processing device are connected to any number of the operating devices 1050 and are able to manage these operating devices 1050.

The first-type apparatuses 1010 are operable by at least communication of an infrared pattern. Examples of the first-type apparatuses 1010 include an electric fan 1010a, a luminaire 1010b, a television 1010c, and an air conditioner 1010d. In the following description, reference numeral 1010 indicates any first-type apparatus, and a lower-case alphabet is suffixed to indicate an individual first-type apparatus.

The second-type apparatuses 1020 are operable via at least a network NW. Here, the second-type apparatuses 1020 are managed by the second information processing device 1200. Examples of the second-type apparatuses 1020, as well as the first-type apparatuses 1010, include an electric fan 1020a, a luminaire 1020b, a television 1020c, and an air conditioner 1020d. In the following description, reference numeral 1020 indicates any second-type apparatus, and a lower-case alphabet is suffixed to indicate an individual second-type apparatus.

Figure 3:
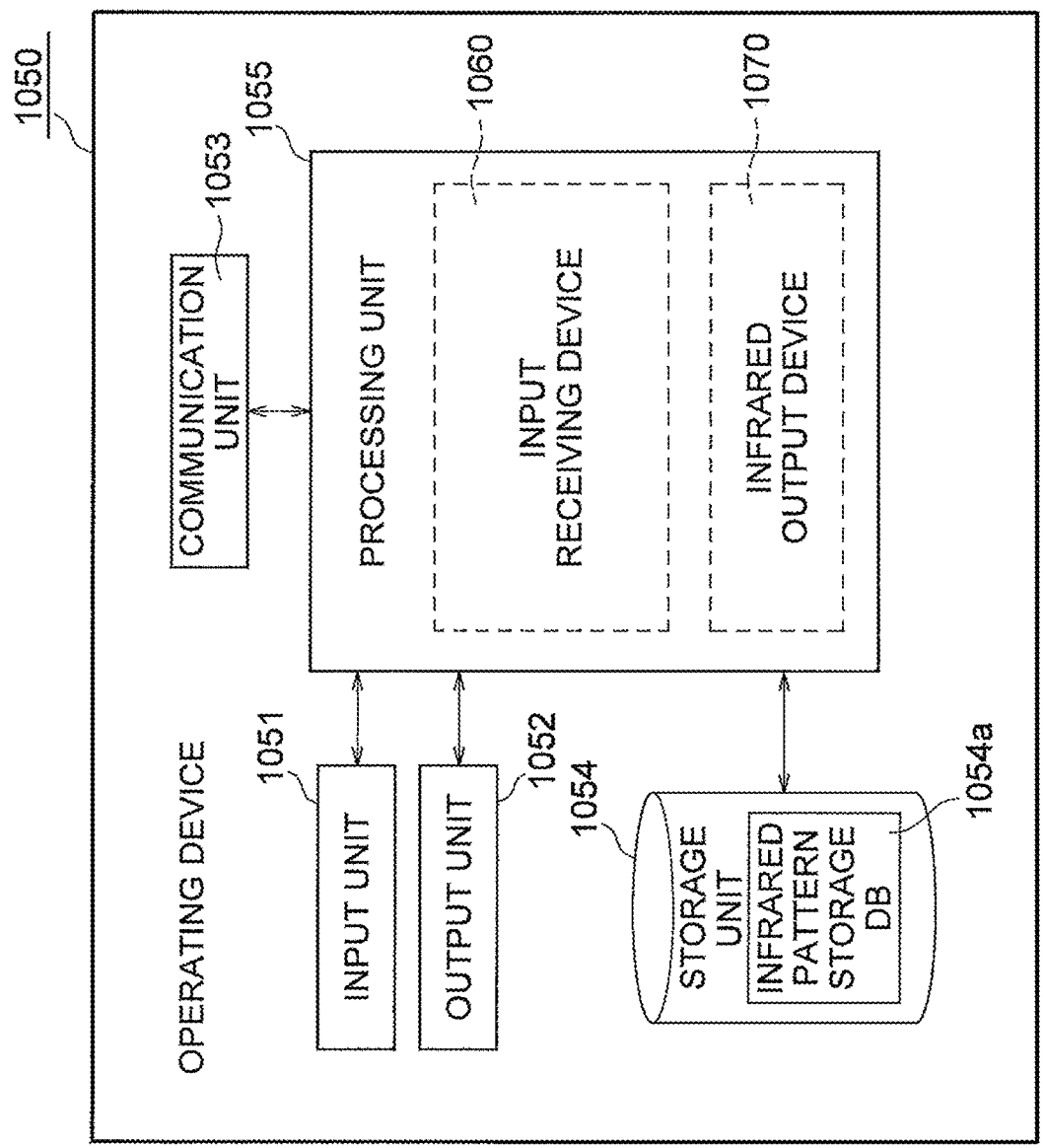
FIG. 3 is a schematic diagram that shows the configuration of an operating device 1050 according to the embodiment.

As shown in FIG. 3, the operating device 1050 includes an input unit 1051, an output unit 1052, a communication unit 1053, a storage unit 1054, and a processing unit 1055, and functions as the input receiving device 1060 and the infrared output device 1070.

The input unit 1051 inputs information to the operating device 1050. For example, the input unit 1051 is a microphone, and the user 1005 is allowed to input information by voice (voice input). Various commands are input to the operating device 1050 via the input unit 1021, and processes corresponding to the commands are executed by the processing unit 1055. The input unit 1051 may include, for example, a keyboard, a mouse, and/or a touch screen.

The output unit 1052 outputs various pieces of information from the operating device 1050. For example, the output unit 1022 is a speaker, or the like. The output unit 1052 is able to output infrared ray. Thus, the output unit 1052 is able to control a surrounding apparatus. The output unit 1052 may include not only the speaker but also a display.

The communication unit 1053 is able to connect with the external network NW. Thus, the operating device 1050 is able to transmit or receive information to or from the first information processing device 1100, the second information processing device 1200, and the like, via the Internet, or the like.

The storage unit 1054 stores information that is input to the operating device 1050, information that is calculated by the operating device 1050, and the like. For example, the storage unit 1054 is a ROM, a RAM, and the like. Here, the storage unit 1054 stores an "infrared pattern storage database (DB) 1054a". Information of an infrared pattern that is set for each of the models of the first-type apparatuses 1010 present around the operating device 1050 is stored in the infrared pattern storage DB. The first-type apparatuses 1010 include a plurality of models. An infrared pattern corresponding to a control instruction varies among the models. The storage unit 1054 stores various programs for implementing the functions of the processing unit 1055.

The processing unit 1055 executes information processing in the operating device 1050. Specifically, the processing unit 1055 is made up of a CPU, a cache memory, and the like. When the processing unit 1055 runs programs installed in the storage unit 1054, the operating device 1050 functions as the "input receiving device 1060" and the "infrared output device 1070".

As the input receiving device 1060 receives an input operation from the input unit 1051, the input receiving device 1060 transmits operation information corresponding to the input operation to the first information processing device 1100 via the communication unit 1053. An input operation can be input to the input receiving device 1060 by voice. After a lapse of a predetermined time from an input operation, the input receiving device 1060 determines whether a second-type apparatuses 1020 has been controlled by the second information processing device 1200 and transmits a determined result to the first information processing device 1100. The input receiving device 1060 determines whether a first-type apparatuses 1010 has been controlled based on an infrared pattern transmitted by the infrared output device 1070 and transmits a determined result to the first information processing device 1100 or the second information processing device 1200.

When the infrared output device 1070 has received an output instruction from the second information processing device 1200 (described later), the infrared output device 1070 reads an infrared pattern corresponding to the output instruction from the storage unit 1054 and outputs the infrared pattern to the first-type apparatus 1010 present around the operating device 1050. Thus, the first-type apparatus 1010 is controlled.

Figure 4:
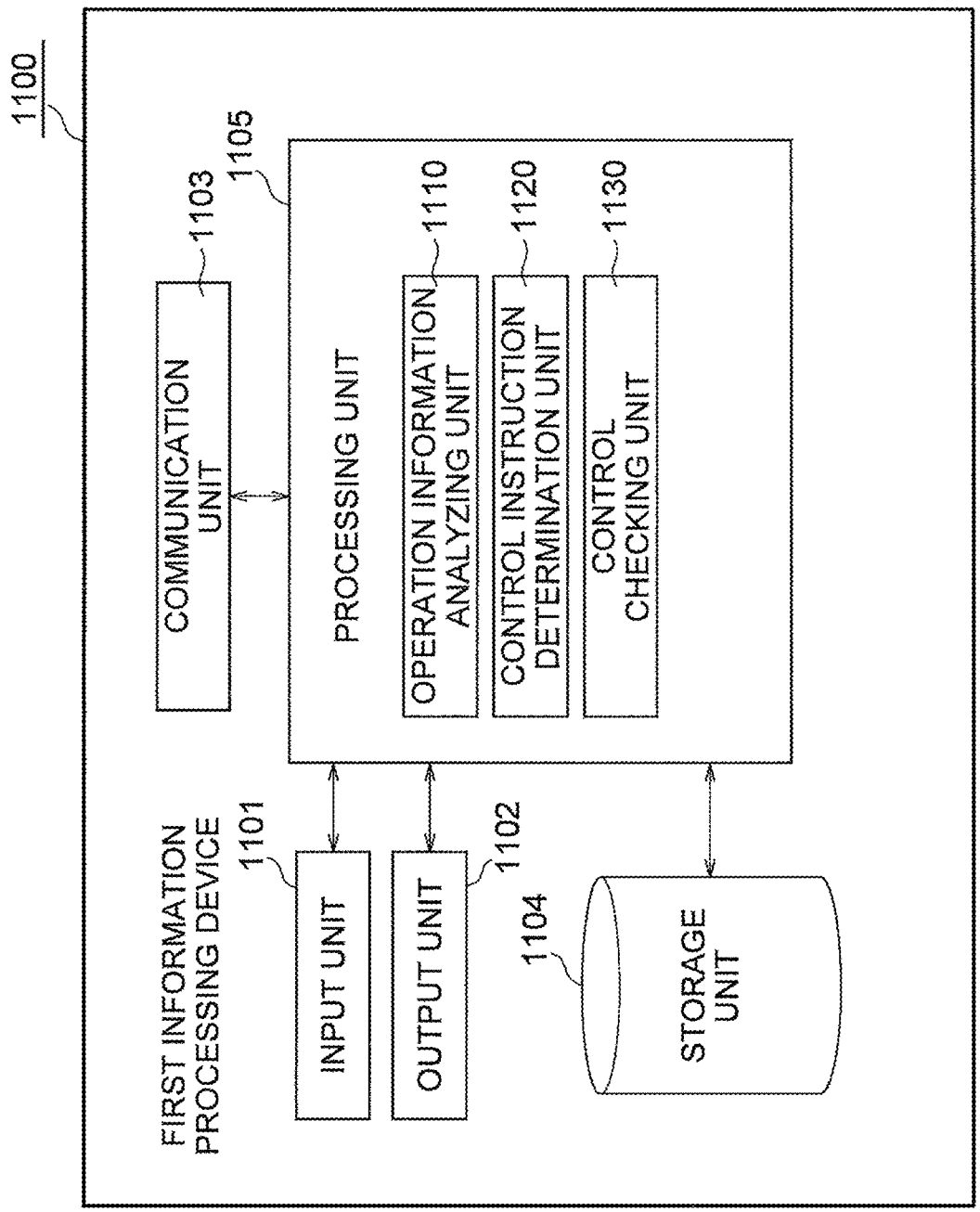
FIG. 4 is a schematic diagram that shows the configuration of a first information processing device 1100 according to the embodiment.

As shown in FIG. 4, the first information processing device 1100 includes an input unit 1101, an output unit 1102, a communication unit 1103, a storage unit 1104, and a processing unit 1105, and is connected to the operating device 1050 and the second information processing device 1200 via the network NW. Here, the input unit 1101 inputs various pieces of information to the first information processing device 1100. The output unit 1102 outputs various pieces of information from the first information processing device 1100. The communication unit 1103 is able to connect with the external network NW. The storage unit 1104 stores information that is input to the first information processing device 1100, information that is calculated by the first information processing device 1100, and the like. The processing unit 1105 executes information processing in the first information processing device 1100. When the processing unit 1105 runs programs installed in the storage unit 1104, the processing unit 1105 functions as an "operation information analyzing unit 1110", a "control instruction determination unit 1120", and a "control checking unit 1130".

The operation information analyzing unit 1110 is configured to analyze operation information corresponding to an input operation received from the operating device 1050. When voice input has been received from the operating device 1050, voice information corresponding to voice input is analyzed. Specifically, a meaning corresponding to the voice is analyzed by using neural network, or the like, and is converted from voice information to text information. The converted text information is transmitted to the control instruction determination unit 1120.

The control instruction determination unit 1120 determines whether the result analyzed by the operation information analyzing unit 1110 contains a control instruction to a first-type apparatus 1010 or a control instruction to a second-type apparatus 1020. The analyzed result is transmitted to the second information processing device 1200.

The control checking unit 1130 receives, from the input receiving device 1060, a determined result as to whether a second-type apparatus 1020 has been controlled by the second information processing device 1200. When the control checking unit 1130 has received a determined result that a second-type apparatus 1020 has not been controlled, the control checking unit 1130 transmits the result analyzed by the operation information analyzing unit 1110 to the second information processing device 1200 again.

Figure 5:
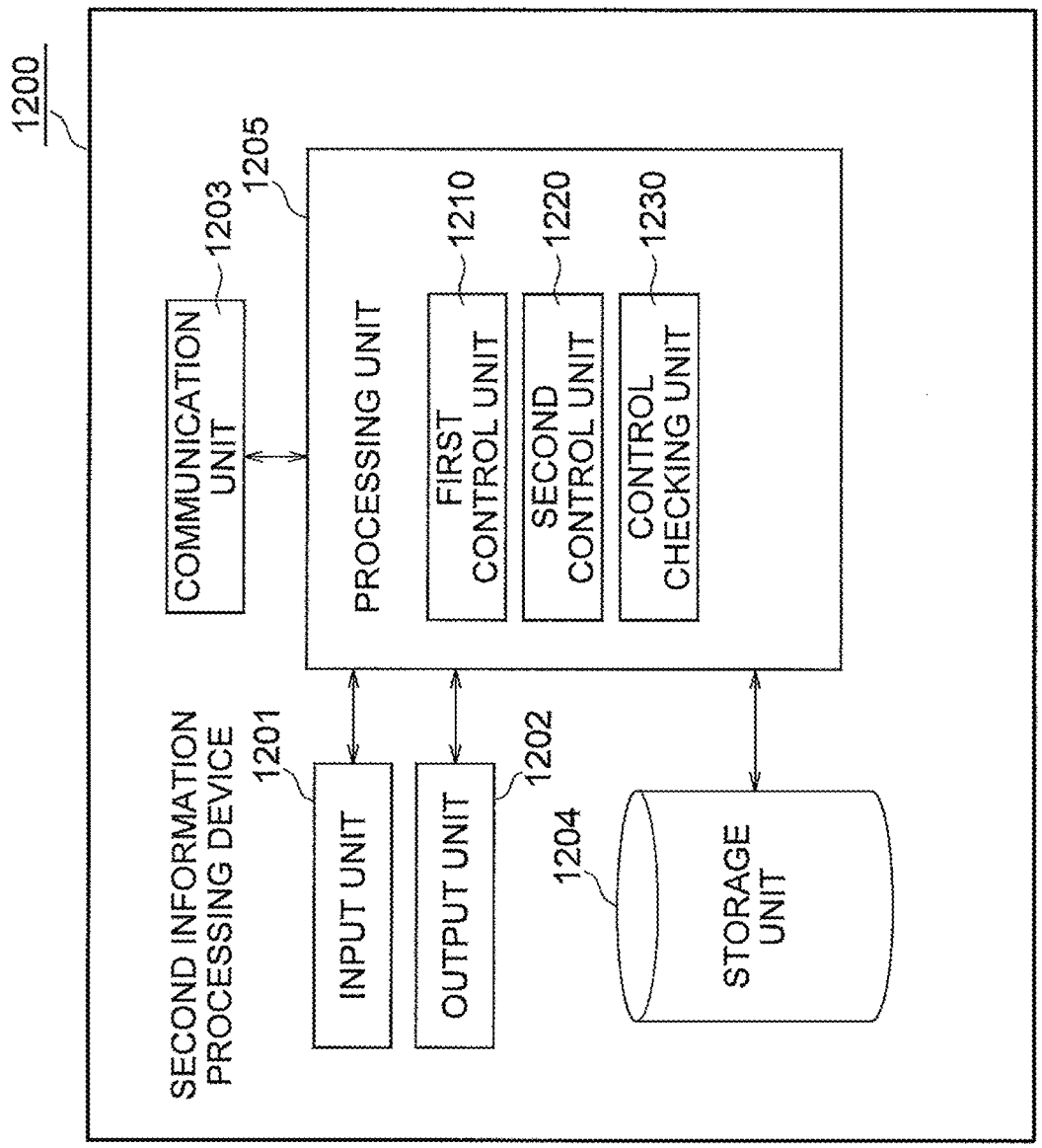
FIG. 5 is a schematic diagram that shows the configuration of a second information processing device 1200 according to the embodiment.

As shown in FIG. 5, the second information processing device 1200 includes an input unit 1201, an output unit 1202, a communication unit 1203, a storage unit 1204, and a processing unit 1205, and is connected to the operating device 1050 and the first information processing device 1100 via the network NW. The input unit 1201 inputs various pieces of information to the second information processing device 1200. The output unit 1202 outputs various pieces of information from the second information processing device 1200. The communication unit 1203 is able to connect with the external network NW. The storage unit 1204 stores information that is input to the second information processing device 1200, information that is calculated by the second information processing device 1200, and the like. The processing unit 1205 executes information processing in the second information processing device 1200. When the processing unit 1205 runs programs installed in the storage unit 1204, the processing unit 1205 functions as a "first control unit 1210", a "second control unit 1220", and a "control checking unit 1230".

When the first control unit 1210 has received a result determined by the control instruction determination unit 1120 from the first information processing device 1100 and the determined result contains a control instruction to a first-type apparatus 1010, the first control unit 1210 transmits an output instruction to the operating device 1050 (infrared output device 1070) via the communication unit 1203 to output an infrared pattern corresponding to the control instruction to the first-type apparatus 1010.

When the second control unit 1220 has received a result determined by the control instruction determination unit 1120 from the first information processing device 1100 and the determined result contains a control instruction to a second-type apparatus 1020, the second control unit 1220 controls the second-type apparatus 1020 via the network NW based on the control instruction.

The control checking unit 1230 receives, from the input receiving device 1060, the determined result as to whether a first-type apparatus 1010 has been controlled by the first information processing device 1100. When the control checking unit 1230 has received a determined result that a first-type apparatus 1010 has not been controlled, the control checking unit 1230 transmits a result analyzed by the operation information analyzing unit 1110 to the infrared output device 1070 again.

(1-1-2) Operation of Operating System 1001

Figure 6:
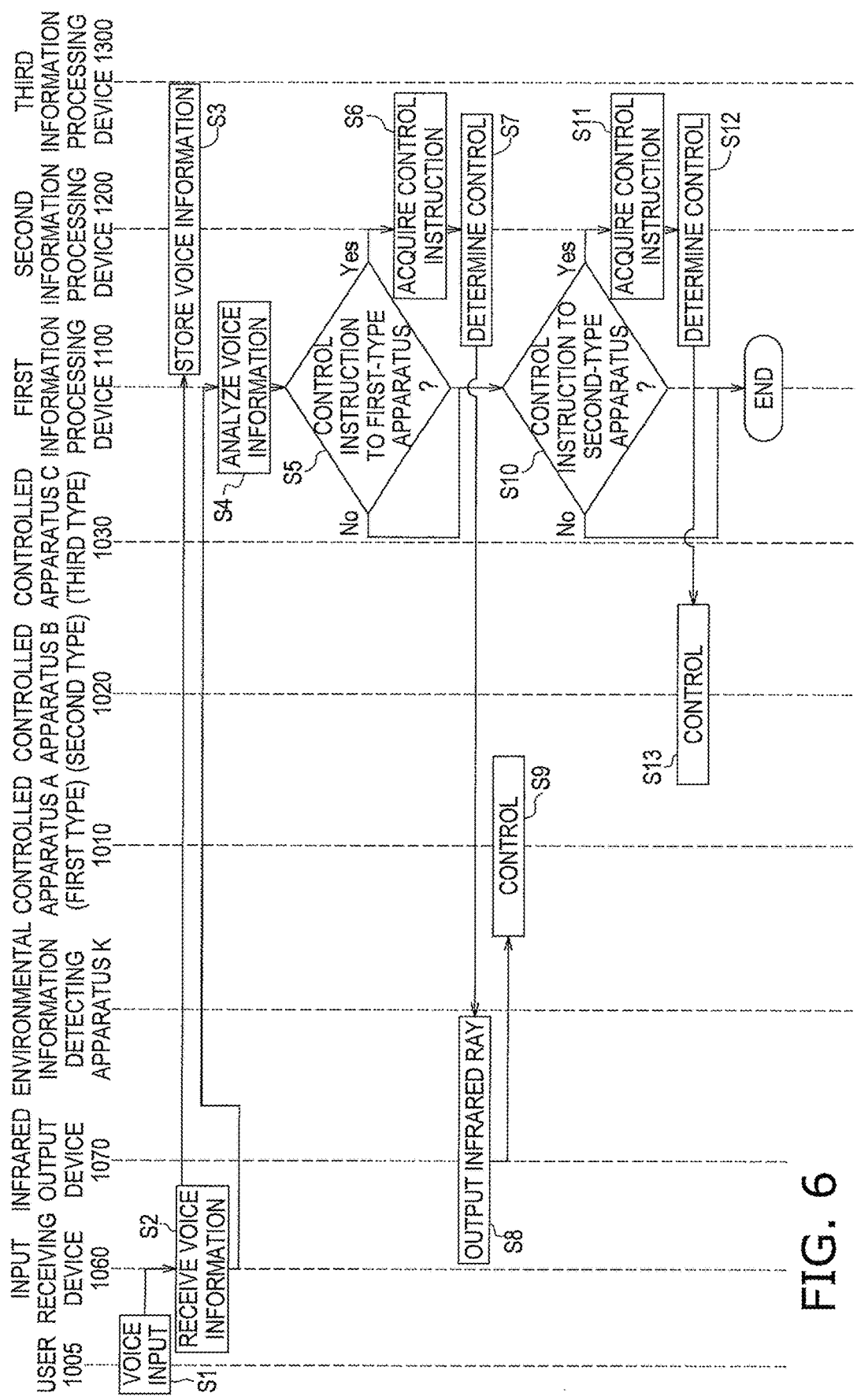
FIG. 6 is a sequence diagram for illustrating the operation of the operating system 1001 according to the embodiment.

FIG. 6 is a sequence diagram for illustrating the operation of the operating system 1001 according to the present embodiment. In the following description, for the sake of convenience, it is assumed that a controlled apparatus A is present as a first-type apparatus 1010 and a controlled apparatus B is present as a second-type apparatus 1020 around the user 1005.

First, an input operation on an apparatus present around the user 1005 is performed by the user 1005. Here, an operating command to the controlled apparatus A or the controlled apparatus B is input by the user 1005 by voice (S1). For example, a command, such as "Turn on the power of the controlled apparatus A" and "Turn off the controlled apparatus B", is input by the user 1005 by voice.

Subsequently, the input receiving device 1060 receives the voice input by the user 1005, converts the input voice to voice information, and transmits the voice information to the first information processing device 1100 and the second information processing device 1200 (S2).

In the second information processing device 1200, the received voice information is accumulated as needed (S3).

In the first information processing device 1100, the operation information analyzing unit 1110 analyzes the voice information received from the operating device 1050 (S4). For example, the operation information analyzing unit 1110 of the first information processing device 1100 analyzes the voice information by using neural network, or the like. Here, the operation information analyzing unit 1110 of the first information processing device 1100 analyzes a meaning corresponding to the voice information and converts the voice information to text information.

Subsequently, the control instruction determination unit 1120 of the first information processing device 1100 determines whether the result analyzed by the operation information analyzing unit 1110 contains a control instruction to a first-type apparatus 1010 or a control instruction to a second-type apparatus 1020 (S5). When the first information processing device 1100 determines that a control instruction to a first-type apparatus 1010 is contained (Yes in S5), the first information processing device 1100 transmits the determined result to the second information processing device 1200. Here, it is assumed that the analyzed result contains a control instruction to the controlled apparatus A that is a first-type apparatus.

After that, the second information processing device 1200 receives the determined result from the first information processing device 1100 (S6), and determines a control content over the first-type apparatus 1010 (controlled apparatus A) (S7). The first control unit 1210 of the second information processing device 1200 transmits an output instruction to the operating device 1050 (infrared output device 1070) via the communication unit 1203 to output an infrared pattern corresponding to the control instruction.

Subsequently, the infrared output device 1070 receives the output instruction from the second information processing device 1200, outputs an infrared pattern based on the output instruction (S8), and controls the controlled apparatus A that is a first-type apparatus 1010 (S9). On the other hand, when the first information processing device 1100 determines in step S5 that a control instruction to a first-type apparatus 1010 is not contained (No in S5), the first information processing device 1100 determines whether a control instruction to a second-type apparatus 1020 is contained (S10). When the first information processing device 1100 determines that a control instruction to a second-type apparatus 1020 is contained (Yes in S10), the first information processing device 1100 transmits the determined result to the second information processing device 1200. Here, it is assumed that the analyzed result contains a control instruction to the controlled apparatus B that is a second-type apparatus 1020.

After that, the second information processing device 1200 receives the determined result from the first information processing device 1100 (S11), and determines a control content over the second-type apparatus 1020 (controlled apparatus B) (S12). The second control unit 1220 of the second information processing device 1200 controls the controlled apparatus B that is a second-type apparatus 1020 via the network NW based on the control instruction (S13). When the first information processing device 1100 determines in step S10 that a control instruction to a second-type apparatus 1020 (controlled apparatus B) is not contained (No in S10), the operating system 1001 ends the process.

The processes of step S5 to step S9 and the processes of step S10 to step S13 are not in particular order and any one of sets of the processes may be executed first.

(1-1-3) Characteristics (1-1-3-1)

As described above, the operating system 1001 according to the present embodiment includes the input receiving device 1060, the first information processing device 1100, the second information processing device 1200, and the infrared output device 1070, and operates a first-type apparatus 1010 operable by at least communication of an infrared pattern and a second-type apparatus 1020 operable via at least the network NW. The input receiving device 1060 receives an input operation. The first information processing device 1100 is connected to the input receiving device 1060 and includes the operation information analyzing unit 1110 that analyzes operation information corresponding to the input operation. The first information processing device 1100 includes the control instruction determination unit 1120 that determines whether a result analyzed by the operation information analyzing unit 1110 contains a control instruction to a first-type apparatus 1010 (controlled apparatus A) or a control instruction to a second-type apparatus 1020 (controlled apparatus B). The second information processing device 1200 is connected to the first information processing device 1100. When the control instruction determination unit 1120 determines that a control instruction to a second-type apparatus 1020 (controlled apparatus B) is contained, the second information processing device 1200 controls the second-type apparatus 1020 (controlled apparatus B) via the network NW based on the control instruction. The infrared output device 1070 is connected to the first information processing device 1100 or the second information processing device 1200. When the control instruction determination unit 1120 determines that a control instruction to a first-type apparatus 1010 (controlled apparatus A) is contained, the infrared output device 1070 outputs an infrared pattern corresponding to the control instruction to the first-type apparatus 1010 (controlled apparatus A).

Therefore, with the operating system 1001 according to the present embodiment, when it is determined that operation information contains a control instruction to a first-type apparatus as a result of analysis of the operation information, the first-type apparatus 1010 (controlled apparatus A) is controlled by transmission of an infrared pattern to the first-type apparatus 1010 (controlled apparatus A). On the other hand, when the operating system 1001 determines that the operation information contains a control instruction to a second-type apparatus 1020 (controlled apparatus B) as a result of analysis of the operation information, the operating system controls the second-type apparatus 1020 (controlled apparatus B) via the network NW. In other words, an apparatus not operable via the network NW (first-type apparatus 1010) is operated by the infrared output device 1070, and an apparatus operable via the network NW (second-type apparatus 1020) is operated by the second information processing device 1200. Therefore, any apparatus around the operating device 1050 (input receiving device 1060) can be controlled.

Particularly, with the operating system 1001 according to the present embodiment, the operation information analyzing unit 1110 of the first information processing device 1100 analyzes operation information input by voice. Therefore, the operating system 1001 is able to control a first-type apparatus 1010 and a second-type apparatus 1020 by voice input.

In the operating system 1001 according to the present embodiment, the second information processing device 1200 receives a result determined by the control instruction determination unit 1120 from the first information processing device 1100. When the determined result contains a control instruction to a first-type apparatus 1010 (controlled apparatus A), the second information processing device 1200 transmits an output instruction to the infrared output device 1070 to output an infrared pattern corresponding to the control instruction to the first-type apparatus 1010 (controlled apparatus A).

In this way, the second information processing device 1200 transmits an output instruction to the infrared output device 1070. Therefore, in the second information processing device 1200, it can be judged whether the first-type apparatus 1010 (controlled apparatus A) has been controlled. As a result, the reliability of the operating system 1001 is improved.

(1-1-3-2)

The operating system 1001 according to the present embodiment includes the operating device 1050 that accommodates the input receiving device 1060 and the infrared output device 1070 in one and the same casing. In this way, since the input receiving device 1060 and the infrared output device 1070 are accommodated in one and the same casing as the operating device 1050, any apparatus around the operating device 1050 can be controlled regardless of whether any apparatus is an apparatus operable via the network NW (second-type apparatus 1020).

(1-1-3-3)

Figure 7:
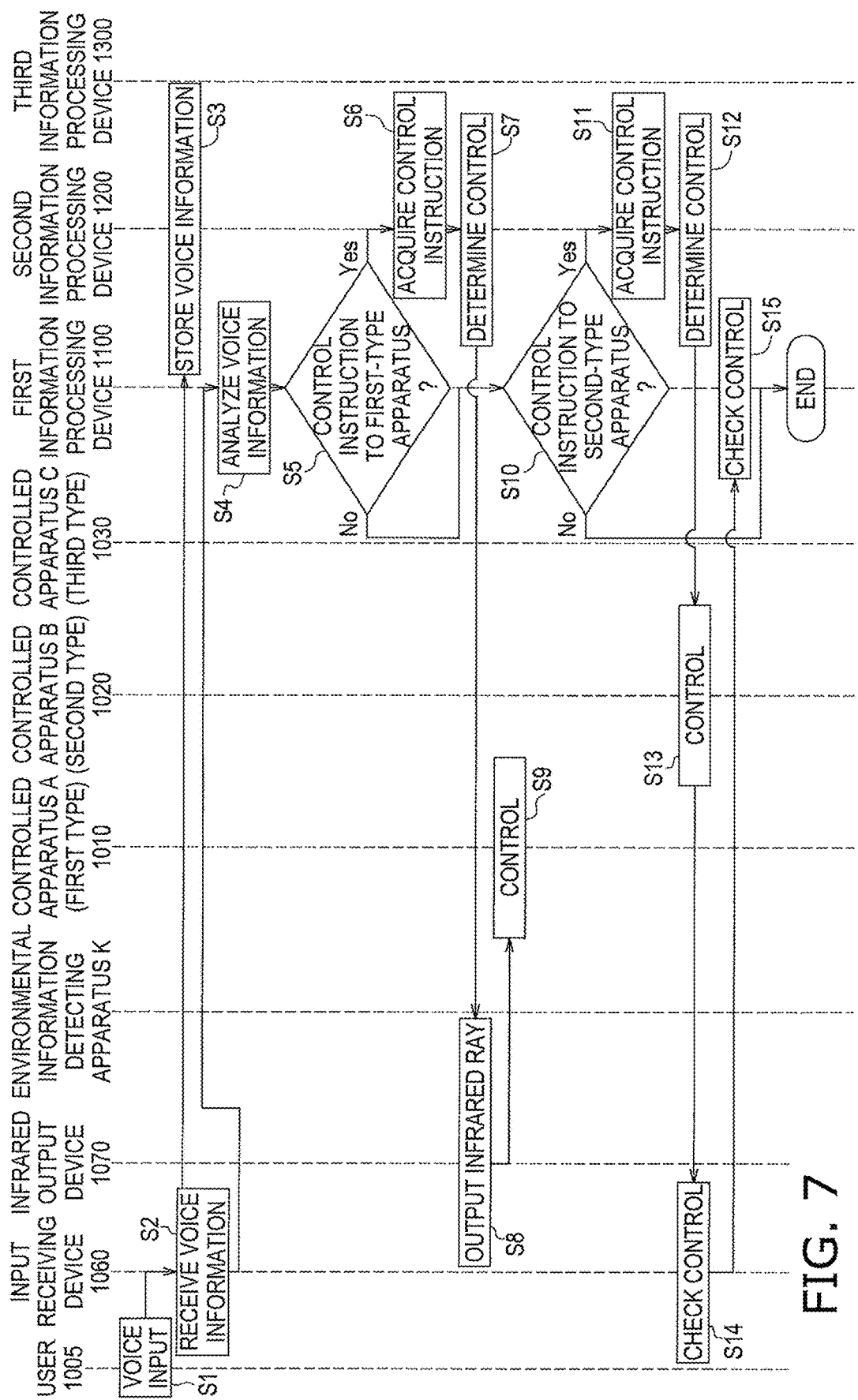
FIG. 7 is a sequence diagram for illustrating the operation of the operating system 1001 according to the embodiment.

In the operating system 1001 according to the present embodiment, as shown in the sequence of FIG. 7, the input receiving device 1060 may determine whether the second-type apparatus 1020 has been controlled by the second information processing device 1200 and transmit a determined result to the first information processing device 1100 (step S14 and step S15). For example, the input receiving device 1060 determines whether the second-type apparatus 1020 has been controlled based on, for example, whether a surrounding apparatus has been operated within a predetermined time from transmission of voice information.

Thus, for example, even when an administrator of the first information processing device 1100 is different from an administrator of the second information processing device 1200, the administrator of the first information processing device 1100 is able to judge whether the second-type apparatus 1020 (controlled apparatus B) has been controlled by the second information processing device 1200. As a result, the operating system 1001 can be appropriately managed.

(1-1-3-4)

Figure 8:
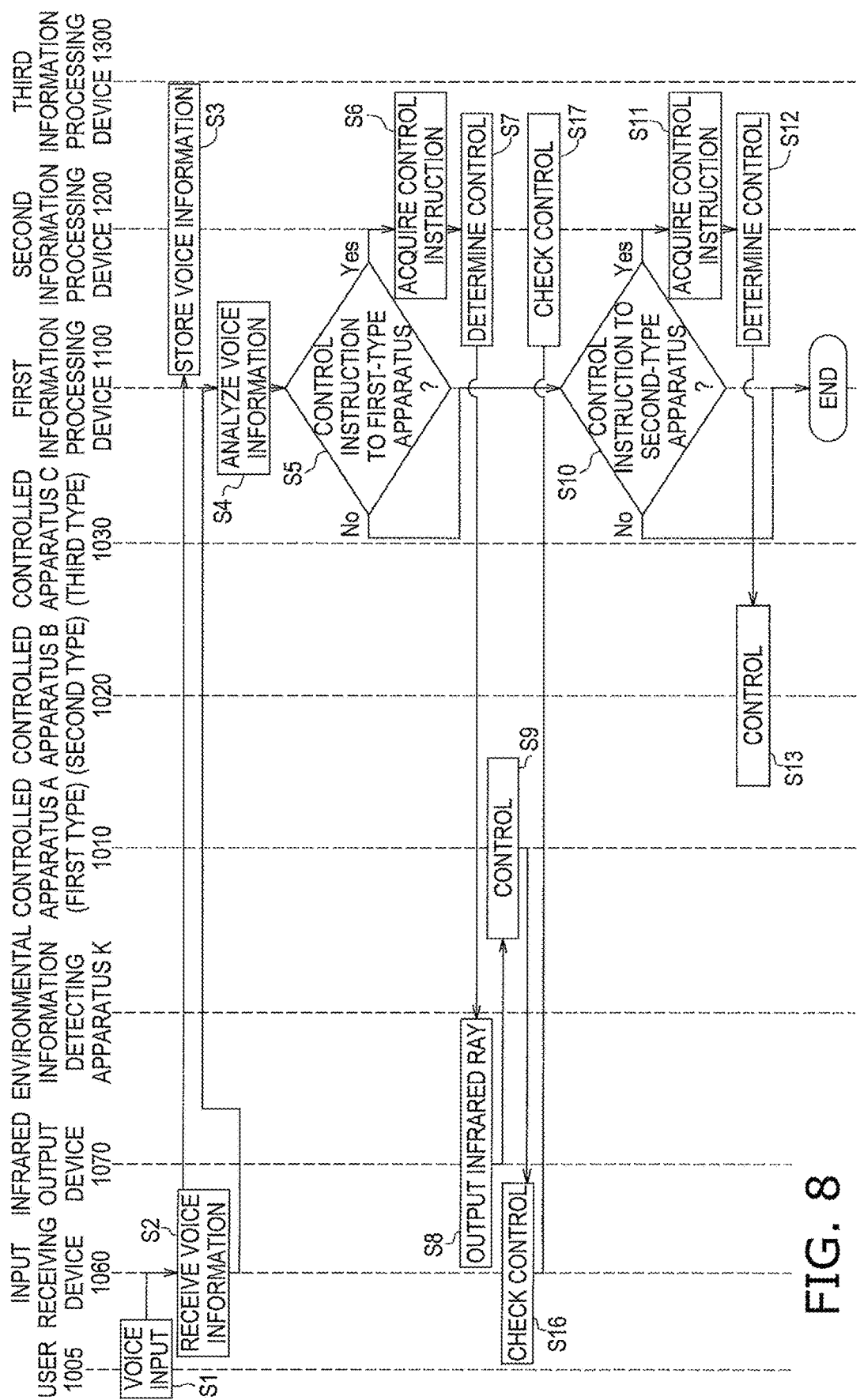
FIG. 8 is a sequence diagram for illustrating the operation of the operating system 1001 according to the embodiment.

As shown in FIG. 8, in the operating system 1001 according to the present embodiment, after step S9, the input receiving device 1060 may determine whether the first-type apparatus 1010 has been controlled by communication of an infrared pattern and transmit a determined result to the second information processing device 1200 (step S16 and step S17).

Thus, the administrator of the second information processing device 1200 is able to judge whether the first-type apparatus 1010 (controlled apparatus A) has been controlled. When the determined result that the first-type apparatus 1010 has not been controlled has been received, the second information processing device 1200 is able to provide the infrared output device 1070 with, for example, an instruction to transmit an infrared pattern again. As a result, the reliability of the operating system 1001 is improved.

(1-1-3-5)

In the operating system 1001 according to the present embodiment, the first-type apparatuses 1010 include a plurality of models, and an infrared pattern corresponding to a control instruction varies among the models. With this configuration, multiple-model first-type apparatuses 1010 can be controlled by using infrared patterns (exclusive commands) that vary among the models.

Such infrared patterns are stored in the storage unit 1054 of the operating device 1050. Pieces of information of these infrared patterns can be updated as needed via the second information processing device 1200.

(1-1-4) Modifications (1-1-4-1) Modification 1A

In the above description, the input receiving device 1060 and the infrared output device 1070 are accommodated in one and the same casing. Alternatively, these devices may be accommodated in individual casings. Thus, the flexibility of the system configuration is improved.

(1-1-4-2) Modification 1B

In the above description, in the control system 1001 according to the present embodiment, the input receiving device 1060 determines whether the first-type apparatus 1010 has been controlled by transmission of an infrared pattern and transmit a determined result to the second information processing device 1200; however, the operating system 1001 according to the present embodiment is not limited thereto. For example, the input receiving device 1060 may determine whether the first-type apparatus 1010 has been controlled by transmission of an infrared pattern and transmit a determined result to the first information processing device 1100 only or transmit a determined result to both the first information processing device 1100 and the second information processing device 1200. With any configuration, the reliability of the operating system 1001 is improved.

(1-1-4-3) Modification 1C

In the operating system 1001 according to the present embodiment, the second information processing device 1200 or the infrared output device 1070 may further include an infrared pattern generating unit that generates an infrared pattern corresponding to a control content over a first-type apparatus 1010. With such a configuration, a desired first-type apparatus 1010 can be controlled. As a result, extensibility to a first-type apparatus 1010 is improved.

(1-1-4-4) Modification 1D

In the operating system 1001 according to the present embodiment, a second-type apparatus 1020 may include the input receiving device 1060 and/or the infrared output device 1070. Specifically, one of the second-type apparatuses 1020 present in the building 1002 may be configured to incorporate the operating device 1050. Thus, the system configuration is simplified.

(1-1-4-5) Modification 1E

In the above description, an input operation is voice input; however, the operating system 1001 according to the present embodiment is not limited thereto. Other than voice input, any input method can be employed as an input operation.

(1-1-4-6) Modification 1F

Figure 9:
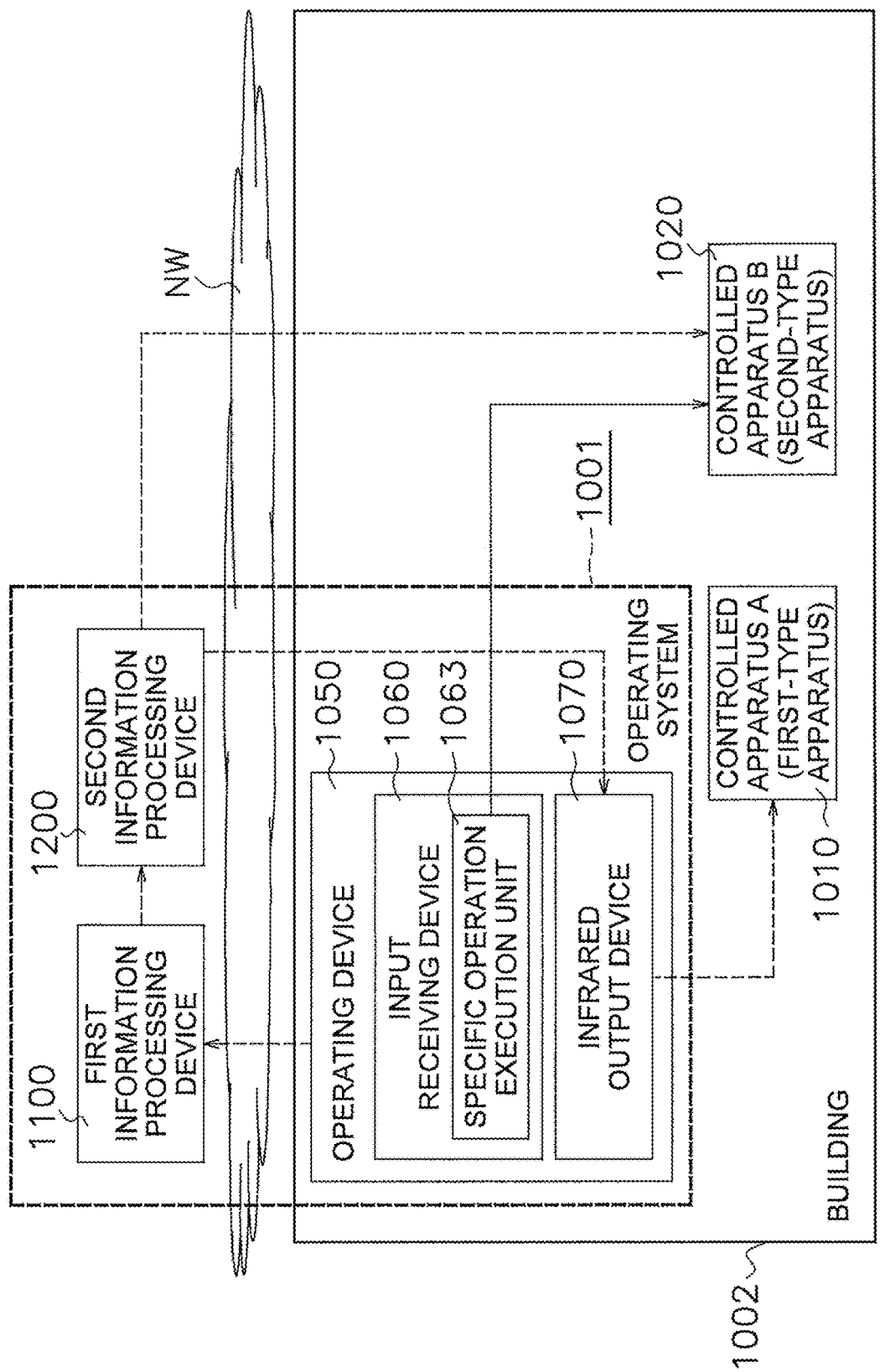
FIG. 9 is a schematic diagram that shows the configuration of an operating system according to a modification 1F.
Figure 10:
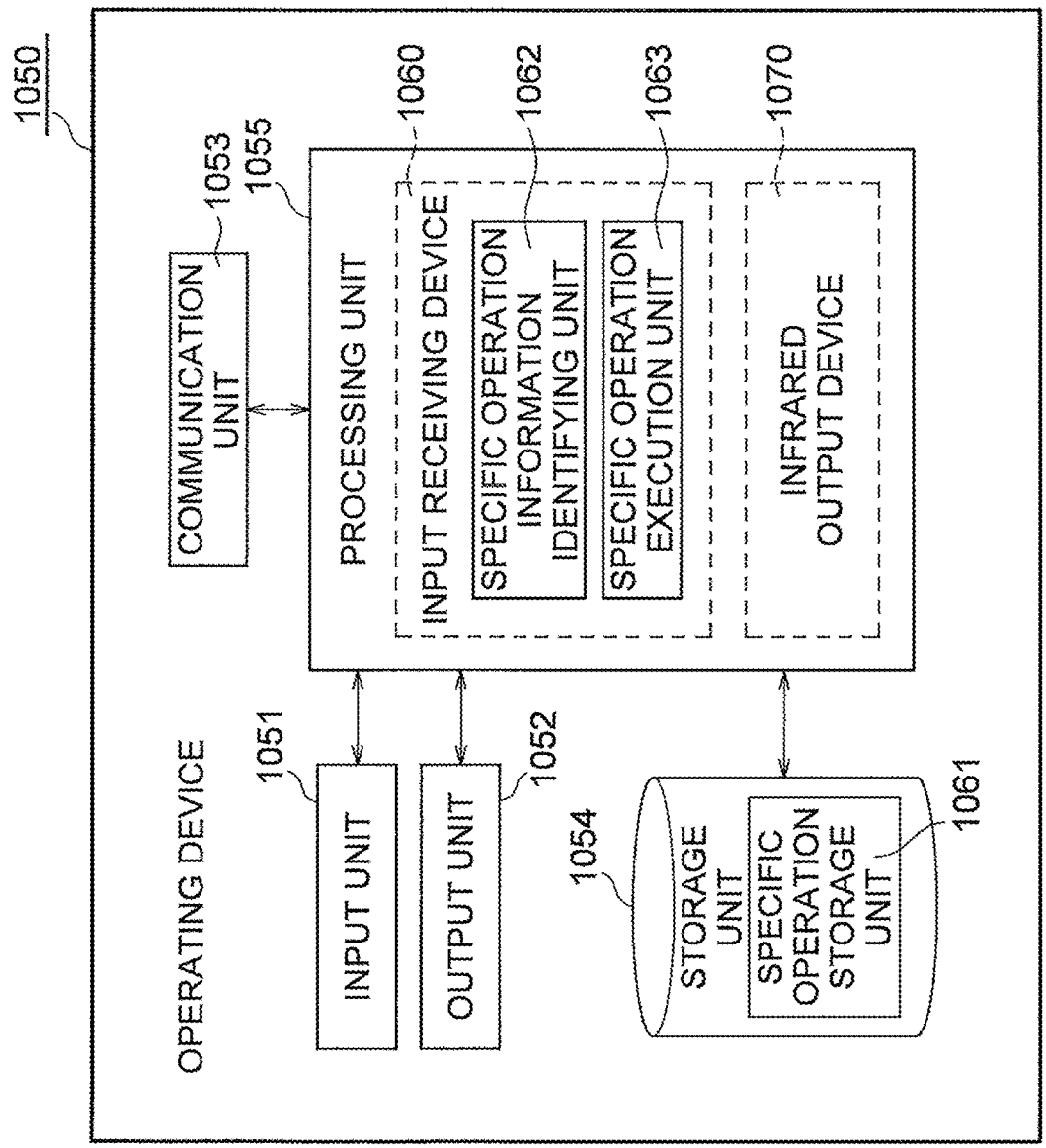
FIG. 10 is a schematic diagram that shows the configuration of the operating device 1050 according to the modification 1F.

FIG. 9 is a schematic diagram that shows the configuration of an operating system according to a modification 1F. FIG. 10 is a schematic diagram that shows the configuration of the operating device 1050 according to the modification.

In the modification 1F, the storage unit 1054 of the operating device 1050 functions as a specific operation storage unit 1061, and the processing unit 1055 of the operating device 1050 functions as a specific operation information identifying unit 1062 and a specific operation execution unit 1063.

The specific operation storage unit 1061 stores specific operation information in association with a specific operation. The specific operation storage unit 1061 prestores voice information corresponding to, for example, "Turn on the power of the D-model electric fan 1020*a*", or the like, in association with a specific operation to turn on the power of the D-model electric fan 1020*a*.

The specific operation information identifying unit 1062 identifies specific operation information on a second-type apparatus 1020 within operation information corresponding to an input operation.

When specific operation information has been identified by the specific operation information identifying unit 1072, the specific operation execution unit 1063 executes a specific operation on a second-type apparatus 1020.

Figure 11:
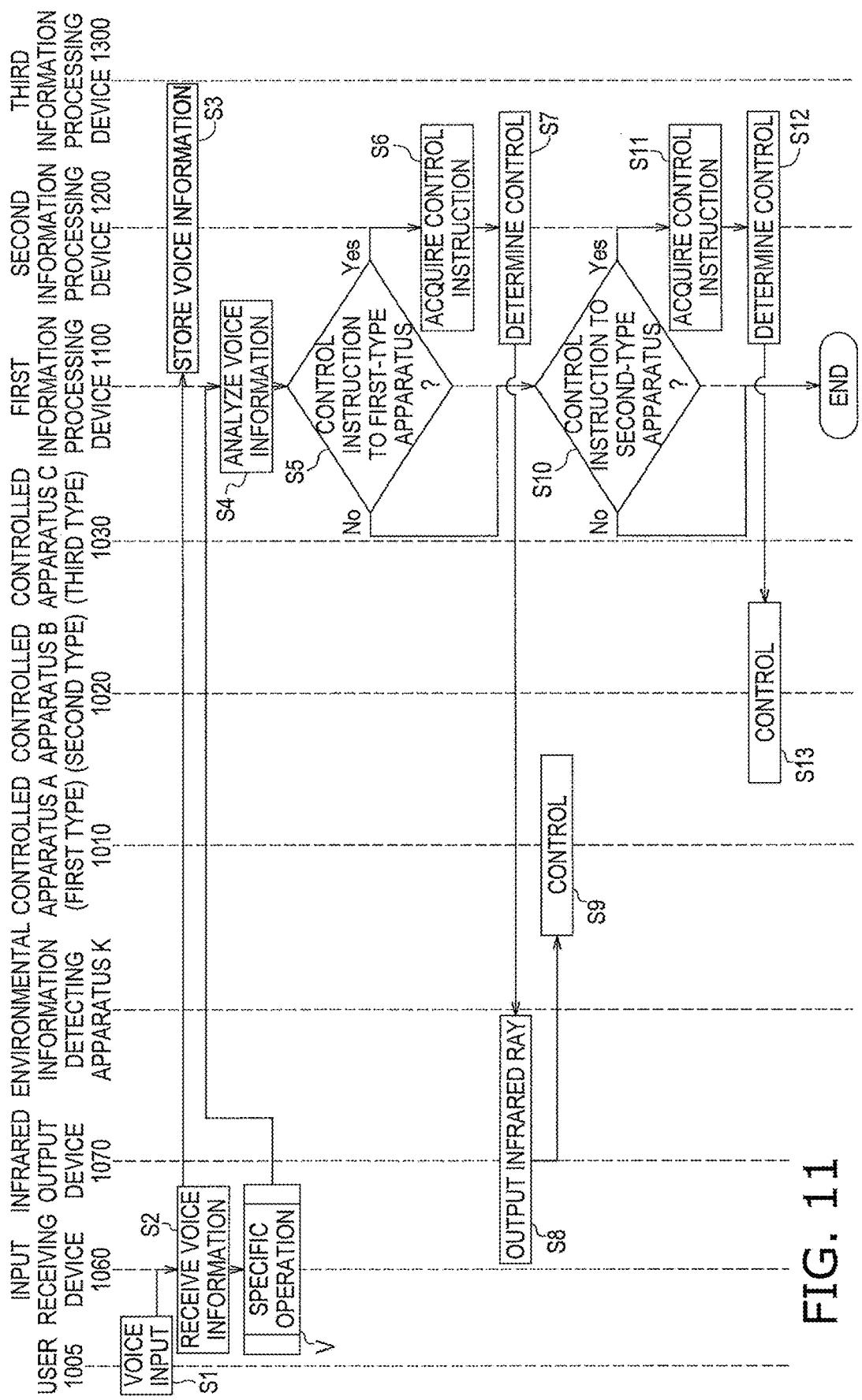
FIG. 11 is a sequence diagram that shows the operation of the operating system 1001 according to the modification 1F.
Figure 12:
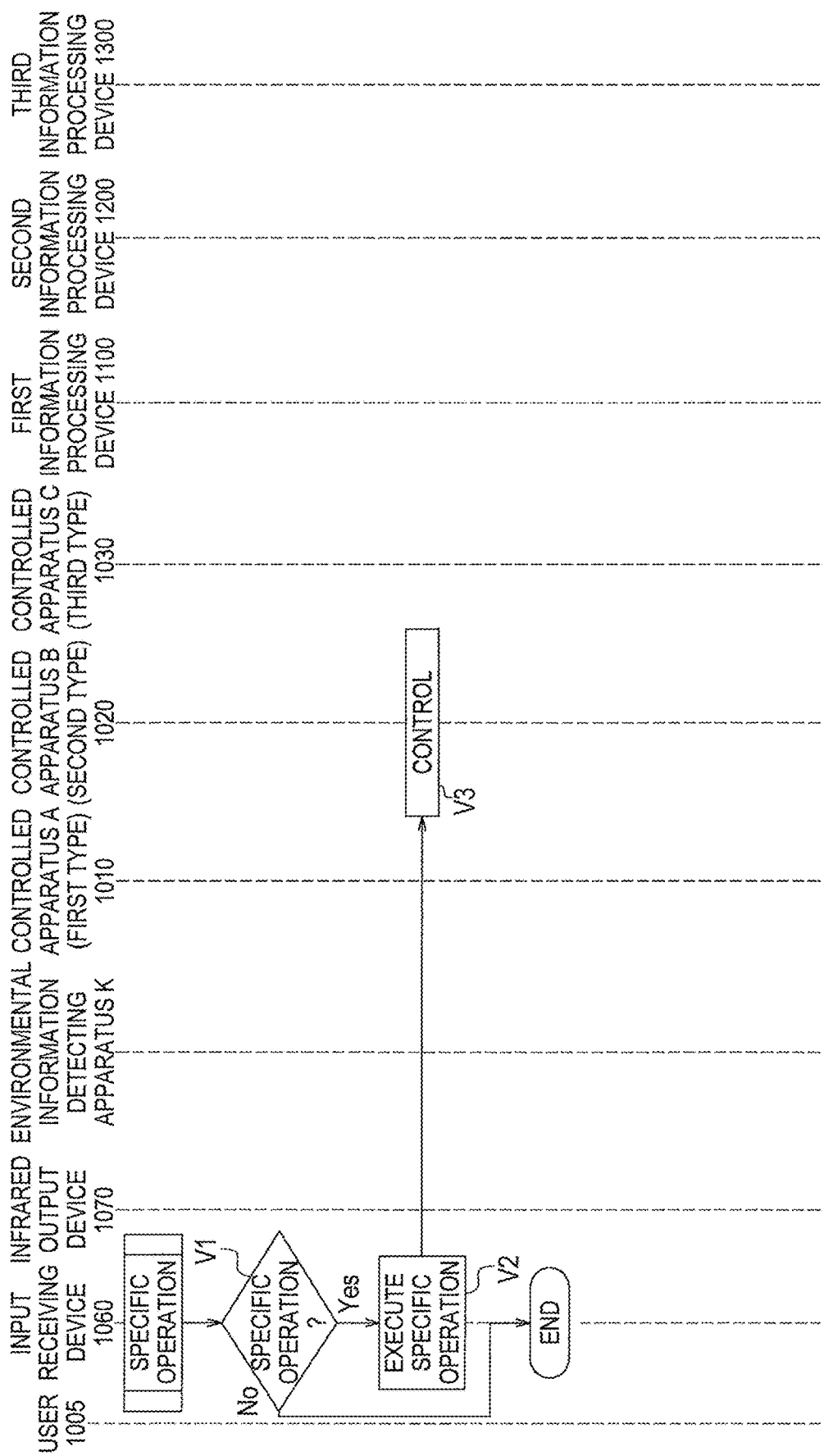
FIG. 12 is a sequence diagram that shows the operation of the operating system 1001 according to the modification 1F.

FIG. 11 and FIG. 12 are sequence diagrams that show the operation of the modification 1F.

In the modification 1F, the above-described operation of step S1 to step S13 is executed. Here, the operation of the following step V1 to step V3 is added subsequent to step S2. In other words, the input receiving device 1060 converts voice input by the user 1005 to voice information and then executes the process of "specific operation".

In the process of "specific operation", the specific operation information identifying unit 1062 identifies specific operation information on a second-type apparatus 1020 within the operation information corresponding to the input operation (V1). Here, the specific operation information identifying unit 1062 identifies whether the operation information is specific operation information by comparing the operation information with the information stored in the specific operation storage unit 1061. Subsequently, when specific operation information has been identified by the specific operation information identifying unit 1062 (Yes in V1), the specific operation execution unit 1063 executes a specific operation on a second-type apparatus 1020 (controlled apparatus B) (V2, V3). On the other hand, when specific operation information has not been identified by the specific operation information identifying unit 1062 (No in V1), the specific operation execution unit 1063 ends the process and returns to the process of step S4.

As described above, with the operating system 1001 according to the modification 1F, when the input receiving device 1060 has identified specific operation information on a second-type apparatus 1020 (controlled apparatus B), the input receiving device 1060 executes a specific operation on the second-type apparatus 1020 (controlled apparatus B). Therefore, the second-type apparatus 1020 (controlled apparatus B) can be controlled without access to the first information processing device 1100 or the second information processing device 1200 on the network NW.

Supplementarily, an apparatus is intended to be controlled by voice input, the amount of information processing is enormous. For this reason, a voice analyzing device on the network NW can be used. In contrast to this, with the modification 1F, an analyzing process is executed at a terminal side (input receiving device 1060) on, for example, voice analysis whose load of the amount of information processing is low. Thus, a quick operation on an apparatus is implemented by avoiding access to the network NW.

(1-1-4-7) Modification 1G

Figure 13:
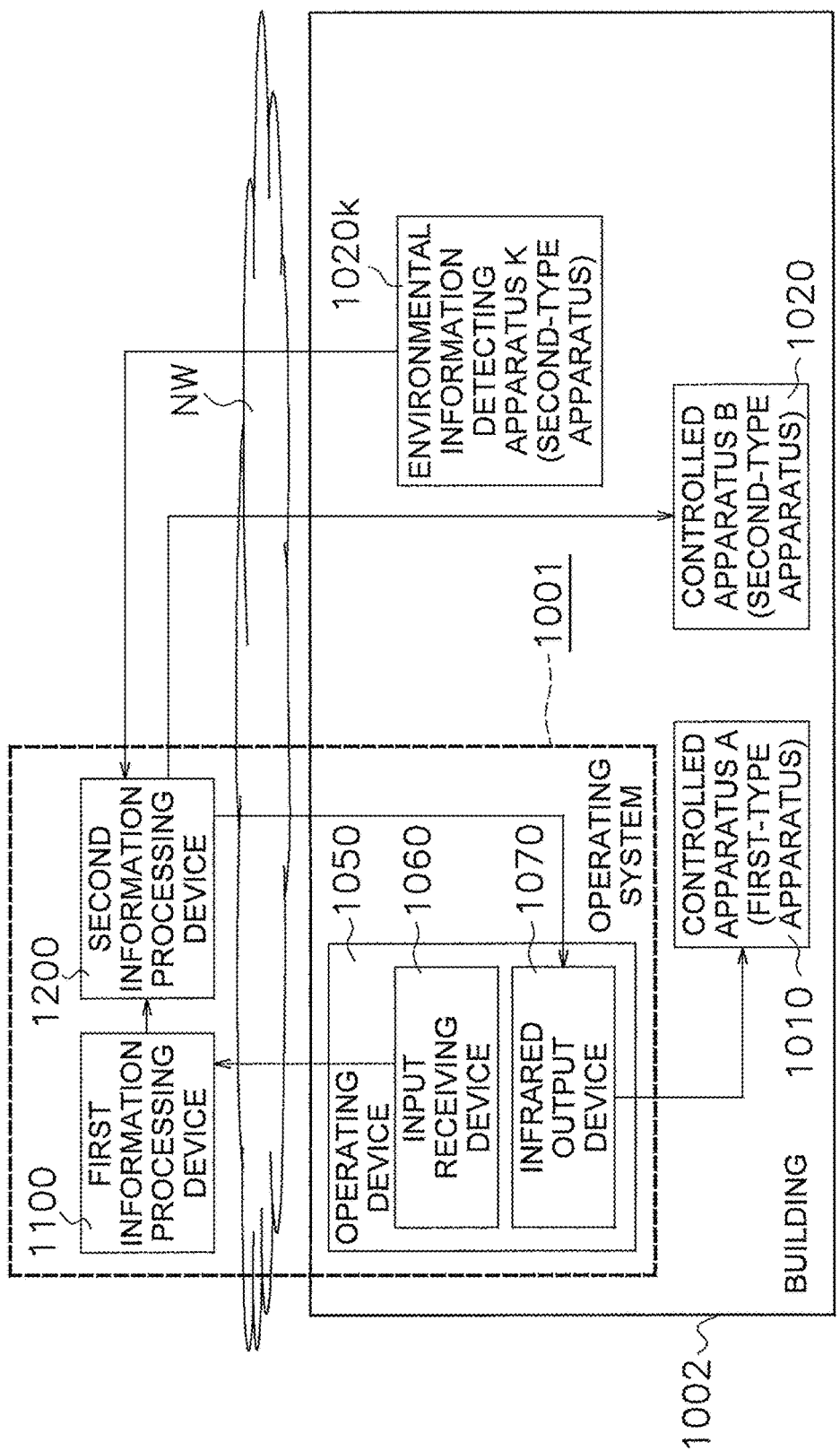
FIG. 13 is a schematic diagram that shows the configuration of the operating system 1001 according to a modification 1G.
Figure 14:
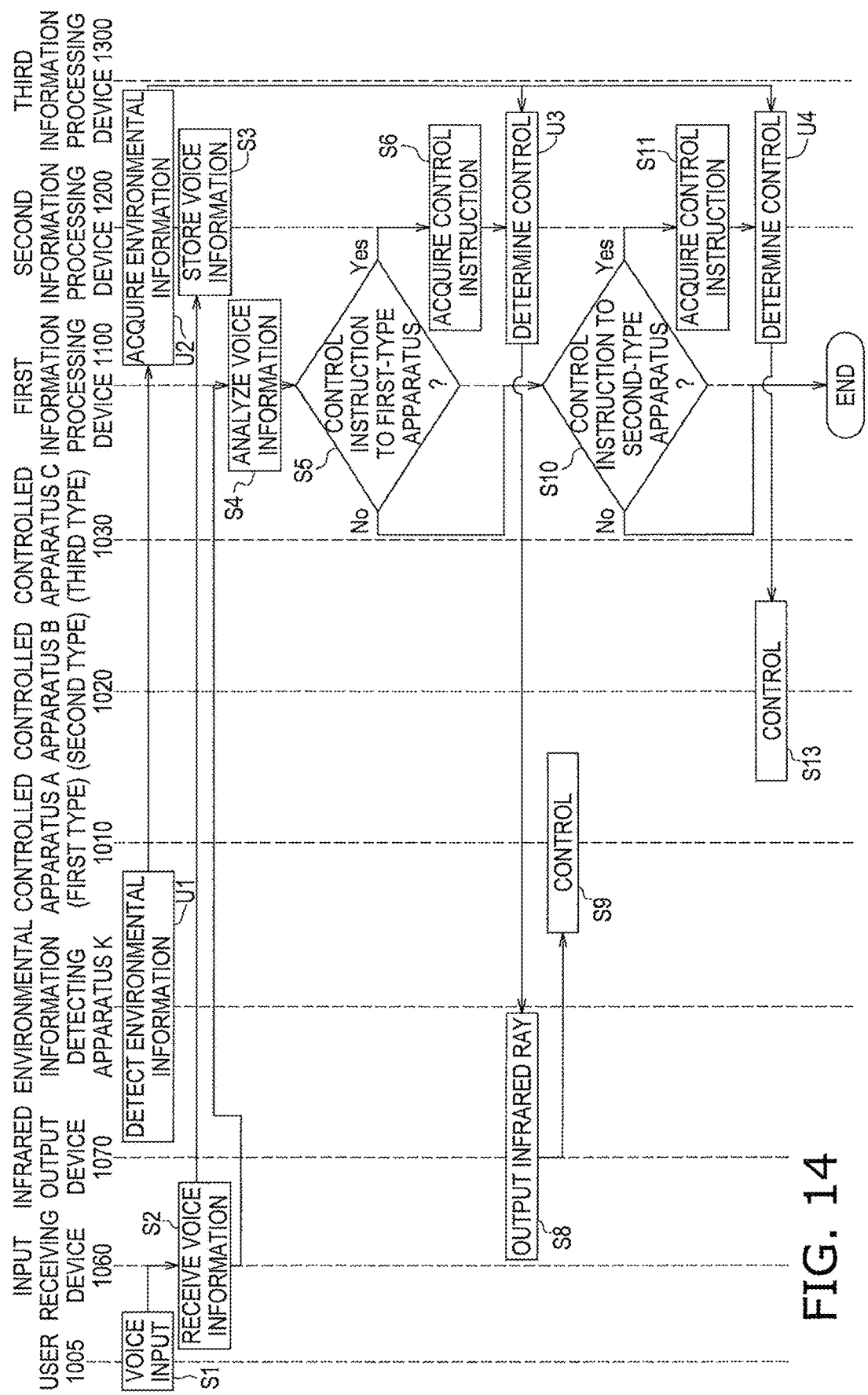
FIG. 14 is a sequence diagram that shows the operation of the operating system 1001 according to the modification 1G.

FIG. 13 is a schematic diagram that shows the configuration of an operating system according to a modification 1G. FIG. 14 is a sequence diagram that shows the operation of the modification 1G. In the modification 1G, the operation of step U1 and step U2 is added to the above-described operation of step S1 to step S13, and step S7 and step S12 are replaced with step U3 and step U4.

In the modification 1G, an environmental information detecting apparatus K is present around the controlled apparatuses A, B. The environmental information detecting apparatus K is a second-type apparatus 1020*k*, and detects "environmental information" that indicates the status of a surrounding environment (U1). Environmental information contains information, such as temperature, humidity, and illuminance.

In the modification 1G, the processing unit 1205 of the second information processing device 1200 further functions as an environmental information acquiring unit 1241. The environmental information acquiring unit 1241 acquires environmental information at predetermined timing from the environmental information detecting apparatus K (U2).

The second information processing device 1200 according to the modification 1G receives a result determined by the control instruction determination unit 1120 from the first information processing device 1100 and, when the determined result contains a control instruction to a first-type apparatus 1010 (controlled apparatus A), transmits an output instruction to the infrared output device 1070 to output an infrared pattern based on the control instruction and the environmental information (U3). In response to this, the infrared output device 1070 controls the first-type apparatus 1010 (controlled apparatus A). When the second information processing device 1200 determines that the determined result contains a control instruction to a second-type apparatus 1020 (controlled apparatus B), the second information processing device 1200 controls the second-type apparatus 1020 (controlled apparatus B) via the network based on the control instruction and the environmental information (U4).

With the operating system 1001 according to the above-described modification 1G, an apparatus is controlled based on the control instruction and the environmental information. Therefore, an apparatus can be appropriately controlled according to an environment of the user 1005.

(1-1-4-8) Modification 1H

Figure 15:
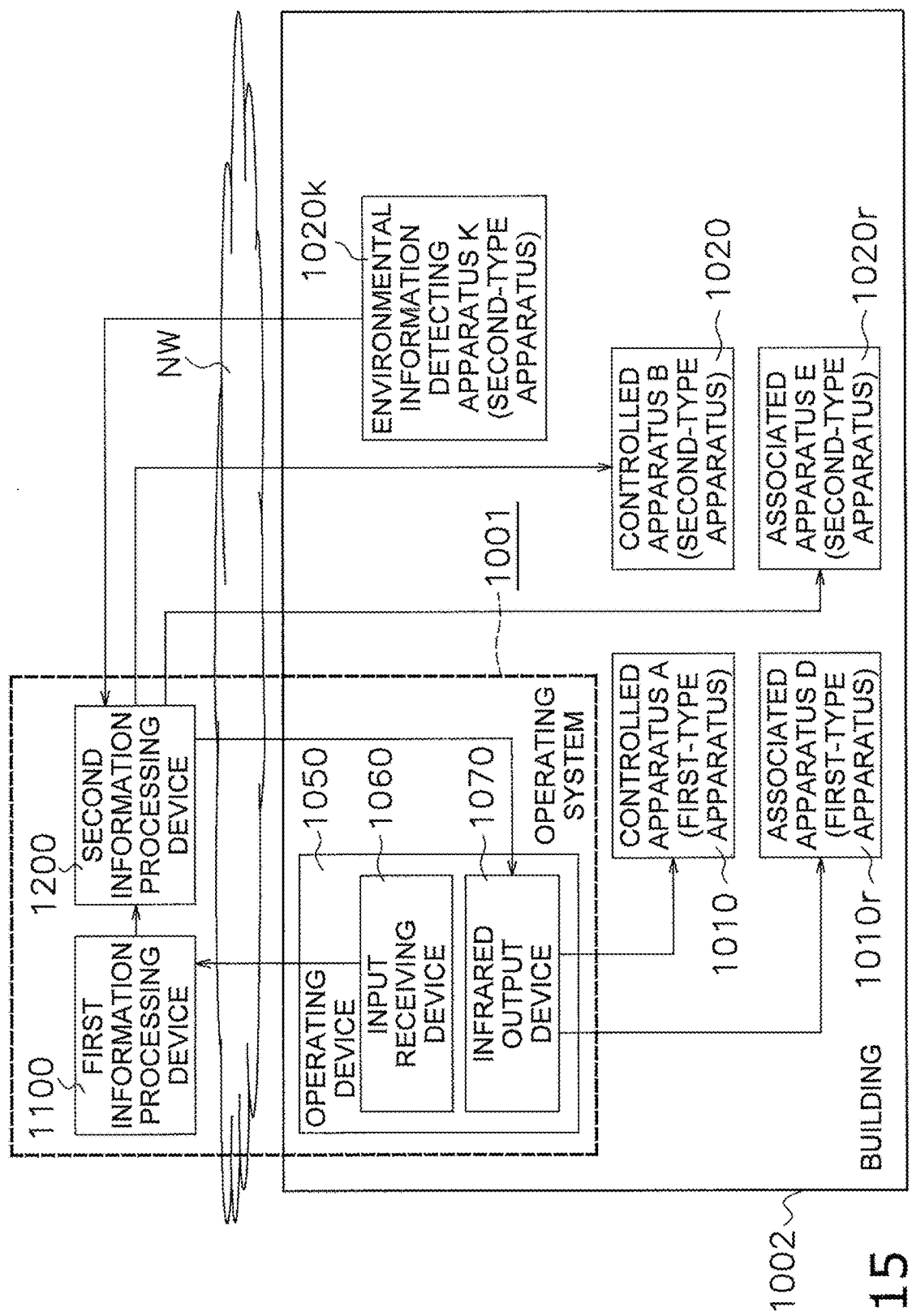
FIG. 15 is a schematic diagram that shows the configuration of the operating system 1001 according to a modification 1H.
Figure 16:
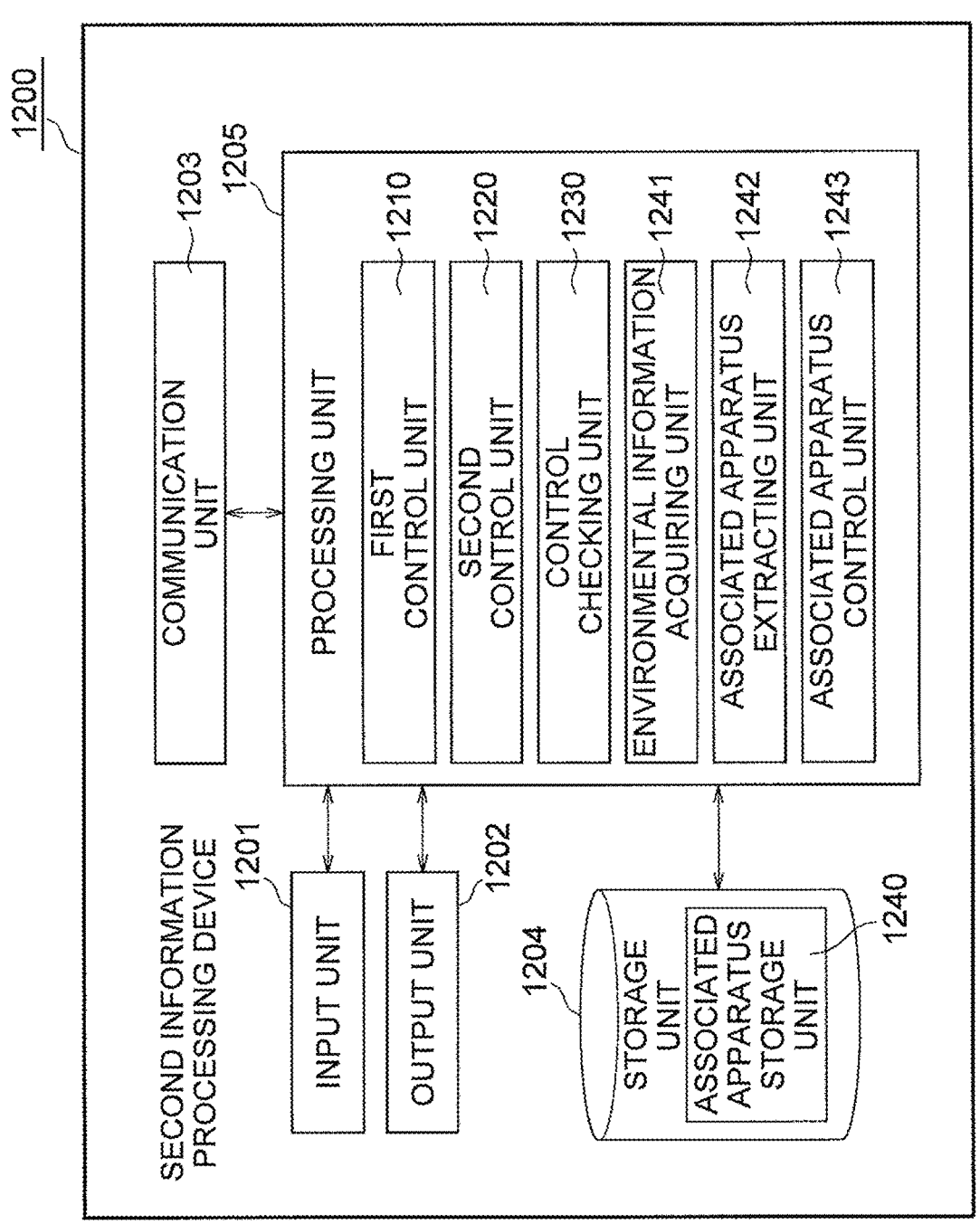
FIG. 16 is a schematic diagram that shows the configuration of the second information processing device 1200 according to the modification 1H.

FIG. 15 is a schematic diagram that shows the configuration of an operating system according to a modification 1H. FIG. 16 is a schematic diagram that shows the configuration of the second information processing device 1200 according to the modification 1H.

In the modification 1H, the environmental information detecting apparatus K is present around the controlled apparatuses A, B. The environmental information detecting apparatus K is a second-type apparatus 1020*k*, and detects environmental information that indicates the status of a surrounding environment.

In the modification 1H, the storage unit 1204 of the second information processing device 1200 functions as an associated apparatus storage unit 1240, and the processing unit 1205 of the second information processing device 1200 further functions as an environmental information acquiring unit 1241, an associated apparatus extracting unit 1242, and an associated apparatus control unit 1243.

The associated apparatus storage unit 1240 stores any one or any combination of another first-type apparatus 1010*r* (associated apparatus D) or another second-type apparatus 1020*r* (associated apparatus E) as an associated apparatus in association with any one of a first-type apparatus 1010 (controlled apparatus A) and a second-type apparatus 1020 (controlled apparatus B) and environmental information. For example, as shown in FIG. 17, the associated apparatus storage unit 1240 stores an "S-model luminaire" that is a first-type apparatus 1010*r* as an associated apparatus (associated apparatus D) in association with "illuminance information" that is environmental information and an "S-model television" that is a first-type apparatus 1010 (controlled apparatus A). For example, the associated apparatus storage unit 1240 stores a "D-model electric fan" that is a first-type apparatus 1010r as an associated apparatus in association with "temperature information" that is environmental information and an "H-model air conditioner" that is a second-type apparatus 1020 (controlled apparatus B). For example, the associated apparatus storage unit 1240 stores a "C-model far infrared heater" that is a first-type apparatus 1010r and a "D-model far infrared heater" that is a second-type apparatus 1020r as associated apparatuses in association with "temperature information" that is environmental information and a "D-model air conditioner" that is a second-type apparatus 1020 (controlled apparatus B).

The environmental information acquiring unit 1241 acquires "environmental information" at predetermined timing from the environmental information detecting apparatus K. Environmental information contains information, such as temperature, humidity, and illuminance.

When the control instruction determination unit 1120 of the first information processing device 1100 determines that a control instruction to a first-type apparatus 1010 or a control instruction to a second-type apparatus 1020 is contained, the associated apparatus extracting unit 1242 extracts an associated apparatus(es) from the associated apparatus storage unit 1240.

When another first-type apparatus 1010r is extracted as an associated apparatus (associated apparatus D) by the associated apparatus extracting unit 1242, the associated apparatus control unit 1243 transmits an output instruction toward the extracted associated apparatus (associated apparatus D) to the infrared output device 1070. When another second-type apparatus 1020r is extracted as an associated apparatus (associated apparatus E) by the associated apparatus extracting unit 1242, the associated apparatus control unit 1243 controls the extracted associated apparatus (associated apparatus E) via the network NW.

Figure 18:
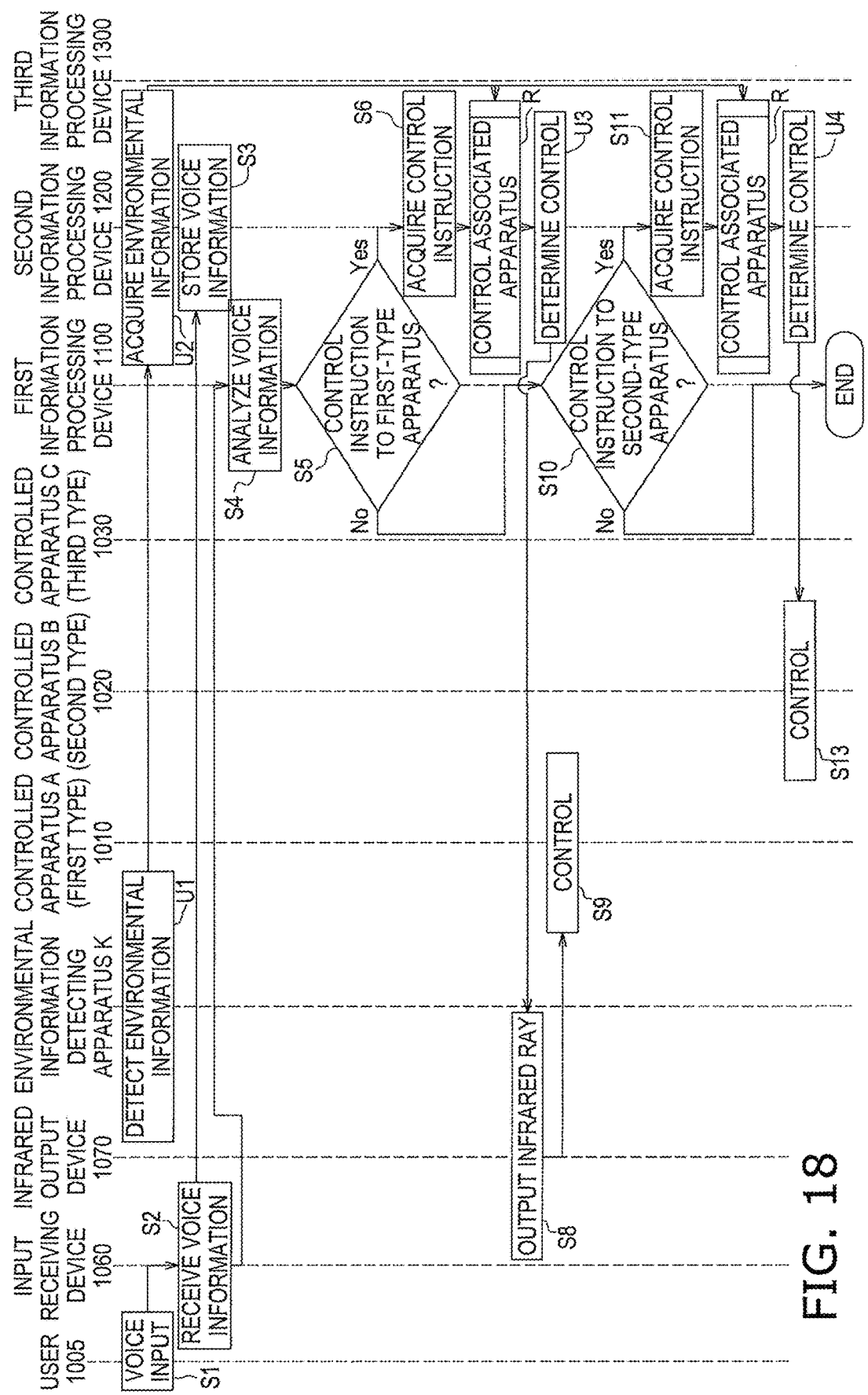
FIG. 18 is a sequence diagram that shows the operation of the operating system 1001 according to the modification 1H.
Figure 19:
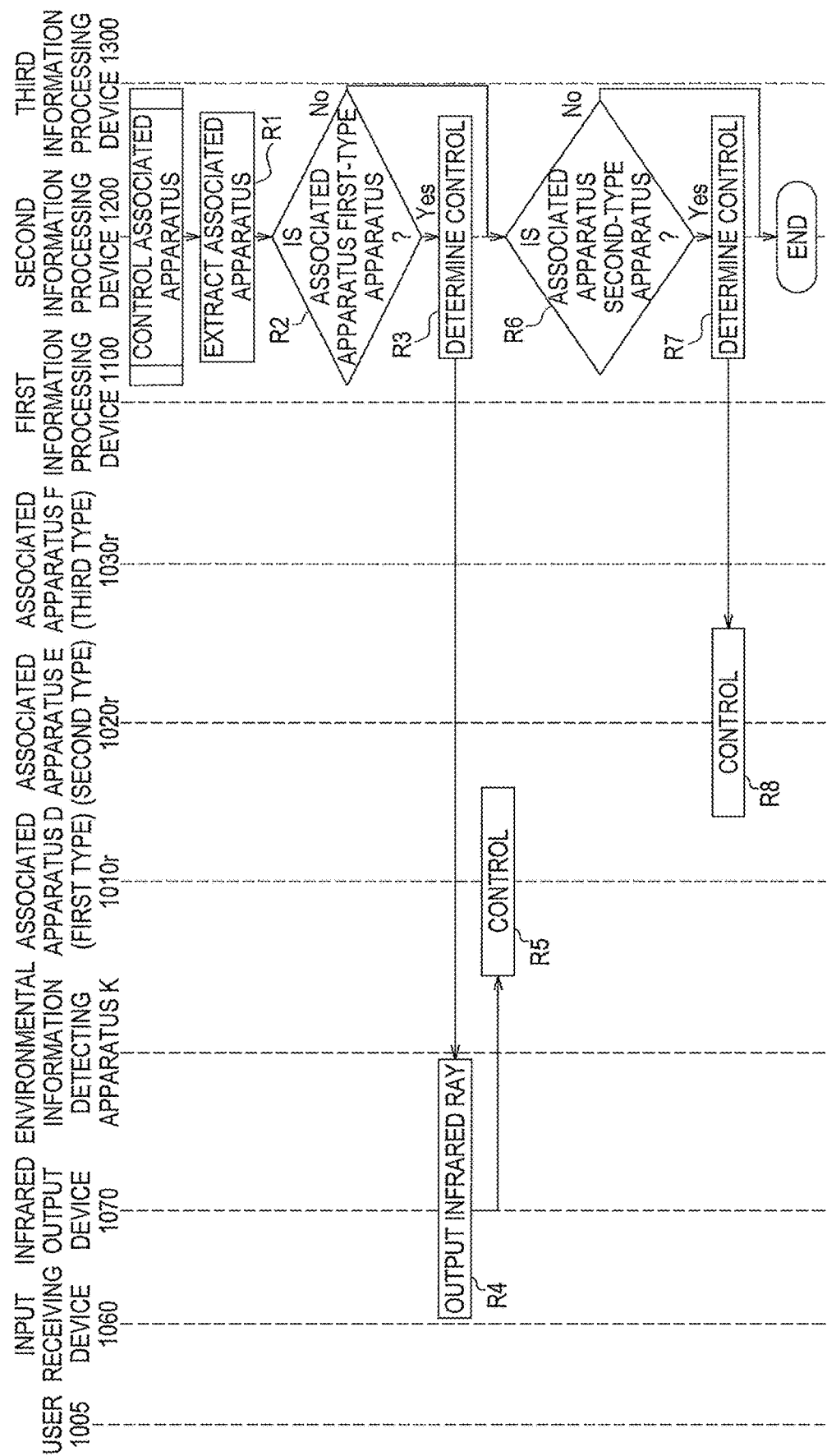
FIG. 19 is a sequence diagram that shows the operation of the operating system 1001 according to the modification 1H.

FIG. 18 and FIG. 19 are sequence diagrams that show the operation of the modification 1H. In the modification 1H, the above-described operation of step S1 to step S6, step S8 to step S11, step S13, and step U1 to step U4 is executed. Here, the process of "control over the associated apparatus(es)" of the following step R1 to step R8 is added between step S6 and step U3 and between step S11 and step U4.

In the process of "control over the associated apparatus (es)", when the control instruction determination unit 1120 of the first information processing device 1100 determines that a control instruction to a first-type apparatus 1010 (controlled apparatus A) or a control instruction to a second-type apparatus 1020 (controlled apparatus B) is contained, the associated apparatus extracting unit 1242 of the second information processing device 1200 extracts an associated apparatus(es) (associated apparatuses D, E) from the associated apparatus storage unit 1240 (R1).

When another first-type apparatus 1010r is extracted as an associated apparatus (associated apparatus D) by the associated apparatus extracting unit 1242 (Yes in R2), the associated apparatus control unit 1243 of the second information processing device 1200 transmits an output instruction toward the extracted associated apparatus (associated apparatus D) to the infrared output device 1070 (R3). In response to this, the infrared output device 1070 outputs an infrared pattern to the first-type apparatus 1010r (associated apparatus D) and controls the first-type apparatus 1010r (associated apparatus D) (R4, R5).

On the other hand, when another first-type apparatus 1010r is not extracted as an associated apparatus (associated apparatus D) by the associated apparatus extracting unit 1242 (No in R2), the associated apparatus control unit 243 of the second information processing device 1200 proceeds to the process of step R6. In the process of step R6, when another second-type apparatus 1020r is extracted as an associated apparatus (associated apparatus E) by the associated apparatus extracting unit 1242 (Yes in R6), the associated apparatus control unit 1243 of the second information processing device 1200 controls the extracted associated apparatus (associated apparatus E) via the network NW (R7, R8). When another second-type apparatus 1020r is not extracted as an associated apparatus (associated apparatus E) by the associated apparatus extracting unit 1242 (Yes in R6), the process is ended.

The processes of step R2 to step R5 and the processes of step R6 to step R8 are not in particular order and any one of sets of the processes may be executed first.

In the operating system 1001 according to the above-described modification 1H, the second information processing device 1200 further includes the environmental information acquiring unit 1241, the associated apparatus storage unit 1240, the associated apparatus extracting unit 1242, and the associated apparatus control unit 1243. The environmental information acquiring unit 1241 acquires environmental information at predetermined timing from the environmental information detecting apparatus K that detects environmental information that indicates the status of a surrounding environment. The associated apparatus storage unit 1240 stores any one or any combination of another first-type apparatus 1010r (associated apparatus D) or another second-type apparatus 1020r (associated apparatus E) as an associated apparatus in association with any one of a first-type apparatus 1010 (controlled apparatus A) and a second-type apparatus 1020 (controlled apparatus B) and environmental information. When the control instruction determination unit 1120 determines that a control instruction to a first-type apparatus 1010 (controlled apparatus A) or a control instruction to a second-type apparatus 1020 (controlled apparatus B) is contained, the associated apparatus extracting unit 1242 extracts an associated apparatus(es) (the associated apparatus D and the associated apparatus E) from the associated apparatus storage unit 1240. When another first-type apparatus 1010r is extracted as an associated apparatus (associated apparatus D) by the associated apparatus extracting unit 1242, the associated apparatus control unit 1243 transmits an output instruction to the infrared output device 1070 to output an infrared pattern corresponding to a control content over the extracted associated apparatus to the associated apparatus (associated apparatus D). When another second-type apparatus 1020r is extracted as an associated apparatus (associated apparatus E) by the associated apparatus extracting unit 1242, the associated apparatus control unit 1243 controls the extracted associated apparatus (associated apparatus E) via the network NW.

Thus, with the operating system 1001 according to the modification 1H, not only a first-type apparatus 1010 (controlled apparatus A) or a second-type apparatus 1020 (controlled apparatus B) but also associated apparatuses (the associated apparatus D and the associated apparatus E) are controlled according to an environment of the user 1005. Therefore, comfort of the user 1005 is improved.

(1-1-4-9) Modification 1I

Figure 20:
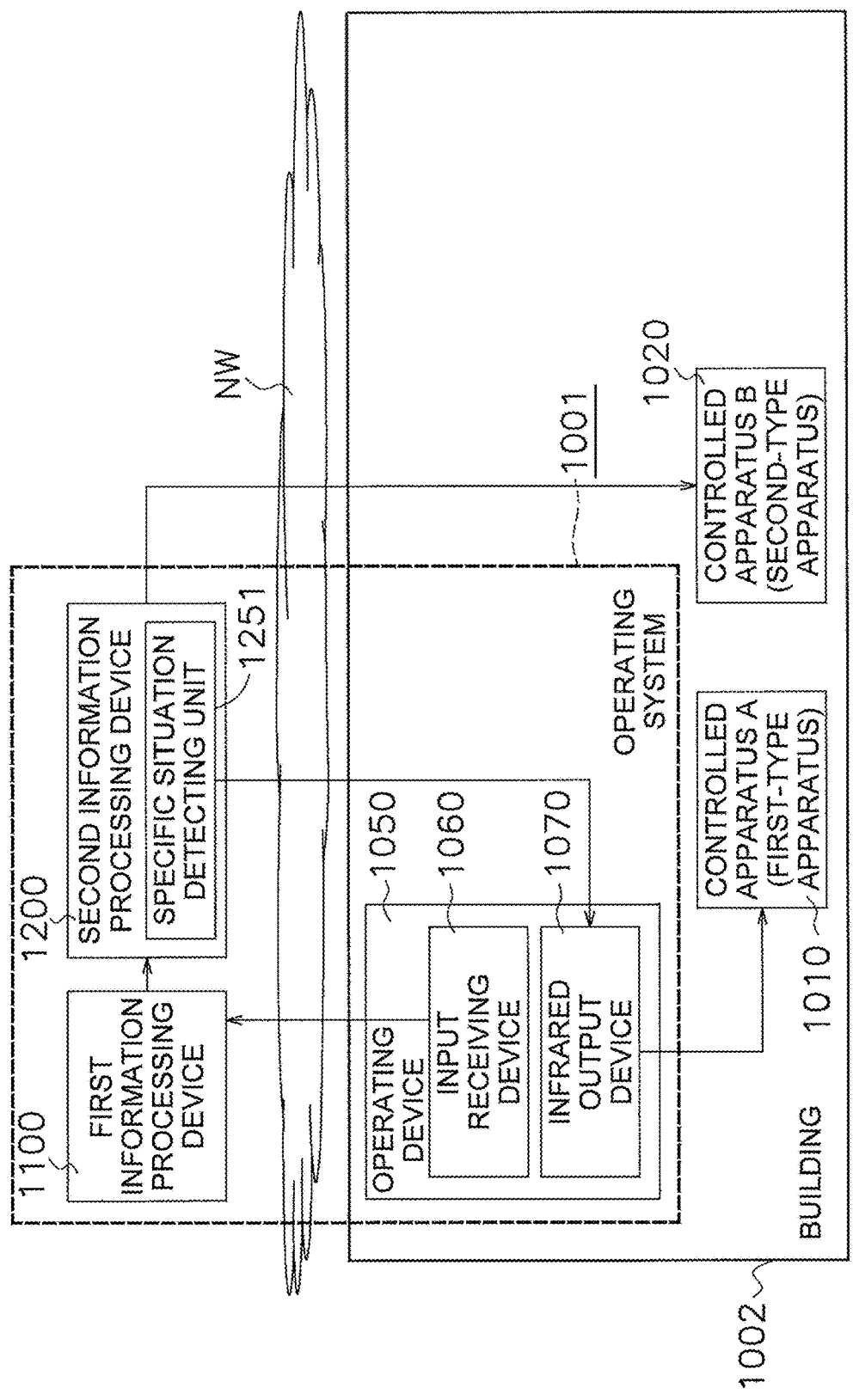
FIG. 20 is a schematic diagram that shows the configuration of the operating system 1001 according to a modification 1I.
Figure 21:
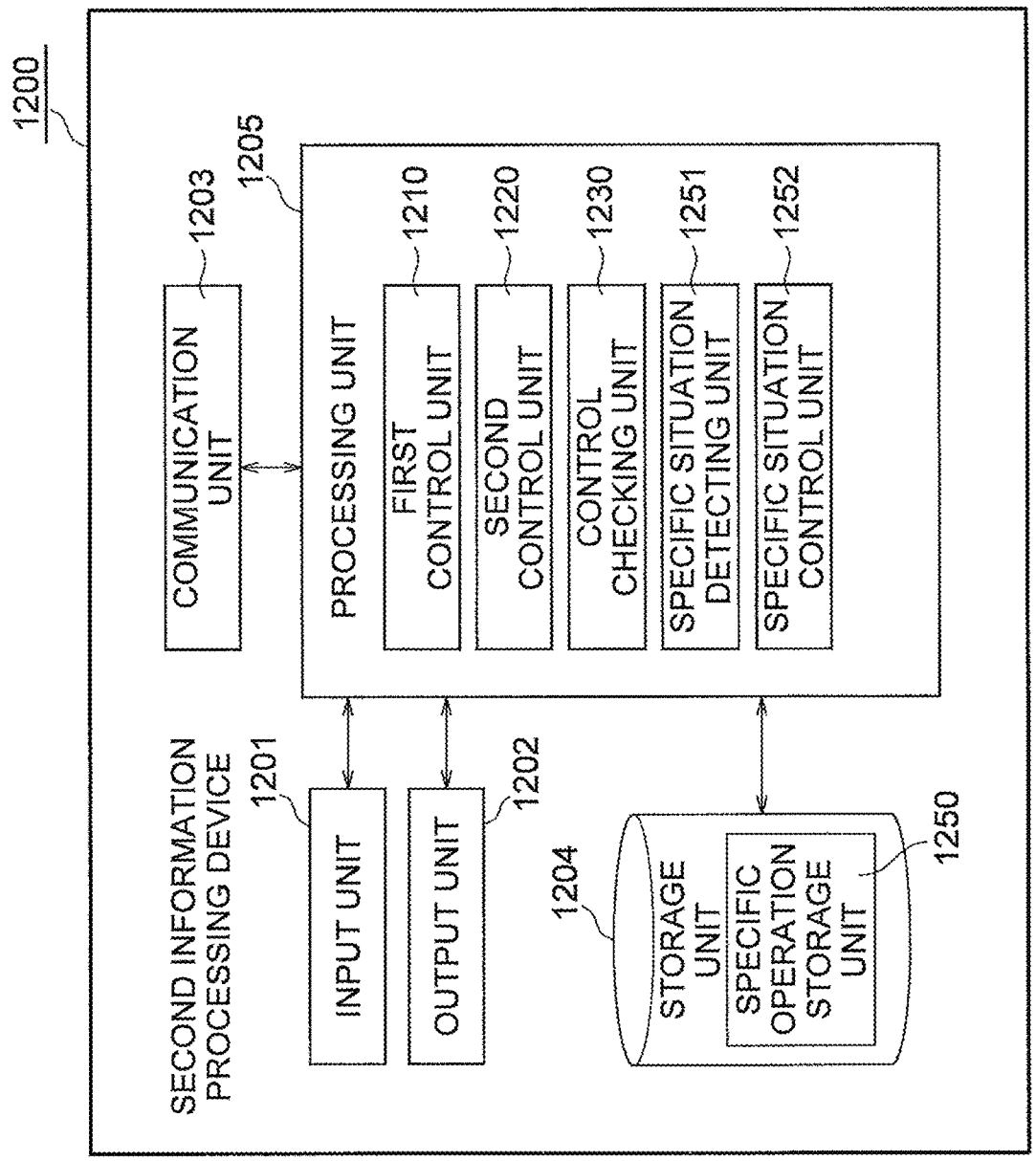
FIG. 21 is a schematic diagram that shows the configuration of the second information processing device 1200 according to the modification 1I.
Figure 22:
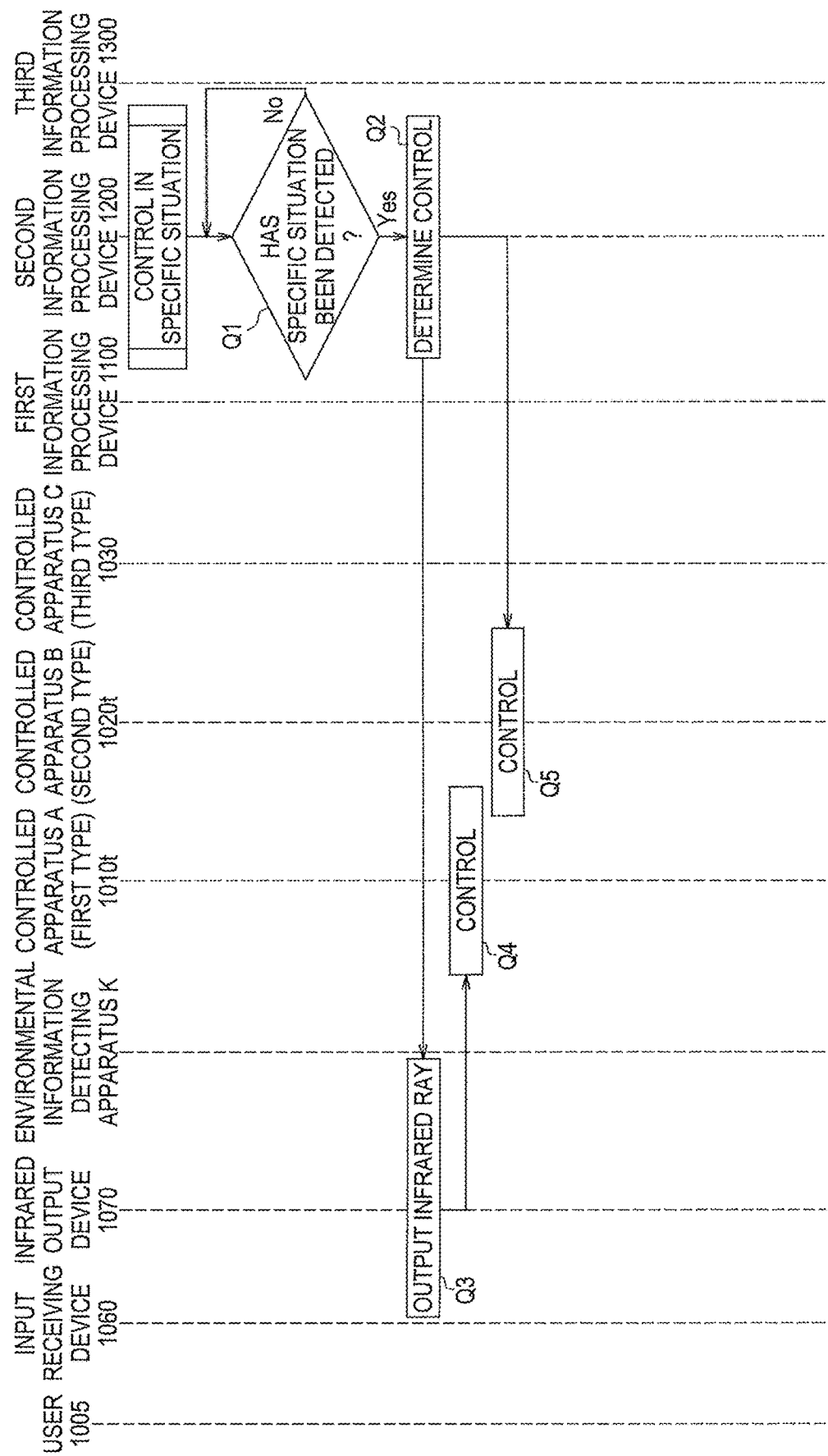
FIG. 22 is a sequence diagram that shows the operation of the operating system 1001 according to the modification 1I.

FIG. 20 is a schematic diagram that shows the configuration of an operating system according to a modification 1I. FIG. 21 is a schematic diagram that shows the configuration of the second information processing device 1200 according to the modification 1I. FIG. 22 is a sequence diagram that shows the operation of the modification 1I. In the modification 1I, in addition to the above-described operation of step S1 to step S13, "control in a specific situation" as shown in step Q1 to step Q5 is executed.

In the modification 1I, the storage unit 1204 of the second information processing device 1200 functions as a specific situation storage unit 1250, and the processing unit 1205 of the second information processing device 1200 further functions as a specific situation detecting unit 1251 and a specific situation control unit 1252.

The specific situation storage unit 1250 stores a specific situation in association with a predetermined first-type apparatus 1010*t* and a control content over the first-type apparatus 1010*t*. In addition, the specific situation storage unit 1250 stores a specific situation in association with a predetermined second-type apparatus 1020*t* and a control content over the second-type apparatus 1020*t*. For example, when the specific situation is "tsunami (seismic sea wave)", the specific situation storage unit 1250 sets the predetermined first-type apparatus 1010*t* for "S-model television" and stores "S-model television" in association with a control content that "Air a state-run program". For example, when the specific situation is "tsunami", the specific situation storage unit 1250 sets the second-type apparatus 1020*t* for "D-model air conditioner" and stores "D-model air conditioner" in association with a control content that "Turn off the power".

The specific situation detecting unit 1251 detects a specific situation (Q1). Examples of the specific situation include tsunami, terrorism, and major earthquake.

When a specific situation has been detected (Yes in Q1), the specific situation control unit 1252 transmits an output instruction to the infrared output device 1070 to output an infrared pattern corresponding to a control content associated with the specific situation to a predetermined first-type apparatus 1010*t* (controlled apparatus A) regardless of operation information (Q2). Thus, the infrared output device 70 outputs the infrared pattern and controls the predetermined first-type apparatus 1010*t* (controlled apparatus A) (Q3, Q4). When a specific situation has been detected (Yes in Q1), the specific situation control unit 1272 controls a predetermined second-type apparatus 1020*t* (controlled apparatus B) in accordance with a control content associated with the specific situation regardless of operation information (Q2, Q5).

In the operating system 1001 according to the above-described modification 1I, when a specific situation has been detected, a first-type apparatus 1010*t* (controlled apparatus A) associated with the specific situation operates to make the user 1005 recognize the specific situation. Depending on the type of a first-type apparatus 1010*t*, the first-type apparatus 1010*t* is controlled so as to ensure safety in a specific situation. In addition, when a specific situation has been detected, a second-type apparatus 1020*t* (controlled apparatus B) is controlled in accordance with a control content associated with the specific situation. Therefore, the user 1005 is made to recognize the specific situation. Depending on the type of a second-type apparatus 1020*t*, the second-type apparatus 1020*t* is controlled so as to ensure safety in a specific situation. Specifically, regardless of a first-type apparatus 1010*t* or a second-type apparatus 1020*t*, when an apparatus is "television", "a state-run program or another program is aired" to make the user 1005 recognize a specific situation. Regardless of a first-type apparatus 1010*t* or a second-type apparatus 1020*t*, when an apparatus is "air conditioner", the apparatus is controlled so as to ensure safety in a specific situation by "turning off the power".

(1-1-4-10) Modification 1J

In the above description, the second information processing device 1200 receives a content of a control instruction from the first information processing device 1100 and transmits a control instruction to the infrared output device 1070; however, the configuration of the operating system 1001 according to the present embodiment is not limited thereto. Specifically, the first information processing device 1100 may be configured to directly transmit a control instruction to the infrared output device 1070.

Second Embodiment (1-2-1) Configuration of Operating System 1001S

Figure 23:
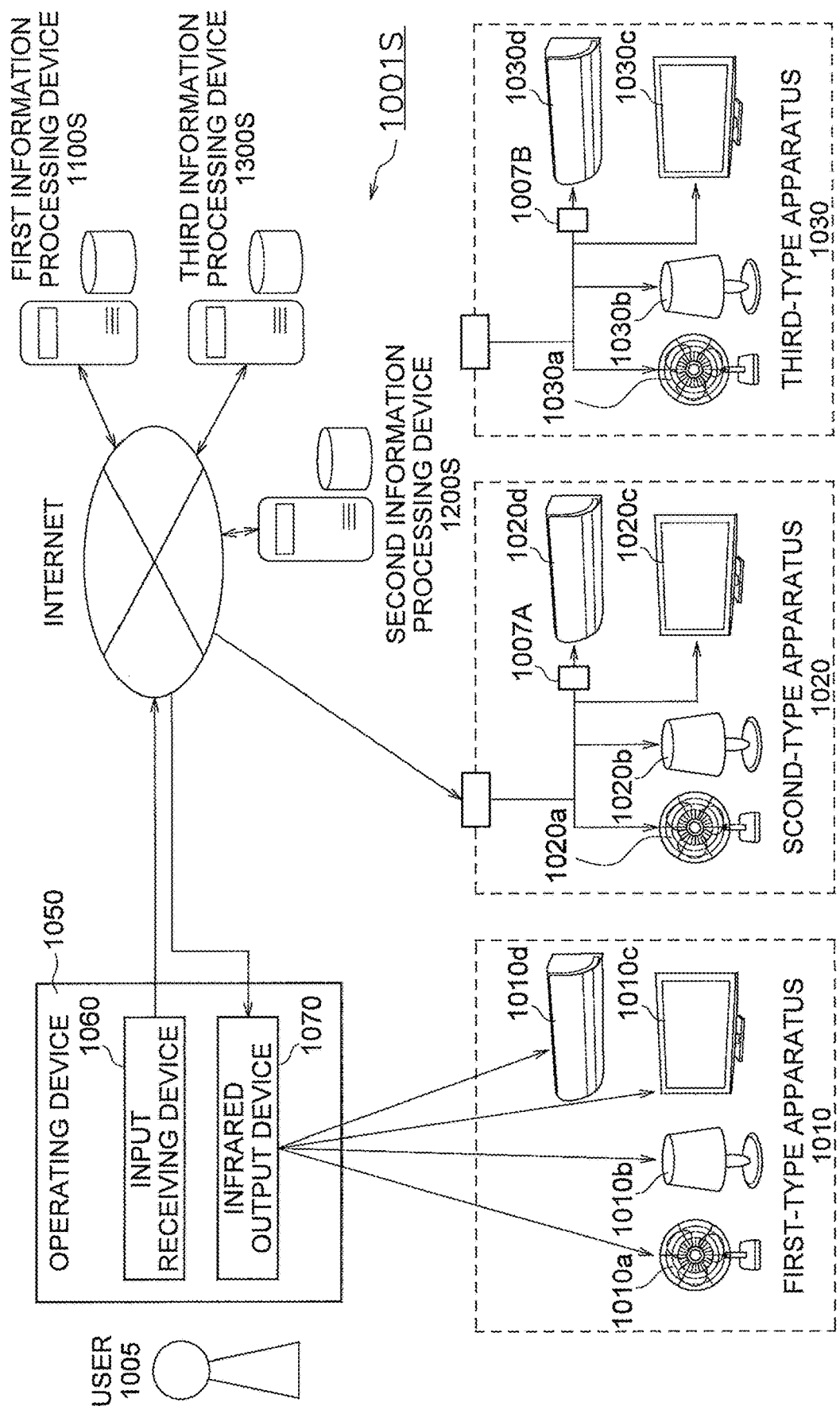
FIG. 23 is a schematic diagram that shows the concept of an operating system 1001S according to a second embodiment of the first invention.
Figure 24:
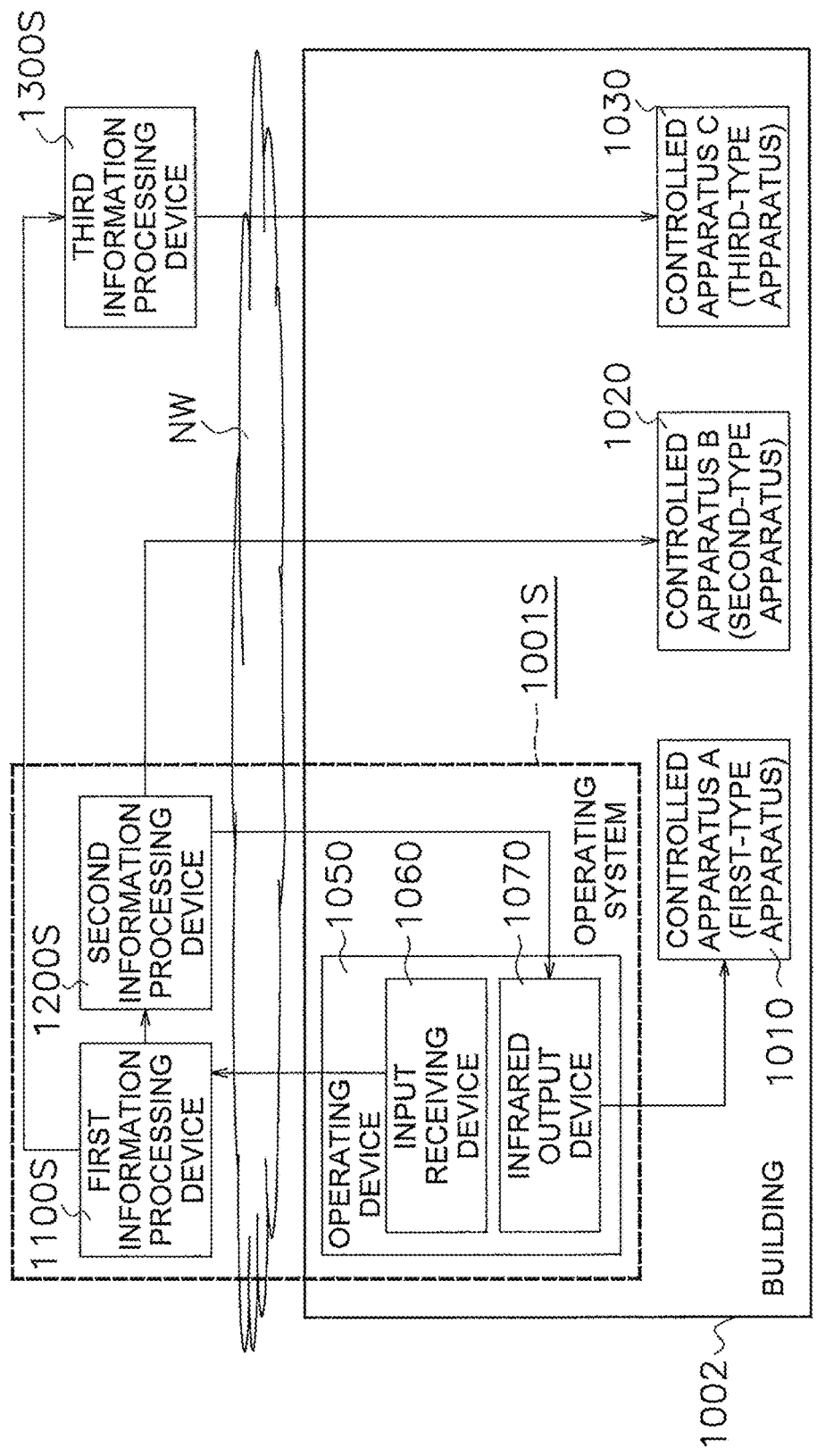
FIG. 24 is a schematic diagram that shows the concept of the operating system 1001S according to the embodiment.

FIG. 23 is a schematic diagram that shows the concept of an operating system 1001S according to a second embodiment of the first invention. FIG. 24 is a schematic diagram that shows the configuration of the operating system 15 according to the embodiment. In the following description, like reference numerals denote the already described components, and the description will not be repeated. In the present embodiment, components different from those of the other embodiments can be described with a suffix "S".

The operating system 1001S includes the operating device 1050, a first information processing device 1100S, and a second information processing device 1200S. The operating device 1050 includes the input receiving device 1060 and the infrared output device 1070. The first information processing device 1100S and second information processing device 1200S of the operating system 1015 are connected to a third information processing device 1300S via the network NW. With this operating system 1001S, when the user 1005 performs an input operation on the operating device 1050, the user 1005 is able to operate apparatuses present around the operating device 1050. Here, the apparatuses include "first-type apparatuses 1010", "second-type apparatuses 1020", and "third-type apparatuses 1030". These apparatuses are placed in the building 1002.

The third-type apparatuses 1030 are operable via at least the network NW. Here, the third-type apparatuses 1030 are managed by the third information processing device 1300S. Examples of the third-type apparatuses 1030, as well as the first-type apparatuses 1010 and the second-type apparatuses 1020, include an electric fan 1030*a*, a luminaire 1030*b*, a television 1030*c*, and an air conditioner 1030*d*. In the following description, reference numeral 1030 indicates any third-type apparatus, and a lower-case alphabet is suffixed to indicate an individual third-type apparatus.

The second information processing device 1200S and the second-type apparatuses 1020 are connected via a communication adaptor 1007A that communicates under a first communication protocol. The third information processing device 1300S and the third-type apparatuses 1030 are connected via a communication adaptor 1007B that communicates under a second communication protocol different from the first communication protocol.

In the second embodiment, a control instruction determination unit 1120S of the first information processing device 1100S further determines whether a result analyzed by the operation information analyzing unit 1110 contains a control instruction to a control instruction to a third-type apparatus 1030. When the control instruction determination unit 1120S determines that a control instruction to a third-type apparatus 1030 is contained, the control instruction determination unit 1120S transmits an operation command corresponding to the control instruction to the third information processing device 1300S.

(1-2-2) Operation of Operating System 1001S

Figure 25A:
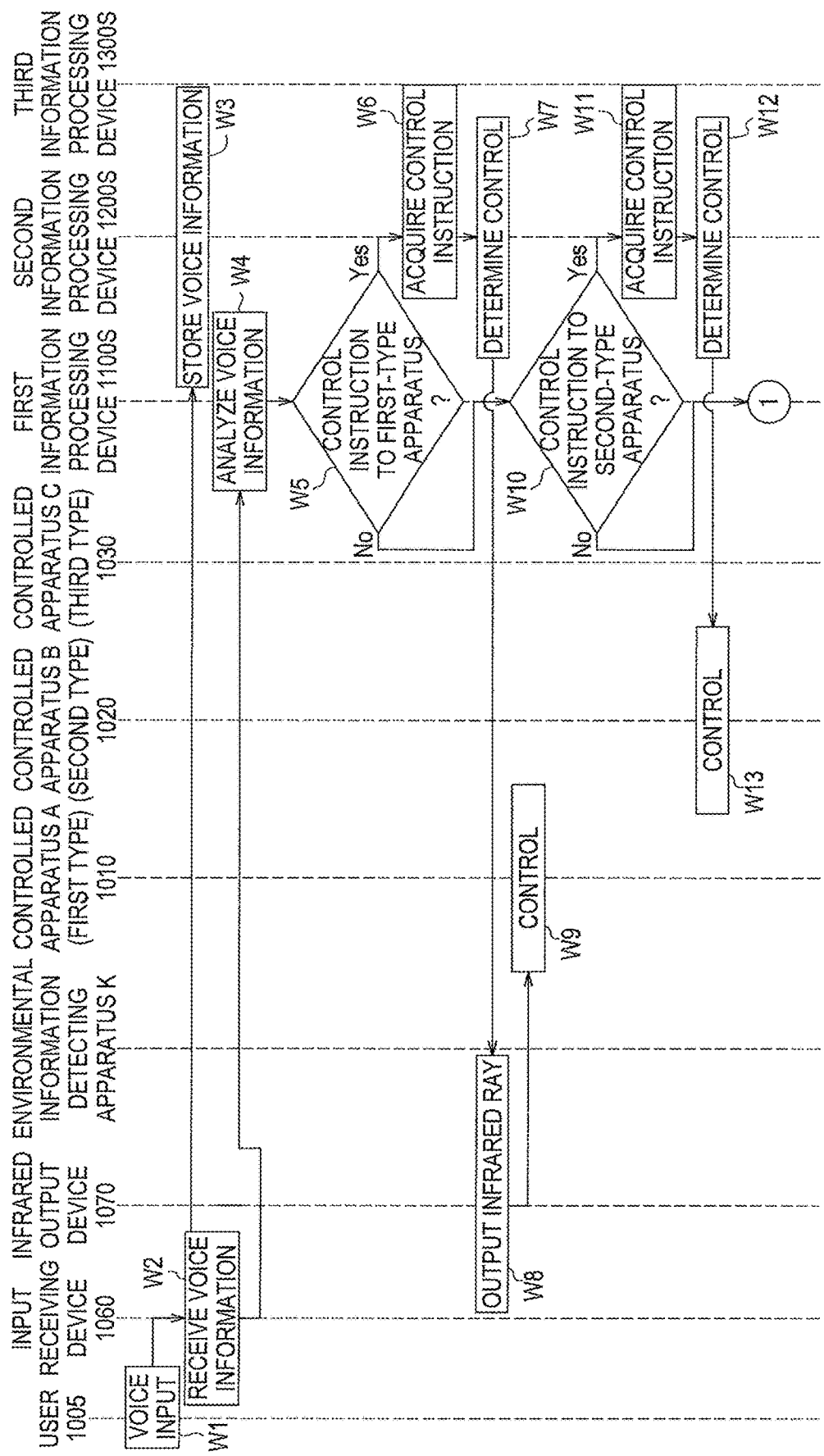
FIG. 25A is a sequence diagram for illustrating the operation of the operating system 1001S according to the embodiment.
Figure 25B:
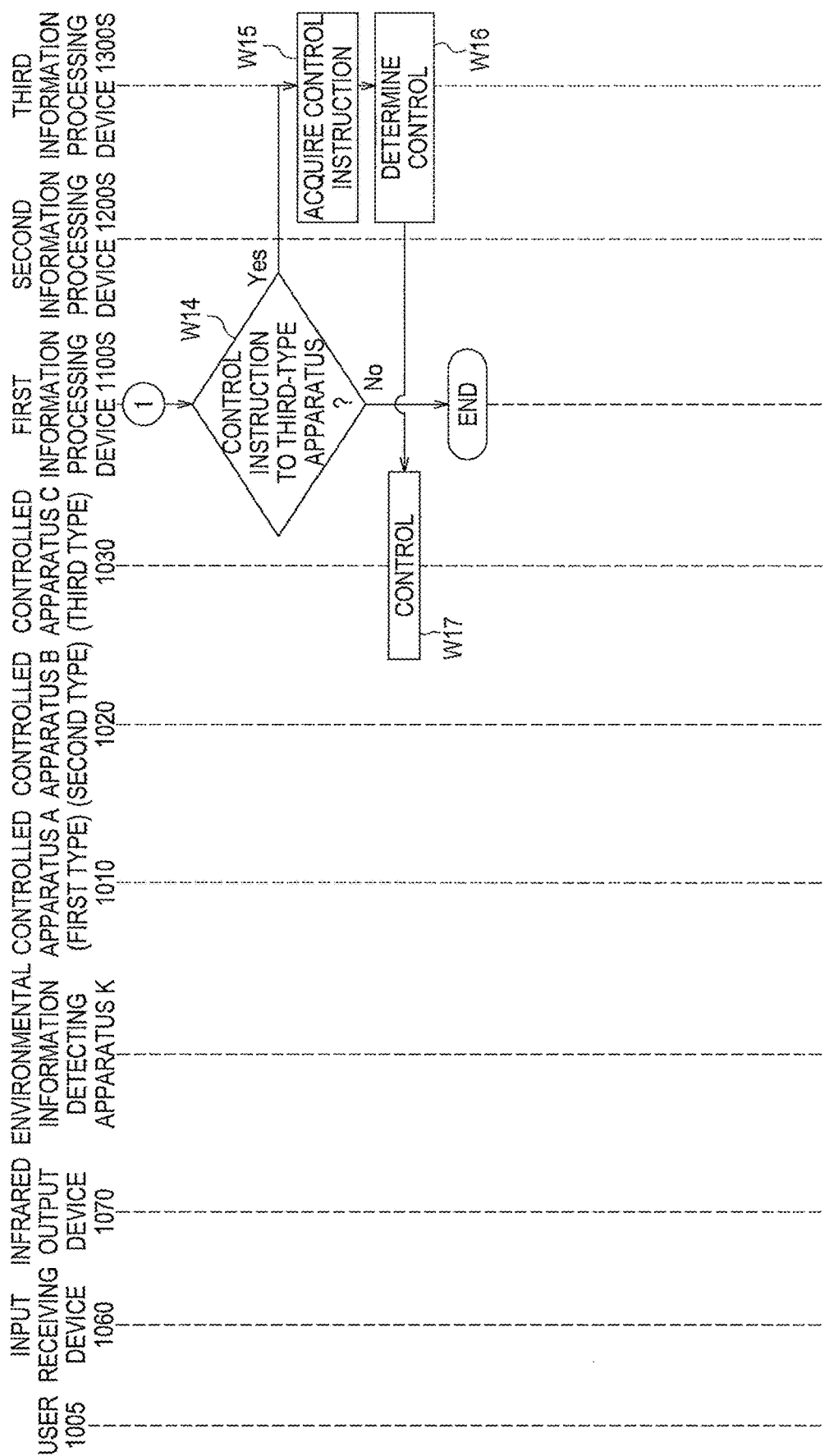
FIG. 25B is a sequence diagram for illustrating the operation of the operating system 1001S according to the embodiment.

FIG. 25A and FIG. 25B are sequence diagrams for illustrating the operation of the operating system 1001S according to the present embodiment. In the following description, for the sake of convenience, it is assumed that a controlled apparatus A is present as a first-type apparatus 1010, a controlled apparatus B is present as a second-type apparatus 1020, and a controlled apparatus C is present as a third-type apparatus 1030 around the user 1005.

First, voice input on an apparatus present around the user 1005 is performed by the user 1005 (W1). For example, a command, such as "Turn on the power of the controlled apparatus A" and "Turn off the controlled apparatus B", is input by voice.

Subsequently, the input receiving device 1060 receives the voice input performed by the user 1005, converts the input voice to voice information, and transmits the voice information to the first information processing device 1100S and the second information processing device 1200S (W2).

In the second information processing device 1200S, the voice information is accumulated as needed (W3).

In the first information processing device 1100S, the operation information analyzing unit 1110 analyzes the voice information received from the operating device 1050 (W4). For example, the operation information analyzing unit 1110 of the first information processing device 1100S analyzes the voice information by using neural network, or the like. The operation information analyzing unit 1110 of the first information processing device 1100S analyzes a meaning corresponding to the voice information and converts the voice information to text information.

Subsequently, the control instruction determination unit 1120 of the first information processing device 1100S determines whether a result analyzed by the operation information analyzing unit 1110 contains a control instruction to a first-type apparatus 1010 (W5). When the first information processing device 1100S determines that a control instruction to a first-type apparatus 1010 (controlled apparatus A) is contained (Yes in W5), the first information processing device 1100S transmits the determined result to the second information processing device 1200S. Here, it is assumed that the analyzed result contains a control instruction to the controlled apparatus A that is a first-type apparatus 1010.

After that, the second information processing device 1200S receives the determined result from the first information processing device 1100S (W6), and determines a control content over the first-type apparatus 1010 (controlled apparatus A) (W7). The first control unit 1210 of the second information processing device 1200S transmits an output instruction to the operating device 1050 (infrared output device 1070) via the communication unit 1203 to output an infrared pattern corresponding to the control instruction.

Subsequently, the infrared output device 1070 receives the output instruction from the second information processing device 1200S, outputs an infrared pattern based on the output instruction (W8), and controls the controlled apparatus A that is the first-type apparatus 1010 (W9).

On the other hand, when the first information processing device 1100S determines in step W5 that a control instruction to a first-type apparatus 1010 is not contained (No in W5), the first information processing device 1100S determines whether a control instruction to a second-type apparatus 1020 is contained (W10). When the first information processing device 1100S determines that a control instruction to a second-type apparatus 1020 is contained (Yes in W10), the first information processing device 1100S transmits the determined result to the second information processing device 1200S. Here, it is assumed that the analyzed result contains a control instruction to the controlled apparatus B that is a second-type apparatus 1020.

After that, the second information processing device 1200S receives the determined result from the first information processing device 1100S (W11), and determines a control content over the second-type apparatus 1020 (controlled apparatus B) (W12). The second control unit 1220 of the second information processing device 1200S controls the controlled apparatus B that is the second-type apparatus 1020 via the network NW based on the control instruction (W13).

On the other hand, when the first information processing device 1100S determines in step W10 that a control instruction to a second-type apparatus 1010 is not contained (No in W10), the first information processing device 1100S determines whether a control instruction to a third-type apparatus 1030 is contained (W14). When the first information processing device 1100S determines that a control instruction to a third-type apparatus 1030 is contained (Yes in W14), the first information processing device 1100S transmits the determined result to the third information processing device 1300S. Here, it is assumed that the analyzed result contains a control instruction to the controlled apparatus C that is a third-type apparatus 1030.

After that, the third information processing device 1300S receives the determined result from the first information processing device 1100S (W15), and determines a control content over the third-type apparatus 1030 (controlled apparatus C) (W16). The third information processing device 1300S controls the controlled apparatus C that is the third-type apparatus 1030 via the network NW based on the control instruction (W17).

When the first information processing device 1100S determines in step W14 that a control instruction to a third-type apparatus 1030 (controlled apparatus C) is not contained (No in W14), the operating system 1001S ends the process.

The processes of step W5 to step W9, the processes of step W10 to step W13, and the processes of step W14 to step W17 are not in particular order and any one of sets of the processes may be executed first.

(1-2-3) Characteristics (1-2-3-1)

As described above, with the operating system 1001S according to the present embodiment, in addition to the configuration of the operating system 1001 according to the first embodiment, the first information processing device 1100S communicates with the third information processing device 1300S that is able to operate a third-type apparatus 1030 different from a second-type apparatus 1020 via the network NW. The control instruction determination unit 1120S of the first information processing device 1100S further determines whether a result analyzed by the operation information analyzing unit 1110 contains a control instruction to a control instruction to a third-type apparatus 1030. When the control instruction determination unit 1120S determines that a control instruction to a third-type apparatus 1030 is contained, the first information processing device 1100S transmits an operation command corresponding to the control instruction to the third information processing device 1300S.

Therefore, with the operating system 1001S according to the present embodiment, when it is determined that operation information contains a control instruction to a first-type apparatus 1010 (controlled apparatus A) as a result of analysis of the operation information, the first-type apparatus 1010 (controlled apparatus A) is controlled by transmission of an infrared pattern to the first-type apparatus (controlled apparatus A). When the operating system 1001S determines that the operation information contains a control instruction to a second-type apparatus (controlled apparatus B) as a result of analysis of the operation information, the operating system 1001S controls the second-type apparatus 1020 (controlled apparatus B) via the network NW. When the operating system 1001S determines that the operation information contains a control instruction to a third-type apparatus 1030 (controlled apparatus C) as a result of analysis of the operation information, the operating system 1001S transmits an operation command to the third-type apparatus 1030 (controlled apparatus C) via the network NW to the third information processing device 1300S that is able to operate the third-type apparatus 1030 (controlled apparatus C).

Therefore, the operating system that is able to not only operate a first-type apparatus 1010 (controlled apparatus A) and a second-type apparatus 1020 (controlled apparatus B) but also transmit an operating instruction to a third-type apparatus 1030 (controlled apparatus C) not operable by the second information processing device 1200S can be provided. As a result, an operating system with further high extensibility can be provided.

(1-2-3-2)

In the operating system 1001S according to the present embodiment, the second information processing device 1200S and the second-type apparatuses 1020 are connected via a first communication adaptor 1007A that communicates under a first communication protocol.

The third information processing device 1300S and the third-type apparatuses 1030 are connected via a second communication adaptor 1007B that communicates under a second communication protocol different from the first communication protocol. In this way, with the operating system 1001S, the operating system 1001S that is able to transmit an operation command also to a third-type apparatus 1030 that communicates under a communication protocol different from that of the second-type apparatuses 1020 can be provided.

(1-2-4) Modifications (1-2-4-1) Modification 2A

Figure 26A:
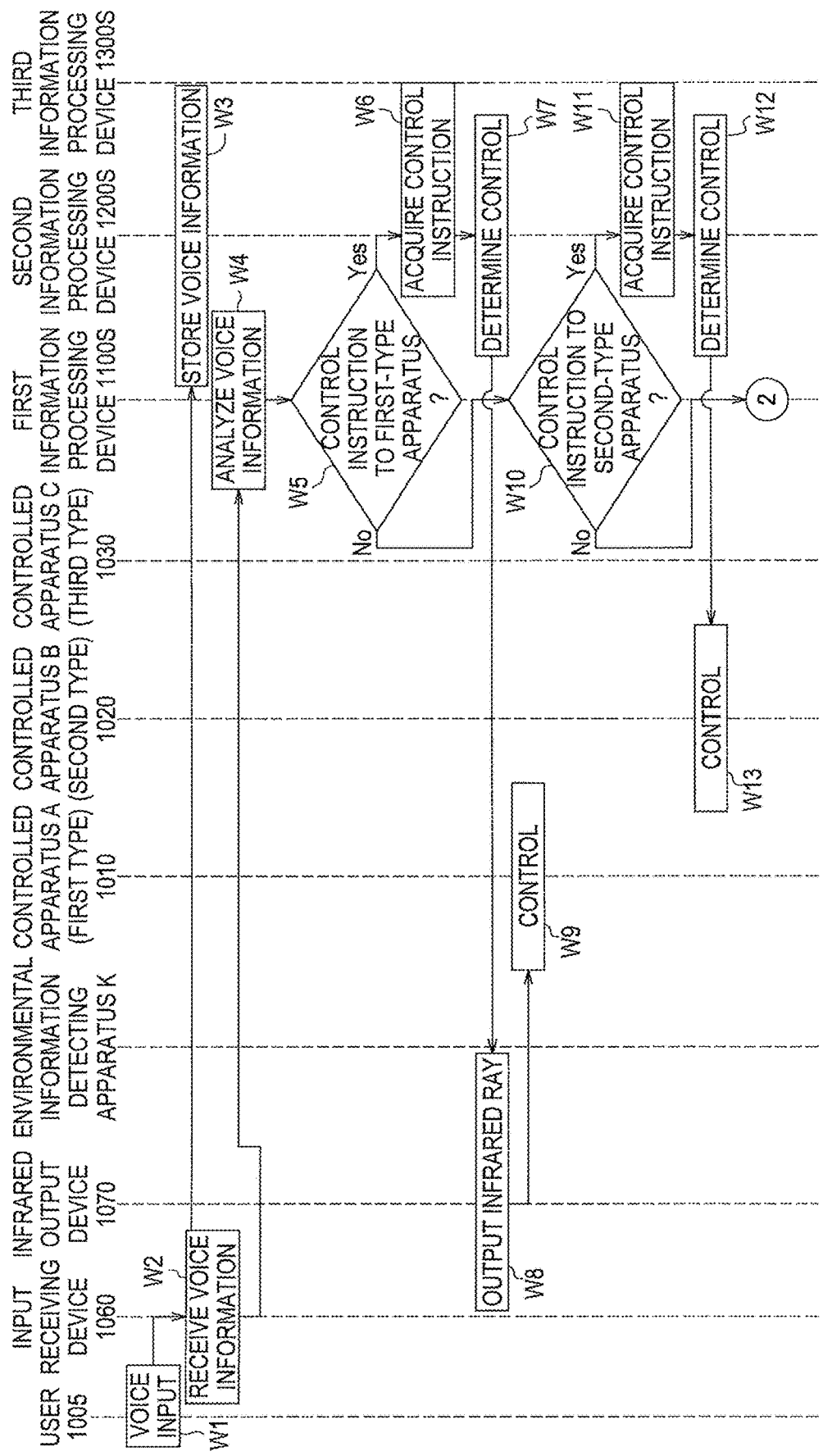
FIG. 26A is a sequence diagram that shows the operation of the operating system 1001S according to a modification 2A.
Figure 26B:
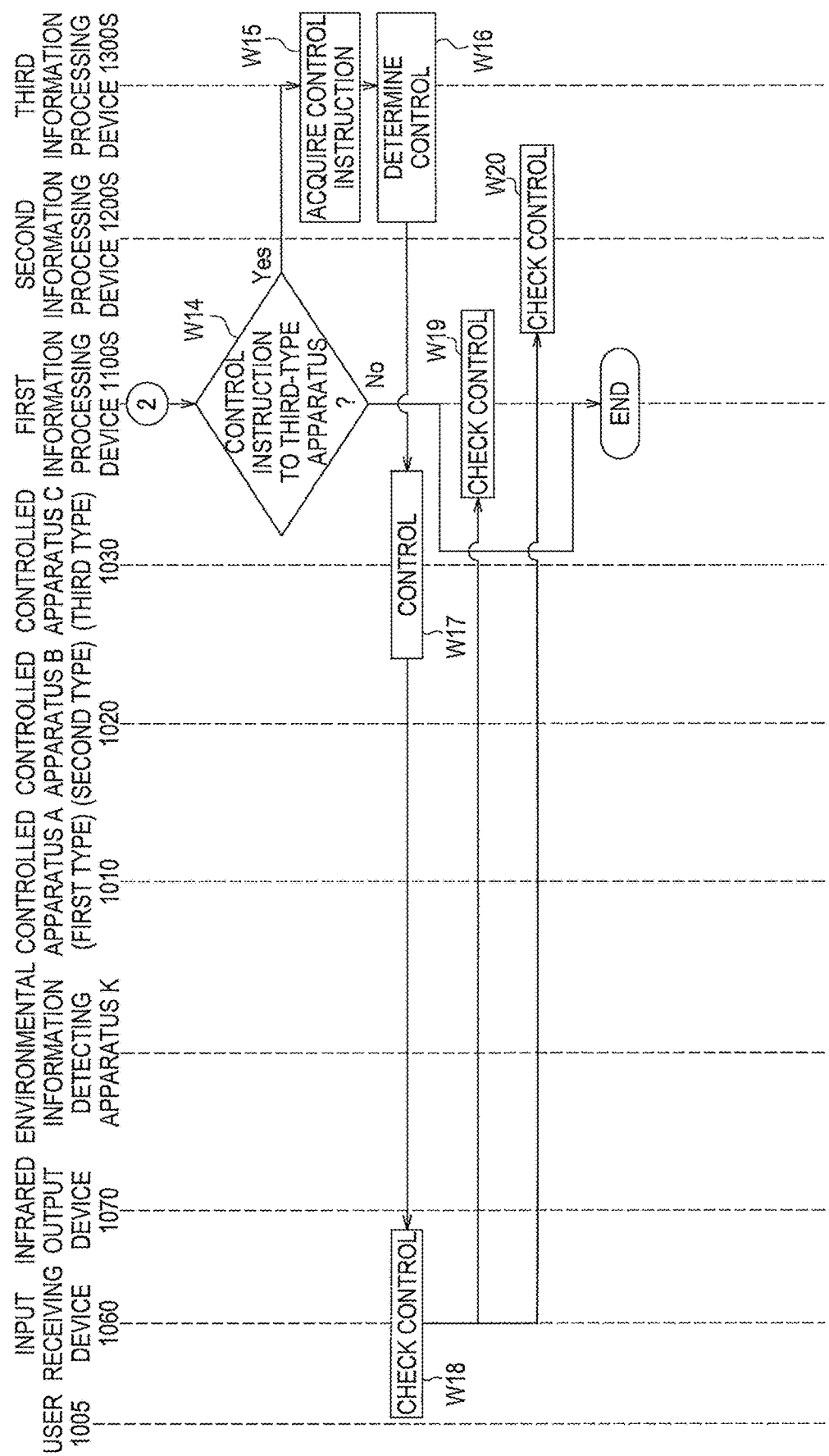
FIG. 26B is a sequence diagram that shows the operation of the operating system 1001S according to the modification 2A.

In the operating system 1001S according to the present embodiment, as shown in the sequences of FIG. 26A and FIG. 26B, the input receiving device 1060 may determine whether the third-type apparatus 1030 has been controlled by the third information processing device 1300S and transmit a determined result to the first information processing device 1100S and/or the second information processing device 1200S (step W18 to step W20).

In this case, the input receiving device 1060 (operating device 1050) determines whether the third-type apparatus 1030 has been controlled and transmits a determined result to the first information processing device 1100S and/or the second information processing device 1200S. Therefore, for example, even when an administrator of the first information processing device 1100S and/or an administrator of the second information processing device 1200S is different from an administrator of the third information processing device 1300S, the administrator of the first information processing device 1100S and/or the administrator of the second information processing device 1200S is able to judge whether the third-type apparatus 1030 has been controlled by the third information processing device 1300S. For example, the input receiving device 1060 determines whether the third-type apparatus 1030 has been controlled based on, for example, whether a surrounding apparatus has been operated within a predetermined time from transmission of voice information. Thus, the operating system 1001S can be further appropriately managed.

(1-2-4-2) Modification 2B

Figure 27:
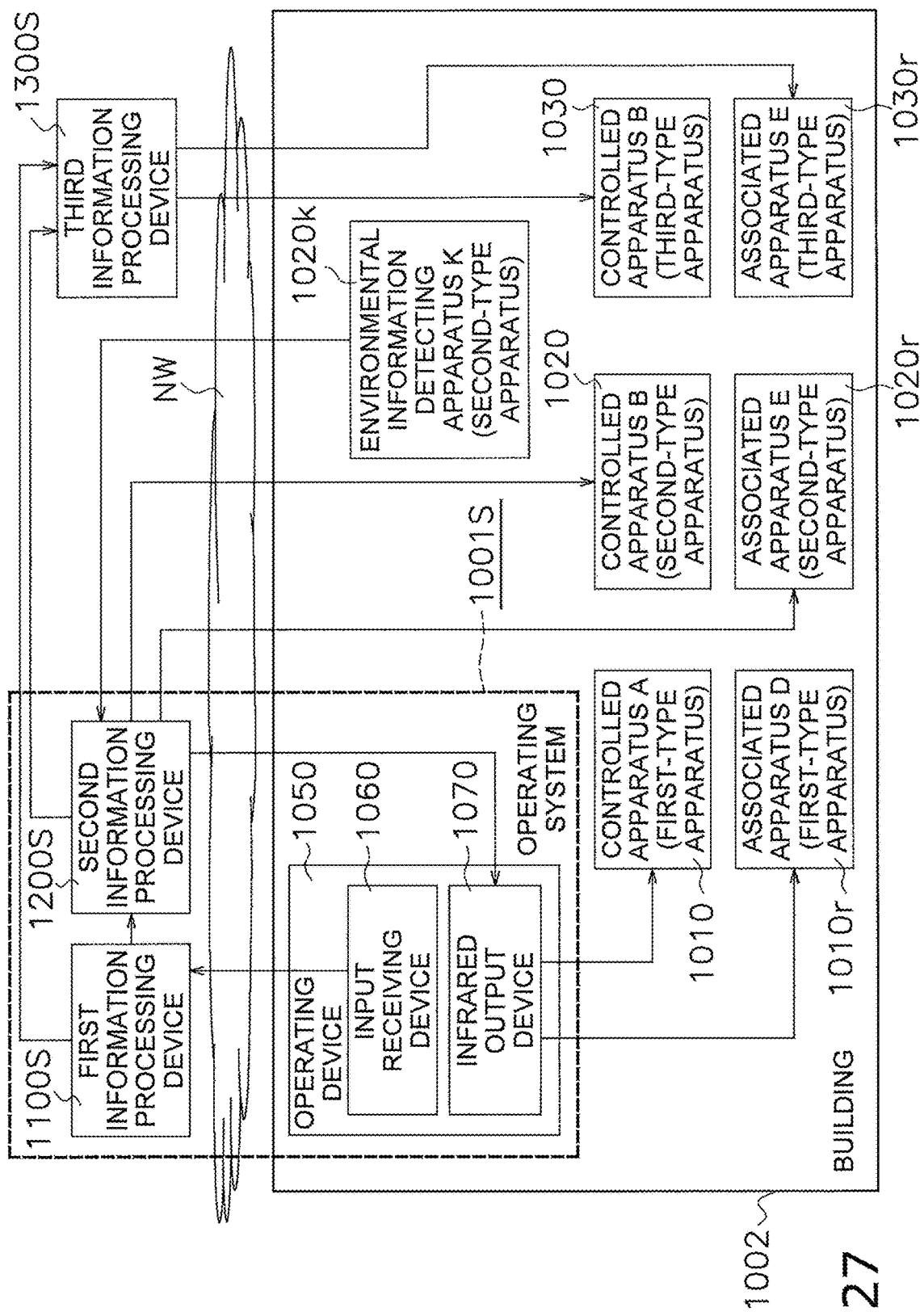
FIG. 27 is a schematic diagram that shows the configuration of the operating system 1001S according to a modification 2B.
Figure 28:
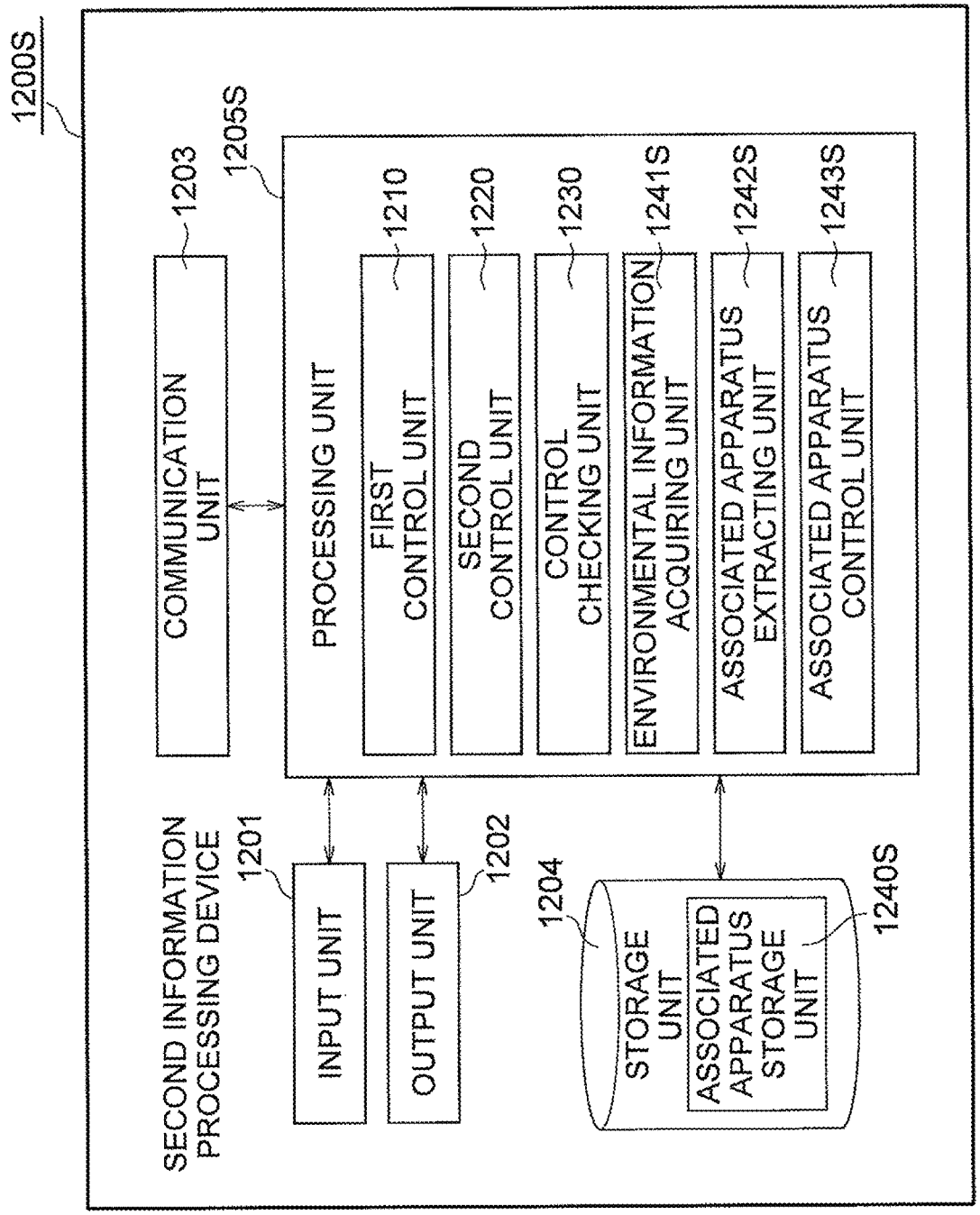
FIG. 28 is a schematic diagram that shows the configuration of a second information processing device 1200S according to the modification 2B.
Figure 30A:
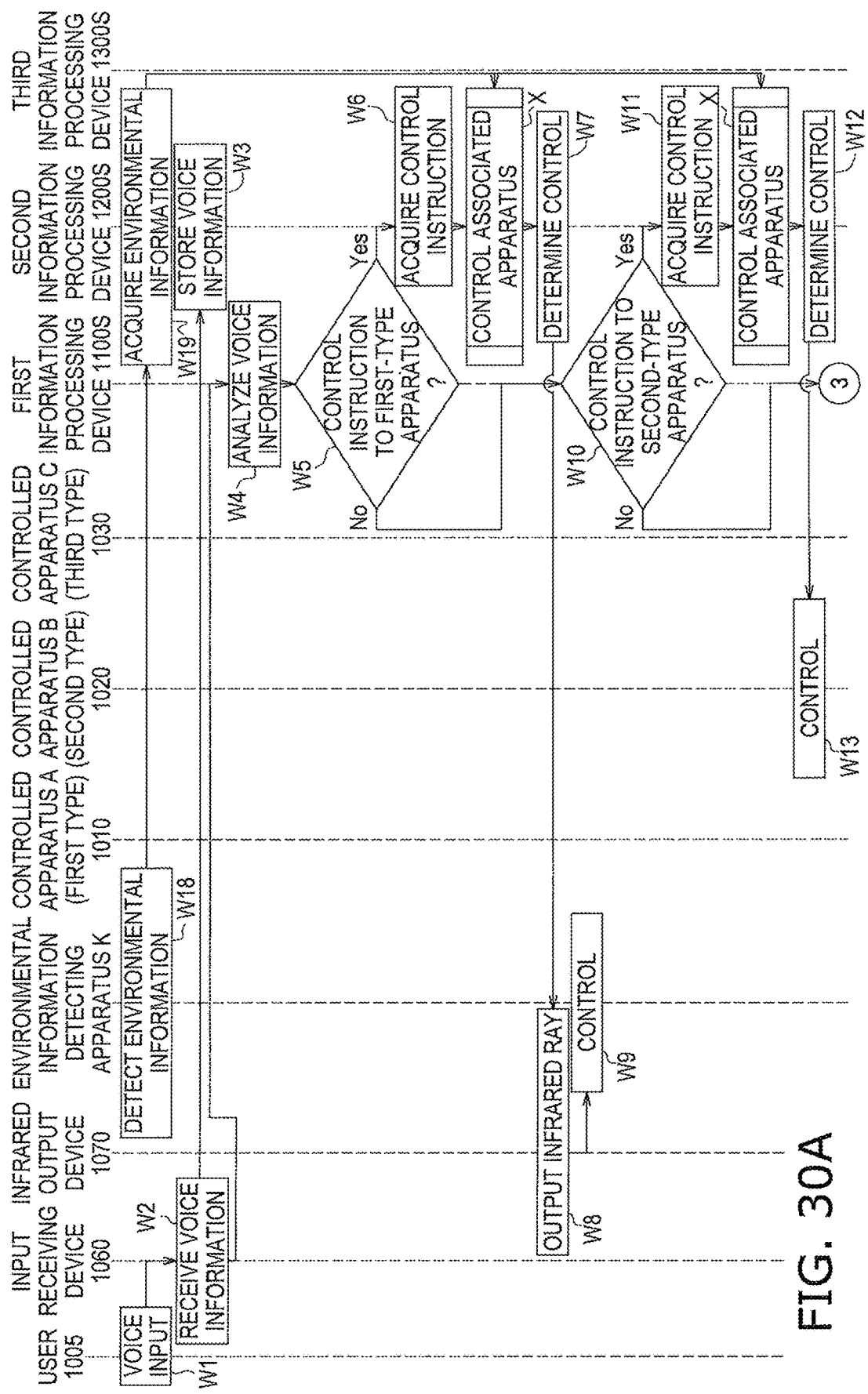
FIG. 30A is a sequence diagram that shows the operation of the operating system 1001S according to the modification 2B.
Figure 30B:
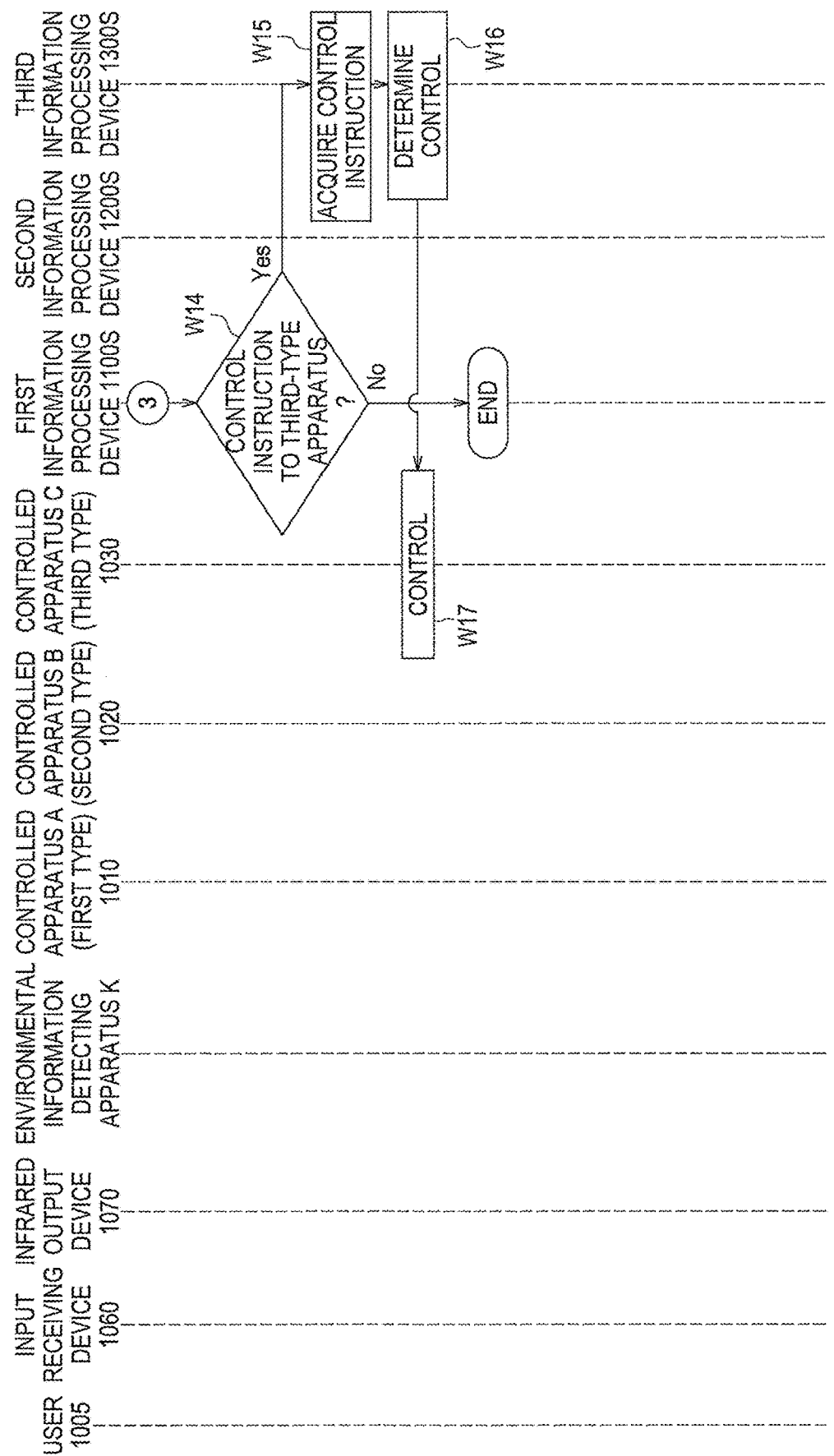
FIG. 30B is a sequence diagram that shows the operation of the operating system 1001S according to the modification 2B.
Figure 31A:
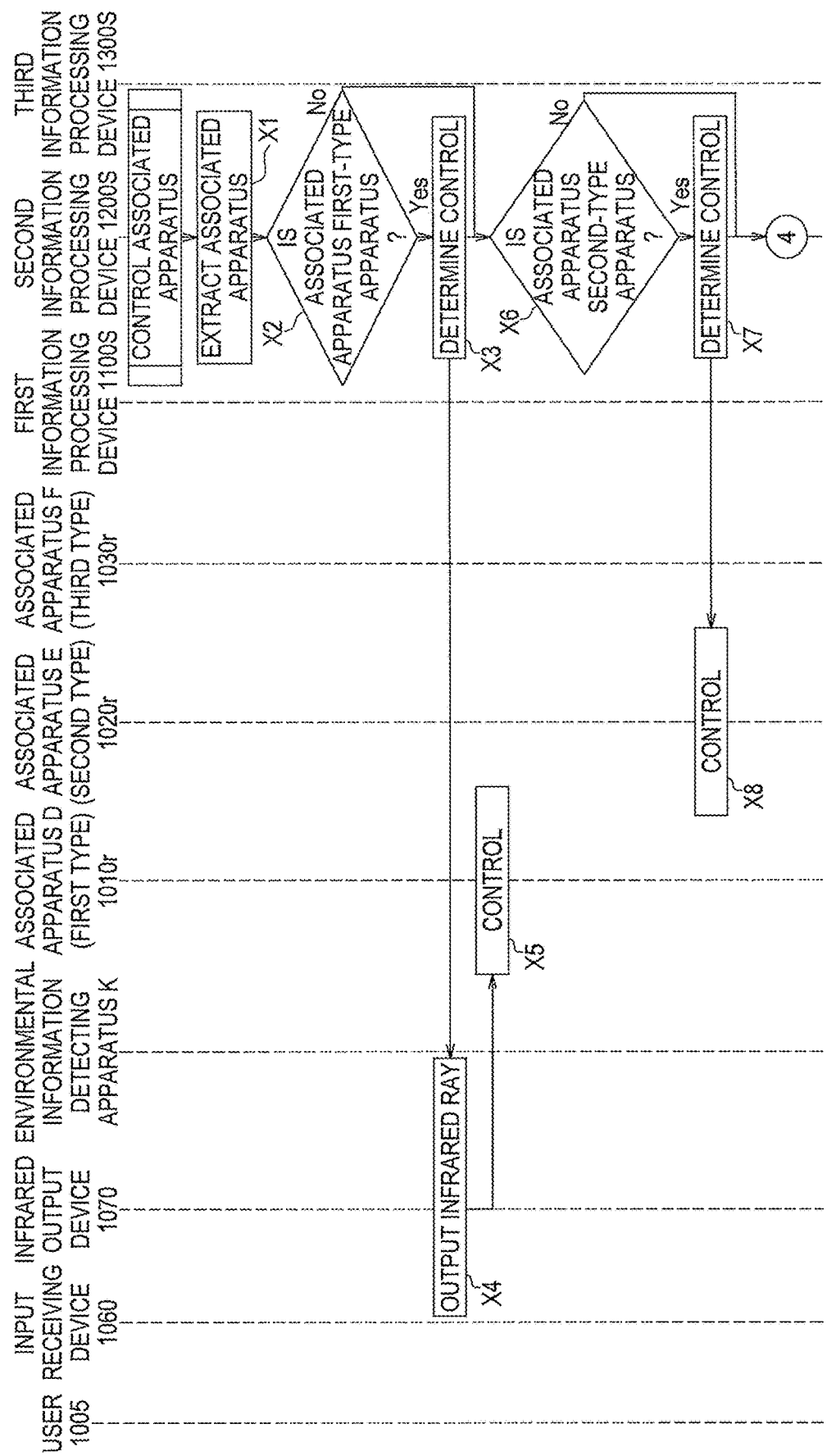
FIG. 31A is a sequence diagram that shows the operation of the operating system 1001S according to the modification 2B.
Figure 31B:
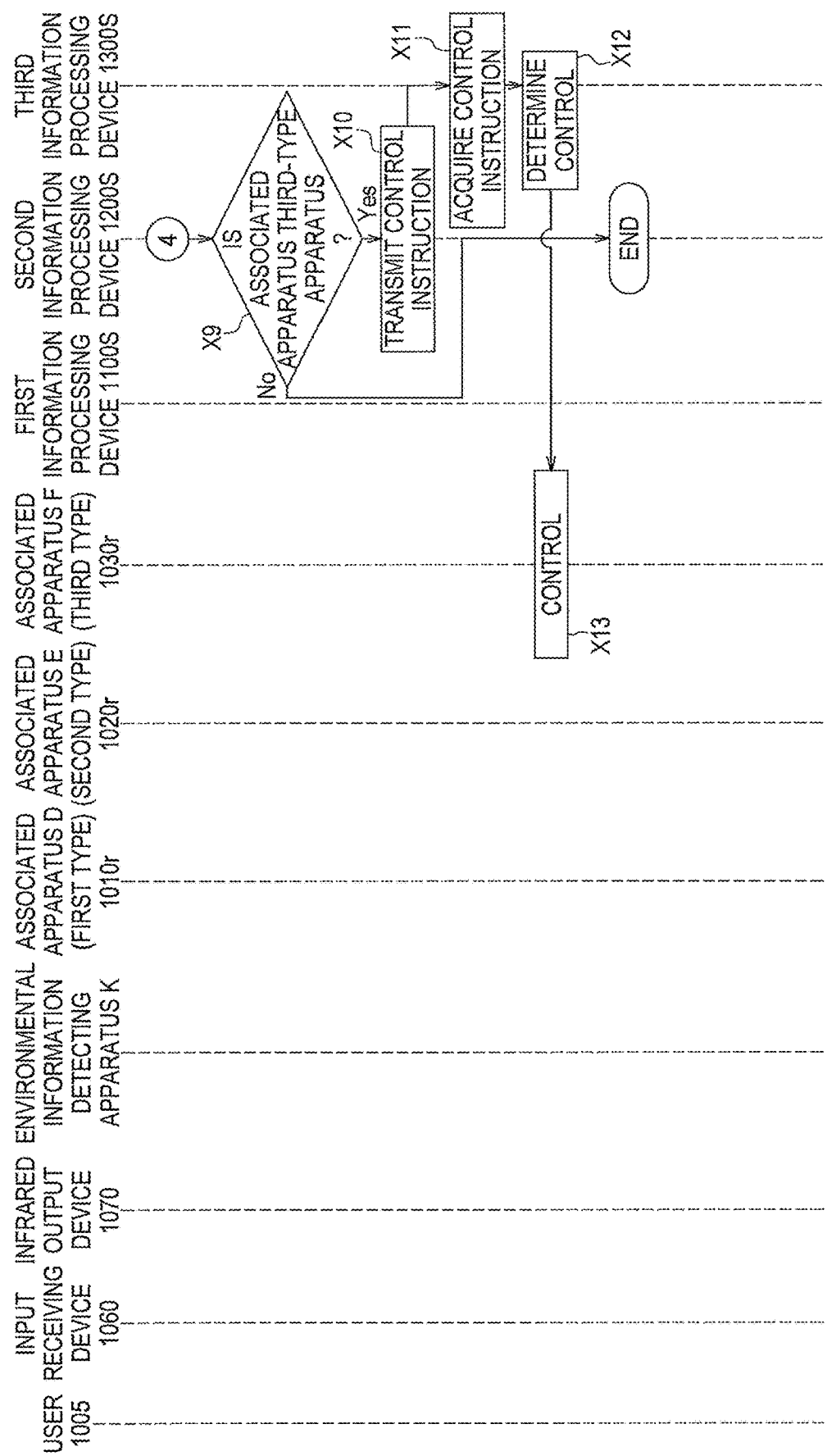
FIG. 31B is a sequence diagram that shows the operation of the operating system 1001S according to the modification 2B.

FIG. 27 is a schematic diagram that shows the configuration of the operating system 1001S according to a modification 2B. FIG. 28 is a schematic diagram that shows the configuration of the second information processing device 1200S according to the modification 2B.

In the modification 2B, the environmental information detecting apparatus K is present around the controlled apparatuses A, B, C. The environmental information detecting apparatus K is a second-type apparatus 1020k, and detects environmental information that indicates the status of a surrounding environment. Environmental information contains information, such as temperature, humidity, and illuminance.

In the modification 2B, the storage unit 1204S of the second information processing device 1200S functions as an associated apparatus storage unit 1240S, and the processing unit 1205S of the second information processing device 1200S further functions as an environmental information acquiring unit 1241S, an associated apparatus extracting unit 1242S, and an associated apparatus control unit 1243S.

The associated apparatus storage unit 1240S stores any one or any combination of another first-type apparatus 1010r (associated apparatus D), another second-type apparatus 1020r (associated apparatus E), or another third-type apparatus 1030r (associated apparatus F) as an associated apparatus in association with any one of a first-type apparatus 1010 (controlled apparatus A), a second-type apparatus 1020 (controlled apparatus B), and a third-type apparatus 1030 (controlled apparatus C) and environmental information. For example, as shown in FIG. 29, the associated apparatus storage unit 1240S stores an "S-model luminaire" (associated apparatus D) that is a first-type apparatus 1010r and a "T-model luminaire" (associated apparatus E) that is a third-type apparatus 1030r as associated apparatuses in association with "illuminance information" that is environmental information and an "S-model television" that is a first-type apparatus 1010 (controlled apparatus A). For example, the associated apparatus storage unit 1240S stores a "T-model luminaire" (associated apparatus D) that is a first-type apparatus 1010r as an associated apparatus in association with "illuminance information" that is environmental information and a "T-model television" that is a third-type apparatus 1010 (controlled apparatus C). For example, the associated apparatus storage unit 1240S stores a "D-model electric fan" (associated apparatus D) that is a first-type apparatus 1010r as an associated apparatus in association with "temperature information" that is environmental information and an "H-model air conditioner" that is a first-type apparatus 1010 (controlled apparatus A). For example, the associated apparatus storage unit 1240S stores a "C-model far infrared heater" (associated apparatus D) that is a first-type apparatus 10r and a "D-model far infrared heater" (associated apparatus E) that is a second-type apparatus 1020r as associated apparatuses in association with "temperature information" that is environmental information and a "D-model air conditioner" that is a second-type apparatus 1020 (controlled apparatus B). For example, the associated apparatus storage unit 1240S stores a "D-model electric fan" (associated apparatus D) that is a first-type apparatus 1010r and an "M-model electric fan" (associated apparatus F) that is a third-type apparatus 1030r as associated apparatuses in association with "temperature information" that is environmental information and an "M-model air conditioner" that is a third-type apparatus 1030 (controlled apparatus C).

The environmental information acquiring unit 1241S acquires "environmental information" at predetermined timing from the environmental information detecting apparatus K.

When the control instruction determination unit 1120S determines that a control instruction to any one of a first-type apparatus 1010 (controlled apparatus A), a second-type apparatus 1020 (controlled apparatus B), and a third-type apparatus 1030 (controlled apparatus C) is contained, the associated apparatus extracting unit 1242S extracts associated apparatuses from the associated apparatus storage unit 1240S.

When another first-type apparatus 1010*r* (associated apparatus D) is extracted as an associated apparatus by the associated apparatus extracting unit 1242S, the associated apparatus control unit 1243S transmits an output instruction toward the extracted associated apparatus (associated apparatus D) to the infrared output device 1070. When another second-type apparatus 1020*r* (associated apparatus E) is extracted as an associated apparatus by the associated apparatus extracting unit 1242S, the associated apparatus control unit 1243S controls the extracted associated apparatus (associated apparatus E) via the network NW. When another third-type apparatus 1030*r* (associated apparatus F) is extracted by the associated apparatus extracting unit 1242S as an associated apparatus, the associated apparatus control unit 1243S transmits an operation command corresponding to a control instruction to the associated apparatus (associated apparatus F) to the third information processing device 1300S.

FIG. 30A, FIG. 30B, FIG. 31A, and FIG. 31B are sequence diagrams that show the operation of the modification 2B. In the modification 2B, the above-described operation of step W1 to step W17 is executed. Here, the process of "control over the associated apparatus(es)" of the following step X1 to step X13 is added between step W11 and step W12. It is assumed that, in the modification 2B, the environmental information detecting apparatus K is present around the controlled apparatuses A, B, C and environmental information is transmitted from the environmental information detecting apparatus K to the second information processing device 1200S at predetermined timing (step W18 and step W19).

In the process of "control over the associated apparatus(es)", when the control instruction determination unit 1120S of the first information processing device 1100S determines that a control instruction to a first-type apparatus 1010 (controlled apparatus A), a control instruction to a second-type apparatus 1020 (controlled apparatus B), or a control instruction to a third-type apparatus 1030 (controlled apparatus C) is contained, the associated apparatus extracting unit 1242S of the second information processing device 1200S extracts associated apparatus(es) (associated apparatuses D, E, F) from the associated apparatus storage unit 1240S (X1).

When another first-type apparatus 1010*r* is extracted as an associated apparatus (associated apparatus D) by the associated apparatus extracting unit 1242S (Yes in X2), the associated apparatus control unit 1243S of the second information processing device 1200S transmits an output instruction toward the extracted associated apparatus (associated apparatus D) to the infrared output device 1070 (X3). In response to this, the infrared output device 1070 outputs an infrared pattern to the first-type apparatus 1010*r* (associated apparatus D) and controls the first-type apparatus 1010*r* (associated apparatus D) (X4, X5).

On the other hand, when another first-type apparatus 1010*r* is not extracted as an associated apparatus (associated apparatus D) by the associated apparatus extracting unit 1242S (No in X2), the process proceeds to the process of step X6. In step X6, when another second-type apparatus 1020*r* is extracted as an associated apparatus (associated apparatus E) by the associated apparatus extracting unit 1242S (Yes in X6), the associated apparatus control unit 1243S of the second information processing device 1200S controls the extracted associated apparatus (associated apparatus E) via the network NW (X7, X8).

On the other hand, when another second-type apparatus 1020*r* is not extracted as an associated apparatus (associated apparatus E) by the associated apparatus extracting unit 1242S (No in X6), the process proceeds to the process of step X9. In step X9, when another third-type apparatus 1030*r* is extracted as an associated apparatus (associated apparatus F) by the associated apparatus extracting unit 1242S (Yes in X9), the associated apparatus control unit 1243S of the second information processing device 1200S controls the extracted associated apparatus (associated apparatus F) via the network NW (X10). In response to this, the third information processing device 1300S controls the third-type apparatus 1030*r* (associated apparatus F) via the network NW (X11 to X13).

When another third-type apparatus 1030*r* is not extracted as an associated apparatus (associated apparatus F) by the associated apparatus extracting unit 1242S (No in X9), the process is ended.

The processes of step X2 to step X5, the processes of step X6 to step X8, and the processes of step X9 to step X13 are not in particular order and any one of sets of the processes may be executed first.

With the operating system 1001S according to the above-described modification 2B, when the second information processing device 1200S has extracted a third-type apparatus 1030*r* (associated apparatus F) as an associated apparatus, the second information processing device 1200S transmits an operation command to the third-type apparatus 1030*r* (associated apparatus F) via the network based on the control instruction and the environmental information. Therefore, an apparatus can be appropriately controlled according to the environment of the user 1005.

(1-2-4-3) Other Modifications

The modifications 1A to 1J are also directly applicable to the present embodiment.

Third Embodiment

In the operating system 1001 according to the first embodiment, the first information processing device 1100 includes the control instruction determination unit 1120. Alternatively, the second information processing device may include this function.

(1-3-1) Configuration of Operating System 1001

Figure 32:
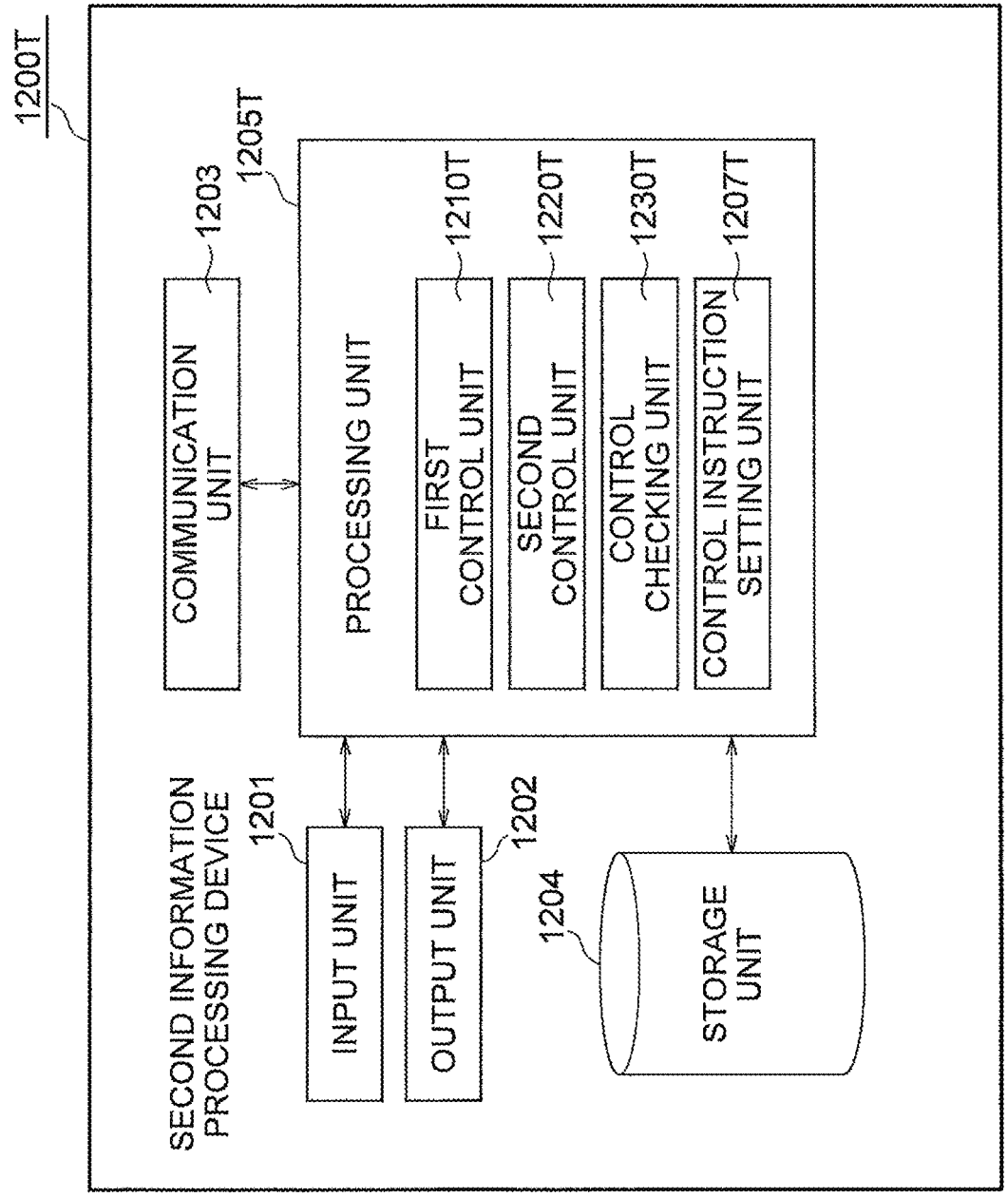
FIG. 32 is a schematic diagram that shows the configuration of a second information processing device 1200T according to a third embodiment of the first invention.

In an operating system 1001T according to a third embodiment of the present invention, a second information processing device 1200T includes a control instruction determination unit 1207T as shown in FIG. 32. In other words, in the second information processing device 1200T, the processing unit 1205 further functions as the "control instruction determination unit 1207T". In the operating system 1001T according to the third embodiment, an operation information analyzing unit 1110T of a first information processing device 1100T transmits text information converted from voice information to the control instruction determination unit 1207T of the second information processing device 1200T.

The control instruction determination unit 1207T determines whether a result analyzed by the operation information analyzing unit 1110T of the first information processing device 1100T contains a control instruction to a first-type apparatus 1010 or a control instruction to a second-type apparatus 1020.

Here, when the control instruction determination unit 1207T has identified that a controlled apparatus is a first-type apparatus 1010, the control instruction determination unit 1207T transmits a control content over the controlled apparatus to the first control unit 1210T. On the other hand, when the control instruction determination unit 1207 has identified that a controlled apparatus is a second-type apparatus 1020, the control instruction determination unit 1207 transmits a control content over the controlled apparatus to the second control unit 1220T.

When a result determined by the control instruction determination unit 1207T contains a control instruction to a first-type apparatus 1010, the first control unit 1210T transmits an output instruction to the operating device 1050 (infrared output device 1070) via the communication unit 1203 to output an infrared pattern corresponding to the control instruction. When a result determined by the control instruction determination unit 1207T contains a control instruction to a second-type apparatus 1020, the second control unit 1220T controls the second-type apparatus 1020 via the network NW based on the control instruction.

(1-3-2) Operation of Operating System 1T

Figure 33:
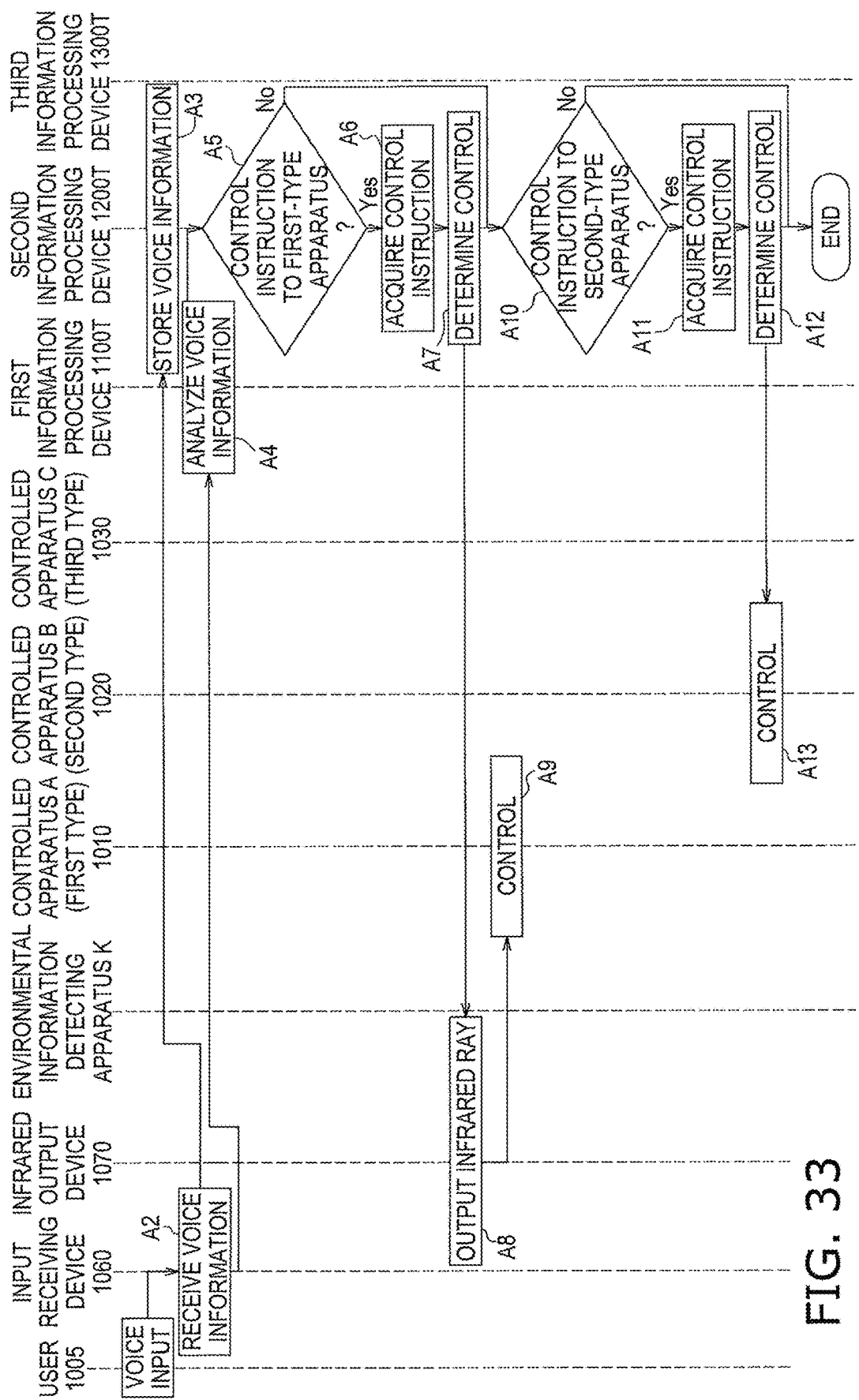
FIG. 33 is a sequence diagram for illustrating the operation of an operating system 1001T according to the embodiment.

FIG. 33 is a sequence diagram for illustrating the operation of the operating system 1001T according to the present embodiment. With the above-described configuration, processes as shown in FIG. 33 are executed in the operating system 1001T according to the third embodiment.

In the following description, for the sake of convenience, it is assumed that a controlled apparatus A is present as a first-type apparatus 1010 and a controlled apparatus B is present as a second-type apparatus 1020 around the user 1005.

First, an input operation on an apparatus present around the user 1005 is performed by the user 1005. Here, an operation command to the controlled apparatus A or the controlled apparatus B is input by the user 1005 by voice (A1). For example, a command, such as "Turn on the power of the controlled apparatus A" and "Turn off the controlled apparatus B", is input by the user 1005 by voice.

Subsequently, the input receiving device 1060 receives the voice input performed by the user 1005, converts the input voice to voice information, and transmits the voice information to the first information processing device 1100T and the second information processing device 1200T (A2).

In the second information processing device 1200T, the received voice information is accumulated as needed (A3).

In the first information processing device 1100T, the operation information analyzing unit 1110T analyzes the voice information received from the operating device 1050 (A4). For example, the operation information analyzing unit 1110T of the first information processing device 1100T analyzes the voice information by using neural network, or the like. Here, the operation information analyzing unit 1110T of the first information processing device 1100T analyzes a meaning corresponding to the voice information and converts the voice information to text information. The analyzed result of the voice information is transmitted to the second information processing device 1200T.

The control instruction determination unit 1207T of the second information processing device 1200T determines whether a result analyzed by the operation information analyzing unit 1110T contains a control instruction to a first-type apparatus 1010 or a control instruction to a second-type apparatus 1020 (A5). When the second information processing device 1200T determines that a control instruction to a first-type apparatus 1010 is contained (Yes in A5), the second information processing device 1200T transmits the determined result to the first control unit 1210T. Here, it is assumed that the analyzed result contains a control instruction to the controlled apparatus A that is a first-type apparatus.

After that, the first control unit 1210T of the second information processing device 1200T receives the determined result (A6), and determines a control content over the first-type apparatus 1010 (controlled apparatus A) based on the determined result (A7). The first control unit 1210T of the second information processing device 1200T transmits an output instruction to the operating device 1050 (infrared output device 1070) via the communication unit 1203 to output an infrared pattern corresponding to the control instruction.

Subsequently, the infrared output device 1070 receives the output instruction from the second information processing device 1200T, outputs an infrared pattern based on the output instruction (A8), and controls the controlled apparatus A that is the first-type apparatus 1010 (A9).

On the other hand, when the second information processing device 1200T determines in step A5 that a control instruction to a first-type apparatus 1010 is not contained (No in A5), the second information processing device 1200T determines whether a control instruction to a second-type apparatus 1020 is contained (A10). When the second information processing device 1200T determines that a control instruction to a second-type apparatus 1020 is contained (Yes in A10), the second information processing device 1200T transmits the determined result to the second control unit 1220T. Here, it is assumed that the analyzed result contains a control instruction to the controlled apparatus B that is a second-type apparatus 1020.

After that, the second control unit 1220T of the second information processing device 1200T acquires the determined result (A11), and determines a control content over the second-type apparatus 1020 (controlled apparatus B) (A12). The second control unit 1220T of the second information processing device 1200T controls the controlled apparatus B that is the second-type apparatus 1020 via the network NW based on the control instruction (A13). When the second information processing device 1200T determines in step A10 that a control instruction to a second-type apparatus 1020 (controlled apparatus B) is not contained (No in A10), the operating system 1001 ends the process.

The processes of step A5 to step A9 and the processes of step A10 to step A13 are not in particular order and any one of sets of the processes may be executed first.

(1-3-3) Characteristics (1-3-3-1)

As described above, the operating system 1001T according to the present embodiment includes the input receiving device 1060, the first information processing device 1100T, the second information processing device 1200T, and the infrared output device 1070, and operates a first-type apparatus 1010 operable by at least communication of an infrared pattern and a second-type apparatus 1020 operable via at least the network NW. The input receiving device 1060 receives an input operation. The first information processing device 1100T is connected to the input receiving device 1060 and includes the operation information analyzing unit 1110T that analyzes operation information corresponding to the input operation. The second information processing device 1200T is connected to the first information processing device 1100T. When the control instruction determination unit 1207T determines that a control instruction to a second-type apparatus 1020 (controlled apparatus B) is contained, the second information processing device 1200T controls the second-type apparatus 1020 (controlled apparatus B) via the network NW based on the control instruction. The infrared output device 1070 is connected to the first information processing device 1100 or the second information processing device 1200. When the control instruction determination unit 1207T determines that a control instruction to a first-type apparatus 1010 (controlled apparatus A) is contained, the infrared output device 1070 outputs an infrared pattern corresponding to the control instruction to the first-type apparatus 1010 (controlled apparatus A).

In the operating system 1001T according to the present embodiment, the second information processing device 1200T includes the control instruction determination unit 1207T that determines whether a result analyzed by the operation information analyzing unit 1110T contains a control instruction to a first-type apparatus 1010 (controlled apparatus A) or a control instruction to a second-type apparatus 1020 (controlled apparatus B).

Therefore, with the operating system 1001T according to the present embodiment, when it is determined that operation information contains a control instruction to a first-type apparatus as a result of analysis of the operation information, the first-type apparatus 1010 (controlled apparatus A) is controlled by transmission of an infrared pattern to the first-type apparatus 1010 (controlled apparatus A). On the other hand, when the operating system 1001T determines that the operation information contains a control instruction to a second-type apparatus 1020 (controlled apparatus B) as a result of analysis of the operation information, the operating system 1001T controls the second-type apparatus 1020 (controlled apparatus B) via the network NW. In other words, an apparatus not operable via the network NW (first-type apparatus 1010) is operated by the infrared output device 1070, and an apparatus operable via the network NW (second-type apparatus 1020) is operated by the second information processing device 1200T. Therefore, any apparatus around the operating device 1050 (input receiving device 1060) can be controlled.

Particularly, with the operating system 1001T according to the present embodiment, the operation information analyzing unit 1110T of the first information processing device 1100T analyzes operation information input by voice. Therefore, the operating system 1001 is able to control a first-type apparatus 1010 and a second-type apparatus 1020 by voice input.

With the operating system 1001T according to the present embodiment, when a result determined by the control instruction determination unit 1207 contains a control instruction to a first-type apparatus 1010 (controlled apparatus A), the second information processing device 1200T transmits an output instruction to the infrared output device 1070 to output an infrared pattern corresponding to the control instruction to the first-type apparatus 1010 (controlled apparatus A).

In this way, the second information processing device 1200 transmits an output instruction to the infrared output device 1070. Therefore, in the second information processing device 1200, it can be judged whether the first-type apparatus 1010 (controlled apparatus A) has been controlled. As a result, the reliability of the operating system 1001 is improved.

(1-3-3-2)

Other than the above, the operating system 1001T according to the third embodiment has similar characteristics to those of the operating system 1001 according to the first embodiment. The modifications of the first embodiment are also directly applicable to the operating system 1001T according to the third embodiment. Specifically, step S5 and step S10 in FIG. 7, FIG. 8, FIG. 11, FIG. 14, and FIG. 18 are replaced with the above-described step A5 and step A10.

Fourth Embodiment

Similar components to those of the operating system 1001S according to the second embodiment as well as the first embodiment may be added to the operating system 1001T according to the control system according to the third embodiment.

(1-4-1) Configuration of Operating System 1001V

Figure 34:
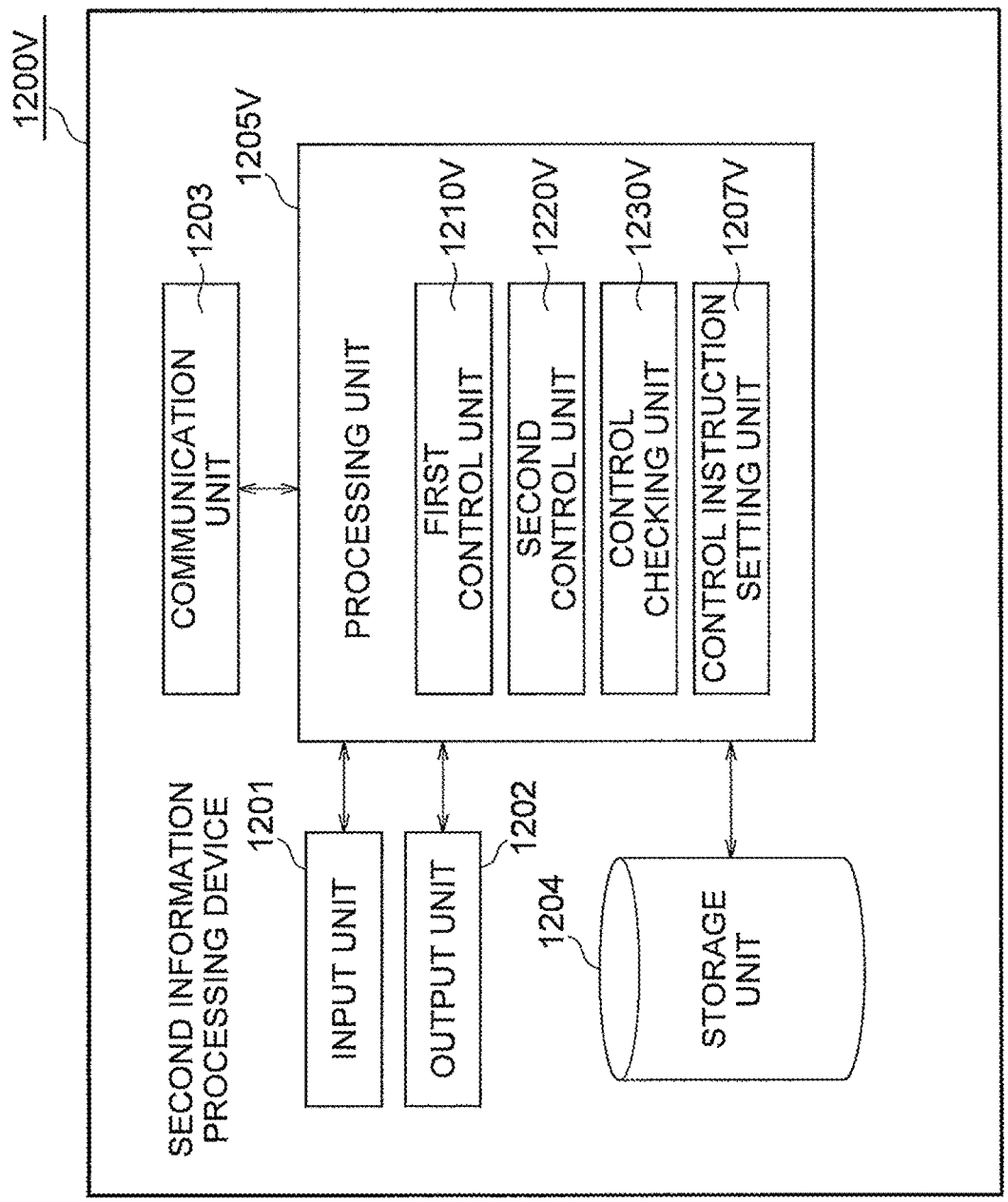
FIG. 34 is a schematic diagram that shows the configuration of a second information processing device 1200V according to a fourth embodiment of the first invention.

In the operating system 1001T according to a fourth embodiment of the first invention, a second information processing device 1200V includes a control instruction determination unit 1207V as shown in FIG. 34. In the fourth embodiment, an operation information analyzing unit 1110V of a first information processing device 1100V transmits text information converted from voice information to the control instruction determination unit 1207V of the second information processing device 1200V.

In the fourth embodiment, the control instruction determination unit 1207V of the second information processing device 1200V further determines whether a result analyzed by the operation information analyzing unit 1110V contains a control instruction to a control instruction to a third-type apparatus 1030. When the control instruction determination unit 1207V determines that a control instruction to a third-type apparatus 1030 is contained, the control instruction determination unit 1207V transmits an operation command corresponding to the control instruction to a third information processing device 1300V.

(1-4-2) Operation of Operating System 1001V

Figure 35A:
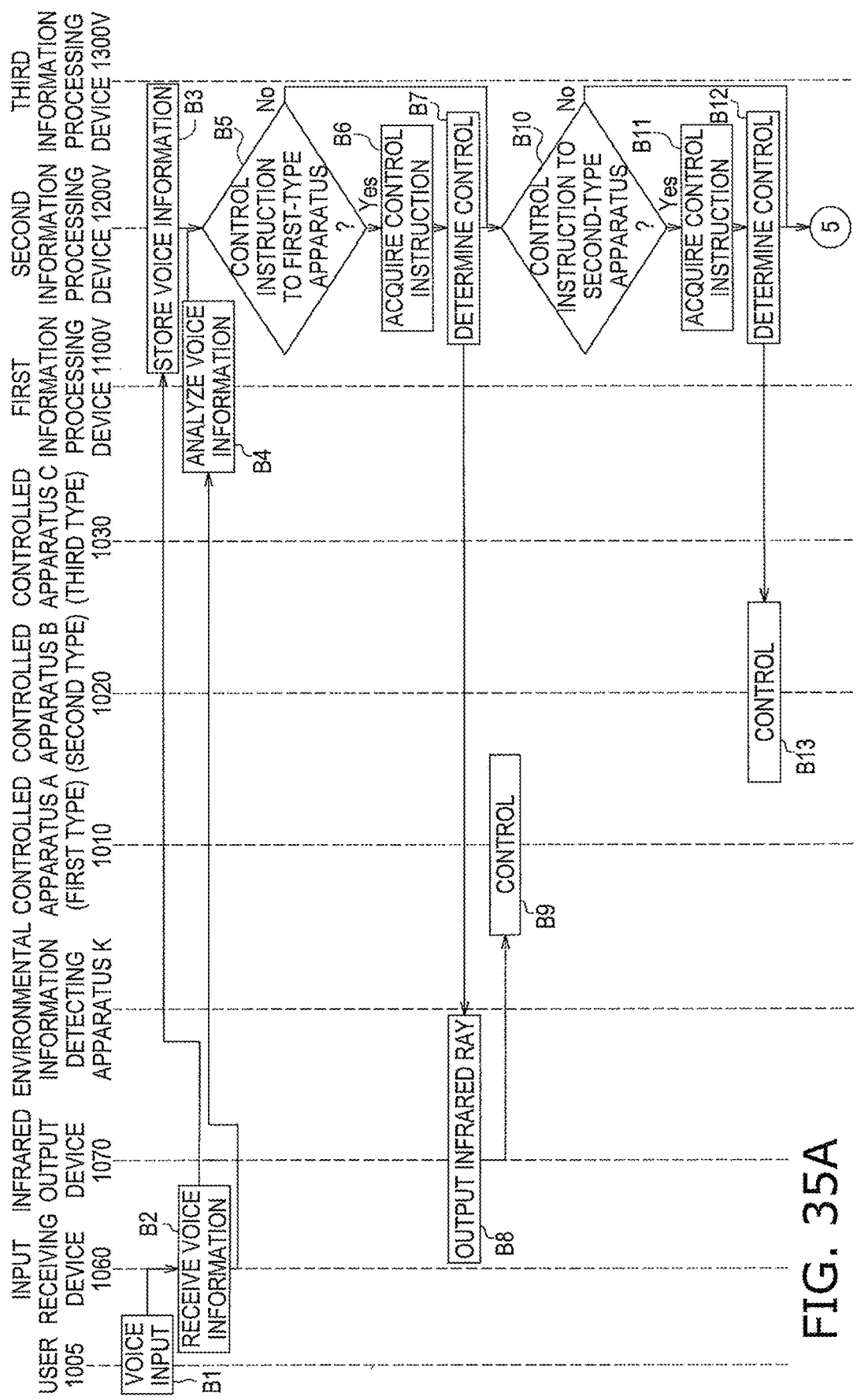
FIG. 35A is a sequence diagram for illustrating the operation of an operating system 1001V according to the embodiment.
Figure 35B:
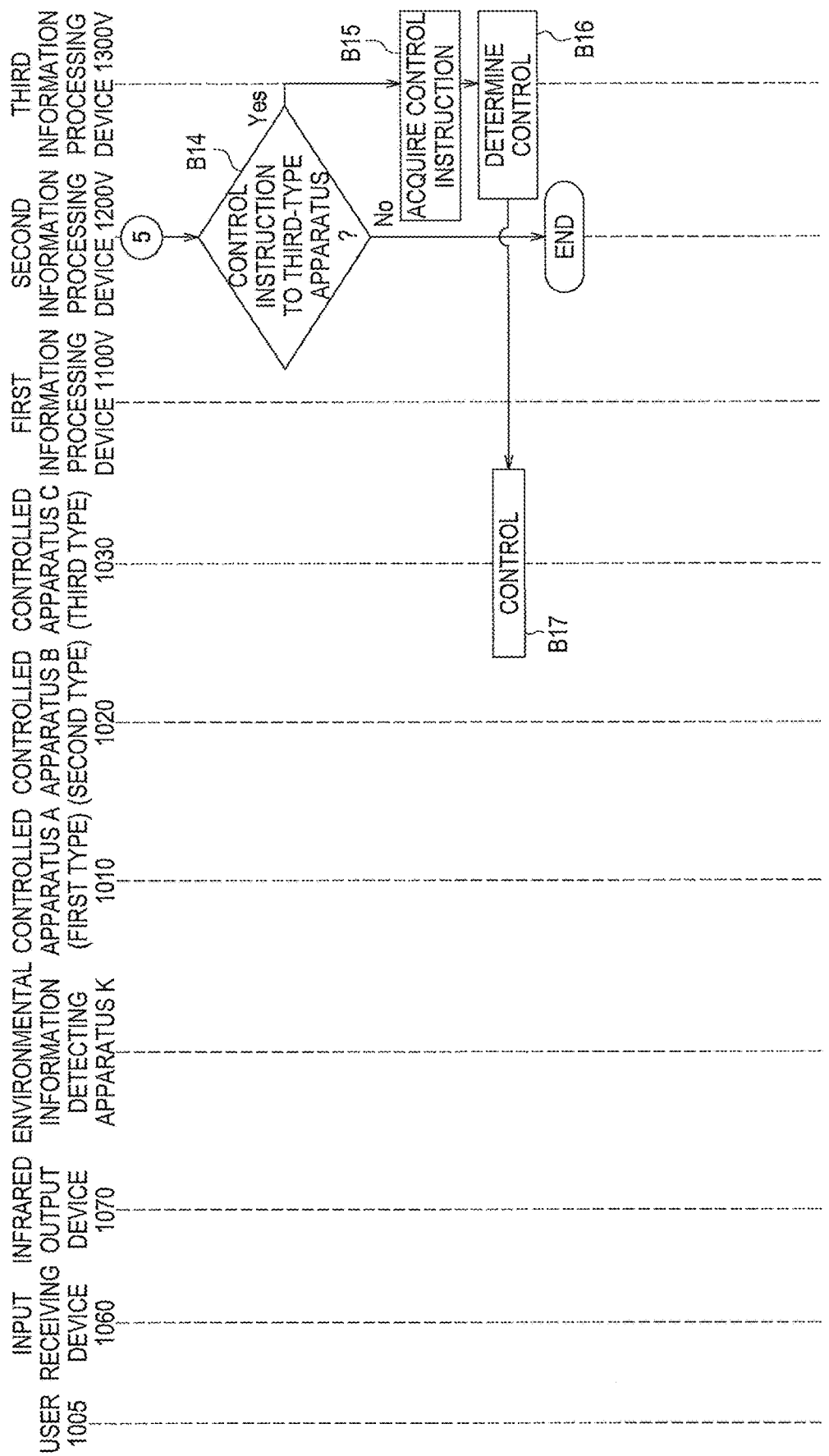
FIG. 35B is a sequence diagram for illustrating the operation of the operating system 1001V according to the embodiment.

FIG. 35A and FIG. 35B are sequence diagrams for illustrating the operation of the operating system 1001V according to the present embodiment. In the following description, for the sake of convenience, it is assumed that a controlled apparatus A is present as a first-type apparatus 1010, a controlled apparatus B is present as a second-type apparatus 1020, and a controlled apparatus C is present as a third-type apparatus 1030 around the user 1005.

First, voice input on an apparatus present around the user 1005 is performed by the user 1005 (B1). For example, a command, such as "Turn on the power of the controlled apparatus A" and "Turn off the controlled apparatus B", is input by voice.

Subsequently, the input receiving device 1060 receives the voice input performed by the user 1005, converts the input voice to voice information, and transmits the voice information to the first information processing device 1100V and the second information processing device 1200V (B2).

In the second information processing device 1200V, voice information is accumulated as needed (B3).

In the first information processing device 1100V, the operation information analyzing unit 1110 analyzes the voice information received from the operating device 1050 (B4). For example, the operation information analyzing unit 1110V of the first information processing device 1100V analyzes the voice information by using neural network, or the like. The operation information analyzing unit 1110V of the first information processing device 1100V analyzes a meaning corresponding to the voice information and converts the voice information to text information.

Subsequently, the control instruction determination unit 1207V of the second information processing device 1200V determines whether the result analyzed by the operation information analyzing unit 1110V contains a control instruction to a first-type apparatus 1010 (B5). When the second information processing device 1200V determines that a control instruction to a first-type apparatus 1010 (controlled apparatus A) is contained (Yes in B5), the second information processing device 1200V transmits the determined result to the first control unit 1210V. Here, it is assumed that the analyzed result contains a control instruction to the controlled apparatus A that is a first-type apparatus 1010.

After that, the first control unit 1210V of the second information processing device 1200V receives the determined result (B6), and determines a control content over the first-type apparatus 1010 (controlled apparatus A) based on the determined result (B7). The first control unit 1210V of the second information processing device 1200V transmits an output instruction to the operating device 1050 (infrared output device 1070) via the communication unit 1203 to output an infrared pattern corresponding to the control instruction.

Subsequently, the infrared output device 1070 receives the output instruction from the second information processing device 1200V, outputs an infrared pattern based on the output instruction (B8), and controls the controlled apparatus A that is the first-type apparatus 1010 (B9).

On the other hand, when the second information processing device 1200V determines in step B5 that a control instruction to a first-type apparatus 1010 is not contained (No in B5), the second information processing device 1200V determines whether a control instruction to a second-type apparatus 1020 is contained (B10). When the second information processing device 1200V determines that a control instruction to a second-type apparatus 1020 is contained (Yes in B10), the second information processing device 1200V transmits the determined result to the second control unit 1220V. Here, it is assumed that the analyzed result contains a control instruction to the controlled apparatus B that is a second-type apparatus 1020.

After that, the second control unit 1220V of the second information processing device 1200V acquires the determined result (B11), and determines a control content over the second-type apparatus 1020 (controlled apparatus B) (B12). The second control unit 1220V of the second information processing device 1200V controls the controlled apparatus B that is the second-type apparatus 1020 via the network NW based on the control instruction (B13).

On the other hand, when the second information processing device 1200V determines in step B10 that a control instruction to a second-type apparatus 1010 is not contained (No in B10), the control instruction determination unit 1207V of the second information processing device 1200V determines whether a control instruction to a third-type apparatus 1030 is contained (B14). When the second information processing device 1200V determines that a control instruction to a third-type apparatus 1030 is contained (Yes in B14), the second information processing device 1200V transmits the determined result to the third information processing device 1300V. Here, it is assumed that the analyzed result contains a control instruction to the controlled apparatus C that is a third-type apparatus 1030.

After that, the third information processing device 1300V receives the determined result from the second information processing device 1200V (B15), and determines a control content over the third-type apparatus 1030 (controlled apparatus C) (B16). The third information processing device 1300V controls the controlled apparatus C that is the third-type apparatus 1030 via the network NW based on the control instruction (B17).

When it is determined in step B14 that a control instruction to a third-type apparatus 1030 (controlled apparatus C) is not contained (No in B14), the operating system 1001V ends the process.

The processes of step B5 to step B9, the processes of step B10 to step B13, and the processes of step B14 to step B17 are not in particular order and any one of sets of the processes may be executed first.

(1-4-3) Characteristics (1-4-3-1)

As described above, with the operating system 1001V according to the present embodiment, in addition to the configuration of the operating system 1001T according to the third embodiment, the second information processing device 1200V communicates with the third information processing device 1300V that is able to operate a third-type apparatus 1030 different from a second-type apparatus 1020 via the network NW. The control instruction determination unit 1207V of the second information processing device 1200V further determines whether the result analyzed by the operation information analyzing unit 1110V contains a control instruction to a control instruction to a third-type apparatus 1030. When the control instruction determination unit 1207V determines that a control instruction to a third-type apparatus 1030 is contained, the second information processing device 1200V transmits an operation command corresponding to the control instruction to the third information processing device 1300V.

Therefore, with the operating system 1001V according to the present embodiment, when it is determined that operation information contains a control instruction to a first-type apparatus 1010 (controlled apparatus A) as a result of analysis of the operation information, the first-type apparatus 1010 (controlled apparatus A) is controlled by transmission of an infrared pattern to the first-type apparatus 1010 (controlled apparatus A). When the operating system 1001V determines that the operation information contains a control instruction to a second-type apparatus (controlled apparatus B) as a result of analysis of the operation information, the operating system 1001V controls the second-type apparatus 1020 (controlled apparatus B) via the network NW. When the operating system 1001V determines that the operation information contains a control instruction to a third-type apparatus 1030 (controlled apparatus C) as a result of analysis of the operation information, the operating system 1001V transmits an operation command to the third-type apparatus 1030 (controlled apparatus C) via the network NW to the third information processing device 1300V that is able to operate the third-type apparatus 1030 (controlled apparatus C).

Therefore, the operating system that is able to not only operate a first-type apparatus 1010 (controlled apparatus A) and a second-type apparatus 1020 (controlled apparatus B) but also transmit an operation command to a third-type apparatus 1030 (controlled apparatus C) not operable by the second information processing device 1200V can be provided. As a result, an operating system with further high extensibility can be provided.

(1-4-3-2)

Other than the above, the operating system 1001V according to the fourth embodiment has similar characteristics to those of the operating system 1001S according to the second embodiment. The modifications of the second embodiment are also directly applicable to the operating system 1001V according to the fourth embodiment. Specifically, step W5, step W10, and step W14 in FIG. 25A, FIG. 25B, FIG. 26A, FIG. 26B, FIG. 30A, and FIG. 30B are replaced with the above-described step B5, step B10, and step B14.

[Second Invention]

First Embodiment (2-1-1) Configuration of Control System 2001

Figure 36:
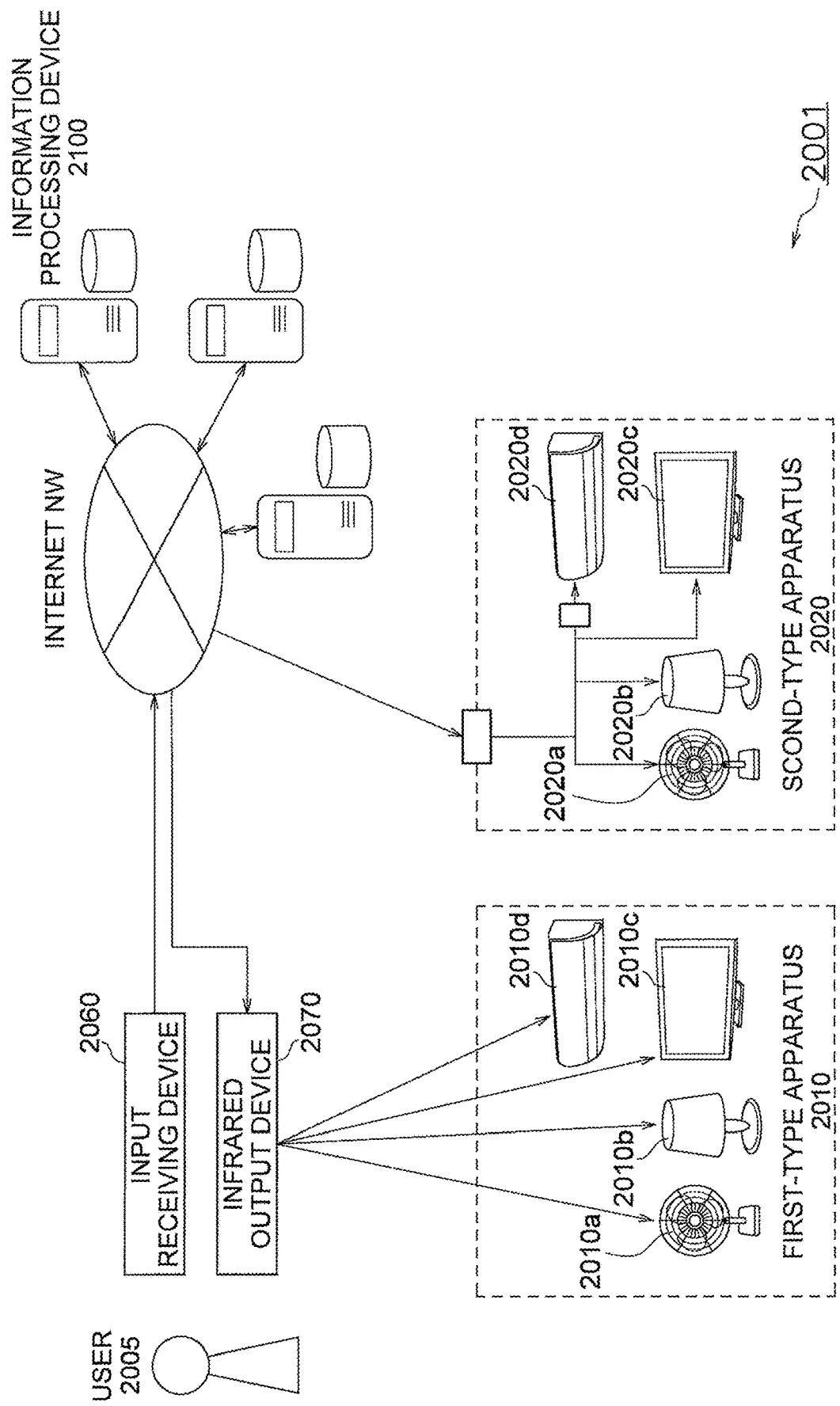
FIG. 36 is a schematic diagram that shows the configuration of a control system 2001 according to a first embodiment of the second invention.
Figure 37:
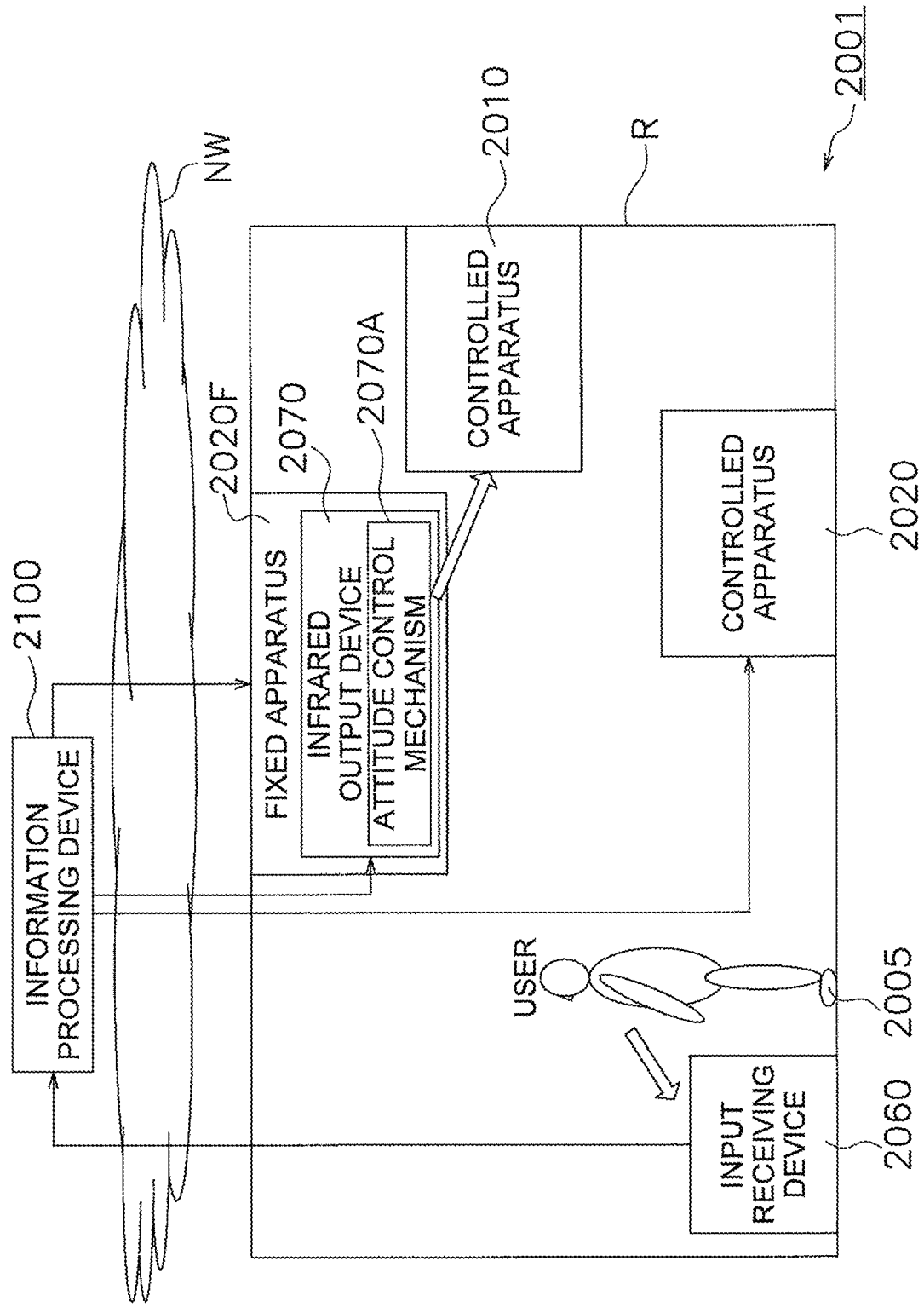
FIG. 37 is a schematic diagram that shows the configuration of the control system 2001 according to the embodiment.

FIG. 36 and FIG. 37 are schematic diagrams that show the configuration of a control system 2001 according to a first embodiment of the second invention.

The control system 2001 includes an input receiving device 2060, an infrared output device 2070, and an information processing device 2100. In the control system 2001, when a user 2005 inputs a control command to the input receiving device 2060, a predetermined controlled apparatus can be controlled. Here, "first-type apparatuses 2010" and "second-type apparatuses 2020" are present as controlled apparatuses. It is assumed that these controlled apparatuses are placed in a room R.

In FIG. 36 and FIG. 37, one of each of the input receiving device 2060, the infrared output device 2070, and the information processing device 2100 is shown; however, the number of each device is not limited thereto. The information processing device 2100 is connected to any number of the devices and is able to manage these devices.

The first-type apparatuses 2010 are controllable by using an infrared output signal. Examples of the first-type apparatuses 2010 include an electric fan 2010a, a luminaire 2010b, a television 2010c, and an air conditioner 2010d. Supplementarily, a pattern of an infrared output signal is preset for each of the controlled apparatuses, and the controlled apparatuses 2010 can be controlled by using the associated patterns of an infrared output signal. Here, an associated relationship between a pattern of an infrared output signal and a control content is stored in an infrared pattern DB 2104A (described later). In the following description, reference numeral 2010 indicates any first-type apparatus, and a lower-case alphabet is suffixed to indicate an individual first-type apparatus.

The second-type apparatuses 2020 are directly controllable by the information processing device 2100 via the network NW. Examples of the second-type apparatuses 2020, as well as the first-type apparatuses 2010, include an electric fan 2020a, a luminaire 2020b, a television 2020c, and an air conditioner 2020d. In the following description, reference numeral 2020 indicates any second-type apparatus, and a lower-case alphabet is suffixed to indicate an individual second-type apparatus.

The input receiving device 2060 receives a control command to a predetermined controlled apparatus 2010 or a predetermined controlled apparatus 2020. Here, the input receiving device 2060 includes a microphone and receives a control command to a controlled apparatus 2010 or a controlled apparatus 2020 from the user 5 by voice input via the microphone. The input receiving device 2060 transmits voice information corresponding to the received voice input to the information processing device 2100. When the input receiving device 2060 has detected voice emitted by the user 2005, the input receiving device 2060 directly transmits the voice information to the information processing device 2100.

The infrared output device 2070 outputs infrared ray to a controlled apparatus (first-type apparatus) 2010. The infrared output device 2070 includes an attitude control mechanism 2070A. When the infrared output device 2070 has received relative position information (described later) from the information processing device 2100, the attitude control mechanism 2070A controls the attitude of the infrared output device 2070 based on the relative position information. The infrared output device 2070 can be installed inside a fixed apparatus 2020F (described later).

Figure 38:
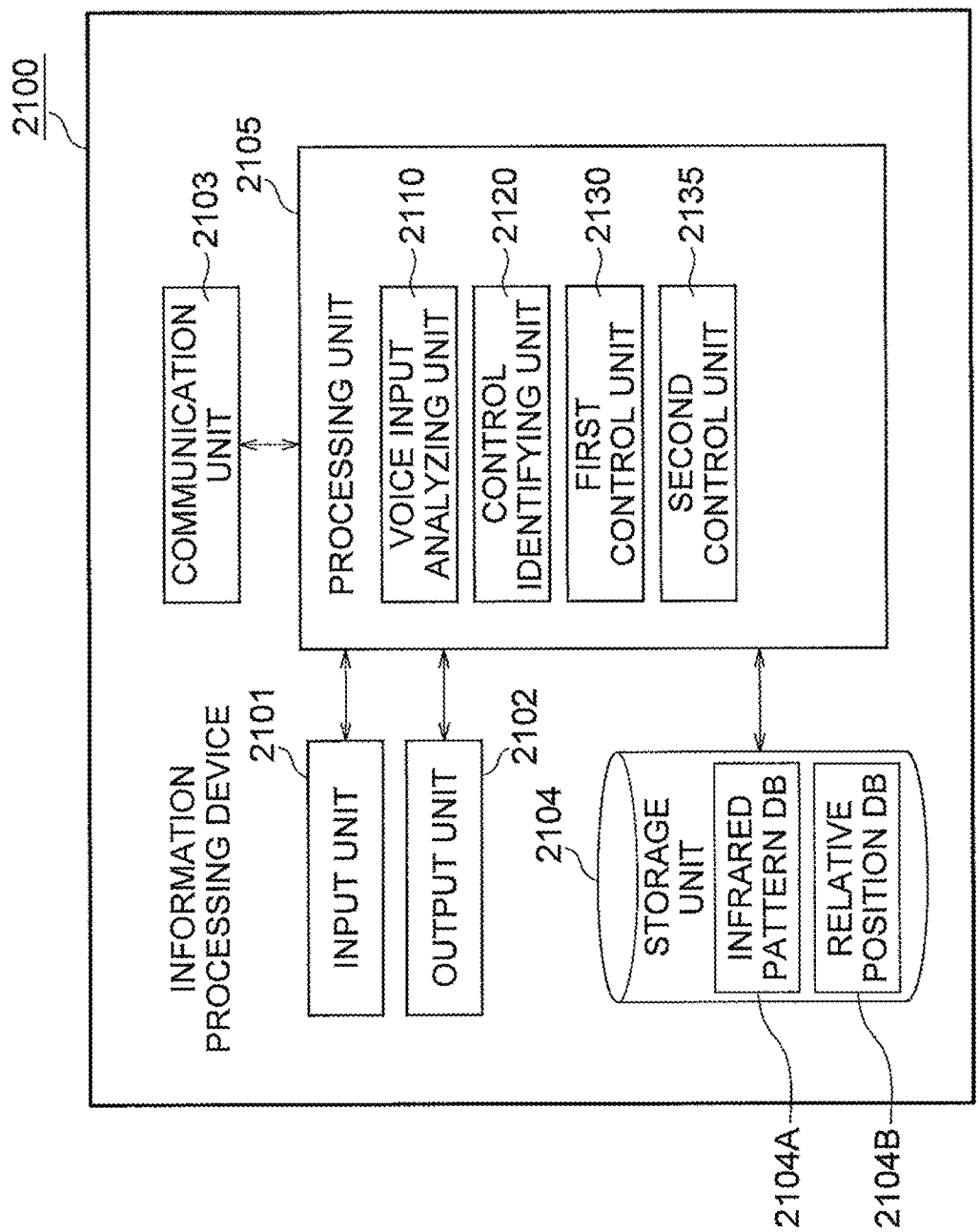
FIG. 38 is a schematic diagram that shows the configuration of an information processing device 2100 according to the embodiment.

As shown in FIG. 38, the information processing device 2100 includes an input unit 2101, an output unit 2102, a communication unit 2103, a storage unit 2104, and a processing unit 2105, and is connected to the input receiving device 2060 and the infrared output device 2070 via the network NW, such as the Internet.

Here, the input unit 2101 is implemented by any input device and inputs various pieces of information to the information processing device 2100. The output unit 2102 is implemented by any output device and outputs various pieces of information from the information processing device 2100. The communication unit 2103 is connected to the external network NW and enables information communication.

The storage unit 2104 is implemented by a ROM, a RAM, or the like, and stores information that is input to the information processing device 2100, information that is calculated by the information processing device 2100, and the like. The storage unit 2104 stores an "infrared pattern database (DB) 2104A" and a "relative position database (DB) 2104B".

The infrared pattern DB 2104A stores an associated relationship between a pattern of an infrared output signal and a predetermined control command for each controlled apparatus (first-type apparatus 2010).

The relative position DB 2104B stores "relative position information" that indicates a relative position between the infrared output device 2070 and a controlled apparatus (first-type apparatus 2010) in a predetermined space (room R). When the infrared output device 2070 is fixed to the fixed apparatus 2020F, information that indicates a relative positional relationship between the position of the fixed apparatus 2020F and the position of a first-type apparatus 2010 may be used as relative position information instead of information that indicates a relative positional relationship between the position of the infrared output device 2070 and the position of a first-type apparatus 2010.

The processing unit 2105 is implemented by a CPU, or the like, and executes information processing in the information processing device 2100. Here, when the processing unit 2105 runs programs installed in the storage unit 2104, the processing unit 2105 functions as a "voice input analyzing unit 2110", a "control identifying unit 2120", a "first control unit 2130", and a "second control unit 2135".

The voice input analyzing unit 2110 analyzes a content of input that is received from the input receiving device 2060. Specifically, the input receiving device 2060 analyzes a meaning corresponding to the voice by using neural network, or the like, and converts voice information to text information.

The control identifying unit 2120 identifies a control content that indicates a controlled apparatus and a control command from a result analyzed by the voice input analyzing unit 2110. For example, when the input receiving device 2060 has received voice input, the control identifying unit 2120 identifies a control content by determining whether the text information converted by the voice input analyzing unit 2110 contains language information associated with a controlled apparatus and a control command.

Here, when the control identifying unit 2120 has identified that the controlled apparatus is a first-type apparatus 2010, the control identifying unit 2120 transmits a control content associated with the controlled apparatus to the first control unit 2130. On the other hand, when the control identifying unit 2120 has identified that the controlled apparatus is a second-type apparatus 2020, the control identifying unit 2120 transmits a control content associated with the controlled apparatus to the second control unit 2135.

When the control content over a first-type apparatus 2010 has been identified by the control identifying unit 2120, the first control unit 2130 transmits an infrared pattern corresponding to the control content to the infrared output device 2070. More specifically, the first control unit 2130 transmits an infrared output instruction to the infrared output device 2070 based on the control content identified by the control identifying unit 2120 and the information stored in the infrared pattern DB 2104A. Thus, the first-type apparatus 2010 is controlled via the infrared output device 2070. The first control unit 2130 transmits relative position information between the infrared output device 2070 and the intended first-type apparatus 2010 to the infrared output device 2070 together with the infrared output instruction. The relative position information is extracted from the relative position DB 2104B.

When the control content over a second-type apparatus 2020 has been identified by the control identifying unit 2120, the second control unit 2135 controls the second-type apparatus 2020 via the network NW based on the control content.

(2-1-2) Operation of Control System 2001

Figure 39A:
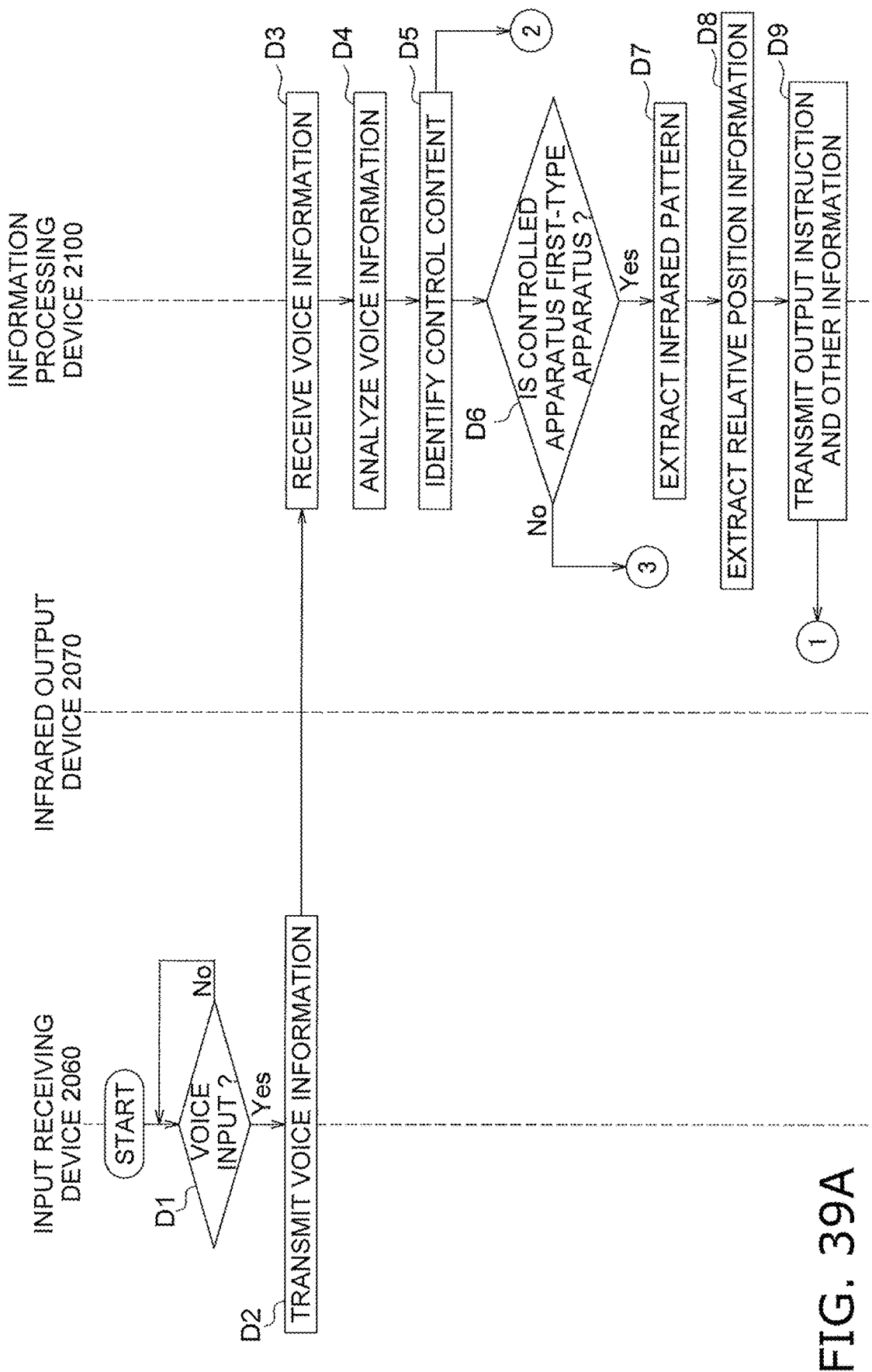
FIG. 39A is a sequence diagram for illustrating the operation of the control system 2001 according to the embodiment.
Figure 39B:
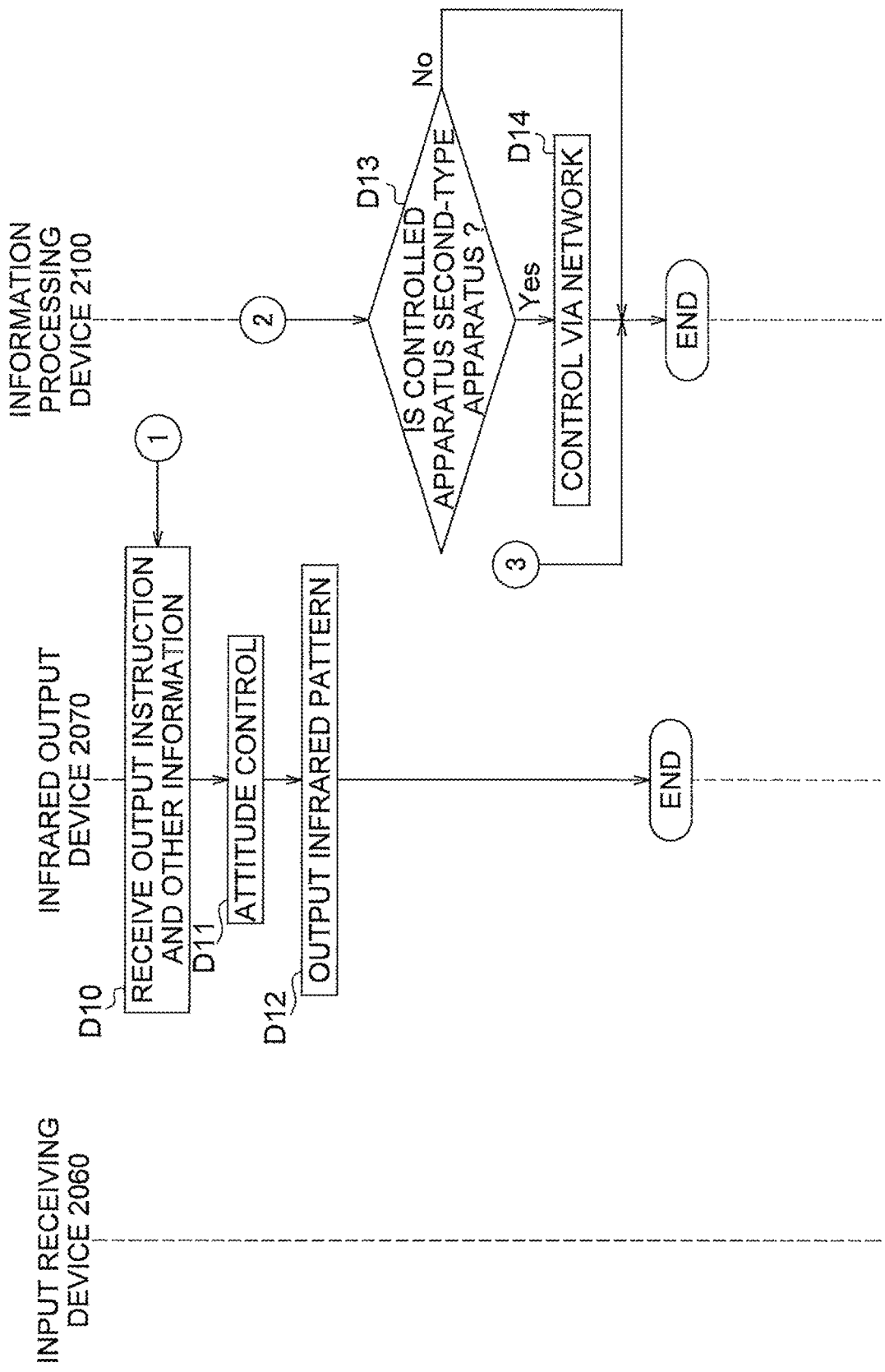
FIG. 39B is a sequence diagram for illustrating the operation of the control system 2001 according to the embodiment.

FIG. 39A and FIG. 39B are sequence diagrams for illustrating the operation of the control system 2001 according to the present embodiment.

First, the input receiving device 2060 is used by the user 2005, and voice input on a controlled apparatus 2010 or a controlled apparatus 2020 is performed (D1). The input receiving device 2060 transmits input information corresponding to the received voice input to the information processing device 2100 (D2).

Subsequently, the information processing device 2100 receives the input information (D3) and analyzes the content of the voice input (D4). After that, the information processing device 2100 identifies a control content that indicates a controlled apparatus 2010 or a controlled apparatus 2020 and a control command to the controlled apparatus 2010 or the controlled apparatus 2020 (D5).

Here, when the information processing device 2100 has identified that the control content is related to a first-type apparatus 2010 (Yes in D6), the information processing device 2100 extracts infrared pattern information from the infrared pattern DB 2104A based on the control content (D7). In addition, the information processing device 2100 extracts relative position information between the first-type apparatus 2010 and the infrared output device 2070 (or the fixed apparatus 2020F) from the relative position DB 2104B (D8). The information processing device 2100 transmits the infrared pattern information and the relative position information to the infrared output device 2070 together with an infrared output instruction (D9).

Subsequently, as the infrared output device 2070 receives the infrared pattern information and the relative position information together with the infrared output instruction (D10), the infrared output device 2070 changes the attitude toward the intended controlled apparatus 2010 based on the relative position information (D11). The infrared output device 2070 outputs infrared ray toward the controlled apparatus (first-type apparatus) 2010 based on the received infrared pattern information (D12).

On the other hand, in parallel with step D6, when the information processing device 2100 has identified that the control content is related to a second-type apparatus 2020 (Yes in D13), the information processing device 2100 controls the controlled apparatus (second-type apparatus) 2020 via the network NW based on the control content (D14).

When the information processing device 2100 cannot identify in step D6 or step D13 that the control content is related to a first-type apparatus 2010 or a second-type apparatus 2020, the information processing device 2100 ends the process (No in D6 or No in D13).

The processes of step D6 to step D9 and the processes of step D13 and step D14 are not in particular order and any one of sets of the processes may be executed first.

(2-1-3) Characteristics

As described above, the control system 2001 according to the present embodiment includes the input receiving device 2060, the infrared output device 2070, and the information processing device 2100. Here, the input receiving device 2060 receives a control command to a controlled apparatus 2010 or a controlled apparatus 2020 from the user 2005 by voice input. The infrared output device 2070 outputs infrared ray to the controlled apparatus 2010 or the controlled apparatus 2020. The information processing device 2100 includes the voice input analyzing unit 2110, the control identifying unit 2120, the first control unit 2130, and the second control unit 2135. The voice input analyzing unit 2110 analyzes a content of input that is received from the input receiving device 2060. The control identifying unit 2120 identifies a control content that indicates a controlled apparatus and a control command from a result analyzed by the voice input analyzing unit 2110. When the control content over a first-type apparatus 2010 has been identified by the control identifying unit 2120, the first control unit 2130 transmits an infrared pattern corresponding to the control content to the infrared output device 2070. When the control content over a second-type apparatus 2020 has been identified by the control identifying unit 2120, the second control unit 2135 controls the second-type apparatus 2020 via the network NW based on the control content.

Therefore, with the control system 2001 according to the present embodiment, a first-type apparatus 2010 controllable by output of an infrared pattern and a second-type apparatus 2020 controllable via the network NW can be controlled.

In addition, with the control system 2001 according to the present embodiment, the information processing device 2100 on the network NW is able to transmit an infrared output instruction to the infrared output device 2070S based on a result of analysis of voice input. When an apparatus is intended to be controlled by voice input, the amount of information processing can be enormous. Even in such a case, with the control system 2001S, voice analysis can be highly accurately performed by using the information processing device 2100 that implements neural network, or the like, and that is constructed on the network NW. Thus, even with voice input, a controlled apparatus 2010 or a controlled apparatus 2020 and a control command can be minutely identified. As a result, the control system 2001 that can easily control any apparatus can be provided.

In the control system 2001 according to the present embodiment, the information processing device 2100 on the network NW includes the infrared pattern DB 2104A, and stores an associated relationship between a pattern of an infrared output signal and a predetermined control content for each controlled apparatus. Thus, change, update, addition, and the like, of the pattern of an infrared output signal can be collectively set. However, in the control system 2001 according to the present embodiment, information in the infrared pattern DB 2104A may be stored not by the information processing device 2100 but by the storage unit of each infrared output device 2070.

(2-1-4) Use of Fixed Apparatus 2020F

As shown in FIG. 37, the infrared output device 2070 can be installed inside the fixed apparatus 2020F whose position is fixed in a predetermined space (room R). The fixed apparatus 2020F is, for example, an air-conditioning device, a luminaire, a television, or the like, and is fixed to a ceiling or wall of the room R. Alternatively, the fixed apparatus 2020F may be fixedly embedded in a ceiling or wall of the room R. The fixed apparatus 2020F may be a second-type apparatus 2020.

Figure 40:
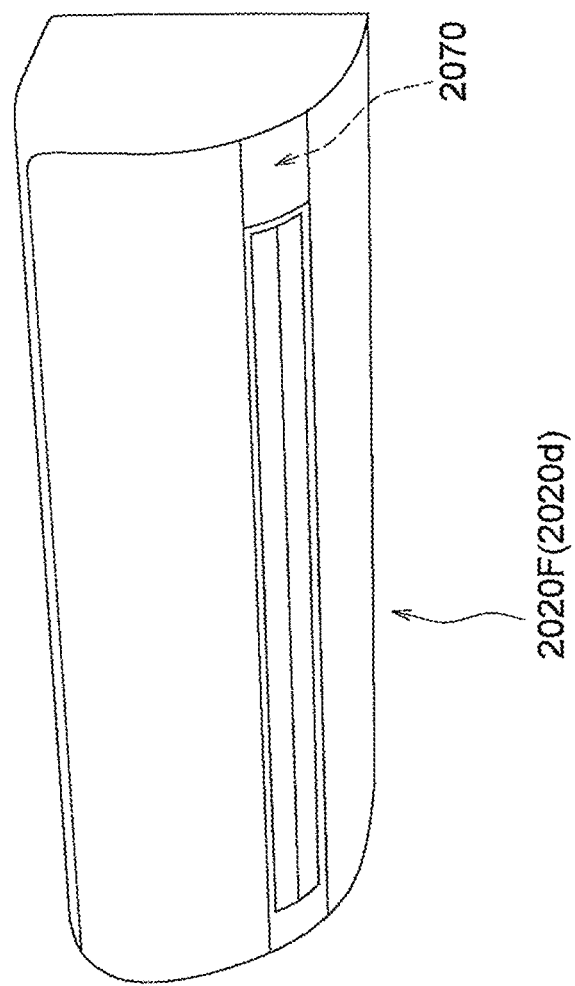
FIG. 40 is a schematic diagram that shows an example of a fixed apparatus (air-conditioning device 2020*d*) according to the embodiment.

Examples of the fixed apparatus 2020F include an air-conditioning device, a luminaire, and a television. For example, when an air-conditioning device 2020d is used as the fixed apparatus 2020F, the infrared output device 2070 is mounted in a control mechanism at the right back side of a front panel as shown in FIG. 40.

In this way, in the control system 2001 according to the present embodiment, the infrared output device 2070 is installed inside the fixed apparatus 2020F whose position is fixed in the predetermined space (for example, room R). Since the position of the fixed apparatus 2020F is fixed in the predetermined space (room R), the range of infrared ray that is output by the infrared output device 2070 installed in the fixed apparatus 2020F can be estimated in advance. Therefore, as long as apparatuses present in the range are controllable by infrared ray, the infrared output device 2070 is able to easily control any controlled apparatus (first-type apparatus 2010). In addition, the infrared output device 2070 is installed in the fixed apparatus 2020F. Therefore, no installation space for the infrared output device 2070 is required.

In the control system 2001 according to the present embodiment, the fixed apparatus 2020F is fixedly installed on a ceiling or wall of the room R (see FIG. 37). Examples of the fixed apparatus fixedly installed on a ceiling or wall of the room R include a luminaire and an air-conditioning device. Any of these is installed at a higher position in the predetermined space (room R). For this reason, the probability of avoiding a shield placed in a transmission path of infrared ray in a predetermined space can be increased. In other words, the probability that infrared ray reaches a controlled apparatus (first-type apparatus 2010) can be increased. As a result, the reliability of the control system 2001 is improved.

In the control system 2001 according to the present embodiment, the information processing device 2100S on the network NW includes the relative position DB 2104B and stores relative position information that indicates a relative positional relationship between the position of the infrared output device 2070 (or the fixed apparatus 2020F) and the position of a controlled apparatus 2010 in the predetermined space. Thus, attitude control over each infrared output device 2070 is possible at the information processing device 2100 side. However, in the control system 2001, information in the relative position DB 2104B may be stored not by the information processing device 2100 but by the storage unit of each infrared output device 2070.

(2-1-4-1) Modification 3A

Figure 41:
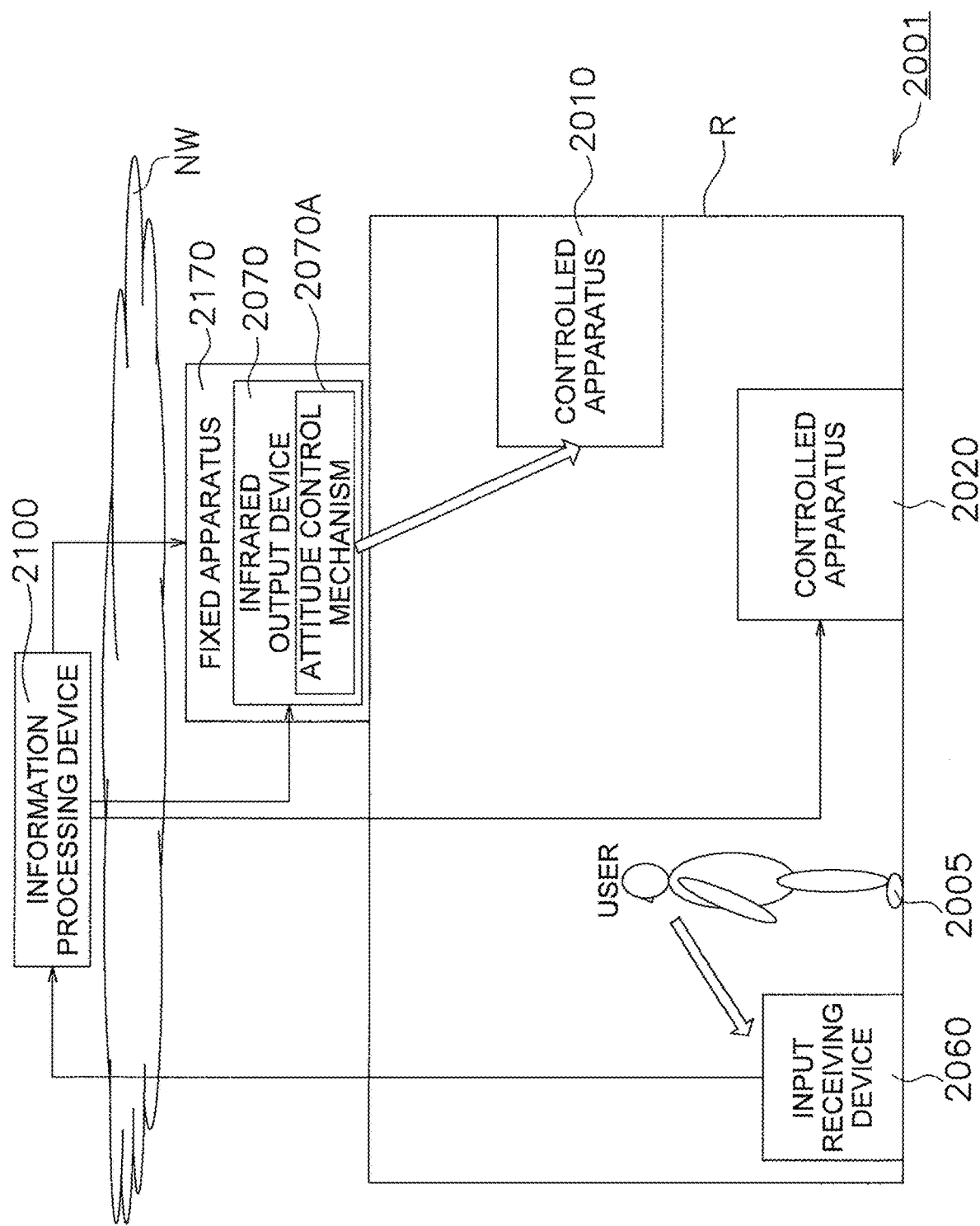
FIG. 41 is a schematic diagram that shows the configuration of the control system 2001 according to a modification 3A.

As shown in FIG. 41 as a concept, in the control system 2001 according to the present embodiment, the fixed apparatus 2020F may be fixedly embedded in a ceiling or wall of the room R. Examples of the fixed apparatus fixedly embedded in a ceiling or wall of the room R include a luminaire, an air-conditioning device, and a wall-hanging television. Any of the fixed apparatuses is installed at a higher position in the predetermined space (room R). For this reason, the probability of avoiding a shield placed in a transmission path of infrared ray in a predetermined space can be increased.

(2-1-4-2) Modification 3B

Figure 42:
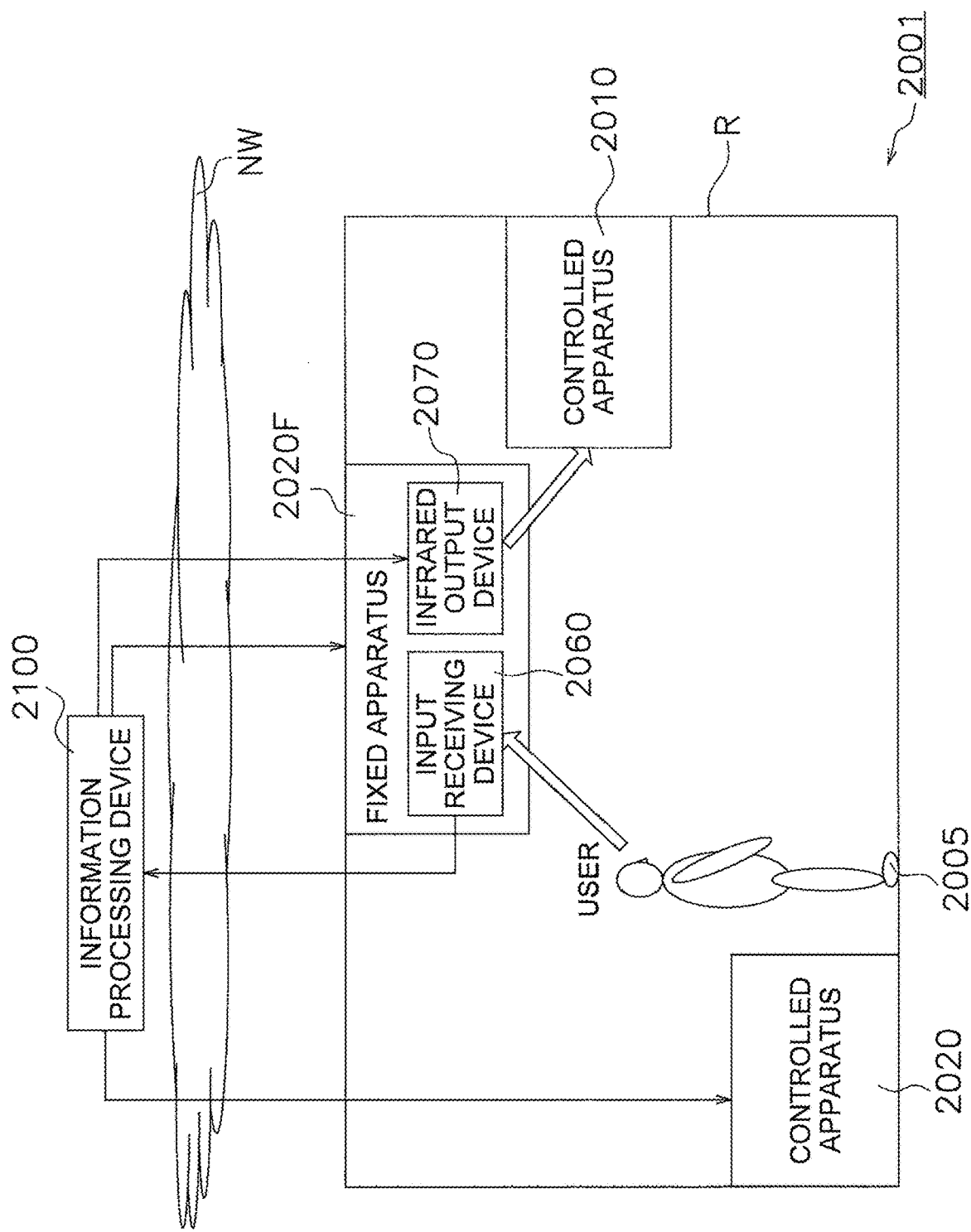
FIG. 42 is a schematic diagram that shows the configuration of the control system 2001 according to a modification 3B.

As shown in FIG. 42 as a concept, in the control system 2001 according to the present embodiment, the input receiving device 2060 may be disposed inside the fixed apparatus 2020F. Thus, the system configuration is simplified. In addition, no new installation space for the input receiving device 2060 is required.

(2-1-4-3) Modification 3C

The infrared output device 2070 according to the present embodiment may be installed in an upper half region of the body of the fixed apparatus 2020F. With such a configuration, infrared ray can be output from a higher position. Thus, the probability of avoiding a shield placed in a transmission path of infrared ray in a predetermined space can be increased. For example, the infrared output device is mounted at an upper part of a floor-standing air-conditioning device.

Second Embodiment (2-2-1) Configuration of Control System 2001S

Figure 43:
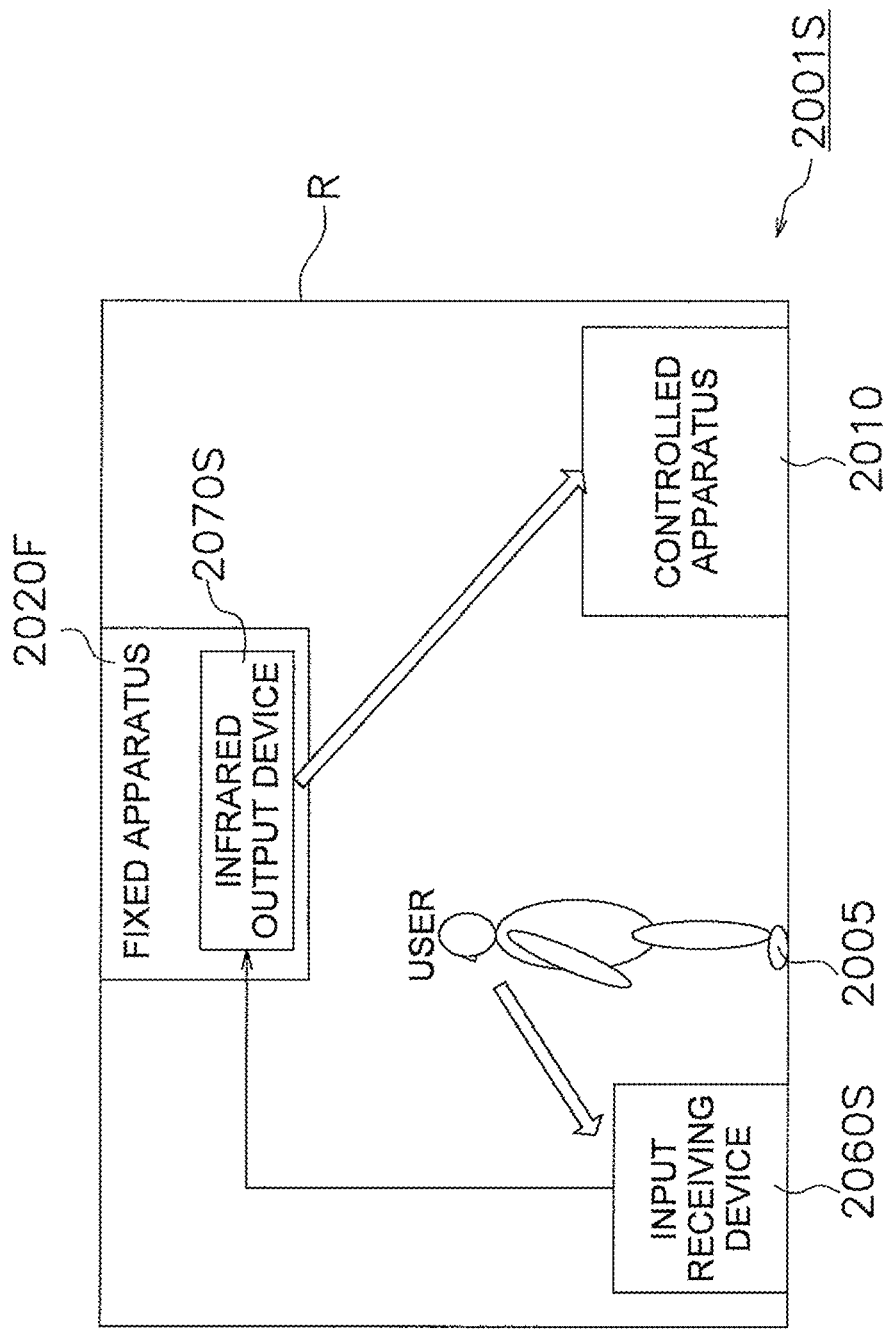
FIG. 43 is a schematic diagram that shows the configuration of a control system 2001S according to a second embodiment of the present invention.

FIG. 43 is a schematic diagram that shows the configuration of a control system 2001S according to a second embodiment of the second invention. In the following description, like reference numerals denote the already described components, and the description will not be repeated. In the present embodiment, components different from those of the other embodiments can be described with a suffix "S".

In the control system 2001S according to the present embodiment, different from the first embodiment, the input receiving device 2060S and the infrared output device 2070S directly communicate with each other, and the configuration of the information processing device 2100 is omitted. In other words, the control system 2001S includes the input receiving device 2060S and the infrared output device 2070S and controls a predetermined controlled apparatus (first-type apparatus) 2010. It is assumed that these apparatuses are placed in a room R. For the sake of convenience of description, FIG. 43 shows one controlled apparatus 2010; however, a plurality of controlled apparatuses 2010 may be present.

The input receiving device 2060S receives a control command to the controlled apparatus 2010. The input receiving device 2060S transmits voice information corresponding to the received voice input to the infrared output device 2070S.

Figure 44:
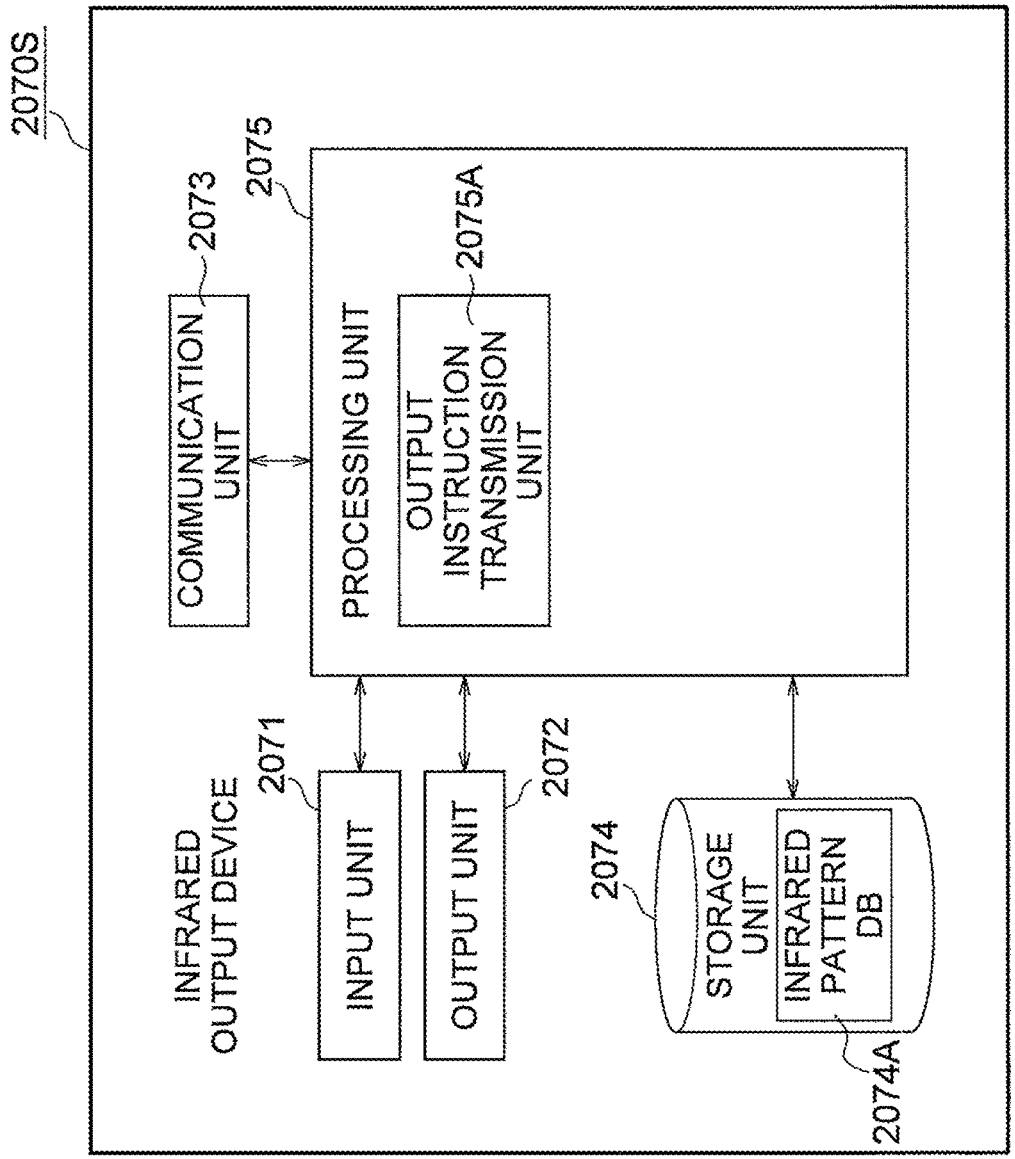
FIG. 44 is a schematic diagram that shows the configuration of an infrared output device 2070S according to the embodiment.

As shown in FIG. 44, the infrared output device 2070S includes an input unit 2071, an output unit 2072, a communication unit 2073, a storage unit 2074, and a processing unit 2075. The infrared output device 2070S outputs infrared ray to the controlled apparatus 2010 via the output unit 2072.

The infrared output device 2070S is installed in the fixed apparatus 2020F whose position is fixed in the predetermined space (room R).

More specifically, the input unit 2071 inputs various pieces of information to the infrared output device 2070S. The output unit 2072 outputs various pieces of information from the infrared output device 2070S. Here, infrared ray is output by the function of an infrared transmitter that serves as the output unit 2072. The communication unit 2073 is able to directly or indirectly connect with the external network NW, or the like. Here, with the function of the communication unit 2073, the infrared output device 2070S and the input receiving device 2060S are connected.

The storage unit 2074 is implemented by a ROM, a RAM, or the like, and stores information that is input to the infrared output device 2070, information that is calculated by the infrared output device 2070S, and the like. For example, an "infrared pattern DB 2074A" is stored in the storage unit 2074. The infrared pattern DB 2074A stores an associated relationship between a pattern of an infrared output signal and a predetermined control content for each controlled apparatus.

The processing unit 2075 is implemented by a CPU, or the like, and executes information processing in the infrared output device 2070S. Here, when the processing unit 2075 runs programs installed in the storage unit 2074, the processing unit 2075 functions as an "output instruction transmission unit 2075A". When the output instruction transmission unit 2075A has received a control command from the input receiving device 2060, the output instruction transmission unit 2075A outputs infrared ray to the controlled apparatus 2010 based on the information stored in the infrared pattern DB 2074A.

(2-2-2) Characteristics

As described above, the control system 2001S according to the present embodiment includes the input receiving device 2060S and the infrared output device 2070S. The input receiving device 2060S receives a control command to a controlled apparatus 2010 controllable by infrared ray. The infrared output device 2070S is installed in the fixed apparatus 2020F whose position is fixed in the predetermined space (room R). When the input receiving device 2060S has received a control command, the infrared output device 2070S outputs infrared ray to the controlled apparatus 2010.

Therefore, with the control system 2001S according to the present embodiment, the controlled apparatus 2010 can be controlled via infrared ray by voice input. Since the position of the fixed apparatus 2020F is fixed in the predetermined space (room R), the range of infrared ray that is output by the infrared output device 2070S installed in the fixed apparatus 2020F can be estimated in advance. Therefore, as long as apparatuses present in the range are controllable by infrared ray, the infrared output device 2070S is able to easily control any controlled apparatus 2010. In addition, the infrared output device 2070S is installed in the fixed apparatus 2020F. Therefore, no installation space for the infrared output device 2070S is required.

In the control system 2001 according to the present embodiment, the fixed apparatus 2020F is fixedly installed on a ceiling or wall of the room R (see FIG. 36). Examples of the fixed apparatus fixedly mounted on a ceiling or wall of the room R include a luminaire and an air-conditioning device. Any of these is installed at a higher position in the predetermined space (room R). For this reason, the probability of avoiding a shield placed in a transmission path of infrared ray in a predetermined space can be increased. In other words, the probability that infrared ray reaches a controlled apparatus 2010 can be increased. As a result, the reliability of the control system 2001 is improved.

(2-2-3) Modifications

Figure 45:
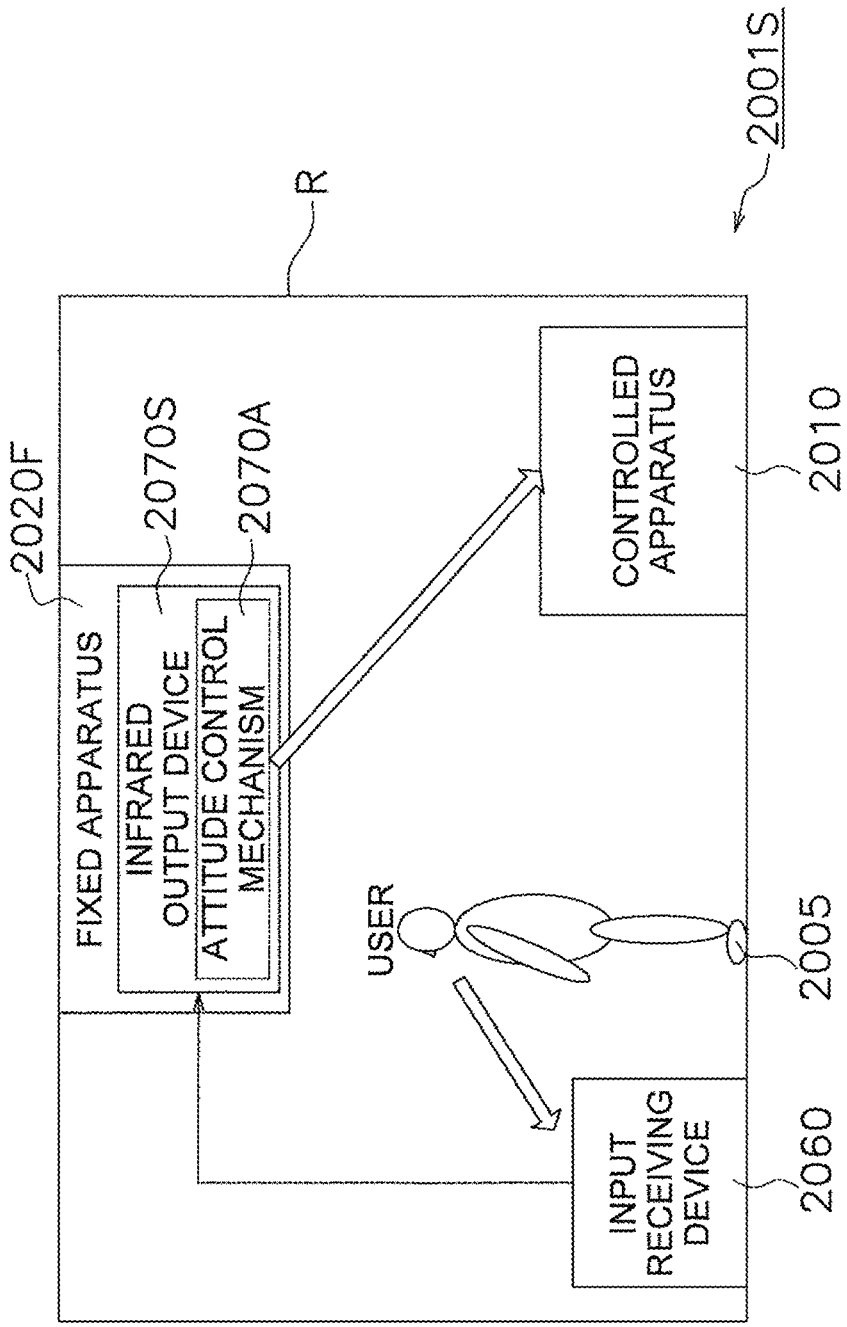
FIG. 45 is a schematic diagram that shows the configuration of a modification of the control system 2001S according to the embodiment.
Figure 46:
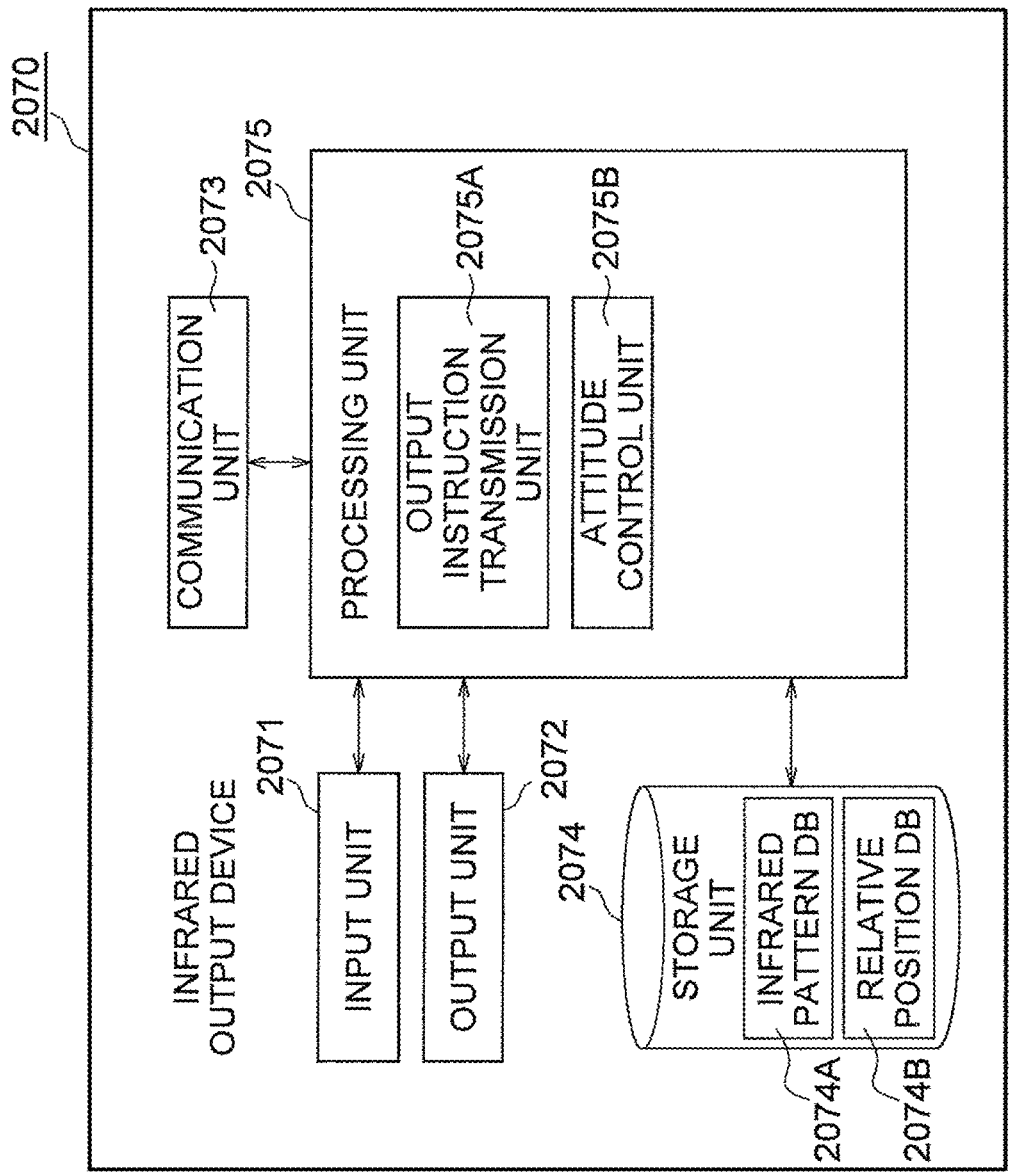
FIG. 46 is a schematic diagram that shows the configuration of a modification of the infrared output device 2070S according to the embodiment.

As shown in FIG. 45, in the control system 2001S according to the present embodiment, the attitude control mechanism 2070S may be incorporated in the infrared output device 2070S. Here, as shown in FIG. 46, the storage unit 2074 of the infrared output device 2070S includes the "relative position DB 2074B". The relative position DB 2074B stores "relative position information" that indicates a relative positional relationship between the infrared output device 2070S and a controlled apparatus 2010 in the predetermined space (room R). When the infrared output device 2070S outputs infrared ray, the processing unit 2075 functions as the attitude control unit 2075B. The attitude control unit 2075B extracts relative position information from the relative position DB 2074B and changes the position of the infrared output device 2070 by actuating the attitude control mechanism 2070A based on the relative position information. Thus, the direction of output of infrared ray of the infrared output device 2070S is changed to a predetermined direction. As a result, the probability that infrared ray reaches a controlled apparatus 2010 can be increased, so the reliability of the control system is improved.

Since the infrared output device 2070S is fixed to the fixed apparatus 2020F, information that indicates a relative positional relationship between the position of the fixed apparatus 2020F and the position of a controlled apparatus 2010 as relative position information instead of information that indicates a relative positional relationship between the position of the infrared output device 2070S and the position of a controlled apparatus 2010.

Other than the above, the modifications 3A to 3C of the first embodiment are also directly applicable to the present embodiment.

[Third Invention]

(3-1) Configuration of Control System 3001

Figure 47:
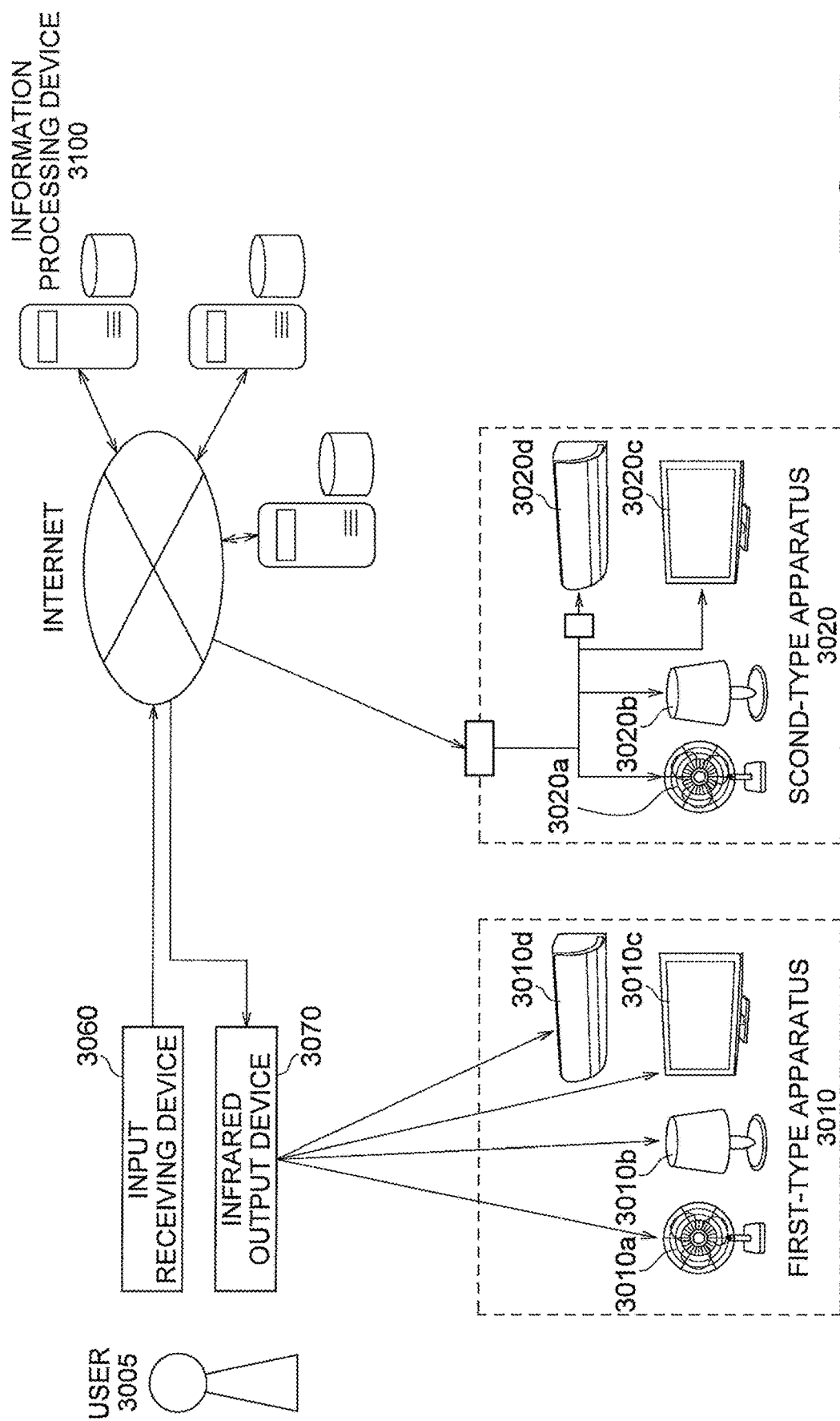
FIG. 47 is a schematic diagram that shows the configuration of a control system 3001 according to a first embodiment of the third invention.
Figure 48:
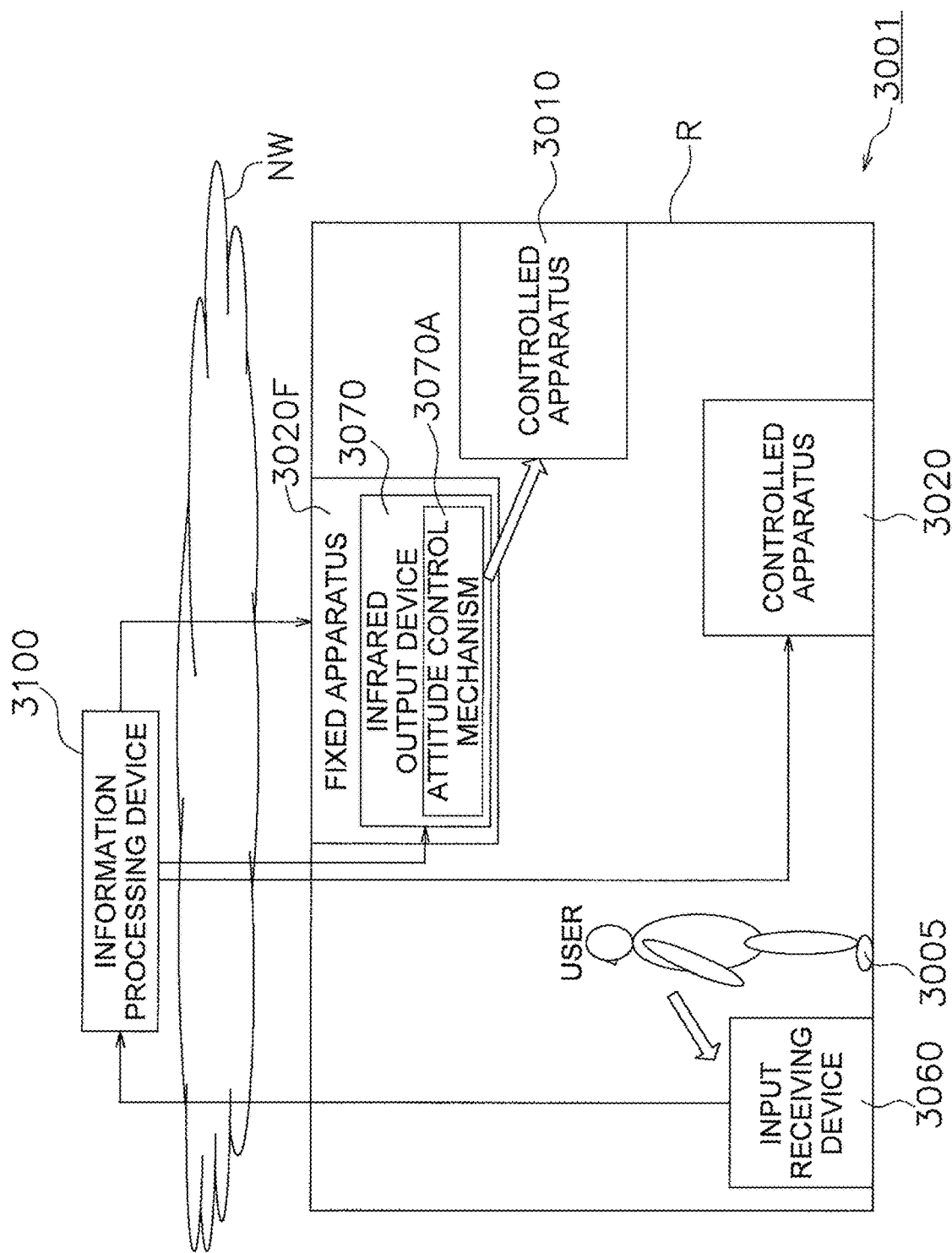
FIG. 48 is a schematic diagram that shows the configuration of the control system 3001 according to the embodiment.

FIG. 47 and FIG. 48 are schematic diagrams that show the configuration of a control system 3001 according to an embodiment of the third invention.

The control system 3001 includes an input receiving device 3060, an infrared output device 3070, and an information processing device 3100. In the control system 3001, when a user 3005 inputs a control command to the input receiving device 3060, a predetermined controlled apparatus can be controlled. Here, "first-type apparatuses 3010" and "second-type apparatuses 3020" are present as controlled apparatuses. It is assumed that these controlled apparatuses are placed in a room R.

In FIG. 47 and FIG. 48, one of each of the input receiving device 3060, the infrared output device 3070, and the information processing device 3100 is shown; however, the number of each device is not limited thereto. The information processing device 3100 is connected to any number of the devices and is able to manage these devices.

The first-type apparatuses 3010 are controllable by using an infrared output signal. Examples of the first-type apparatuses 3010 include an electric fan 3010a, a luminaire 3010b, a television 3010c, and an air conditioner 3010d. Supplementarily, a pattern of an infrared output signal is preset for each of the controlled apparatuses, and the controlled apparatuses 3010 can be controlled by using the associated patterns of an output signal of infrared. Here, an associated relationship between a pattern of an infrared output signal and a control content is stored in an infrared pattern DB 3104A (described later). In the following description, reference numeral 3010 indicates any first-type apparatus, and a lower-case alphabet is suffixed to indicate an individual first-type apparatus.

The second-type apparatuses 3020 are directly controllable by the information processing device 3100 via the network NW. Examples of the second-type apparatuses 3020, as well as the first-type apparatuses 3010, include an electric fan 3020a, a luminaire 3020b, a television 3020c, and an air conditioner 3020d. In the following description, reference numeral 3020 indicates any second-type apparatus, and a lower-case alphabet is suffixed to indicate an individual second-type apparatus.

The input receiving device 3060 receives a control command on a predetermined controlled apparatus 3010 or a predetermined controlled apparatus 3020. Here, the input receiving device 3060 includes a microphone and receives a control command on the controlled apparatus 3010 or the controlled apparatus 3020 from the user 3005 by voice input via the microphone. The input receiving device 3060 transmits voice information corresponding to the received voice input to the information processing device 3100. When the input receiving device 3060 has detected voice emitted by the user 3005, the input receiving device 3060 directly transmits the voice information to the information processing device 3100. However, the input receiving device 3060 is not limited to an input receiving device and receives input from any input device or method.

The infrared output device 3070 outputs infrared ray to a controlled apparatus (first-type apparatus) 3010. The infrared output device 3070 includes an attitude control mechanism 3070A. When the infrared output device 3070 has received relative position information (described later) from the information processing device 3100, the attitude control mechanism 3070A controls the attitude of the infrared output device 3070 based on the relative position information. The infrared output device 3070 can be installed inside the fixed apparatus 3020F whose position is fixed in a predetermined space (room R). The fixed apparatus 3020F is, for example, an air-conditioning device, a luminaire, a television, or the like, and is fixed to a ceiling or wall of the room R. Alternatively, the fixed apparatus 3020F may be fixedly embedded in a ceiling or wall of the room R.

Figure 49:
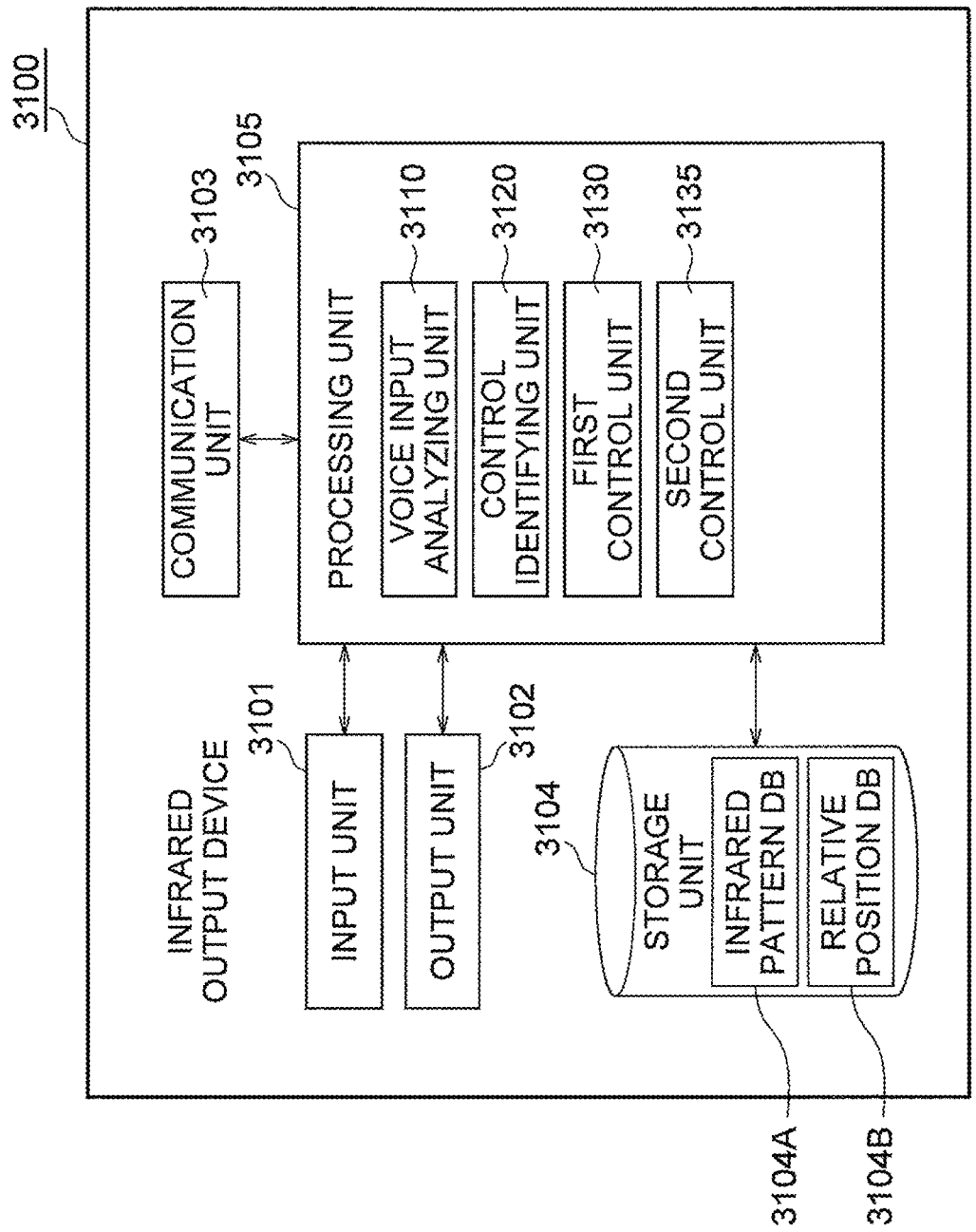
FIG. 49 is a schematic diagram that shows the configuration of an information processing device 3100 according to the embodiment.

As shown in FIG. 49, the information processing device 3100 includes an input unit 3101, an output unit 3102, a communication unit 3103, a storage unit 3104, and a processing unit 3105, and is connected to the input receiving device 3060 and the infrared output device 3070 via the network NW, such as the Internet.

Here, the input unit 3101 is implemented by any input device and inputs various pieces of information to the information processing device 3100. The output unit 3102 is implemented by any output device and outputs various pieces of information from the information processing device 3100. The communication unit 3103 is connected to the external network NW and enables information communication.

The storage unit 3104 is implemented by a ROM, a RAM, or the like, and stores information that is input to the information processing device 3100, information that is calculated by the information processing device 3100, and the like. The storage unit 3104 stores an "infrared pattern database (DB) 3104A" and a "relative position database (DB) 3104B".

The infrared pattern DB 3104A stores an associated relationship between a pattern of an infrared output signal and a predetermined control content for each controlled apparatus (first-type apparatus 3010).

The relative position DB 3104B stores "relative position information" that indicates a relative positional relationship between the infrared output device 3070 and a controlled apparatus (first-type apparatus 3010) in a predetermined space (room R). When the infrared output device 3070 is fixed to the fixed apparatus 3020F, information that indicates a relative positional relationship between the position of the fixed apparatus 3020F and the position of a first-type apparatus 3010 may be used as relative position information instead of information that indicates a relative positional relationship between the position of the infrared output device 3070 and the position of a first-type apparatus 3010.

The processing unit 3105 is implemented by a CPU, or the like, and executes information processing in the information processing device 3100. Here, when the processing unit 3105 runs programs installed in the storage unit 3104, the processing unit 3105 functions as an "input analyzing unit 3110", a "control identifying unit 3120", a "first control unit 3130", and a "second control unit 3135".

The input analyzing unit 3110 analyzes a content of input that is received from the input receiving device 3060. For example, when the input receiving device 3060 has received voice input, the input analyzing unit 3110 analyzes the content of the voice input by converting the content of the voice input to text information. When the input analyzing unit 3110 analyzes the content of the voice input, the input analyzing unit 3110 is able to highly accurately analyze the content by using neural network, or the like.

The control identifying unit 3120 identifies a control content that indicates a controlled apparatus and a control command from a result analyzed by the input analyzing unit 3110. For example, when the input receiving device 3060 has received voice input, the control identifying unit 3120 identifies a control content by determining whether text information converted by the input analyzing unit 3110 contains language information associated with a controlled apparatus and a control command.

Here, when the control identifying unit 3120 has identified that the controlled apparatus is a first-type apparatus 3010, the control identifying unit 3120 transmits a control content associated with the controlled apparatus to the first control unit 3130. On the other hand, when the control identifying unit 3120 has identified that the controlled apparatus is a second-type apparatus 3020, the control identifying unit 3120 transmits a control content associated with the controlled apparatus to the second control unit 3135.

When the control content over a first-type apparatus 3010 has been identified by the control identifying unit 3120, the first control unit 3130 transmits an infrared pattern corresponding to the control content to the infrared output device 3070. More specifically, the first control unit 3130 transmits an infrared output instruction to the infrared output device 3070 based on the control content identified by the control identifying unit 3120 and the information stored in the infrared pattern DB 3104A. Thus, the first-type apparatus 3010 is controlled via the infrared output device 3070. The first control unit 3130 transmits relative position information between the infrared output device 3070 and the intended first-type apparatus 3010 to the infrared output device 3070 together with the infrared output instruction. The relative position information is extracted from the relative position DB 3104B.

When the control content over a second-type apparatus 3020 has been identified by the control identifying unit

3120, the second control unit 3135 controls the second-type apparatus 3020 via the network NW based on the control content.

(3-2) Operation of Control System 3001

Figure 50A:
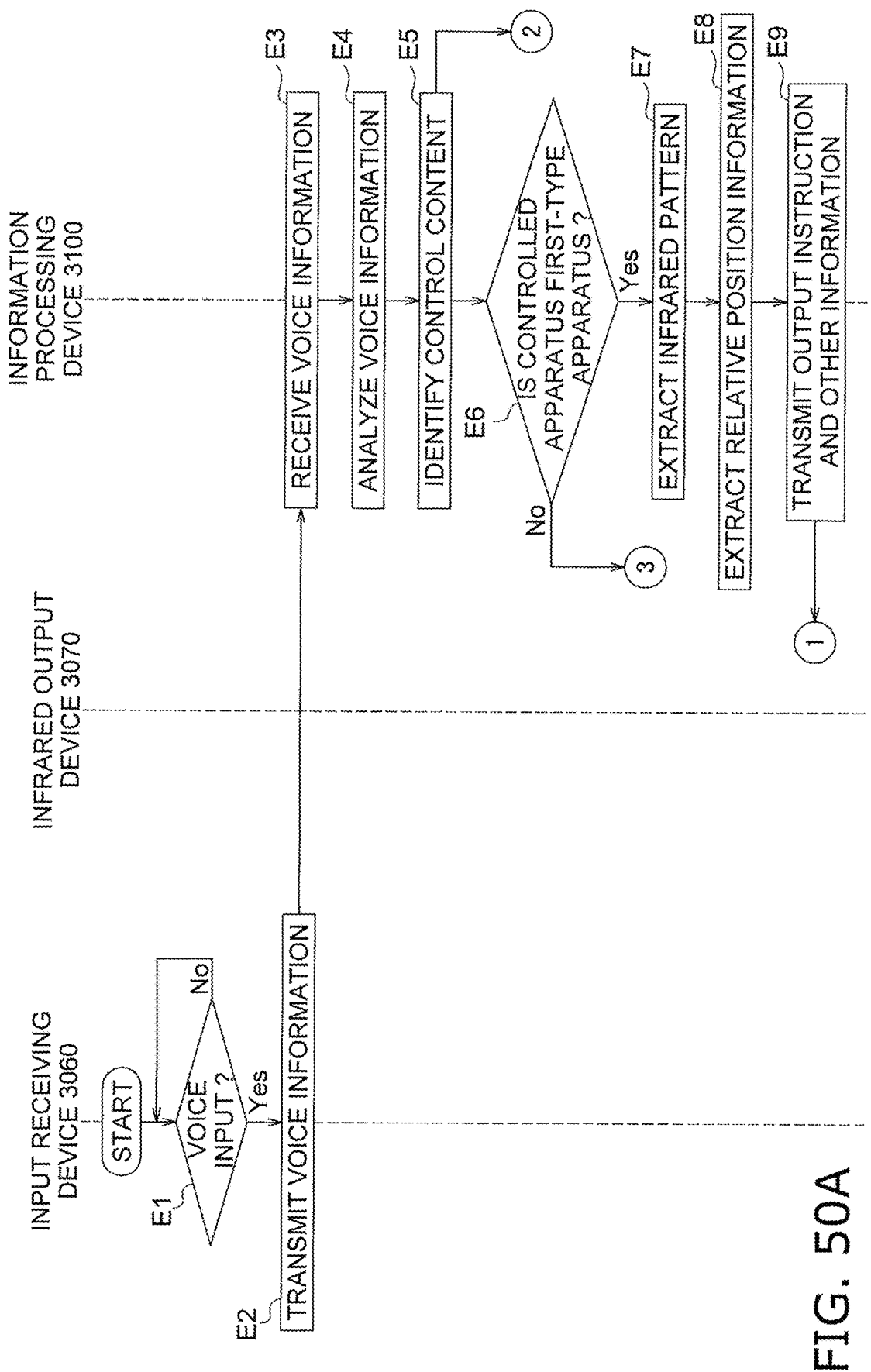
FIG. 50A is a sequence diagram for illustrating the operation of the control system 3001 according to the embodiment.
Figure 50B:
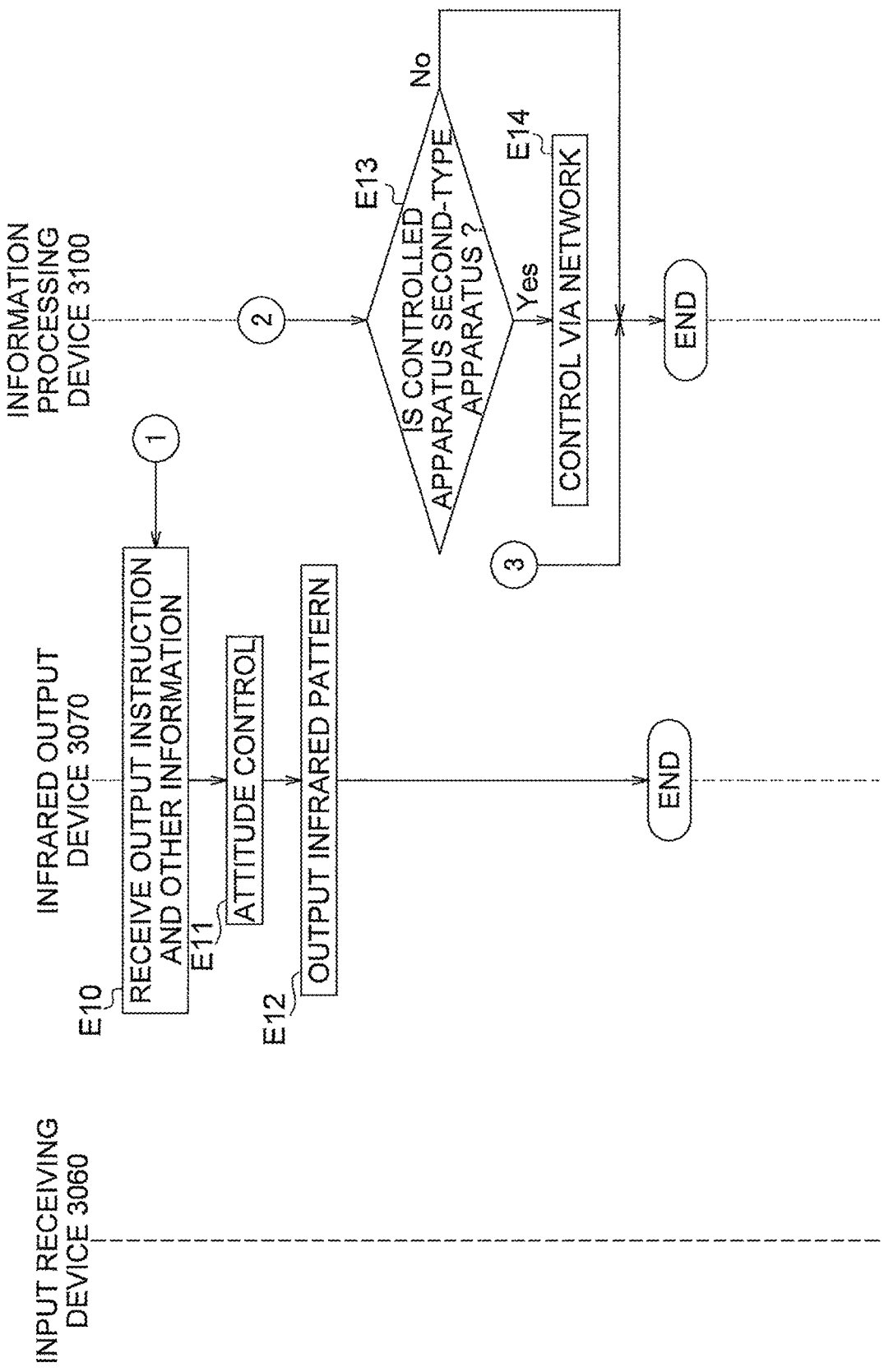
FIG. 50B is a sequence diagram for illustrating the operation of the control system 3001 according to the embodiment.

FIG. 50A and FIG. 50B are sequence diagrams for illustrating the operation of the control system 3001 according to the present embodiment.

First, the input receiving device 3060 is used by the user 3005, and voice input on a controlled apparatus 3010 or a controlled apparatus 3020 is performed (E1). The input receiving device 3060 transmits input information corresponding to the received voice input to the information processing device 3100 (E2). Here, the input receiving device 3060 receives an input operation by voice (voice input).

Subsequently, the information processing device 3100 receives the input information (E3) and analyzes the content of the input (E4). After that, the information processing device 3100 identifies a control content that indicates a controlled apparatus 3010 or a controlled apparatus 3020 and a control command to the controlled apparatus 3010 or the controlled apparatus 3020 (E5).

Here, when the information processing device 3100 has identified that the control content is related to a first-type apparatus 3010 (Yes in E6), the information processing device 3100 extracts infrared pattern information from the infrared pattern DB 3104A based on the control content (E7). In addition, the information processing device 3100 extracts relative position information between the first-type apparatus 3010 and the infrared output device 3070 (or the fixed apparatus 3020F) from the relative position DB 3104B (E8). The information processing device 3100 transmits the infrared pattern information and the relative position information to the infrared output device 3070 together with an infrared output instruction (E9).

Subsequently, as the infrared output device 3070 receives the infrared pattern information and the relative position information together with the infrared output instruction (E10), the infrared output device 3070 changes the attitude toward the intended controlled apparatus 3010 based on the relative position information (E11). The infrared output device 3070 outputs infrared ray toward the controlled apparatus (first-type apparatus) 3010 based on the received infrared pattern information (E12).

On the other hand, in parallel with step E6, when the information processing device 3100 has identified that the control content is related to a second-type apparatus 3020 (Yes in E13), the information processing device 3100 controls the controlled apparatus (second-type apparatus) 3020 via the network NW based on the control content (E14).

When the information processing device 3100 cannot identify in step E6 or step E13 that the control content is related to a first-type apparatus 3010 or a second-type apparatus 3020, the information processing device 3100 ends the process (No in E6 or No in E13).

The processes of step E6 to step E9 and the processes of step E13 and step E14 are not in particular order and any one of sets of the processes may be executed first.

(3-3) Characteristics

As described above, the control system 3001 according to the present embodiment includes the input receiving device 3060, the infrared output device 3070, and the information processing device 3100. Here, the input receiving device 3060 receives a control command to a controlled apparatus 3010 or a controlled apparatus 3020 from the user 3005 by voice input. The infrared output device 3070 outputs infrared ray to the controlled apparatus 3010 or the controlled apparatus 3020. The information processing device 3100 includes the input analyzing unit 3110, the control identifying unit 3120, the first control unit 3130, and the second control unit 3135. The input analyzing unit 3110 analyzes a content of input that is received from the input receiving device 3060. The control identifying unit 3120 identifies a control content that indicates a controlled apparatus and a control command from a result analyzed by the input analyzing unit 3110. When the control content over a first-type apparatus 3010 has been identified by the control identifying unit 3120, the first control unit 3130 transmits an infrared pattern corresponding to the control content to the infrared output device 3070. When the control content over a second-type apparatus 3020 has been identified by the control identifying unit 3120, the second control unit 3135 controls the second-type apparatus 3020 via the network NW based on the control content.

Therefore, with the control system 3001 according to the present embodiment, a first-type apparatus 3010 controllable by output of an infrared pattern and a second-type apparatus 3020 controllable via the network NW can be controlled.

In addition, with the control system 3001S according to the present embodiment, the information processing device 3100 on the network NW is able to transmit an infrared output instruction to the infrared output device 3070S based on a result of analysis of voice input. When an apparatus is intended to be controlled by voice input, the amount of information processing can be enormous. Even in such a case, with the control system 3001S, voice analysis can be highly accurately performed by using the information processing device 3100 that implements neural network, or the like, and that is constructed on the network NW. Thus, even with voice input, a controlled apparatus 3010 or a controlled apparatus 3020 and a control command can be minutely identified. As a result, the control system 3001 that can easily control any apparatus can be provided.

In the control system 3001 according to the present embodiment, the information processing device 3100 on the network NW includes the infrared pattern DB 3104A, and stores an associated relationship between a pattern of an infrared output signal and a predetermined control content for each controlled apparatus. Thus, change, update, addition, and the like, of the pattern of an infrared output signal can be collectively set. However, in the control system 3001 according to the present embodiment, information in the infrared pattern DB 3104A may be stored not by the information processing device 3100 but by the storage unit of each infrared output device 3070.

(3-4) Use of Environmental Information Detecting Apparatus 3020K

(3-4-1) Configuration of Control System 3001

Figure 51:
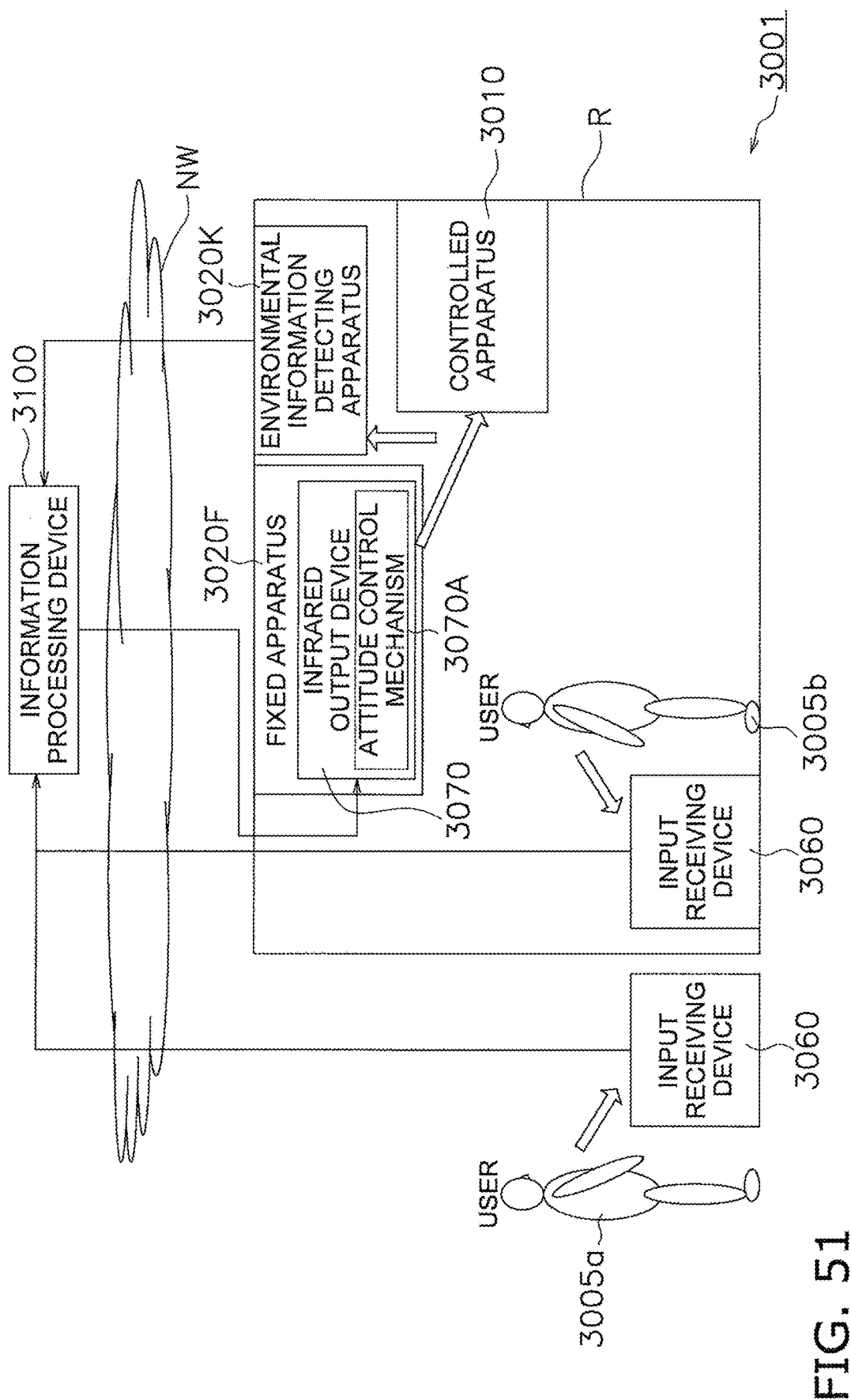
FIG. 51 is a schematic diagram that shows the configuration of the control system 3001 according to the embodiment.

As shown in FIG. 51, a configuration that the control system 3001 according to the present embodiment further includes an environmental information detecting apparatus 3020K may be employed.

The environmental information detecting apparatus 3020K detects environmental information around a controlled apparatus 3010 or a controlled apparatus 3020. Environmental information contains information, such as temperature, humidity, and illuminance. Examples of the environmental information detecting apparatus 3020K include those using a voice sensor, an illuminance sensor, an air volume sensor, an image sensor (camera), an infrared sensor, a temperature sensor, a pressure sensor, a humidity sensor, a thermistor, or the like. These pieces of environmental information are transmitted to the information processing device 3100. The environmental information detecting apparatus 3020K may be a second-type apparatus 3020.

Figure 52:
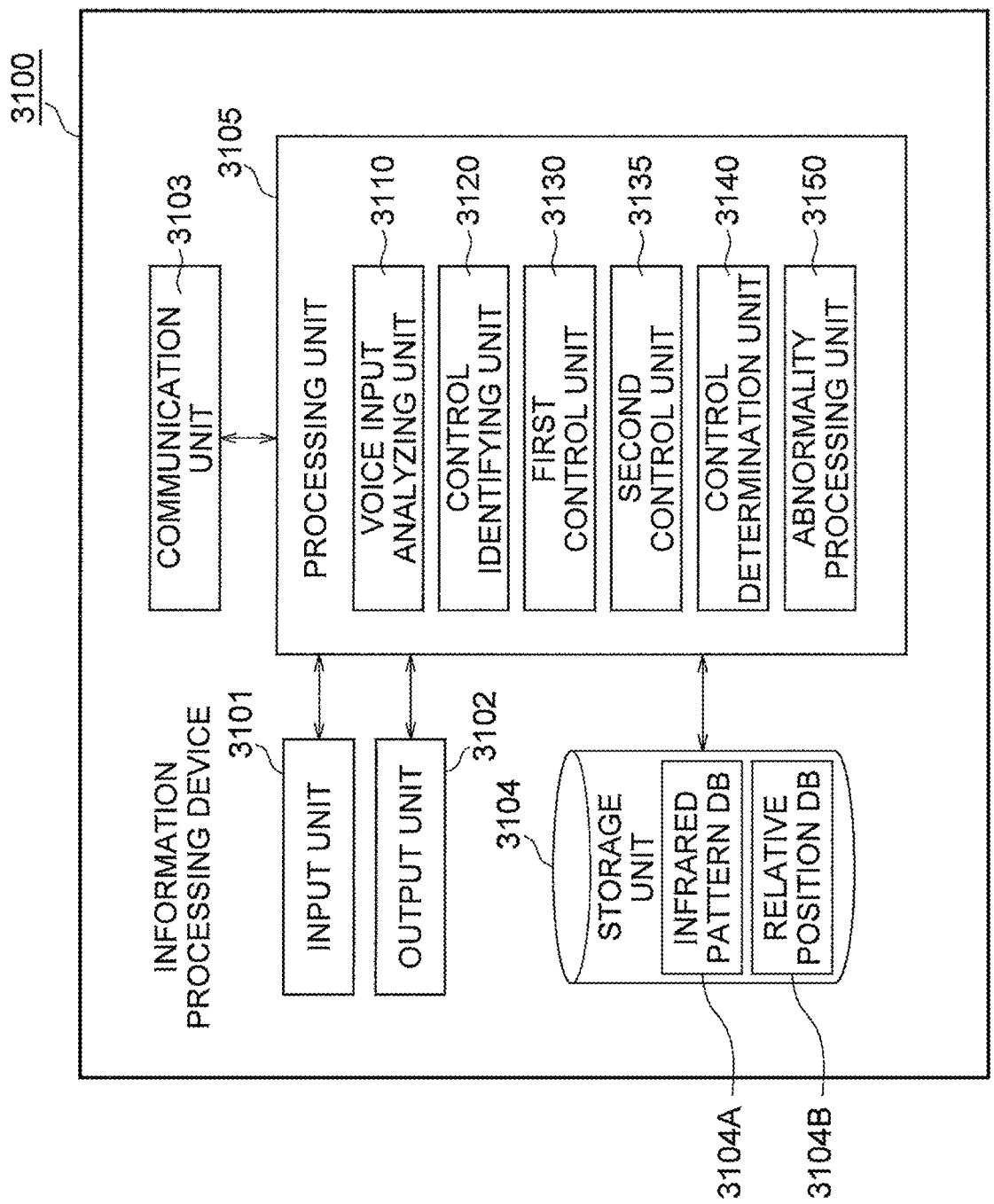
FIG. 52 is a schematic diagram that shows the configuration of the information processing device 3100 according to the embodiment.

As shown in FIG. 52, in the information processing device 3100, the processing unit 3105 further functions as a "control determination unit 3140" and an "abnormality processing unit 3150".

The control determination unit 3140 receives environmental information from the environmental information detecting apparatus 3020K and determines whether the controlled apparatus (first-type apparatus) 3010 has been controlled in accordance with an infrared output instruction and environmental information. For example, when the controlled apparatus 3010 is an air conditioner, the temperature of a surrounding environment changes. The control determination unit 3140 acquires temperature information as environmental information and determines whether the controlled apparatus 3010 has been controlled by determining whether there occurs a predetermined temperature change. For example, when the controlled apparatus 3010 is a television, the illuminance of a surrounding environment changes. The control determination unit 3140 acquires illuminance information as environmental information and determines whether the controlled apparatus 3010 has been controlled by determining whether there occurs a predetermined illuminance change.

When the control determination unit 3140 determines (abnormality determination) that the controlled apparatus 3010 has not been controlled based on an infrared output instruction and environmental information, the abnormality processing unit 3150 executes abnormality processing. For example, the abnormality processing unit 3150 executes a process of retransmitting an infrared output instruction to the infrared output device 3070 as abnormality processing.

(3-4-2) Operation of Control System 3001

Figure 53A:
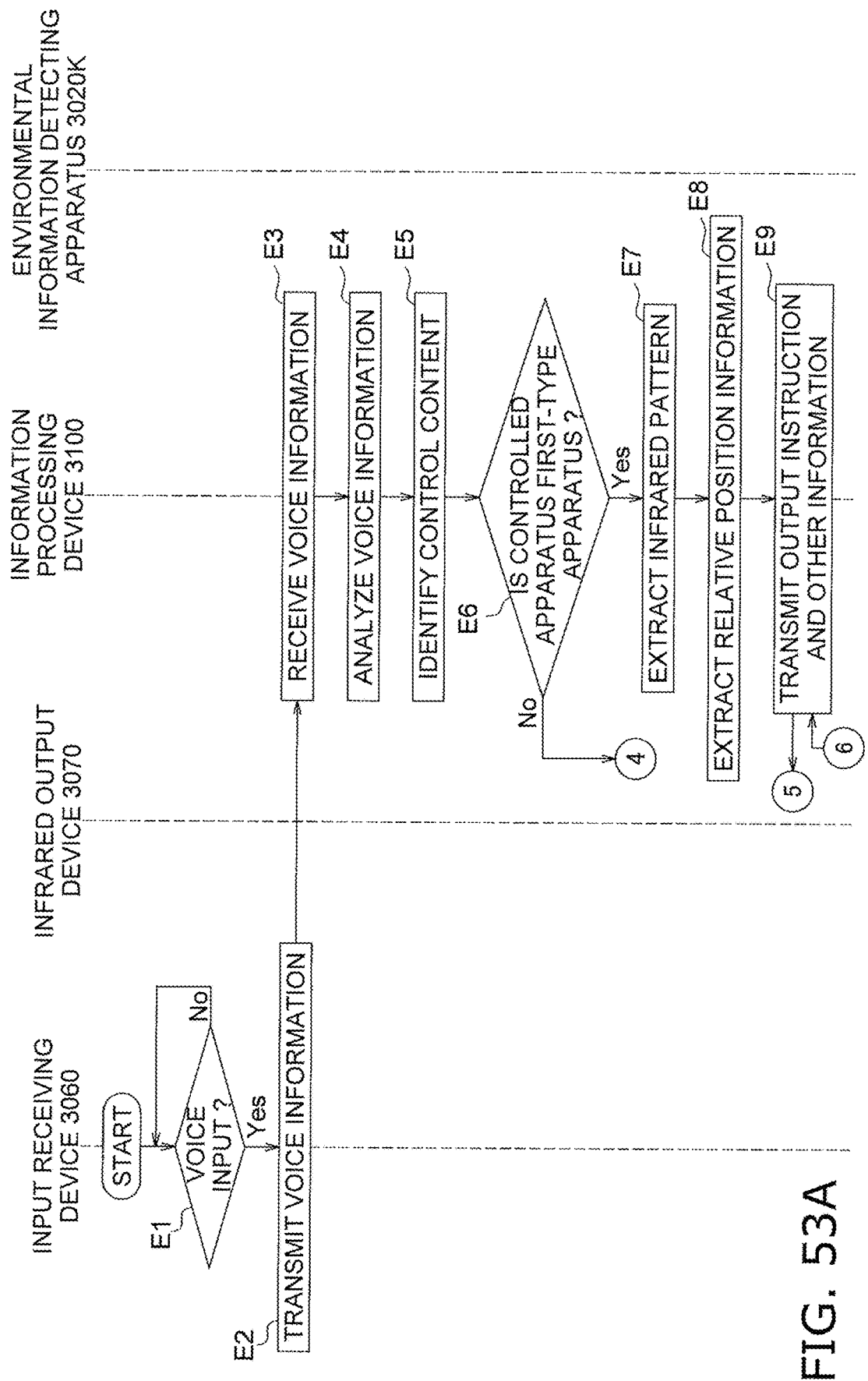
FIG. 53A is a sequence diagram for illustrating the operation of the control system 3001 according to the embodiment.
Figure 53B:
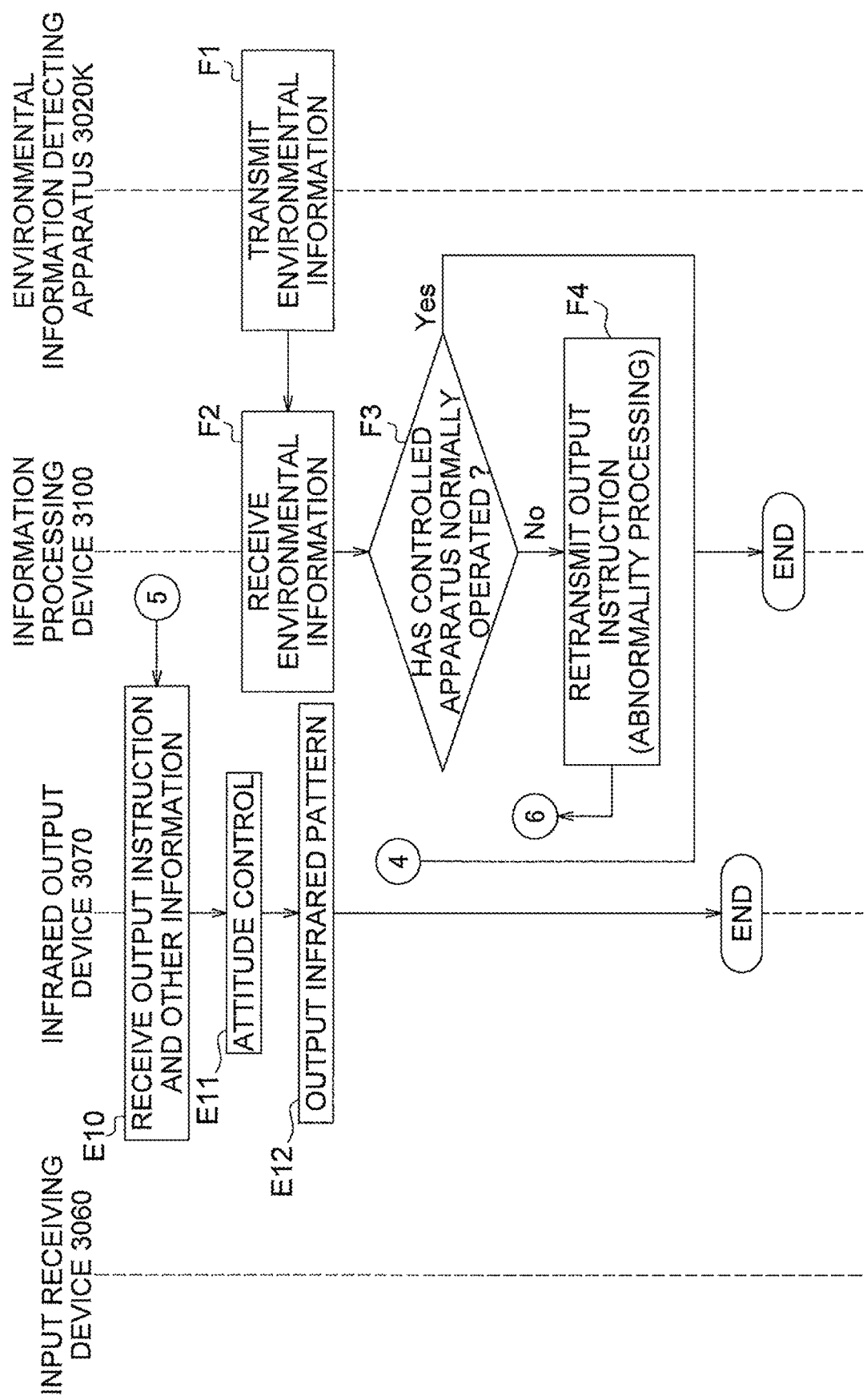
FIG. 53B is a sequence diagram for illustrating the operation of the control system 3001 according to the embodiment.

FIG. 53A and FIG. 53B are sequence diagrams for illustrating the operation of the control system 3001 according to the present embodiment. In the following description, the description will be made on the assumption that the controlled apparatus is a first-type apparatus 3010.

The configuration that the control system 3001 according to the present embodiment includes the environmental information detecting apparatus 3020K is employed, so the following processes of step F1 to step F4 can be added to the above-described step E1 to step E12.

In other words, the environmental information detecting apparatus 3020K where necessary transmits environmental information around the controlled apparatus 3010 to the information processing device 3100 (F1).

In response to this, in the information processing device 3100, it is determined whether the controlled apparatus 3010 is being controlled in accordance with the output instruction based on the time of the output instruction transmitted to the infrared output device 3070, the time of the environmental information received from the environmental information detecting apparatus 3020K, and the amount of change (F2, F3).

In the information processing device 3100, when it is determined that the controlled apparatus 3010 is being controlled in accordance with the output instruction, the process of control checking is ended (Yes in F3).

On the other hand, in the information processing device 3100, when it is determined that the controlled apparatus 3010 is not being controlled based on the output instruction, it is determined that there is an abnormality and abnormality processing is executed (No in F3, and F4). For example, the information processing device 3100 retransmits an output instruction to the infrared output device 3070 as abnormality processing (E9). Thus, until the controlled apparatus 3010 is controlled normally, the output instruction is repeatedly transmitted from the infrared output device 3070 to the controlled apparatus 3010.

(3-4-3) Characteristics

As described above, the control system 3001 according to the present embodiment includes the input receiving device 3060, the infrared output device 3070, the environmental information detecting apparatus 3020K, and the information processing device 3100. The input receiving device 3060 receives a control command to a controlled apparatus (first-type apparatus) 3010 controllable by infrared ray. The infrared output device 3070 outputs infrared ray to the controlled apparatus 3010. The environmental information detecting apparatus 3020K detects environmental information around the controlled apparatus 3010. The information processing device 3100 receives the control command from the input receiving device 3060 and transmits an infrared output instruction to the infrared output device 3070 based on the control command. The information processing device 3100 receives the environmental information from the environmental information detecting apparatus 3020K and determines that the controlled apparatus 3010 has been controlled based on the output instruction and the environmental information.

Thus, with the control system 3001 according to the present embodiment, the information processing device 3100 receives environmental information from the environmental information detecting apparatus 3020K and determines whether a controlled apparatus 3010 has been controlled based on an output instruction and the environmental information. Therefore, when the controlled apparatus 3010 has not been controlled, a process for controlling the controlled apparatus 3010 can be executed.

For example, when the information processing device 3100 determines that the controlled apparatus 3010 has not been controlled based on the infrared output instruction and the environmental information, the information processing device 3100 retransmits an output instruction to the infrared output device 3070. Thus, the controlled apparatus 3010 is reliably controlled, so the control system 3001 with high reliability can be provided.

(3-4-4) Modifications (3-4-4-1)

In the above description, when it is determined that the controlled apparatus 3010 has not been controlled based on the infrared output instruction and the environmental information, an output instruction is repeatedly transmitted from the infrared output device 3070 to the controlled apparatus 3010 until the controlled apparatus 3010 is controlled normally. However, the process in the control system 3001 according to the present embodiment is not limited to such control. For example, the number of times of output instruction to be transmitted to a controlled apparatus 3010 may be limited to a predetermined number. Thus, the load on the system is reduced. When the information processing device 3100 determines that the controlled apparatus 3010 has not been controlled based on the infrared output instruction and the environmental information, the information processing device 3100 may transmit, to the input receiving device 3060, a notification that the controlled apparatus 3010 has not been controlled. Thus, the user 3005 of the input receiving device 3060 is prompted to input a control command again, so the controlled apparatus 3010 is reliably controlled. As a result, the control system 3001 with high reliability can be provided.

Particularly, in the control system 3001 according to the present embodiment, the infrared output device 3070 is operated via the information processing device 3100 on the network NW, so remote control over a controlled apparatus 3010 is possible. On the other hand, in the case of remote control, a user 3005*a* who controls a controlled apparatus 3010 can be different from a user 3005*b* who uses the controlled apparatus 3010 (see FIG. 51). In such a situation as well, with the control system 3001 according to the modification, when abnormality determination is made, the notification that the controlled apparatus 3010 has not been controlled is provided to the user 3005*a* who controls the controlled apparatus 3010. Therefore, the controlled apparatus 3010 can be appropriately managed by the user 3005*a* who controls the controlled apparatus 3010.

(3-4-4-2)

Figure 54:
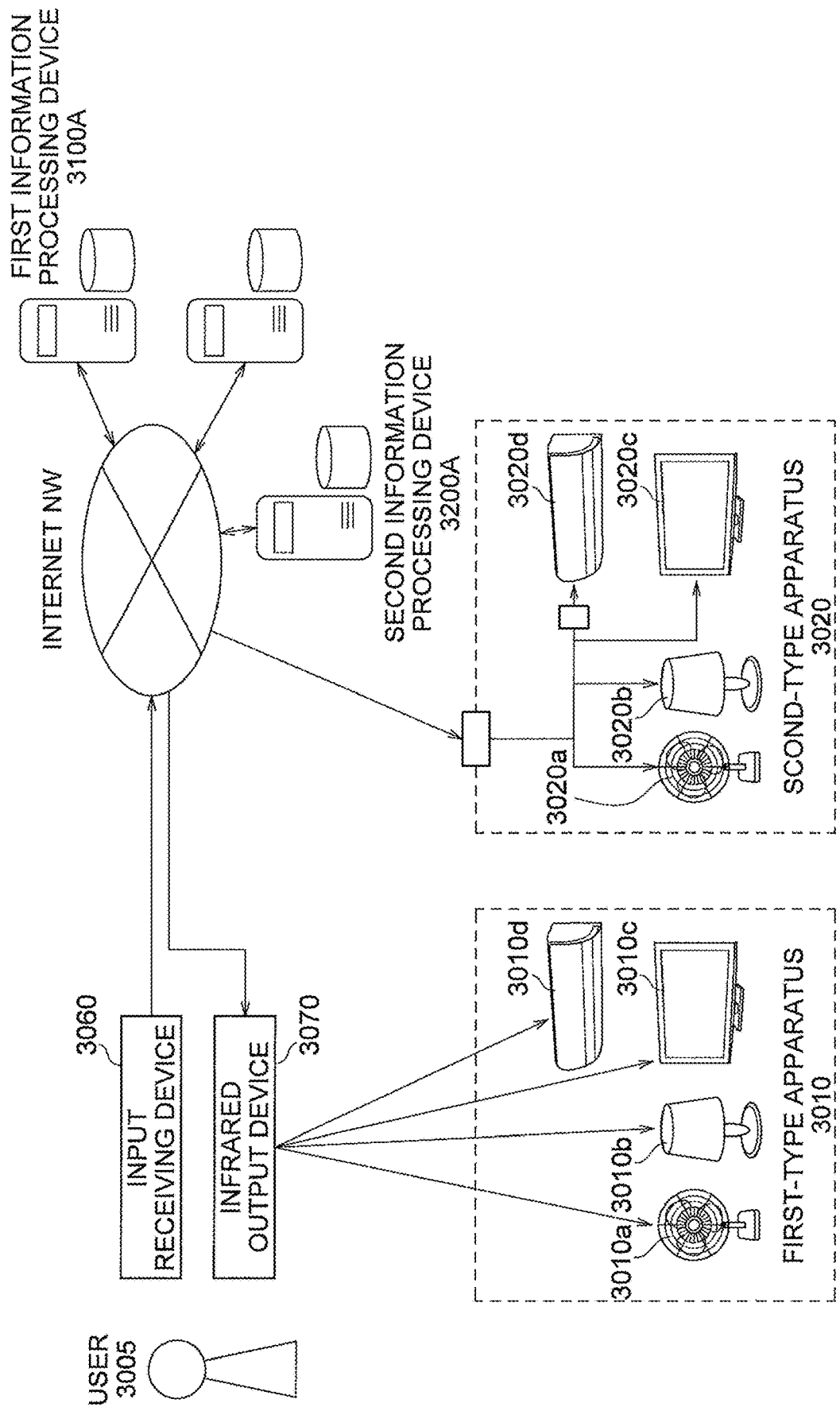
FIG. 54 is a schematic diagram that shows a modification of the control system 3001 according to the embodiment.
Figure 55:
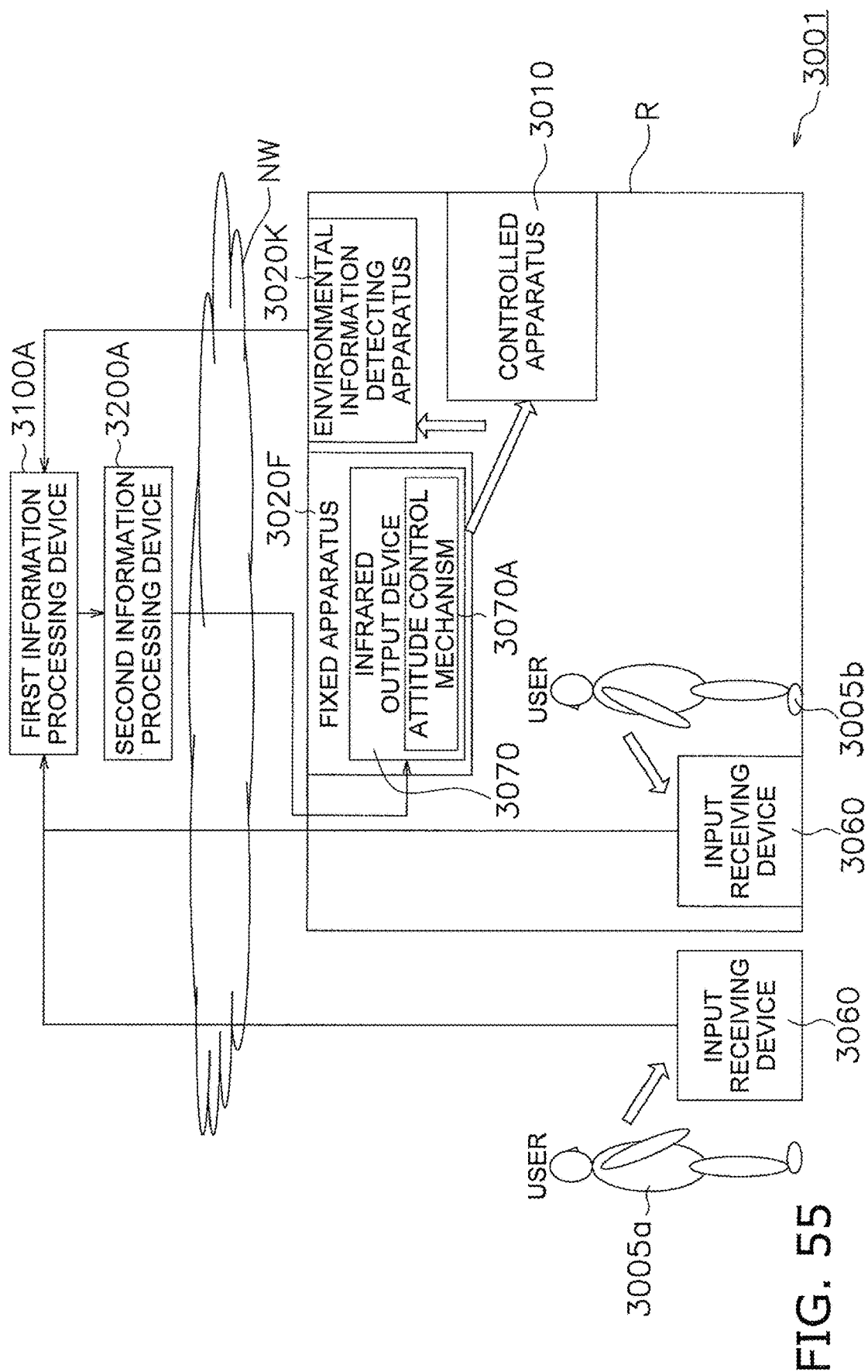
FIG. 55 is a schematic diagram that shows a modification of the control system 3001 according to the embodiment.

The above-described functions of the information processing device 3100 may be executed by multiple information processing in a distributed manner. For example, as shown in FIG. 54 and FIG. 55, the control system 3001 may include a first information processing device 3100A and a second information processing device 3200A instead of the information processing device 3100. Here, the first information processing device 3100A has the function of the above-described input analyzing unit, and the second information processing device 3200A has the other functions. Supplementarily, when a controlled apparatus is controlled by voice input, an enormous amount of processing can be required to analyze voice input. Even in such a case, with the control system 3001, voice analysis can be highly accurately performed by using the first information processing device 3100A that implements neural network, or the like, and that is constructed on the network NW. Thus, even with voice input, a controlled apparatus and a control command can be minutely identified. As a result, the control system 3001 that can easily control any apparatus can be provided.

(3-4-4-3)

In the above description, the information processing device 3100 includes the infrared pattern DB 3104A. Alternatively, the infrared output device 3070 may store this information. In this case, the storage unit of the infrared output device 3070 stores the infrared pattern DB.

(3-4-4-4)

In the above description, the information processing device 3100 includes the relative position DB 3104B. Alternatively, the infrared output device 3070 may store this information. In this case, the storage unit of the infrared output device 3070 stores the relative position DB. Even when the information processing device 3100 or the infrared output device does not include the relative position DB, control over an apparatus can be, of course, implemented by the control system 3001 according to the present embodiment.

[Fourth Invention]

Hereinafter, an operating system 4001 according to an embodiment of the operating system of the present invention will be described with reference to the accompanying drawings.

The following embodiment is a specific example of the present invention and is not intended to limit the technical scope of the present invention. The following embodiment may be modified as needed without departing from the purport of the present invention.

(4-1) General Outline of Equipment System

Figure 56:
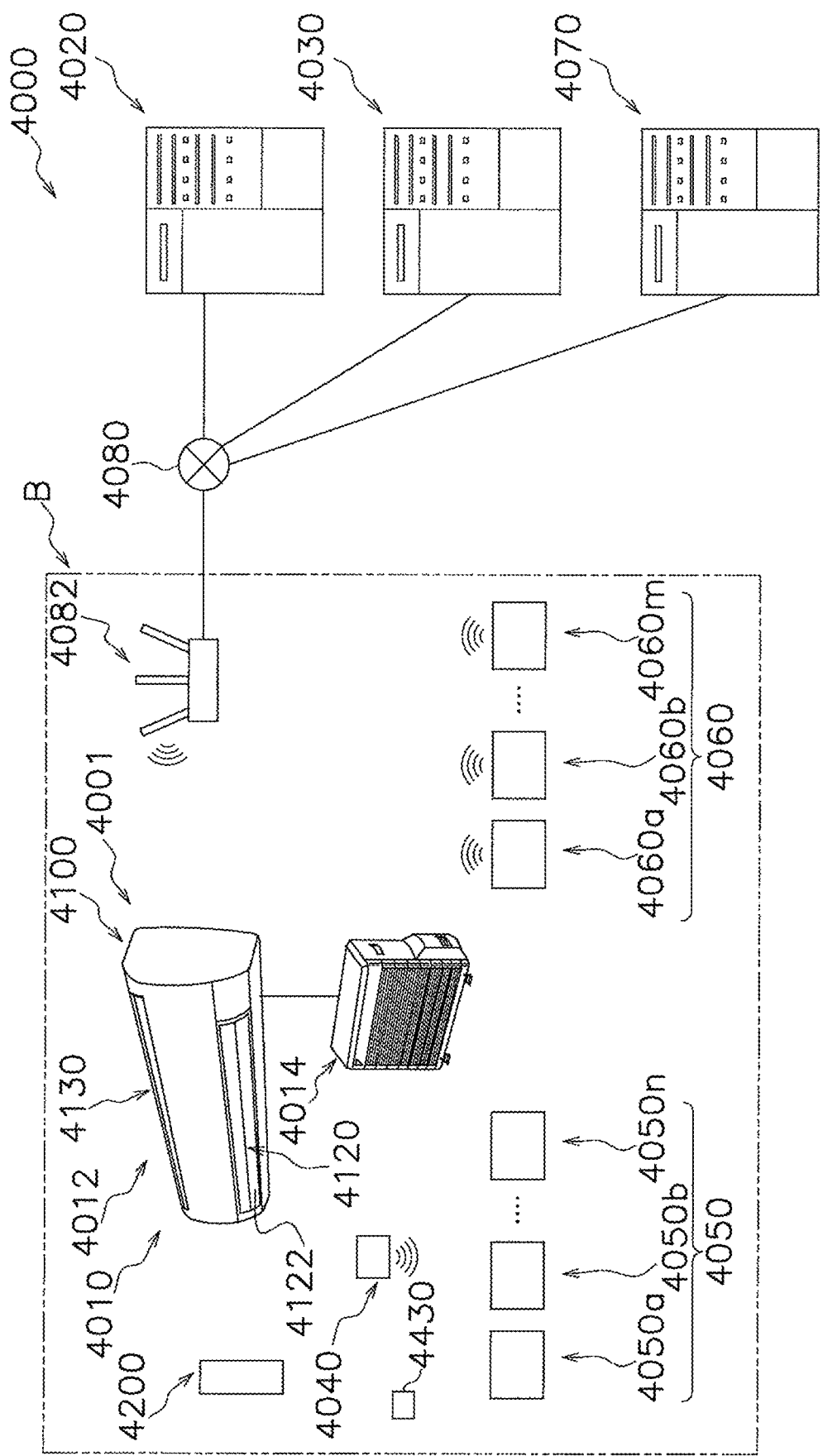
FIG. 56 is a schematic configuration diagram of an equipment system according to one embodiment of the fourth invention.
Figure 57:
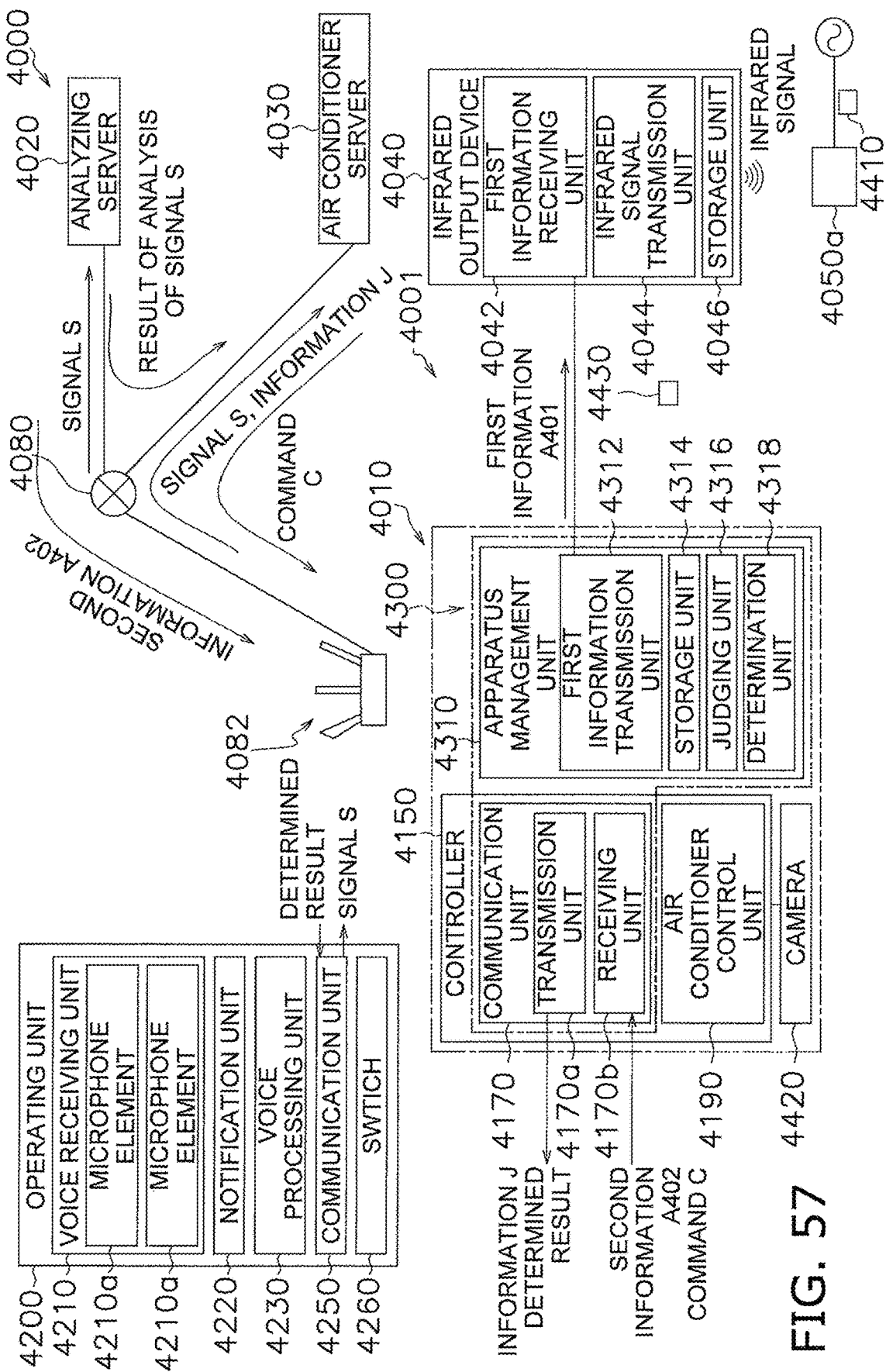
FIG. 57 is a schematic block diagram of the equipment system according to the embodiment, and, in FIG. 57, part of components of the equipment system are not shown.

FIG. 56 is a schematic configuration diagram of an equipment system 4000 according to an embodiment of the fourth invention. FIG. 57 is a schematic block diagram of the equipment system 4000. In FIG. 57, a partial configuration of the equipment system 4000 is not shown.

In the present embodiment, an operating system 4001 is a system that operates an air conditioner 4010, apparatuses 4050*a*, 4050*b*, . . . , 4050*n* included in a first apparatus group (also referred to as first-type apparatuses) 4050, and apparatuses 4060*a*, 4060*b*, . . . , 4060*m* included in a second apparatus group (also referred to as second-type apparatuses) 4060 at a voice command of an operator. In the operating system 4001, the air conditioner 4010, the apparatuses of the first apparatus group 4050, and the apparatuses of the second apparatus group 4060 are operable by input of a voice command to an operating unit 4200. The apparatuses 4050*a*, 4050*b*, . . . , 4050*n* included in the first apparatus group 4050 each are an example of an apparatus to be operated. In other words, the apparatuses 4050*a*, 4050*b*, 4050*n* included in the first apparatus group 4050 are apparatuses operable by an infrared signal, other than the air conditioner 4010.

The equipment system 4000 mainly includes the operating unit 4200, the air conditioner 4010, the first apparatus group 4050, the second apparatus group 4060, an infrared output device (also referred to as infrared transmitter) 4040, an analyzing server 4020, an air conditioner server 4030, and an equipment server 4070 (see FIG. 56 and FIG. 57). The operating system 4001 mainly includes the operating unit 4200, the air conditioner 4010, and the infrared output device 4040. In addition, the operating system 4001 includes a sensor 4410 that measures a current or electric power of the first apparatus group 4050, and an environment sensor 4430 such as an illuminance sensor, a temperature sensor, and a barometric sensor (see FIG. 57).

The air conditioner 4010, the first apparatus group 4050, the second apparatus group 4060, and the infrared output device 4040 are apparatuses placed in a building B (see FIG. 56). For example, the building B is a stand-alone house; however, the building B is not limited thereto. The building B may be an office building, a commercial facility, a factory, or the like. Although not limited, the analyzing server 4020, the air conditioner server 4030, and the equipment server 4070 are ordinarily installed in a place different from the building B.

In FIG. 56, only one building B in which the air conditioner 4010, first apparatus group 4050, and second apparatus group 4060 that are controlled by the operating system 4001 are placed is shown. Alternatively, there may be a plurality of the buildings B. In other words, the operating system 4001 may be a system that controls the operations of the air conditioner 4010, first apparatus group 4050, and second apparatus group 4060 respectively placed in the plurality of buildings B. Here, for the sake of simple description, the number of the buildings B is one.

The numbers of the air conditioners 4010, apparatuses of the first apparatus group 4050, apparatuses of the second apparatus group 4060, infrared output devices 4040, and environment sensors 4430 placed in the building B are not limited to those shown in FIG. 56 and may be one or multiple. Here, the description will be made on the assumption that the numbers of the air conditioners 4010, infrared output devices 4040, and environment sensors 4430 placed in the building B are one and the numbers of the apparatuses of the first apparatus group 4050 and second apparatus group 4060 placed in the building B are multiple.

The operating unit 4200 is installed in the building B and is used to operate the air conditioner 4010, the apparatuses of the first apparatus group 4050, and the apparatuses of the second apparatus group 4060 in the building B. In FIG. 56 and FIG. 57, only one operating unit 4200 is shown; however, the number of the operating units 4200 is not limited to one and may be multiple. For example, the operating units 4200 may be placed at a plurality of locations in the building B.

The operating unit 4200 may be a mobile terminal that can be carried to outside the building B. In other words, the air conditioner 4010, and the apparatuses of the first apparatus group 4050 and second apparatus group 4060 may be configured to be operable from the outside of the building B with the portable operating unit 4200.

(4-2) Detailed Configuration

The operating unit 4200, air conditioner 4010, first apparatus group 4050, second apparatus group 4060, infrared output device 4040, analyzing server 4020, air conditioner server 4030, and equipment server 4070 of the equipment system 4000 will be described below.

(4-2-1) Operating Unit

The operating unit 4200 is used to input operations to the air conditioner 4010, the apparatuses 4050a, 4050b, . . . , 4050n of the first apparatus group 4050, and the apparatuses 4060a, 4060b, . . . , 4060m of the second apparatus group 4060. The operating unit 4200 is an example of a command receiver and receives commands to the apparatuses 4050a, 4050b, 4050n included in the first apparatus group 4050 as voice commands. The operating unit 4200 receives commands to the air conditioner 4010 and the apparatuses 4060a, 4060b, 4060m included in the second apparatus group 4060 as voice commands.

The operating unit 4200 is, for example, installed in the building B. For example, the operating unit 4200 is fixed to a wall surface, or the like, or put on a table or shelf. The operating unit 4200 may be an apparatus that is exclusively used to operate the air conditioner 4010, and the apparatuses of the first apparatus group 4050 and second apparatus group 4060, and that has functions as will be described below. The operating unit 4200 may be an apparatus that further has another function (for example, the function of a clock or music player) in addition to the functions as will be described below.

The operating unit 4200 may be a mobile terminal. Although a type is not limited, the mobile terminal may be a smartphone, a mobile phone, a tablet terminal, a wearable terminal, or the like, having a voice receiving unit. For example, specifically, the operating unit 4200 is a watch-type apparatus that an operator wears to carry on the wrist.

When a plurality of the operating units 4200 is used, each of the plurality of operating units 4200 may be different in type from another one of the operating units 4200.

The operating unit 4200 includes a CPU (not shown) that executes various processes, a storage device (not shown) that stores programs that the CPU runs and various pieces of information, and the like. The operating unit 4200 includes microphone elements 4210a as a voice receiving unit 4210, a speaker as a notification unit 4220, a voice processing chip that executes various processes over voice acquired by the microphone elements 4210a, a wireless LAN adaptor that functions as a communication unit 4250, and the like.

The operating unit 4200 includes the voice receiving unit 4210, a notification unit 4220, a voice processing unit 4230, the communication unit 4250, and a switch 4260 as functional units (see FIG. 57).

(4-2-1-1) Voice Receiving Unit

The voice receiving unit 4210 receives input of voice commands to the air conditioner 4010, the apparatuses of the first apparatus group 4050, and the apparatuses of the second apparatus group 4060.

The voice receiving unit 4210 includes the microphone elements 4210a that receive a voice command. The number of the microphone elements 4210a may be one or may be multiple (in FIG. 57, the number of the microphone elements 4210a is two).

For example, a plurality of the microphone elements 4210a is provided when the operating unit 4200 is a stationary apparatus and the microphone elements 4210a are arranged so as to easily acquire a voice command from different locations. Thus, regardless of the location of an operator (speaker), a voice command is more reliably acquired by the voice receiving unit 4210.

(4-2-1-2) Notification Unit

The notification unit 4220 is a speaker here.

The notification unit 4220 mainly informs that the voice receiving unit 4210 has received a voice command. For example, specifically, when the voice receiving unit 4210 has received a voice command, the notification unit 4220 informs that the voice receiving unit 4210 has received a voice command by speaking a sentence, such as "Voice is accepted" or speaking to read back a received voice command. The notification unit 4220 may be configured to, when the air conditioner 4010 performs various operations, inform the contents of the operations (for example, a sentence, such as "Operation is started"). The notification unit 4220 may be configured to, when the apparatuses of the second apparatus group 4060 perform various operations, inform the contents of the operations.

In addition, the notification unit 4220 informs information about a result determined by a determination unit 4318 of the apparatus management device 4300, which is output (sent) from a transmission unit 4170a of the apparatus management device 4300 of the air conditioner 4010 (described later) to the communication unit 4250. Here, a determined result means a result of determination as to whether the a command content issued to an apparatus of the first apparatus group 4050 with the operating unit 4200 is inconsistent with a behavior of the apparatus.

When the communication unit 4250 has received information indicating that the a command content to an apparatus of the first apparatus group 4050 is not inconsistent with a behavior of the apparatus (the command content is consistent with the behavior), the notification unit 4220 speaks, for example, a sentence, such as "The apparatus has been normally operated". When the communication unit 4250 has received information indicating that the a command content to an apparatus of the first apparatus group 4050 is inconsistent with a behavior of the apparatus, the notification unit 4220 speaks, for example, a sentence, such as "The apparatus has not been normally operated". The word "apparatus" in the sentence may be replaced with, for example, the name of the apparatus.

The sentence that the notification unit 4220 speaks is illustrative, and a sentence that the notification unit 4220 speaks just needs to be determined as needed.

The speaker that serves as the notification unit 4220 does not need to provide a notification by speaking a sentence or a word and may provide a notification by beep sound, or the like.

The notification unit 4220 need not be a speaker. For example, another notification-type annunciator, such as a lamp that provides a notification by light, a vibrator that provides a notification by vibrations, and a display that provides notification by display of information, may be used as the notification unit 4220.

(4-2-1-3) Voice Processing Unit

The voice processing unit 4230 is an integrated circuit that converts a voice command received by the voice receiving unit 4210 to data suitable for communication. Various processes may be implemented by hardware processing or may be implemented by software processing.

For example, the voice processing unit 4230 performs analog-to-digital conversion over a voice command received by the microphone elements 4210a into a digital voice signal and further executes speech compression process in various voice data compression technologies (for example, MP3, or the like). Thus, the voice processing unit 4230 generates a signal S to be transmitted from the communication unit 4250.

The processing contents of the voice processing unit 4230 are illustrative. The voice processing unit 4230 may, for example, perform analog-to-digital conversion over a voice command received by the microphone elements 4210a and generate a digital voice signal as the signal S. The voice processing unit 4230 may convert a voice command received by the microphone elements 4210a into text and generate text data as the signal S.

(4-2-1-4) Communication Unit

The communication unit 4250 is a functional unit for the operating unit 4200 to communicate with the air conditioner 4010, the analyzing server 4020, or the like (see FIG. 57).

The operating unit 4200 is connected to the analyzing server 4020 via a network 4080 (see FIG. 56). Here, the network 4080 is the Internet; however, the network 4080 may be another WAN. The operating unit 4200 is connected to a router 4082 by a wireless LAN, and is connected to the network 4080 via the router 4082 (see FIG. 56). The router 4082 includes a WAN-side interface and a LAN-side interface and establishes connection between a WAN and a LAN. The operating unit 4200 and the router 4082 may be connected not by a wireless LAN but by a wired LAN. The network 4080 may be a LAN.

The communication unit 4250 is, for example, a wireless LAN adaptor that carries out wireless communication with the router 82.

The communication unit 4250 transmits a signal S associated with a voice command received by the voice receiving unit 4210 (signal S generated from a voice command by the voice processing unit 4230) (see FIG. 57). Specifically, the communication unit 4250 transmits a signal S associated with a voice command received by the voice receiving unit 4210 to the analyzing server 4020 via the network 4080 (see FIG. 57).

The communication unit 4250 may transmit a signal S further to the air conditioner server 4030 or the equipment server 4070. In other words, the communication unit 4250 may transmit a signal S to a plurality of addresses (for example, the analyzing server 4020 and the air conditioner server 4030) (see FIG. 57).

The communication unit 4250 also receives information about a result determined by the determination unit 4318 of the apparatus management device 4300, which is output (sent) from the transmission unit 4170a of the apparatus management device 4300 of the air conditioner 4010 (described later) to the communication unit 4250.

The communication unit 4250 may be configured to receive information about the contents of operations of the air conditioner 4010 and apparatuses 4060a, 4060b, . . . , 4060m of the second apparatus group 4060, which are respectively transmitted from the transmission unit 4170a of the air conditioner 4010 and transmission units (not shown) of the apparatuses 4060a, 4060b, . . . , 4060m of the second apparatus group 4060.

(4-2-1-5) Switch

The switch 4260 is a switch for changing the operational status of the voice receiving unit 4210.

Although not limited, the switch 4260 is a push button switch. When the switch 4260 is pushed down, the operational status of the voice receiving unit 4210 is switched between a sleep state of not receiving a voice command and an active state of being able to receive a voice command.

The operational status of the voice receiving unit 4210 may be changed between the sleep state and the active state each time the switch 4260 is pushed down. Alternatively, the operational status of the voice receiving unit 4210 may be changed from the sleep state to the active state only for a predetermined time as the switch 4260 is pushed down.

The operating unit 4200 does not need to include the switch 4260, and the operational status of the voice receiving unit 4210 may be always set to the active state. However, to avoid a situation that the voice receiving unit 4210 receives voice at unintended timing (to avoid a situation that the air conditioner 4010 or any one of the apparatuses of the first apparatus group 4050 and the second apparatus group 4060 erroneously operates without an intention), the switch 4260 is desirably provided in the operating unit 4200.

(4-2-2) Air Conditioner

The air conditioner 4010 is an air conditioner operable by inputting a voice command to the voice receiving unit 4210 of the operating unit 4200. Although a voice command is not limited, a voice command is, for example, voice, such as "Turn on air conditioning" and "Set the set temperature to 25 degrees C.". The air conditioner 4010 may be configured to be operable with a general remote controller in addition to a voice operation.

The air conditioner 4010 also has a management function of managing the apparatuses 4050a, 4050b, . . . 4050n of the first apparatus group 4050. Specifically, the air conditioner 4010 includes the apparatus management device 4300 that manages the apparatuses 4050a, 4050b, . . . , 4050n of the first apparatus group 4050.

The air conditioner 4010 mainly includes an indoor unit 4012, an outdoor unit 4014, a connection pipe (not shown) connecting these units, a controller 4150, an apparatus management unit 4310, and a camera 4420 (see FIG. 56 and FIG. 57). The apparatus management unit 4310 and part of the controller 4150 (specifically, the communication unit 4170) function as the apparatus management device 4300.

The air conditioner 4010 is a device that air-conditions an air-conditioned space. The air-conditioned space is, for example, a room in which the indoor unit 4012 is installed in the building B.

Figure 58A:
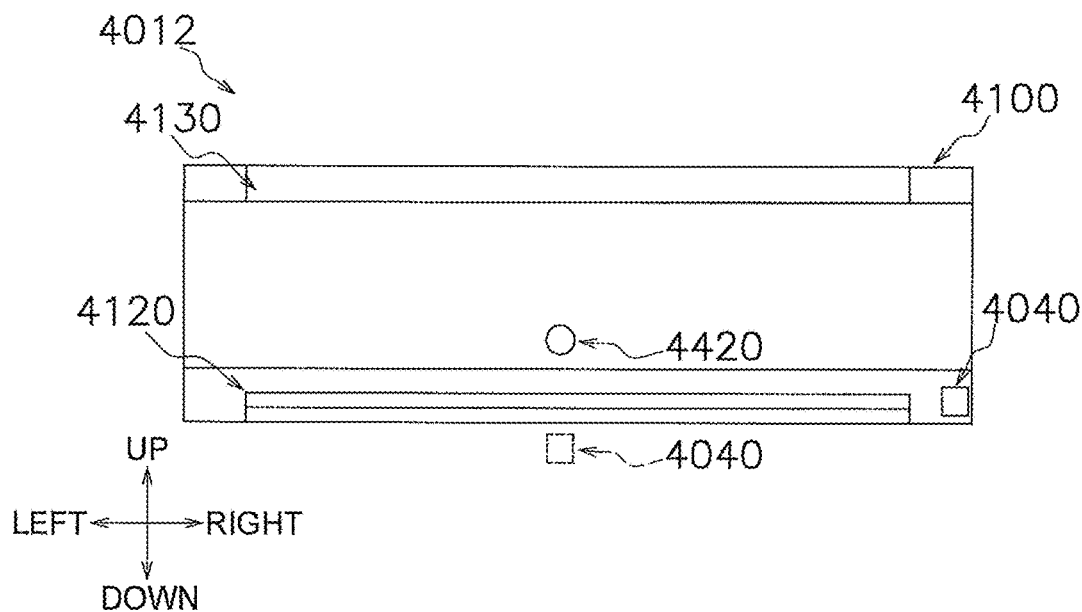
FIG. 58A is a schematic diagram of a state where a wall-hanging indoor unit of an air conditioner and an infrared output device are installed in an operating system according to the embodiment.

In the present embodiment, the indoor unit 4012 is of a wall-hanging type. FIG. 58A is a schematic front view of the indoor unit 4012 of the air conditioner 4010 according to the present embodiment. Hereinafter, expressions, such as "left", "right", "up", and "down", may be used to describe directions or orientations, the orientations indicated by these expressions are in accordance with the orientations of arrows in FIG. 58A unless otherwise specified.

The indoor unit 4012 includes a body 4100 whose back side is mounted on a wall (see FIG. 56 and FIG. 58A). The body 4100 is a casing that accommodates an indoor-side heat exchanger, a fan, and a fan motor (not shown) inside. The body 4100 has an air outlet 4120 and an air inlet 4130 (see FIG. 56 and FIG. 58A).

The air inlet 4130 is an opening for drawing air in the air-conditioned space into the body 4100. The air inlet 4130 extends in a right and left direction in front view as a longitudinal direction (see FIG. 58A). The air inlet 4130 is formed in the region from the front upper part of the body 4100 to the top surface of the body 4100.

The air outlet 4120 is an opening for blowing conditioned air to the air-conditioned space. The air outlet 4120 is formed at the lower part of the body 4100. Flaps 4122 for adjusting the wind direction in an up and down direction are disposed at the air outlet 4120 (see FIG. 56).

Figure 58B:
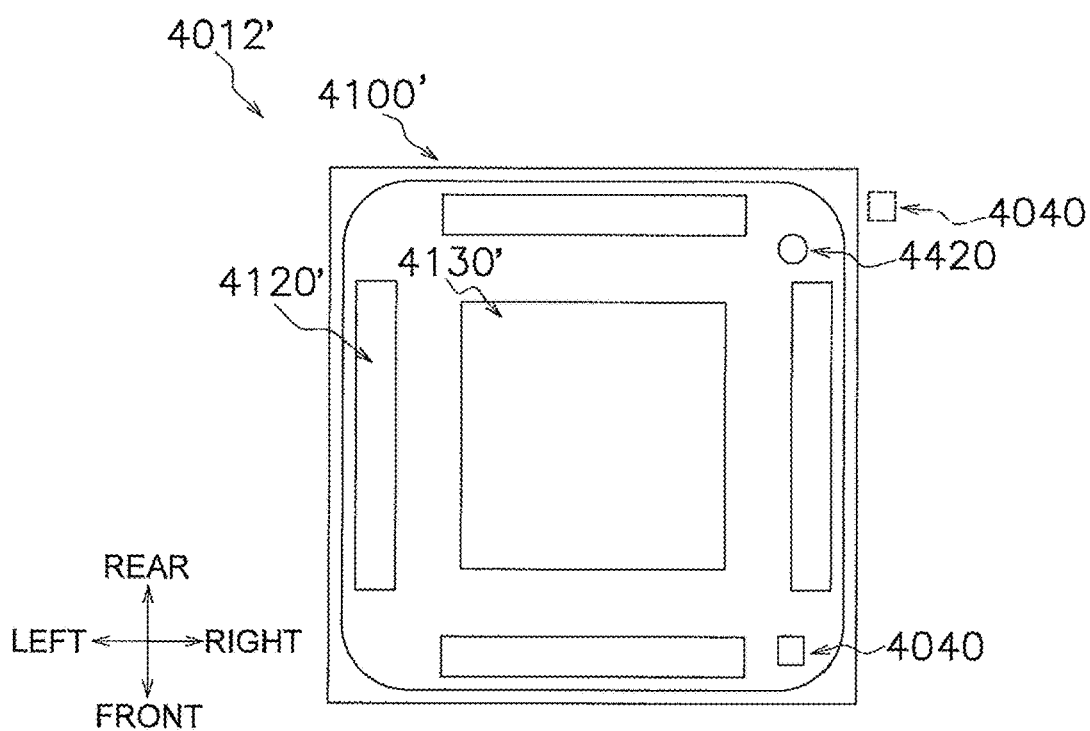
FIG. 58B is a schematic diagram of a state where a ceiling-concealed indoor unit of an air conditioner and an infrared output device are installed in the operating system according to the embodiment.

The type of the indoor unit of the air conditioner is not limited to a wall-hanging type. For example, the air conditioner may use a ceiling concealed indoor unit 4012 shown in FIG. 58B. FIG. 58B is a schematic bottom view of the indoor unit 4012 of the air conditioner 4010 according to the present embodiment. Hereinafter, expressions, such as "front", "rear", "left", and "right", may be used to describe directions or orientations, the orientations indicated by these expressions are in accordance with the orientations of arrows in FIG. 58B unless otherwise specified. An indoor unit 4012' according to another example is, for example, a unit that blows air in four directions.

The indoor unit 4012' includes a body 4100' (see FIG. 58B). The body 4100' is a casing that accommodates an indoor-side heat exchanger, a fan, and a fan motor (not shown) inside. The body 4100' has air outlets 4120' and an air inlet 4130' (see FIG. 58B).

In the body 4100', the air inlet 4130' is formed in a square shape (see FIG. 58B). The air inlet 4130' is formed at the center portion of the body 4100' in bottom view (see FIG. 58B).

In the body 4100', the air outlets 4120' are formed at four portions at the lower face of the body 4100'. The air outlets 4120' are respectively formed near a front edge, near a rear edge, near a left edge, and near a right edge along the four sides of the square body 4100' in bottom view. The air outlets 4120' are formed to surround the air inlet 4130' disposed at the center portion of the body 4100' in bottom view.

Although the drawing and description are omitted, an indoor unit of an air conditioner may be, for example, a ceiling-suspended indoor unit or a floor-mounted indoor unit, other than the types described here.

An indoor unit of an air conditioner may be a built-in unit in which the body is not exposed to an air-conditioned space or almost not exposed to an air-conditioned space. The body of a built-in unit is disposed in a wall or above a ceiling. For example, in a built-in unit, air blown from an air outlet of the body is transmitted to an opening provided at a wall surface or a ceiling surface via a duct and is blown to an air-conditioned space.

In the air conditioner 4010, the indoor unit 4012 and the outdoor unit 4014 are connected via the connection pipe, so an indoor heat exchanger (not shown) of the indoor unit 4012 and a compressor, outdoor heat exchanger, expansion valve, and the like (not shown), of the outdoor unit 4014 are connected by pipes, with the result that a refrigerant circuit is formed. In the air conditioner 4010, when refrigerant is circulated in a refrigerant circuit, a space where the indoor unit 4012 is installed is cooled or heated.

The operation principle and behaviors of the air conditioner 4010 that uses a vapor compression refrigeration cycle are generally widely known, so the description thereof is omitted. The air conditioner 4010 need not be an air conditioner that is able to perform both cooling and heating of an air-conditioned space and may be an air conditioner exclusive for cooling or an air conditioner exclusive for heating.

In the present embodiment, in the air conditioner 4010, heat exchange is performed in an indoor heat exchanger of the indoor unit 4012 between refrigerant flowing through the inside of the indoor heat exchanger and air in the air-conditioned space; however, the air conditioner according to the present invention is not limited to such an apparatus. For example, the air conditioner 4010 may be a device in which heat exchange is performed in an indoor heat exchanger of the indoor unit 4012 (fan coil unit) between cool water or heat water flowing through the inside of the indoor heat exchanger and air in the air-conditioned space.

(4-2-2-1) Controller

The controller 4150 is a control device that controls the operation of the air conditioner 4010.

The controller 4150 includes a control board (not shown) of the indoor unit 4012 and a control board (not shown) of the outdoor unit 4014. CPUs of the control boards or other components of the indoor unit 4012 and outdoor unit 4014, which are components of the controller 4150, execute various processes by running various programs stored in storage devices of the control boards and other components. The controller 4150 includes a device, or the like, such as a wireless LAN adaptor that functions as the communication unit 4170 (described later).

The controller 4150 mainly includes the communication unit 4170 and an air conditioner control unit 4190 as functional units.

(4-2-2-1-1) Communication Unit

The communication unit 4170 is used for the air conditioner 4010 to communicate with the operating unit 4200, the analyzing server 4020, or the air conditioner server 4030 (see FIG. 57). The communication unit 4170 is not only used to control the air conditioner 4010 but also functions as part of the apparatus management device 4300.

The air conditioner 4010 (communication unit 4170) is connected to the operating unit 4200, the analyzing server 4020, and the air conditioner server 4030 via the network 4080 (see FIG. 56). The air conditioner 4010 is connected to the router 4082 by a wireless LAN and is connected to the network 4080 via the router 4082 (see FIG. 56). Alternatively, the air conditioner 4010 and the router 4082 may be connected not by a wireless LAN but by a wired LAN.

The communication unit 4170 is, for example, a wireless LAN adaptor that carries out wireless communication with the router 4082. The communication unit 4170 includes a transmission unit 4170a that transmits information and a receiving unit 4170b that receives information as functional units (see FIG. 57).

The transmission unit 4170a, for example, outputs (transmits) information about a result determined by the determination unit 4318 of the apparatus management device 4300 (described later) to the communication unit 4250 of the operating unit 4200 (see FIG. 57). In other words, the transmission unit 4170a is an example of an output unit of an apparatus management device. Information about a result determined by the determination unit 4318 is information about a result determined by the determination unit 4318 as to whether a command content given to an apparatus of the first apparatus group 4050 with the operating unit 4200 is inconsistent with a behavior of the apparatus. For example, information about a determined result contains an apparatus identification code that indicates information on which apparatus among the plurality of apparatuses 4050a, 4050b, . . . , 4050n of the first apparatus group 4050 and information that indicates whether the a command content given to the apparatus is inconsistent with an actual behavior.

The transmission unit 4170*a* desirably transmits information J on a state quantity regarding at least one of the air conditioner 4010 and the air-conditioned space to the air conditioner server 4030 (see FIG. 57). Although not limited, examples of the state quantity regarding the air conditioner 4010 include a temperature or pressure of refrigerant, which is measured by a sensor (not shown) at various locations in a refrigerant circuit, the number of rotations of an inverter control motor (not shown) of a compressor of the outdoor unit 4014, and an opening degree of an expansion valve of the outdoor unit 4014. Although a state quantity regarding an air-conditioned space is not limited, the state quantity includes a measured temperature, or the like, in an air-conditioned space.

The receiving unit 4170*b*, for example, receives from the outside a command C corresponding to a signal S transmitted by the communication unit 4250 of the operating unit 4200 (particularly, a signal S based on a voice command related to control over the air conditioner 4010). More specifically, the receiving unit 4170*b* receives a command C generated based on a result of analysis of the signal S (particularly, a signal S based on a voice command related to control over the air conditioner 4010) by the analyzing server 4020. Preferably, the receiving unit 4170*b* receives a command C generated by the air conditioner server 4030 based on a result of analysis of a signal S (particularly, a signal S based on a voice command related to control over the air conditioner 4010) by the analyzing server 4020 and information J on a state quantity transmitted from the transmission unit 4170*a* to the air conditioner server 4030.

Although not limited, the command C is related to, for example, at least one of the on/off state of the air conditioner 4010, switching of an operating mode (such as cooling, heating, dehumidifying, or air sending) of the air conditioner 4010, change of a set temperature (target temperature of an air-conditioned space), a target value of the number of rotations of an inverter control motor (not shown) of a compressor of the outdoor unit 4014, a target value of the opening degree of an expansion valve of the outdoor unit 4014, and a target value of the rotation speed of a fan motor under inverter control of the indoor unit 4012.

The receiving unit 4170*b*, for example, receives from the outside second information A402 on a command content to an apparatus of the first apparatus group 4050, corresponding to a signal S transmitted by the communication unit 4250 of the operating unit 4200 (particularly, a signal S based on a voice command related to control over an apparatus of the first apparatus group 4050). The receiving unit 4170*b* is an example of a command information receiving unit of the apparatus management device. The receiving unit 4170*b* specifically receives second information A402 on a command content to an apparatus of the first apparatus group 4050, corresponding to a signal S transmitted by the communication unit 4250 of the operating unit 4200 (particularly, a signal S based on a voice command related to control over an apparatus of the first apparatus group 4050) transmitted by the analyzing server 4020. The second information A402 contains an apparatus identification code that indicates a command to which apparatus among the apparatuses 4050*a*, 4050*b*, . . . , 4050*n* of the first apparatus group 4050 and information that indicates a command content to the apparatus. For example, specifically, the second information A402 contains an apparatus identification code that indicates the apparatus 4050*a* and information that indicates the command content "Start".

As the receiving unit 4170*b* receives second information A402, the second information A402 is stored in the storage unit 4314 of the apparatus management unit 4310 (described later). In addition, as the receiving unit 4170*b* receives second information A402, the first information transmission unit 4312 of the apparatus management unit 4310 (described later) generates first information A401 based on the second information A402 received by the receiving unit 4170*b* and transmits the generated first information A401 to the infrared output device 4040.

The second information A402 need not contain an apparatus identification code and information that indicates a command content to the apparatus, as described above. For example, the second information A402 may be text information that is an analyzed result of a signal S that is a voice signal. Interpretation of text information (such as interpretation of the a command content) may be performed at the apparatus management device 4300 side.

(4-2-2-1-2) Air Conditioner Control Unit

The air conditioner control unit 4190 controls the operation of the air conditioner 4010 in response to a command C that is received by the receiving unit 4170*b*, an ordinary command from a remote controller (not shown), or the like. For example, the air conditioner control unit 4190 controls the operation of the compressor and expansion valve of the outdoor unit 4014, the fan of the indoor unit 4012, and other components, based on settings (such as a set temperature) of the air conditioner 4010, measured values of various sensors (not shown), and the like, in response to a command C that is received by the receiving unit 4170*b*. The air conditioner control unit 4190 may control the operations of the various units of the air conditioner 4010 by further using information (for example, information, such as where a person is present in an air-conditioned space) acquired by the camera 4420 (see FIG. 58A and FIG. 58B) of the air conditioner 4010.

(4-2-2-2) Apparatus Management Device

The apparatus management device 4300 manages the apparatuses 4050*a*, 4050*b*, 4050*n* of the first apparatus group 4050 to be managed (that are apparatuses to be operated by the operating system 4001).

The apparatus management device 4300 includes the apparatus management unit 4310 and the communication unit 4170. The apparatus management unit 4310 of the apparatus management device 4300 includes a control board (not shown) provided in the indoor unit 4012 and/or the outdoor unit 4014. Various programs and various data are stored in the storage device of the control board. The CPU of the control board executes various processes by running various programs.

The apparatus management unit 4310 includes the first information transmission unit 4312, the storage unit 4314, a judging unit 4316, and the 4 determination unit 318 as functional units (see FIG. 57).

Hereinafter, the apparatus management unit 4310 will be described. The communication unit 4170 that is a component of the apparatus management device 4300 has been already described as part of the controller 4150, so the description is omitted here.

(4-2-2-2-1) First Information Transmission Unit

The first information transmission unit 4312 transmits first information A401 to the infrared output device 4040.

First information A401 is information about a command to any one of the apparatuses 4050a, 4050b, . . . , 4050n of the first apparatus group 4050.

As the receiving unit 4170b of the communication unit 4170 receives second information A402, the first information transmission unit 4312 generates first information A401 based on the second information A402 and transmits the generated first information A401 to the infrared output device 4040. Second information A402 is information based on an analyzed result of a signal S by the analyzing server 4020. In other words, first information A401 that is generated based on second information A402 is information based on an analyzed result of a signal S by the analyzing server 4020.

For example, it is assumed that the receiving unit 4170b of the communication unit 4170 has received second information A402 that contains an apparatus identification code indicating the apparatus 4050a that is an apparatus to be operated and information that indicates the command content "Start". At this time, the first information transmission unit 4312 transmits a signal instructing the infrared output device 4040 to transmit a command to start operation to the apparatus 4050a by an infrared signal as first information A401.

The first information transmission unit 4312 may transmit first information A401 at timing other than when the receiving unit 4170b has received second information A402. For example, when the determination unit 4318 determines that the a command content given to an apparatus of the first apparatus group 4050 is inconsistent with the behavior of the apparatus, the first information transmission unit 4312 may transmit (retransmit) first information A401 to the infrared output device 4040. Retransmission of first information A401 by the first information transmission unit 4312 will be described later.

The apparatus management device 4300 is connected to the infrared output device 4040 via a communication line. The first information transmission unit 4312 transmits first information A401 to the infrared output device 4040 via the communication line. However, the apparatus management device 4300 may be wirelessly connected to the infrared output device 4040, and the first information transmission unit 4312 may wirelessly transmit first information A401 to the infrared output device 4040.

(4-2-2-2-2) Storage Unit

Various programs and various data are stored in the storage unit 4314.

Data that is stored in the storage unit 4314 includes various pieces of information regarding the apparatuses 4050a, 4050b, . . . , 4050n of the first apparatus group 4050 to be managed by the apparatus management device 4300.

For example, a list of the apparatuses of the first apparatus group 4050 to be managed by the apparatus management device 4300 is stored in the storage unit 4314. The apparatuses to be managed by the apparatus management device 4300 are, for example, apparatuses to which the infrared output device 4040 disposed in the indoor unit 4012 or near the indoor unit 4012 is able to transmit an infrared signal (placed at locations where the apparatuses are able to receive an infrared signal that is transmitted from the infrared output device 4040).

For example, as the receiving unit 4170b receives second information A402, the second information A402 received by the receiving unit 4170b is stored in the storage unit 4314. For example, it is assumed that the receiving unit 4170b of the communication unit 4170 has received second information A402 that contains an apparatus identification code indicating the apparatus 4050a that is an apparatus to be operated and information that indicates the command content "start". In this case, information ("Start") that indicates the command content is stored in the storage unit 4314 as information regarding the apparatus 4050a.

A behavior judged by the judging unit 4316 (described later) is desirably stored in the storage unit 4314 one by one for the apparatuses 4050a, 4050b, . . . , 4050n of the first apparatus group 4050.

Figures 59, 60:
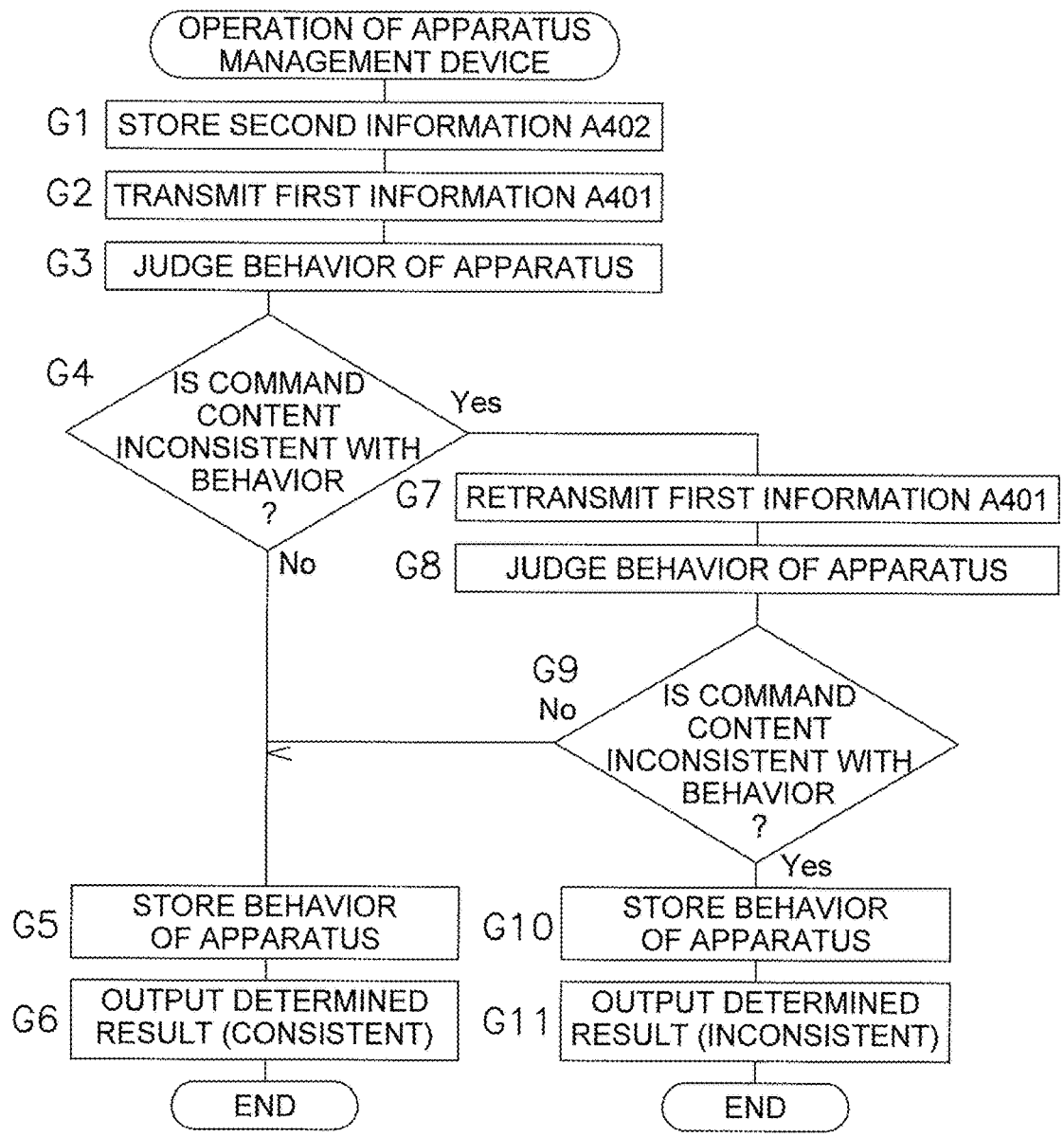
FIG. 59 is a flowchart that illustrates the operation of an apparatus management device when an apparatus of a first apparatus group is operated according to the embodiment.
FIG. 60 is an example of a list of a command content to an apparatus and a behavior of the apparatus for each apparatus, stored in a storage unit of the apparatus management device of the air conditioner according to the embodiment.

In other words, as shown in FIG. 60, for all the apparatuses 4050a, 4050b, . . . , 4050n of the first apparatus group 4050 to be managed by the apparatus management device 4300, the apparatus identification code that identifies an apparatus, the a command content to the apparatus, and the behavior of the apparatus are desirably stored in the storage unit 4314 in association with one another. When such information is held, the apparatus management device 4300 can hold whether the behavior of each of the apparatuses 4050a, 4050b, . . . , 4050n of the first apparatus group 4050 is inconsistent with the command content.

(4-2-2-2-3) Judging Unit

The judging unit 4316 judges the behavior of each of apparatuses of the first apparatus group 4050 based on an operational status that is detected by an operational status detecting unit that detects the operational statuses of the apparatuses of the first apparatus group 4050.

The operational status detecting unit, for example, includes at least one of the microphone elements 4210a of the voice receiving unit 4210 of the operating unit 4200, the camera 4420 of the air conditioner 4010, the sensor 4410 that measures a current or current of each of the apparatuses of the first apparatus group 4050, and an environment sensor 4430 (see FIG. 57). In FIG. 57, only the sensor 4410 that measures a current or electric power of the apparatus 4050a of the first apparatus group 4050 is shown; however, the sensor 4410 may be provided for each of the apparatuses 4050a, 4050b, . . . , 4050n of the first apparatus group 4050. The environment sensor 4430 is, for example, an illuminance sensor, a temperature sensor, a barometric sensor, or the like. The environment sensor 4430 disposed in the building B is not limited to one type, and multiple types of environment sensors may be disposed in the building B. Although a communication line, and other components, are shown in FIG. 57, the apparatus management device 4300 is connected to the microphone elements 4210a, the sensor 4410, the camera 4420, and the environment sensor 4430 as the operational status detecting unit so as to be communicable in a wireless or wired manner, and is configured to be able to acquire information from the devices 4210a, 4410, 4420, 4430.

Among the illustrated microphone elements 4210a, the camera 4420, the sensor 4410, and the environment sensor 4430, which one of the devices is used as the operational status detecting unit in the operating system 4001 may be selected as needed according to the types of the apparatuses 4050a, 4050b, . . . , 4050n of the first apparatus group 4050, of which the operational status is detected, and the characteristics of the apparatuses. The operating system 4001 may include all the illustrated apparatuses 4210a, 4410, 4420, 4430 as the operational status detecting units or may include only part of the apparatuses 4210a, 4410, 4420, 4430 as the operational status detecting unit(s). The operating system 4001 may use a different one of the apparatuses 4210a, 4410, 4420, 4430 as the operational status detecting unit according to the apparatus of the first apparatus group 4050. For example, the sensor 4410 may be used as the operational status detecting unit for the apparatus 4050a, and the microphone elements 4210a may be used as the operational status detecting unit for the apparatus 4050b.

When the microphone elements 4210a are used as the operational status detecting unit, the operational status detecting unit detects, for example, an operation sound of an apparatus of the first apparatus group 4050 or a notification sound at the time when an apparatus of the first apparatus group 4050 performs a certain operation (voice, such as beep sound, that an apparatus of the first apparatus group 4050 emits from the speaker at the time of various operations) as the operational status of the apparatus of the first apparatus group 4050.

When the camera 4420 is used as the operational status detecting unit, the operational status detecting unit, for example, detects the motion of an apparatus of the first apparatus group 4050 or turning on or off a lamp, which indicates a behavior and is provided in an apparatus of the first apparatus group 4050, as the operational status of the apparatus of the first apparatus group 4050.

When the sensor 4410 is used as the operational status detecting unit, the operational status detecting unit detects the magnitude of current/electric power that is supplied to an apparatus of the first apparatus group 4050 as the operational status of the apparatus of the first apparatus group 4050.

When the environment sensor 4430 is used as the operational status detecting unit, the operational status detecting unit detects an environmental value (for example, illuminance, temperature, atmospheric pressure, or the like) that changes according to a behavior of an apparatus of the first apparatus group 4050 as the operational status of the apparatus of the first apparatus group 4050. The type of the environment sensor 4430 that is used as the operational status detecting unit in the operating system 4001 may be determined as needed according to the type, or the like, of an apparatus whose operational status is intended to be detected.

The behavior of an apparatus of the first apparatus group 4050, which is judged by the judging unit 4316, desirably contains, for example, a start or stop of the apparatus of the first apparatus group 4050.

The behavior of an apparatus of the first apparatus group 4050, which is judged by the judging unit 4316, desirably contains, for example, setting of the level of the operation of the apparatus of the first apparatus group 4050.

Setting of the level of the operation is, for example, setting of the air volume of an electric fan when the apparatus of the first apparatus group 4050 is the electric fan. Although not limited, for example, the judging unit 4316 is able to judge a set air volume of an electric fan by detecting a wind noise with the microphone elements 4210a or detecting a current/electric power value with the sensor 4410 and comparing the detected result with the prestored magnitude of sound or current/electric power value at the time of setting of the level.

The level of the operation is, for example, setting of brightness when the apparatus of the first apparatus group 4050 is a lighting device that is able to change the level of brightness. Although not limited, for example, the judging unit 4316 is able to judge a set brightness of the lighting device by detecting an illuminance with an illuminance sensor that is an example of the environment sensor 4430 and comparing the detected result with a prestored illuminance at the time of setting of each brightness.

The level of the operation is, for example, volume setting when the apparatus of the first apparatus group 4050 is an audio instrument. Although not limited, for example, the judging unit 4316 is able to judge a set volume of the audio instrument by detecting a sound with the microphone elements 4210a and comparing the detected result with a preset magnitude of sound at the time of setting of each volume.

(4-2-2-2-4) Determination Unit

The determination unit 4318 determines whether the behavior of an apparatus of the first apparatus group 4050 is inconsistent with the a command content to the apparatus based on the behavior of the apparatus and second information on the command content to the apparatus.

Here, the case where the determination unit 4318 carries out determination as to the apparatus 4050a of the first apparatus group 4050 (when the receiving unit 4170b has received second information A402 containing the apparatus identification code that indicates the apparatus 4050a and information that indicates the a command content to the apparatus 4050a) will be described in detail as an example. For example, here, it is assumed that the receiving unit 4170b has received second information A402 containing the apparatus identification code of the apparatus 4050a and information that indicates the command content "Start".

The receiving unit 4170b receives the above-described second information A402, the first information transmission unit 4312 transmits a signal instructing the infrared output device 4040 to transmit a command to start the apparatus 4050a by an infrared signal as first information A401, and then the determination unit 4318 acquires a result judged by the judging unit 4316. The determination unit 4318 determines whether the behavior of the apparatus 4050a (here, whether the apparatus 4050a is operating) is inconsistent with the command content to the apparatus 4050a, stored in the storage unit 4314 (here, "Start") (that is, whether the behavior is consistent with the command content).

When the determination unit 4318 determines that the behavior of the apparatus 4050a is inconsistent with the command content to the apparatus 4050a, the first information transmission unit 4312 retransmits the first information A401 to the infrared output device 4040 (see step G7 in FIG. 59) as will be described later.

A result determined by the determination unit 4318 (whether the behavior of the apparatus 4050a is inconsistent with the command content to the apparatus 4050a) is output by the transmission unit 4170a to the communication unit 4250 of the operating unit 4200 (see step G6 and step G10 in FIG. 59) as will be described later. The notification unit 4220 of the operating unit 4200 informs an operator, or the like, of the result determined by the determination unit 4318 and received by the communication unit 4250.

(4-2-2-2-5) Operation of Apparatus Management Device when Apparatus of First Apparatus Groups is Operated The operation of the apparatus management device 4300 when any one of the apparatuses 4050a, 4050b, ..., 4050n of the first apparatus group 4050 is operated will be described below. Here, the operation of the apparatus management device 4300 when the apparatus 4050a is operated will be described as an example; however, this also applies to the case where another one of the apparatuses 4050b, ..., 4050n is operated.

Here, the following description will be made on the assumption that the receiving unit 4170b has received second information A402 containing an apparatus identification code that indicates the apparatus 4050a that is an apparatus to be operated and information that indicates the command content "Start".

First, in step G1, second information A402 received by the receiving unit 4170b is stored in the storage unit 4314. Specifically, information that indicates the command content (here, "Start") is stored in the storage unit 4314 as information related to the apparatus 4050a (information associated with the apparatus identification code that indicates the apparatus 4050a).

After that, in step G2, the first information transmission unit 4312 generates a signal instructing the infrared output device 4040 to transmit a command to operate to the apparatus 4050a by an infrared signal as first information A401 by consulting the second information A402 stored in the storage unit 4314. The first information transmission unit 4312 transmits the first information A401 to the infrared output device 4040.

Subsequently, after a lapse of a predetermined time from execution of step G2, the judging unit 4316 judges the behavior of the apparatus 4050a based on the operational status detected by the operational status detecting unit that detects the operational status of the apparatus 4050a (step G3).

Then, in step G4, the determination unit 4318 determines whether the behavior of the apparatus 4050a, judged by the judging unit 4316 in step G3, is inconsistent with the command content on the apparatus 4050a, stored in the storage unit 4314. When it is determined in step G4 that there is no inconsistency (that is, it is determined that the behavior is consistent with the command content), the process proceeds to step G5; whereas, when it is determined that there is inconsistency, the process proceeds to step G7.

In step G5, the behavior of the apparatus 4050a (the content judged by the judging unit 4316 in step G3) is stored in the storage unit 4314. Specifically, as shown in FIG. 60, an apparatus identification code that indicates an apparatus, the a command content to the apparatus, and the behavior of the apparatus, judged by the judging unit 4316, are stored in the storage unit 4314 in association with one another.

Subsequently, in step G6, the transmission unit 4170a outputs (transmits) a result determined by the determination unit 4318 (whether the behavior of the apparatus 4050a is inconsistent with the command content to the apparatus 4050a) to the communication unit 4250 of the operating unit 4200. Particularly, in step G6, the transmission unit 4170a transmits the fact that there is no inconsistency (the fact that the behavior of the apparatus 4050a is consistent with the command content to the apparatus 4050a) to the communication unit 4250 of the operating unit 4200.

In step G7, the first information transmission unit 4312 retransmits the first information A401 transmitted in step G2 to the infrared output device 4040.

Subsequently, after a lapse of a predetermined time from execution of step G7, the judging unit 4316 judges the behavior of the apparatus 4050a based on the operational status detected by the operational status detecting unit that detects the operational status of the apparatus 4050a (step G8).

After that, in step G9, the determination unit 4318 determines whether the behavior of the apparatus 4050a, judged by the judging unit 4316 in step G8, is inconsistent with the command content to the apparatus 4050a, stored in the storage unit 4314 (whether the behavior is consistent with the command content). When it is reversed that there is no inconsistency (that is, when it is determined that the behavior is consistent with the command content), the process proceeds to step G5. On the other hand, when it is determined that there is inconsistency, the process proceeds to step G10.

In step G10, the behavior of the apparatus 4050a (the result judged by the judging unit 4316 in step G8) is stored in the storage unit 4314. Specifically, as shown in FIG. 60, the apparatus identification code that indicates the apparatus, the command content to the apparatus, and the behavior of the apparatus, judged by the judging unit 4316, are stored in the storage unit 4314 in association with one another.

Subsequently, in step G11, the transmission unit 4170a outputs (transmits) the result determined by the determination unit 4318 (whether the behavior of the apparatus 4050a is inconsistent with the command content to the apparatus 4050a) to the communication unit 4250 of the operating unit 4200. Particularly, in step G11, the transmission unit 4170a transmits the fact that there is inconsistency (the fact that the behavior of the apparatus 4050a is inconsistent with the command content to the apparatus 4050a) to the communication unit 4250 of the operating unit 4200.

The flowchart of the processes described here is an example of the flowchart of the processes of the apparatus management device 4300 and may be changed as needed.

For example, the order of steps of the processes may be changed as needed without any contradiction.

For example, the apparatus management device 4300 does not need to retransmit first information A401. When it is determined in step G4 that the behavior of the apparatus 4050a is inconsistent with the command content to the apparatus 4050a, the process may directly proceed to the process of step G10.

For example, here, the apparatus management device 4300 retransmits first information A401 only once. However, retransmission of first information A401 may be performed multiple times (for example, a predetermined number of times or until the behavior of the apparatus 4050a becomes consistent with the command content to the apparatus 4050a).

(4-2-3) First Apparatus Group

The apparatuses 4050a, 4050b, . . . , 4050n of the first apparatus group 4050 are apparatuses operable by using an infrared signal. The apparatuses 4050a, 4050b, . . . , 4050n of the first apparatus group 4050 are examples of an apparatus to be operated. Although not limited, examples of the apparatuses 4050a, 4050b, . . . , 4050n of the first apparatus group 4050 include an electric fan, a luminaire, and an audio instrument. The apparatuses 4050a, 4050b, . . . , 4050n of the first apparatus group 4050 may include, for example, an air conditioner operable by using an infrared signal, other than the air conditioner 4010. The apparatuses 4050a, 4050b, . . . , 4050n of the first apparatus group 4050 need not be connected to the network 4080.

The apparatuses 4050a, 4050b, . . . , 4050n of the first apparatus group 4050 are apparatuses operable by using an infrared signal that is transmitted from the infrared output device 4040 in response to input of a voice command to the operating unit 4200. Examples of contents operable by using an infrared signal include turning on or off of the apparatuses 4050a, 4050b, . . . , 4050n, change of a set air volume in the case of an electric fan, change a set brightness in the case of a luminaire, and change a set volume in the case of an audio instrument.

The apparatuses 4050a, 4050b, . . . , 4050n of the first apparatus group 4050 may be configured to be operable with a general infrared remote controller, or switches provided on the bodies of the apparatuses 4050a, 4050b, . . . , 4050n, in addition to a voice operation (in addition to an operation by using an infrared signal that is transmitted from the infrared output device 4040 in response to input of a voice command).

(4-2-4) Second Apparatus Group

The apparatuses 4060a, 4060b, . . . , 4060m of the second apparatus group 4060 are apparatuses operable by using a signal that is transmitted via the network 4080. Although not limited, examples of the apparatuses 4060a, 4060b, ..., 4060m of the second apparatus group 4060 include a television and a DVD recorder. The apparatuses 4060a, 4060b, ..., 4060m of the second apparatus group 4060 each have a wireless LAN adaptor (not shown) and are connected to the network 4080 via the router 4082 (see FIG. 56). The apparatuses 4060a, 4060b, ..., 4060m of the second apparatus group 4060 are communicably connected to at least one of the analyzing server 4020 and the equipment server 4070 via the network 4080 (see FIG. 56). The apparatuses 4060a, 4060b, ..., 4060m of the second apparatus group 4060 may be connected to the router 4082 not by a wireless LAN but by a wired LAN.

The apparatuses 4060a, 4060b, ..., 4060m of the second apparatus group 4060 are operated by using a signal that is transmitted from the analyzing server 4020 or the equipment server 4070 in response to input of a voice command to the operating unit 4200. Examples of contents operable by using a signal that is transmitted from the analyzing server 4020 or the equipment server 4070 include turning on or off the apparatuses 4060a, 4060b, ..., 4060m, change of a channel or volume in the case of a television, and setting of scheduled video recording in the case of a DVD recorder.

The apparatuses 4060a, 4060b, ..., 4060m of the second apparatus group 4060 may be configured to be operable with a generally used remote controller or switches provided on the bodies of the apparatuses 4060a, 4060b, ..., 4060m in addition to a voice operation (in addition to an operation by using a signal that is transmitted via the network 4080 in response to input of a voice command).

(4-2-5) Analyzing Server

The analyzing server 4020 is communicably connected to the operating unit 4200, the air conditioner 4010, the air conditioner server 4030, and the equipment server 4070 via the network 4080.

As the operating unit 4200 receives a voice command, the communication unit 4250 transmits a signal S corresponding to the voice command to the analyzing server 4020 via the network 4080 (see FIG. 57). Voice commands that are received by the operating unit 4200 include a voice command related to an operation of the air conditioner 4010, voice commands related to operations of the apparatuses 4050a, 4050b, ..., 4050n of the first apparatus group 4050, and voice commands related to operations of the apparatuses 4060a, 4060b, ..., 4060m of the second apparatus group 4060. In other words, the analyzing server 4020 receives a signal S associated with a voice command that is a command to the air conditioner 4010, any one of the apparatuses 4050a, 4050b, ..., 4050n, or any one of the apparatuses 4060a, 4060b, 4060m via the network 4080.

The analyzing server 4020 is an example of an analyzing device. The analyzing server 4020 is a computer that analyzes a received signal S by running a program stored in a storage device. For example, specifically, the analyzing server 4020 performs voice recognition of a voice signal that is a received signal S. The analyzing server 4020 may interpret the meaning of text information that is a received signal S.

In addition to the program, for example, a list of apparatuses (the air conditioner 4010, the apparatuses 4050a, 4050b, ..., 4050n of the first apparatus group 4050, and the apparatuses 4060a, 4060b, ..., 4060 of the second apparatus group 4060) operable by each operating unit 4200 may be stored in the storage device of the analyzing server 4020. In other words, the analyzing server 4020 holds that which apparatus(es) is/are operable from each operating unit 4200. As for the apparatuses 4060a, 4060b, ..., 4060m of the second apparatus group 4060, information as to whether each of the apparatuses 4060a, 4060b, ..., 4060m to be controlled is a target to be directly controlled by the analyzing server 4020 (by which each of the apparatuses 4060a, 4060b, ..., 4060m is a target to be controlled, the analyzing server 4020 or the equipment server 4070) is also desirably stored.

The analyzing server 4020, for example, analyzes voice as a signal S and obtains its feature quantity, and generates text information from the feature quantity by using a voice recognition dictionary including an acoustic model, a language model, and a pronouncing dictionary stored in the storage device. Although not limited, text information that is generated by the analyzing server 4020 is, for example, text information, such as "Turn on the air conditioner", "Set the set temperature of the air conditioner to 25 degrees C.", "Turn off the lighting device", and "Turn on the television".

When the generated text information is associated with control over the air conditioner 4010 (for example, when text information contains a keyword associated with an air conditioner), the analyzing server 4020 transmits the analyzed result of the signal S (that is, the generated text information) to the air conditioner server 4030 via the network 4080 (see FIG. 57).

When the text information is associated with control over any one of the apparatuses 4050a, 4050b, ... 4050n of the first apparatus group 4050 (for example, when the text information contains a keyword associated with the first apparatus group 4050), the analyzing server 4020 generates second information A402 on the a command content to the any one of the apparatuses 4050a, 4050b, ..., 4050n of the first apparatus group 4050 and transmits the second information A402 to the apparatus management device 4300 (communication unit 4170) of the air conditioner 4010. The second information A402 is as described above.

When the text information is associated with control over any one of the apparatuses 4060a, 4060b, ..., 4060m of the second apparatus group 4060 (for example, when the text information contains a keyword associated with the second apparatus group 4060), the analyzing server 4020 transmits a command corresponding to the analyzed result of the signal S (that is, the generated text information) to the any one of the apparatuses 4060a, 4060b, 4060m of the second apparatus group 4060. For example, when the text information is information related to a television contained in the apparatuses 4060a, 4060b, ..., 4060m of the second apparatus group 4060 (for example, "Turn on the television"), the analyzing server 4020 transmits, to the television, a command to turn on the switch. A command to any one of the apparatuses 4060a, 4060b, ..., 4060m of the second apparatus group 4060 is transmitted from the analyzing server 4020 to the any one of the apparatuses 4060a, 4060b, ..., 4060m of the second apparatus group 4060 via the network 4080.

When the text information is associated with control over any one of the apparatuses 4060a, 4060b, ..., 4060m of the second apparatus group 4060 and the any one of the apparatuses 4060a, 4060b, ..., 4060m to be controlled is not a target to be directly controlled by the analyzing server 4020, the text information is transmitted to the equipment server 4070 that controls the any one of the apparatuses 4060a, 4060b, ..., 4060m. A command is transmitted from the equipment server 4070 to the any one of the apparatuses 4060a, 4060b, ..., 4060m via the network 4080.

(4-2-6) Air Conditioner Server

The air conditioner server 4030 is an example of a command generating device.

The air conditioner server 4030 generates a command C based on an analyzed result of a signal S by the analyzing server 4020, transmitted from the analyzing server 4020 (that is, text information generated by the analyzing server 4020), and information J about a state quantity associated with at least one of the air conditioner 4010 and the air-conditioned space, which is transmitted as needed from the transmission unit 4170*a* of the air conditioner 4010. The air conditioner server 4030 transmits a command C to the receiving unit 4170*b* of the air conditioner 4010 via the network 4080. Although not limited, as the air conditioner server 4030 receives, for example, the command "Turn on the air conditioner" as text information, the air conditioner server 4030 determines the operations of the various units of the air conditioner 4010 based on the current temperature and other information of the air-conditioned space and transmits the determined operations as a command C.

Here, the air conditioner server 4030 generates a command C based on information J in addition to an analyzed result of a signal S by the analyzing server 4020; however, the configuration is not limited thereto. The air conditioner server 4030 may generate a command C based on only an analyzed result of a signal S by the analyzing server 4020.

The air conditioner server 4030 accumulates a signal S that is transmitted from the operating unit 4200 and performs various analyses by using the signals S.

In the present embodiment, the equipment system 4000 includes the air conditioner server 4030; however, the configuration is not limited thereto. For example, when the air conditioner 4010 is able to directly determine the behavior based on an analyzed result of a signal S by the analyzing server 4020 (that is, text information generated by the analyzing server 4020), the air conditioner server 4030 need not be provided. The analyzed result of the signal S by the analyzing server 4020 may be directly transmitted to the receiving unit 4170*b* of the air conditioner 4010 as a command C.

(4-2-7) Equipment Server

The equipment server 4070 generates a command for any one of the apparatuses 4060*a*, 4060*b*, . . . , 4060*m* of the second apparatus group 4060 based on an analyzed result of a signal S by the analyzing server 4020 (that is, text information generated by the analyzing server 4020), transmitted from the analyzing server 4020. The equipment server 4070 transmits a command to the any one of the apparatuses 4060*a*, 4060*b*, . . . , 4060*m* of the second apparatus group 4060 to be operated via the network 4080.

FIG. 56 shows the one equipment server 4070; however, there are multiple types of the apparatuses 4060*a*, 4060*b*, . . . , 4060*m* that are operated (not by a command from the analyzing server 4020 but) by the equipment server 4070, there are desirably the equipment servers 4070 in number corresponding to the number of the types.

When the apparatuses 4060*a*, 4060*b*, . . . , 4060*m* each are operated by a command from the analyzing server 4020, the equipment server 4070 need not be provided.

(4-2-8) Infrared Output Device

The infrared output device 4040 is a device that transmits a command to the apparatuses 4050*a*, 4050*b*, . . . , 4050*n* of the first apparatus group 4050 by using an infrared signal.

In one embodiment, the infrared output device 4040 is mounted in the indoor unit 4012 of the air conditioner 4010 or in the indoor unit 4012'. The infrared output device 4040 is, for example, installed in the indoor unit 4012 or the indoor unit 4012' (see the infrared output device 4040 shown by the solid lines in FIG. 58A and FIG. 58B) such that an infrared light-emitting part (for example, an infrared LED, not shown) of an infrared signal transmission unit 4044 (described later) is disposed on the outside of the body 4100 of the indoor unit 4012 or on the outside of the body 4100' of the indoor unit 4012'. The infrared light-emitting part of the infrared signal transmission unit 4044 is desirably disposed near an infrared signal receiving unit (not shown) of the indoor unit 4012 or indoor unit 4012' (a receiving unit for an infrared signal from an ordinary remote controller to the air conditioner 4010). Part of the components of the infrared output device 4040 may be disposed inside the body 4100 of the indoor unit 4012 or inside the body 4100' of the indoor unit 4012'.

In another mode, the infrared output device 4040 need not be mounted in the indoor unit 4012 or in the indoor unit 4012'. In other words, the infrared output device 4040 is a device independent of the air conditioner 4010. The infrared output device 4040 is installed in the body 4100 of the indoor unit 4012 or in the body 4100' of the indoor unit 4012' (see the infrared output device 4040 shown by the solid lines in FIG. 58A and FIG. 58B), or on a wall surface near the body 4100 of the indoor unit 4012 (see the infrared output device 4040 shown by the dashed line in FIG. 58A), or on a ceiling surface near the body 4100' of the indoor unit 4012' (see the infrared output device 4040 shown by the dashed line in FIG. 58B).

In the present embodiment, the single infrared output device 4040 is provided for the indoor unit 4012 or the indoor unit 4012'; however, the configuration is not limited thereto. In another mode, a plurality of the infrared output devices 4040 may be provided for the indoor unit 4012 or the indoor unit 4012'.

The infrared output device 4040 mainly includes a first information receiving unit 4042, the infrared signal transmission unit 4044, and a storage unit 4046.

The first information receiving unit 4042 receives first information A401 transmitted from the first information transmission unit 4312 of the apparatus management device 4300.

An infrared signal pattern for control is stored in the storage unit 4046 for each of the apparatuses 4050*a*, 4050*b*, . . . , 4050*n* of the first apparatus group 4050 and each a command content.

The infrared signal transmission unit 4044 transmits an infrared signal of a pattern corresponding to the first information A401 received by the first information receiving unit 4042 to an apparatus to be operated (when the first information A401 is information regarding a command for the apparatus 4050*a*, the apparatus 4050*a*) from the infrared light-emitting part (not shown) by consulting the storage unit 4046.

(4-3) Characteristics (4-3-1)

The operating system 4001 according to the present embodiment includes the air conditioner 4010 and the infrared output device 4040. The air conditioner 4010 includes the indoor unit 4012. The infrared output device 4040 is installed in the indoor unit 4012 or on a wall surface or ceiling surface near the indoor unit 4012. The infrared output device 4040 receives first information A401 regarding a command for an apparatus (hereinafter, which may be referred to as apparatus to be operated) of the first apparatus group 4050 and transmits an infrared signal corresponding to the first information A401 to the apparatus to be operated. The apparatus to be operated is an apparatus other than the air conditioner 4010 and operable by using an infrared signal. The air conditioner 4010 includes the apparatus management device 4300 that manages the apparatus to be operated. The apparatus management device 4300 includes the receiving unit 4170*b* that serves as an example of a designated information receiving unit, and the determination unit 4318. The receiving unit 4170*b* receives second information A402 on the a command content. The determination unit 4318 determines whether the behavior of an apparatus to be operated is inconsistent with the a command content to the apparatus to be operated based on the behavior of the apparatus to be operated and the second information A402.

Here, since the apparatus management device 4300 of the air conditioner 4010 determines whether the actual behavior of an apparatus to be operated is inconsistent with the a command content to the apparatus to be operated (an apparatus of the first apparatus group 4050), a state where the behavior is inconsistent with the command content (operation failed state) is hardly left as it is.

Since the air conditioner 4010 includes the apparatus management device 4300, particularly the following advantages are obtained.

Houses, offices, and the like, are often air-conditioned by the air conditioner 4010. For this reason, when the air conditioner 4010 includes the apparatus management device 4300, an apparatus to be operated can be managed without additionally providing a device exclusive to management of the apparatus, so equipment cost tends to be reduced.

In addition, when the infrared output device 4040 is disposed in the indoor unit 4012 of the air conditioner 4010 or on a wall surface or ceiling surface near the indoor unit 4012, the following advantages are obtained.

Furniture, and the like, are placed in a house, an office, or the like, so, depending on the installation position of the infrared output device 4040, furniture, and the like, can be obstacles and, as a result, an infrared signal may not reach an infrared photoreceiving portion of an apparatus to be operated.

The indoor unit 4012 is often provided on a ceiling or near a ceiling from which a space can be looked over from its original functional viewpoint. Moreover, to achieve the purpose of air-conditioning, there is a low possibility that furniture, such as a shelf, is disposed near the indoor unit 4012 so as to interfere with sending of air. In other words, there is a relatively low possibility that an obstacle that interferes with transmission of an infrared signal is installed near the indoor unit 4012.

For this reason, with the operating system in which the infrared output device 4040 is installed in the indoor unit 4012 of the air conditioner 4010 or on a wall surface or ceiling surface near the indoor unit 4012, the state where an operation content in a command from the infrared output device 4040 is inconsistent with an actual behavior of an apparatus hardly occurs in the first place.

(4-3-2)

In the operating system 4001 according to the present embodiment, the apparatus management device 4300 includes the first information transmission unit 4312. The first information transmission unit 4312 transmits first information A401 to the infrared output device 4040.

With the operating system 4001, when the first information A401 is transmitted from the apparatus management device 4300 to the infrared output device 4040, an infrared signal corresponding to the first information A401 is transmitted to an apparatus to be operated. In other words, the operation of the infrared output device 4040 to transmit a signal is controlled by the apparatus management device 4300 of the air conditioner 4010. The infrared output device 4040 is installed in the indoor unit 4012 or near the indoor unit 4012. Therefore, the operating system 4001 can be implemented almost without wiring work for installing the infrared output device 4040.

(4-3-3)

In the operating system 4001 according to the present embodiment, when the determination unit 4318 determines that there is inconsistency, the first information transmission unit 4312 retransmits the first information A401 to the infrared output device 4040.

With the operating system 4001, when an actual behavior of the apparatus to be operated is inconsistent with the content of an operation in the command, the first information A401 is resent, and, as a result, an infrared signal corresponding to the first information A401 is resent from the infrared output device 4040 to the apparatus to be operated. Therefore, an operation failed state is hardly left as it is.

(4-3-4)

In the operating system 4001 according to the present embodiment, the infrared output device 4040 is mounted in the indoor unit 4012.

The infrared output device 4040 is mounted in the indoor unit 4012. Therefore, work for connecting the infrared output device 4040 and the indoor unit 4012 on site is not required.

(4-3-5)

The operating system 4001 according to the present embodiment includes the operational status detecting unit. The operational status detecting unit detects an operational status of the apparatus to be operated. The apparatus management device 4300 includes the judging unit 4316. The judging unit 4316 judges a behavior of the apparatus to be operated based on the operational status that is detected by the operational status detecting unit.

An apparatus to be operated with infrared ray mostly has no output unit that outputs a behavior to the outside. However, the operating system 4001 includes the operational status detecting unit that detects the operational status of the apparatus to be operated, and the behavior of the apparatus to be operated is judged based on the detected operational status. Therefore, even an apparatus to be operated without an output unit, or the like, that outputs a behavior can be managed by the apparatus management device 300.

(4-3-6)

In the operating system 4001 according to the present embodiment, the operational status detecting unit includes at least one of the microphone elements 4210*a*, the camera 4420, the sensor 4410 that measures a current or electric power, and the environment sensor 4430, such as an illuminance sensor, a temperature sensor, and a barometric sensor.

The operational status detecting unit acquires an operating sound of the apparatus to be operated or a notification sound at the time of receiving an infrared signal with the microphone elements 4210*a*, detects the behavior of the apparatus to be operated with the camera 4420, or measures various state quantities with various sensors 4410, 4430. Thus, the operational status of the apparatus to be operated can be accurately acquired.

(4-3-7)

In the operating system 4001 according to the present embodiment, the apparatus management device 4300 includes the transmission unit 4170*a* as an example of an output unit. The transmission unit 4170*a* outputs information about a result determined by the determination unit 4318.

With the operating system 4001, information about a result determined by the determination unit 4318 is output. Therefore, the state (operation failed state) of the apparatus to be operated, where an operation content in a command is inconsistent with an actual behavior, is hardly left as it is.

(4-3-8)

The operating system 4001 according to the present embodiment includes the operating unit 4200 as an example of a command receiver. The operating unit 4200 receives a command to an apparatus to be operated as a voice command and transmits a signal on the voice command to the analyzing server 4020 via the network 4080. The analyzing server 4020 is an example of an analyzing device that analyzes a signal. First information A401 is information based on an analyzed result of a signal by the analyzing server 4020.

The apparatus to be operated can be operated by voice, so convenience is high.

(4-4) Modifications

Hereinafter, modifications of the above-described embodiment will be described. The modifications may be combined with each other as needed without any contradiction.

(4-4-1) Modification 4A

In the above-described embodiment, the operating system 4001 is a system that is able to operate the air conditioner 4010, the apparatuses of the first apparatus group 4050, and the apparatuses of the second apparatus group 4060 by using a voice command; however, the configuration is not limited thereto.

For example, in the operating system 4001, one of the air conditioner 4010 and the apparatuses of the second apparatus group 4060 or both the air conditioner 4010 and the apparatuses of the second apparatus group 4060 need not be a target to be operated. When the second apparatus group 4060 is not operated by using a voice command, the apparatuses of the second apparatus group 4060 and the equipment server 4070 need not be included in the operating system 4001.

(4-4-2) Modification 4B

In the above-described embodiment, the analyzing server 4020, air conditioner server 4030, and equipment server 4070 of the equipment system 4000 are separate servers; however, the configuration is not limited thereto. For example, a single server may function as the analyzing server 4020 and the air conditioner server 4030 or functions as the analyzing server 4020, the air conditioner server 4030, and the equipment server 4070.

Conversely, the functions of each of the analyzing server 4020, air conditioner server 4030, and equipment server 4070 described in the above embodiment may be not implemented by a single server but by a plurality of servers.

In the above-described embodiment, the analyzing server 4020 directly receives a signal S that is transmitted by the communication unit 4250; however, the configuration is not limited. For example, the communication unit 4250 may transmit a signal S to the air conditioner server 4030 and the signal S may be transmitted from the air conditioner server 4030 to the analyzing server 4020.

(4-4-3) Modification 4C

In the above-described embodiment, a signal S is transmitted from the operating unit 4200 to the analyzing server 4020, and second information A402 is transmitted from the analyzing server 4020 to the apparatus management device 4300; however, the configuration is not limited thereto. For example, the operating unit 4200 may have functions described as the functions of the analyzing server 4020 in the above-described embodiment. In this case, the operating unit 4200 generates second information A402 in response to a voice command and transmits the generated second information A402 to the apparatus management device 4300.

Alternatively, the operating unit 4200 may have part or all of the functions of the air conditioner server 4030 and the equipment server 4070 in addition to the functions of the analyzing server 4020.

(4-4-4) Modification 4D

The air conditioner 4010 of the operating system 4001 according to the above-described embodiment is a device that adjusts the temperature or humidity of air; however, the configuration is not limited thereto. The air conditioner according to the present invention may be an air cleaner that cleans air by removing dust, or the like, in air and blows the cleaned air, an air flow adjuster that adjusts the flow of air in an air-conditioned space, or other devices.

(4-4-5) Modification 4E

In the equipment system 4000 according to the above-described embodiment, second information A402 is generated by the analyzing server 4020, and first information A401 that is generated by the apparatus management device 4300 that has received the second information A402 is transmitted to the infrared output device 4040; however, the configuration is not limited thereto.

For example, when text information that is obtained as a result of analysis of a signal S is associated with control over any one of the apparatuses 4050*a*, 4050*b*, . . . , 4050*n* of the first apparatus group 4050, the analyzing server 4020 may transmit the analyzed result of the signal S (that is, the generated text information) to the air conditioner server 4030 or the equipment server 4070. In the air conditioner server 4030 or equipment server 4070 that has received the analyzed result, second information A402 on the a command content to the any one of the apparatuses 4050*a*, 4050*b*, . . . , 4050*n* of the first apparatus group 4050 may be generated and transmitted to the apparatus management device 4300.

Figure 61:
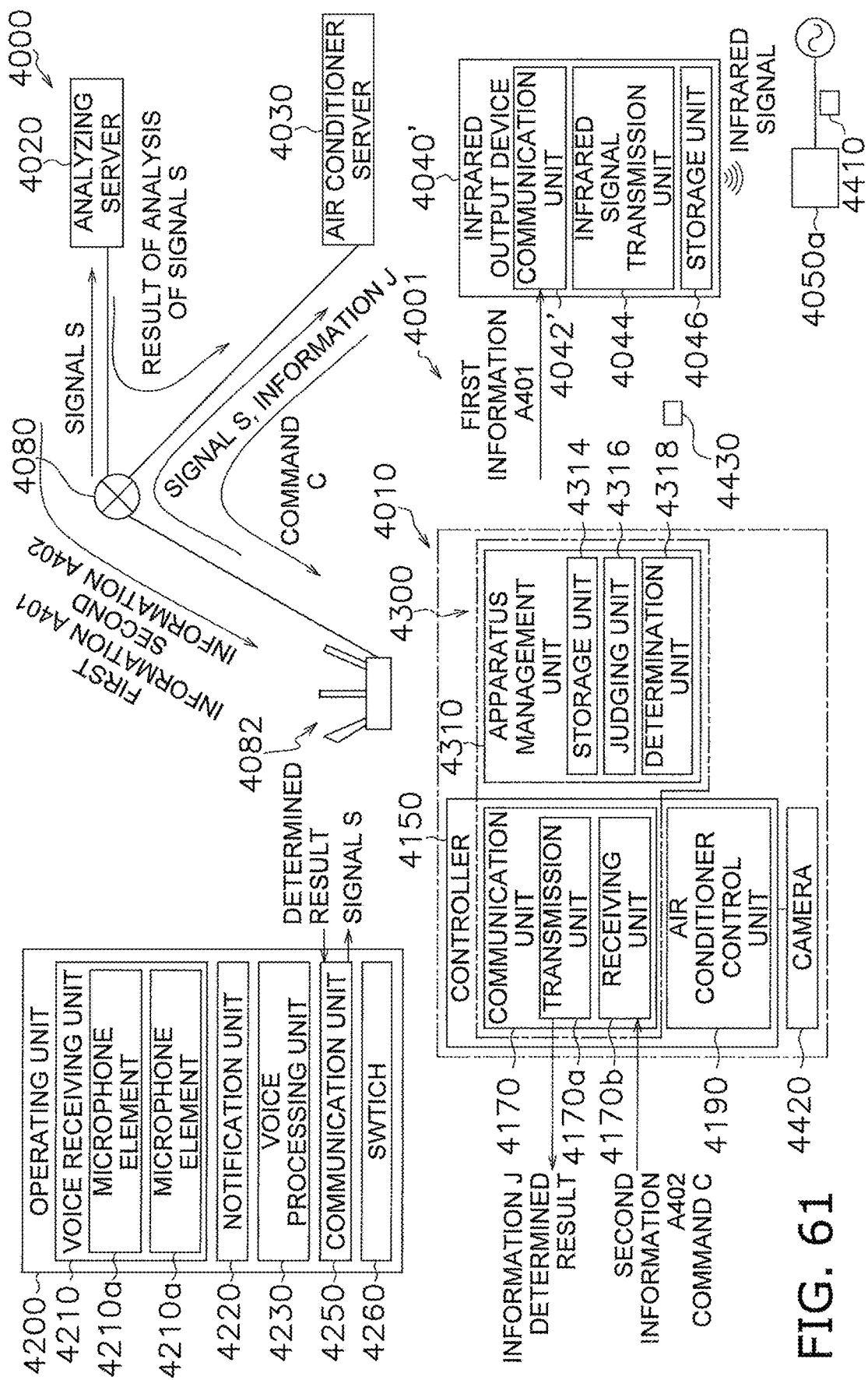
FIG. 61 is a schematic block diagram of an operating system of a modification 4E, and, in FIG. 61, part of components of the operating system are not shown.

For example, as shown in FIG. 61, the infrared output device of the operating system 4001 may be an infrared output device 4040' including a communication unit 4042' that is able to connect with the router 4082 through a wireless LAN. The infrared output device 4040' may receive first information A401, which is generated by the analyzing server 4020, via the network 4080. When configured in this way, a result determined by the determination unit 4318 may be transmitted from the apparatus management device 4300 to the analyzing server 4020, and the first information A401 may be, for example, resent from the analyzing server 4020 to the infrared output device 4040' based on the determined result.

In another mode, instead of the analyzing server 4020, first information A401 that is generated in the air conditioner server 4030 or the equipment server 4070 may be transmitted to the infrared output device 4040'.

(4-4-6) Modification 4F

In the operating system 4001 according to the above-described embodiment, the air conditioner 4010, the apparatuses of the first apparatus group 4050, and the apparatuses of the second apparatus group 4060 are operated by input of a voice command to the operating unit 4200; however, the configuration is not limited thereto. For example, in the operating system 4001, the air conditioner 4010, the apparatuses of the first apparatus group 4050, and the apparatuses of the second apparatus group 4060 may be operated through text input, switch operation, or the like, to the operating unit.

(4-4-7) Modification 4G

In the above-described embodiment, the transmission unit 4170a that is an example of the output unit of the apparatus management device 4300 outputs (transmits) a result determined by the determination unit 4318 to the operating unit 4200; however, the configuration is not limited thereto.

For example, the transmission unit 4170a may output (transmit) a result determined by the determination unit 4318 to various apparatuses other than the operating unit 4200 (for example, a mobile terminal of an operator, or a notification device, such as a display and a speaker, installed separately from the operating unit 4200. The output unit of the apparatus management device 4300 may output a result determined by the determination unit 4318 from a notification unit (for example, a speaker or a display) provided in the air conditioner 4010.

(4-4-8) Modification 4H

In the above-described embodiment, the apparatuses 4050a, 4050b, ..., 4050n of the first apparatus group 4050 do not provide their own behaviors to the apparatus management device 4300; however, the configuration is not limited thereto. For example, part or all of the apparatuses 4050a, 4050b, ..., 4050n of the first apparatus group 4050 may further include an infrared transmitter for providing their own current behaviors or a notification on an infrared signal received from the infrared output device 4040, and may provide behaviors to the apparatus management device 4300 by using an infrared signal by themselves.

<Additional Statement>

The present invention is not limited to the above-described embodiments. The present invention may be implemented by modifying components without departing from the purport of the present invention in a practical phase. The present invention may form various inventions by combining a plurality of components described in the above-described embodiments as needed. For example, some components may be deleted from all the components described in the embodiments. Furthermore, the components of the different embodiments may be combined as needed.

REFERENCE SIGNS LIST

1001 operating system
1001S operating system
1001T operating system
1001V operating system
1002 building
1005 user
1007A first communication adaptor
1007B second communication adaptor
1010 first-type apparatus
1020 second-type apparatus
1030 third-type apparatus
1050 operating device
1060 input receiving device
1061 specific operation storage unit
1062 specific operation information identifying unit
1063 specific operation execution unit
1070 infrared output device
1100 first information processing device
1100S first information processing device
1110 operation information analyzing unit
1120 control instruction determination unit
1120S control instruction determination unit
1200 second information processing device
1200S second information processing device
1200T second information processing device
1200V second information processing device
1207T control instruction determination unit
1207V control instruction determination unit
1240 associated apparatus storage unit
1240S associated apparatus storage unit
1241 environmental information acquiring unit
1241S environmental information acquiring unit
1242 associated apparatus extracting unit
1242S associated apparatus extracting unit
1243 associated apparatus control unit
1243S associated apparatus control unit
1250 specific situation storage unit
1251 specific situation detecting unit
1252 specific situation control unit
1300S third information processing device
2001 control system
2001S control system
2005 user
2010 first-type apparatus (controlled apparatus)
2020 second-type apparatus (controlled apparatus)
2020d air-conditioning device
2020F fixed apparatus
2060 input receiving device
2060S input receiving device
2070 infrared output device
2070S infrared output device
2070A attitude control device
2074A infrared pattern DB
2074B relative position DB
2075A output instruction transmission unit
2075B attitude control unit
2100S information processing device
2104A infrared pattern DB
2104B relative position DB
2110 voice input analyzing unit
2120 control identifying unit
2130 first control unit (output instruction transmission unit)
2135 second control unit
3001 control system
3005a user
3005b user
3010 first-type apparatus (controlled apparatus)
3020 second-type apparatus (controlled apparatus)
3020F fixed apparatus
3020K environmental information detecting apparatus (environmental information detecting device)
3060 input receiving device
3070 infrared output device
3070A attitude control device
3100 information processing device
3100A first information processing device
3110 voice input analyzing unit
3120 control identifying unit
3130 first control unit (output instruction transmission unit)
3135 second control unit
3140 control determination unit
3150 abnormality processing unit
3200A second information processing device
4001 operating system
4010 air conditioner
4012 indoor unit
4012' indoor unit
4020 analyzing server (analyzing device)
4040 infrared output device
4040' infrared output device
4050a apparatus (apparatus to be operated)
4050b apparatus (apparatus to be operated)

4050n apparatus (apparatus to be operated)
4080 network
4170a transmission unit (output unit)
4170b receiving unit (command information receiving unit)
4200 operating unit (command receiver)
4210a microphone element (operational status detecting unit)
4300 apparatus management device
4312 first information transmission unit
4316 judging unit
4318 determination unit
4410 sensor (operational status detecting unit)
4420 camera (operational status detecting unit)
4430 environment sensor (operational status detecting unit)
A401 first information
A402 second information
K environmental information detecting apparatus
NW network
R room
S signal

CITATION LIST

Patent Literature

Patent Literature 1: Japanese Registered Utility Model No. 3130081
Patent Literature 2: Japanese Laid-open Patent Publication No. H6-113365

The invention claimed is:

1. A control system comprising:
an input receiving device configured to receive input of a control command to a first-type apparatus controllable by infrared ray;
an infrared output device configured to output infrared ray to the first-type apparatus;
an environmental information detecting device configured to detect environmental information around the first-type apparatus; and
an information processing device configured to receive the control command from the input receiving device and transmit, to the infrared output device, an output instruction to output infrared based on the control command,
the information processing device is being configured to receive the environmental information from the environmental information detecting device and determine that the first-type apparatus has been controlled based on the output instruction and the environmental information, and
the information processing device being further configured to retransmit the output instruction to the infrared output device when the information processing device determines that the first-type apparatus has not been operationally controlled.

2. A control system according to claim 1, wherein
the information processing device is configured to transmit, to the input receiving device, notification that the controlled apparatus has not been controlled, when the information processing device determines that the first-type apparatus has not been controlled.

3. A control system according to claim 1, wherein
an attitude control device configured to control an attitude of the infrared output device is installed in the infrared output device.

4. An information processing device connectable to
an input receiving device configured to receive input of a control command to a first-type apparatus controllable by infrared ray;
an infrared output device configured to output infrared ray to the first-type apparatus;
an environmental information detecting device configured to detect environmental information around the first-type apparatus, the information processing device comprising:
an output instruction transmission unit configured to receive the control command from the input receiving device and transmit, to the infrared output device, an output instruction to output infrared based on the control command; and
a control determination unit configured to receive the environmental information from the environmental information detecting device and determine that the first-type apparatus has been controlled based on the output instruction to output infrared and the environmental information,
the output instruction transmission unit being configured to retransmit the output instruction to the infrared output device when the control determination unit determines that the first-type apparatus has not been operationally controlled.

* * * * *